US012574429B2

(12) United States Patent
Svennebring et al.

(10) Patent No.: US 12,574,429 B2
(45) Date of Patent: Mar. 10, 2026

(54) LINK PERFORMANCE PREDICTION AND MEDIA STREAMING TECHNOLOGIES

(71) Applicant: Intel Corporation, Santa Clara, CA (US)

(72) Inventors: Jonas Svennebring, Sollentuna (SE); Carl-Oscar Montelius, Sollentuna (SE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/626,119

(22) PCT Filed: Aug. 7, 2020

(86) PCT No.: PCT/US2020/045512

§ 371 (c)(1),
(2) Date: Jan. 10, 2022

(87) PCT Pub. No.: WO2021/026509

PCT Pub. Date: Feb. 11, 2021

(65) Prior Publication Data

US 2022/0303331 A1 Sep. 22, 2022

Related U.S. Application Data

(60) Provisional application No. 62/925,691, filed on Oct. 24, 2019, provisional application No. 62/884,647, filed on Aug. 8, 2019.

(51) Int. Cl.
H04L 65/752 (2022.01)
H04L 41/147 (2022.01)

(52) U.S. Cl.
CPC .......... H04L 65/752 (2022.05); H04L 41/147 (2013.01)

(58) Field of Classification Search
CPC ... H04L 65/758; H04L 41/147; H04L 65/752; H04L 43/0882; H04L 65/612;
(Continued)

(56) References Cited

U.S. PATENT DOCUMENTS

2002/0177448 A1 11/2002 Moran et al.
2003/0195977 A1* 10/2003 Liu ...................... H04L 65/752
375/E7.181
(Continued)

FOREIGN PATENT DOCUMENTS

KR 100832537 B1 5/2008

OTHER PUBLICATIONS

PCT International Search Report and Written Opinion issued in PCT/US2020/045512, dated Nov. 3, 2020; 15 pages.
(Continued)

*Primary Examiner* — Abdulkader M Alriyashi
(74) *Attorney, Agent, or Firm* — Alliance IP, LLC

(57) ABSTRACT

In one embodiment, a computing device for receiving a media stream includes processing circuitry to receive a link performance prediction for a network link between the computing device and a network, which indicates a predicted performance of the network link during a future timeframe. Based on the link performance prediction, the processing circuitry identifies a performance objective for the media stream. The performance objective is associated with media stream content that will be received in the media stream over the network link for playback during the future timeframe. Based on the link performance prediction and the performance objective, the processing circuitry adjusts one or more media streaming parameters for the media stream content to be played during the future timeframe. The processing circuitry then receives the media stream content
(Continued)

1400

START

1402 — RECEIVE LINK PERFORMANCE PREDICTION FOR NETWORK LINK USED FOR MEDIA STREAM TRANSMISSION

1404 — IDENTIFY PERFORMANCE OBJECTIVE FOR MEDIA STREAM BASED ON LINK PERFORMANCE PREDICTION

1406 — ADJUST MEDIA STREAMING PARAMETER(S) FOR FUTURE MEDIA STREAM CONTENT BASED ON LINK PERFORMANCE PREDICTION AND PERFORMANCE OBJECTIVE

1408 — RECEIVE MEDIA STREAM CONTENT VIA NETWORK LINK BASED ON MEDIA STREAMING PARAMETER(S)

END to be played during the future timeframe over the network link based on the media streaming parameter(s).

25 Claims, 42 Drawing Sheets

(58) Field of Classification Search
CPC .............. H04L 65/80; H04N 21/23439; H04N 21/26258; H04N 21/44209; H04N 21/462; H04N 21/64738; H04N 21/8456; H04N 21/2402; H04N 21/41407
USPC ......................................................... 709/217
See application file for complete search history.

(56) References Cited

U.S. PATENT DOCUMENTS

| | | | |
|---|---|---|---|
| 2008/0155373 | A1 | 6/2008 | Friedman et al. |
| 2011/0093605 | A1* | 4/2011 | Choudhury ........... H04L 65/613 |
| | | | 709/231 |
| 2012/0258699 | A1* | 10/2012 | Kim .................. H04W 52/0209 |
| | | | 455/418 |
| 2014/0280760 | A1* | 9/2014 | Hurst ............... H04N 21/23805 |
| | | | 709/219 |
| 2014/0357993 | A1 | 12/2014 | Hiriyannaiah et al. |
| 2015/0092838 | A1 | 4/2015 | Hiriyannaiah et al. |
| 2015/0271235 | A1 | 9/2015 | Zanger et al. |
| 2015/0333953 | A1* | 11/2015 | Vasseur .................. H04L 45/22 |
| | | | 370/228 |
| 2018/0063013 | A1* | 3/2018 | Walkin .................. H04L 67/101 |
| 2018/0115743 | A1* | 4/2018 | McLoughlin ........... A63F 13/00 |
| 2018/0288773 | A1* | 10/2018 | Liu ........................ H04W 28/14 |
| 2019/0036630 | A1 | 1/2019 | Svennebring et al. |
| 2019/0068473 | A1* | 2/2019 | Vu .......................... H04L 41/16 |
| 2019/0141359 | A1* | 5/2019 | Taquet .............. H04N 21/6373 |
| 2021/0021895 | A1* | 1/2021 | Li ....................... H04N 21/4331 |

OTHER PUBLICATIONS

PCT International Preliminary Report on Patentability issued in PCT/US2020/045512, dated Feb. 17, 2022; 13 pages.
EPO Extended Search Report in EP Patent Application Serial No. 20849517.6 mailed on Apr. 28, 2023 (8 pages).
EPO Communication Pursuant to Article 94(3) EPC in EP Application Serial No. 20849517.6 mailed on May 14, 2025, 6 pages.

* cited by examiner

```
MPEG-DASH with LPP:

. . .
get_next_chunk:
        download_chunk(resolution)

bandwidth = LPP_get_future_bandwidth
        set_resolution(bandwidth)

goto get_next_chunk
 . . .
```

FIG. 4B

```
Classic MPEG-DASH:

. . .
get_next_chunk:
        start_timer_and_datacount
        download_chunk(resolution)
        stop_timer_and_datacount bandwidth = datacount / time
        set_resolution(bandwidth)

goto get_next_chunk
 . . .
```

FIG. 4A

1100
1102a
1102b
1102c
1102d
1102e
1102f
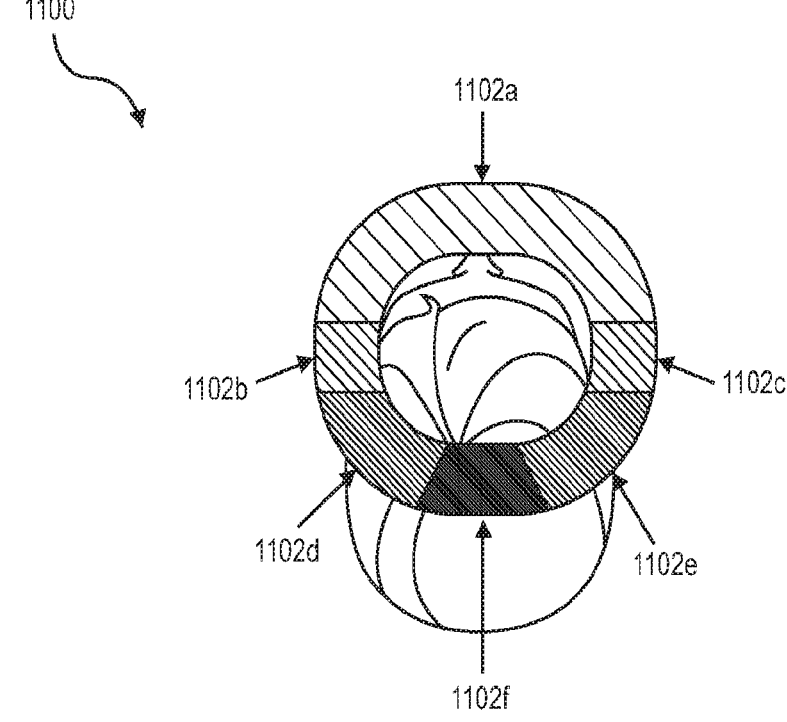
OUTSIDE FIELD OF VIEW          FIELD OF VIEW          OUTSIDE FIELD OF VIEW
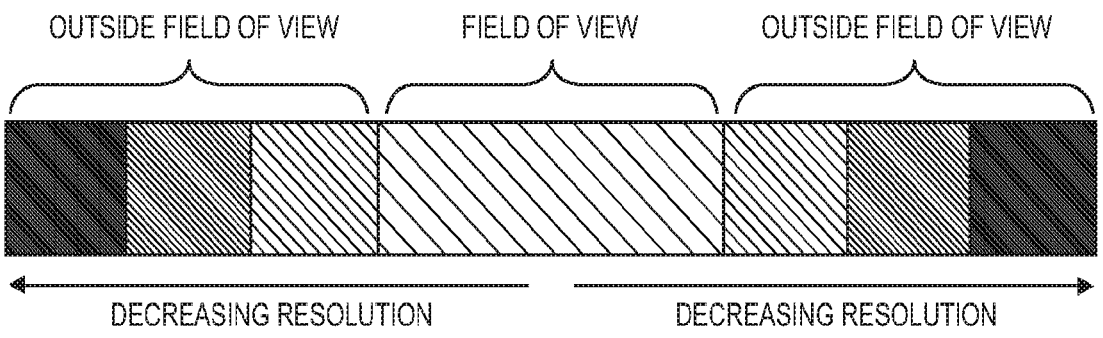
DECREASING RESOLUTION          DECREASING RESOLUTION
FIG. 11

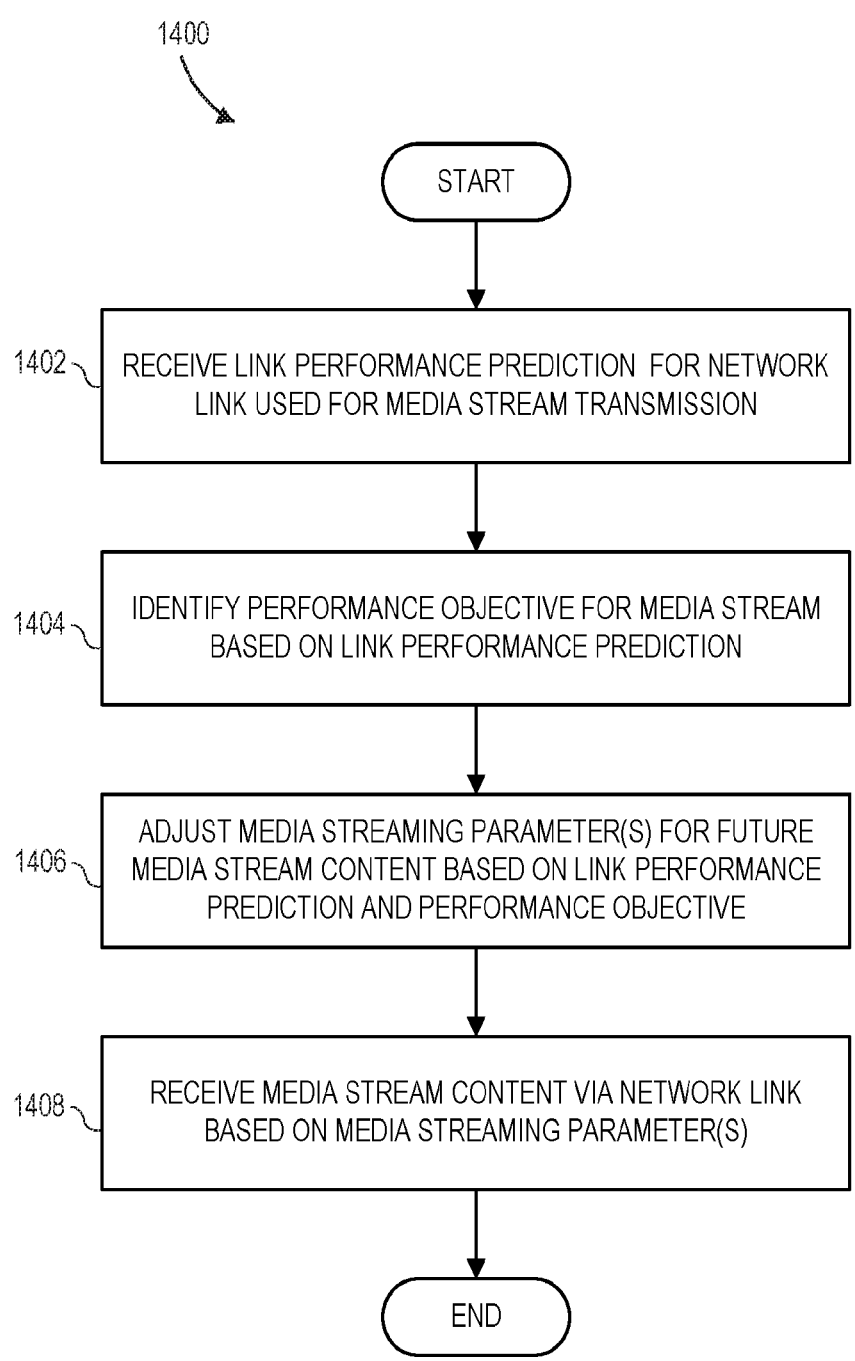

1400

START

1402 — RECEIVE LINK PERFORMANCE PREDICTION FOR NETWORK LINK USED FOR MEDIA STREAM TRANSMISSION

1404 — IDENTIFY PERFORMANCE OBJECTIVE FOR MEDIA STREAM BASED ON LINK PERFORMANCE PREDICTION

1406 — ADJUST MEDIA STREAMING PARAMETER(S) FOR FUTURE MEDIA STREAM CONTENT BASED ON LINK PERFORMANCE PREDICTION AND PERFORMANCE OBJECTIVE

1408 — RECEIVE MEDIA STREAM CONTENT VIA NETWORK LINK BASED ON MEDIA STREAMING PARAMETER(S)

END

FIG. 14

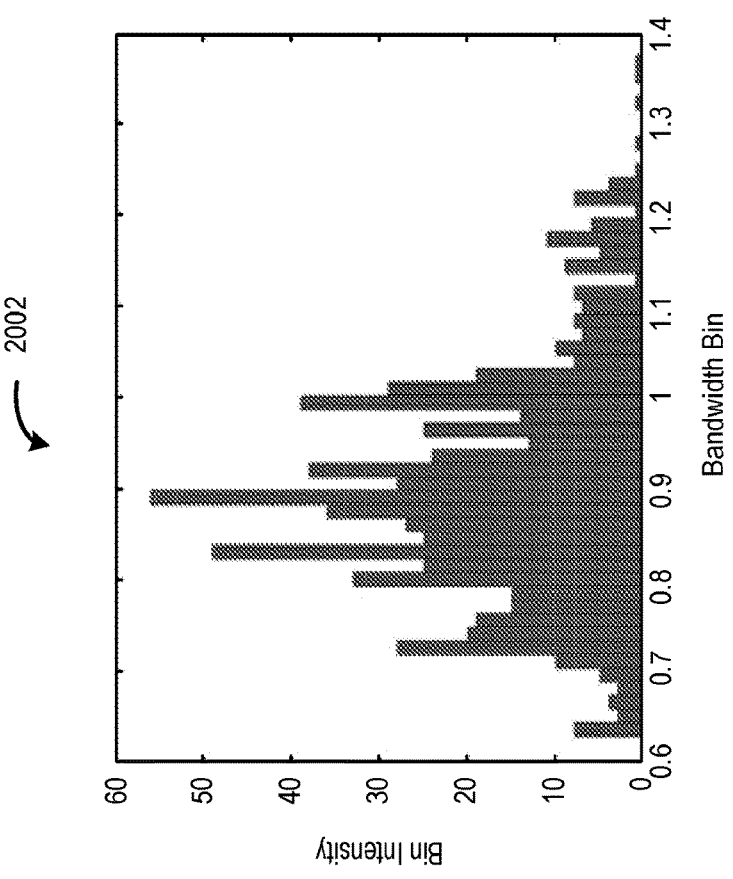
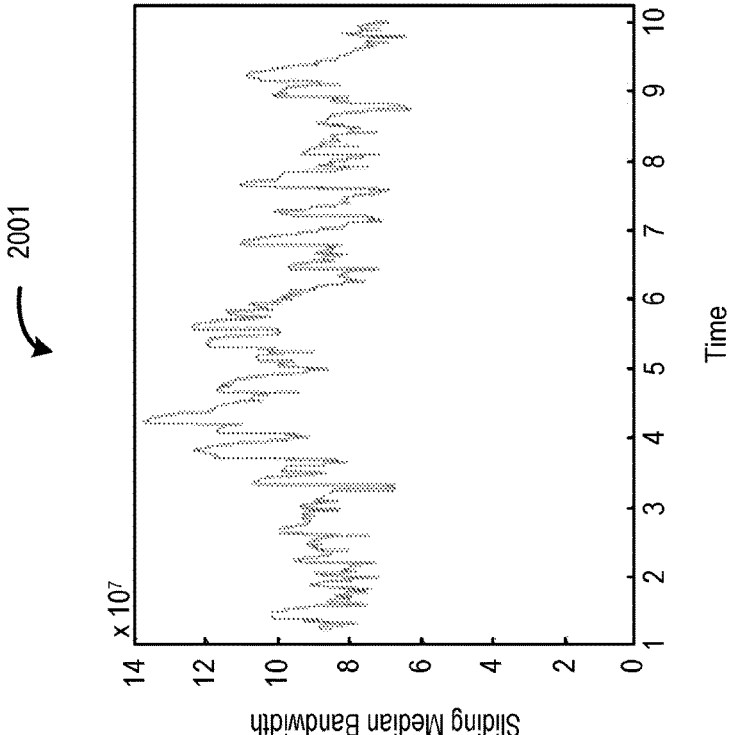
FIG. 20

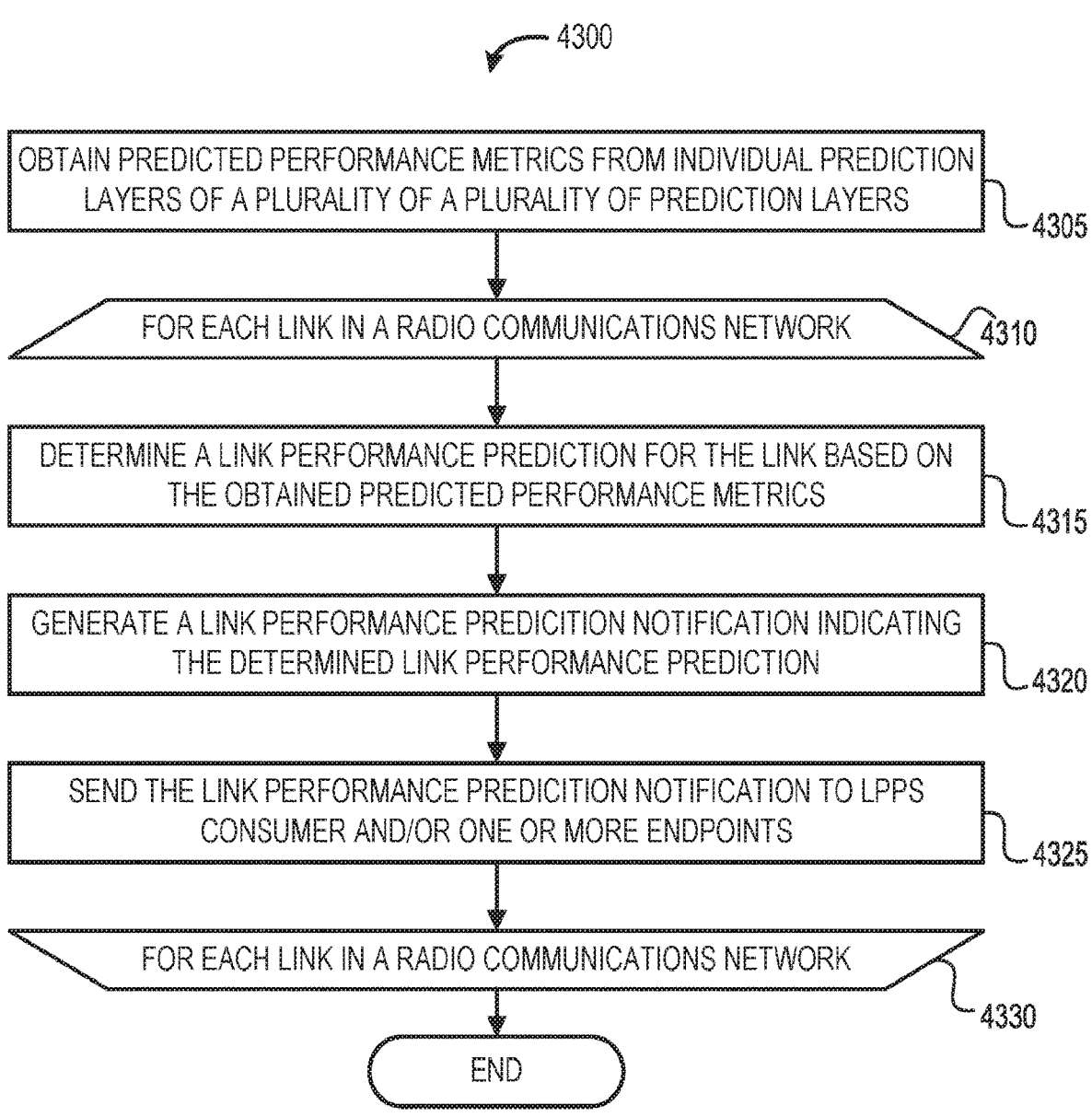

— 4300

OBTAIN PREDICTED PERFORMANCE METRICS FROM INDIVIDUAL PREDICTION LAYERS OF A PLURALITY OF A PLURALITY OF PREDICTION LAYERS
4305

FOR EACH LINK IN A RADIO COMMUNICATIONS NETWORK
4310

DETERMINE A LINK PERFORMANCE PREDICTION FOR THE LINK BASED ON THE OBTAINED PREDICTED PERFORMANCE METRICS
4315

GENERATE A LINK PERFORMANCE PREDICITION NOTIFICATION INDICATING THE DETERMINED LINK PERFORMANCE PREDICTION
4320

SEND THE LINK PERFORMANCE PREDICTION NOTIFICATION TO LPPS CONSUMER AND/OR ONE OR MORE ENDPOINTS
4325

FOR EACH LINK IN A RADIO COMMUNICATIONS NETWORK
4330

END

FIG. 43

LINK PERFORMANCE PREDICTION AND MEDIA STREAMING TECHNOLOGIES

CROSS-REFERENCE TO RELATED APPLICATIONS

This application is a national stage application under 35 U.S.C. § 371 of PCT International Application Serial No. PCT/US2020/045512, filed on Aug. 7, 2020 and entitled "MEDIA STREAMING USING LINK PERFORMANCE PREDICTIONS," which application claims the benefit of the filing date of U.S. Provisional Patent Application Ser. No. 62/884,647, filed on Aug. 8, 2019, and entitled "MEDIA STREAMING USING LINK PERFORMANCE PREDICTION," and U.S. Provisional Patent Application Ser. No. 62/925,691, filed on Oct. 24, 2019, and entitled "TECHNOLOGIES FOR LINK PERFORMANCE PREDICTION MEASUREMENT". The disclosures of the prior Applications are considered part of and are incorporated by reference in the disclosure of this Application.

TECHNICAL FIELD

This disclosure relates in general to the field of communication systems and networks, and more particularly, though not exclusively, to link performance prediction and media streaming technologies.

BACKGROUND

The rising popularity of media streaming services is continuously increasing the volume of network traffic used for streaming video and other types of media content, and the traffic from these services is only expected to grow as mobile networks continue to rapidly evolve. In an ideal world, the underlying network links would always be capable of providing enough capacity for these media streaming services, but that is far from reality, as the performance of these services often varies significantly depending on the quality of the underlying network links. For example, a drop in link quality can decrease the bandwidth or capacity of the underlying link, which may cause media playback to stall and/or re-buffer. This can be particularly problematic on mobile or wireless networks, as they typically experience more significant variations in link quality than fixed networks.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 4A illustrates pseudocode for reactive resolution control using classic MPEG-DASH.

FIG. 4B illustrates pseudocode for proactive resolution control using MPEG-DASH with LPP technology.

FIG. 11 illustrates an example of the range of views in an immersive reality system.

FIG. 14 illustrates a flowchart for an example embodiment of media streaming using link performance predictions.

FIGS. 19-20 illustrate graphs of data for bandwidth estimation.

FIG. 43 depicts an example process for practicing the various embodiments discussed herein.

DETAILED DESCRIPTION

Figure 1:
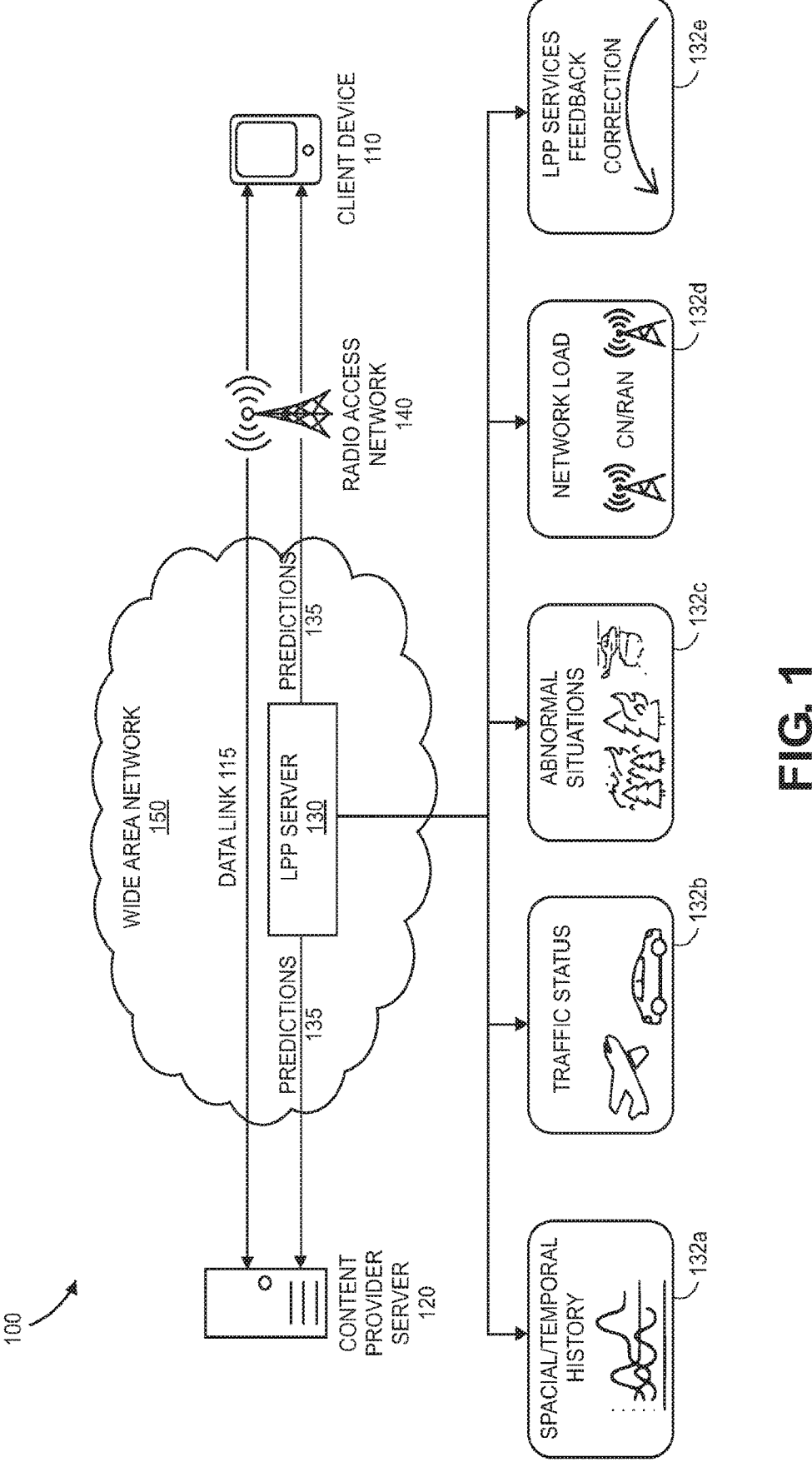
FIG. 1 illustrates an example embodiment of a media streaming system that leverages link performance prediction (LPP) technology.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

I. Media Streaming Using Link Performance Predictions

The rising popularity of media streaming services is continuously increasing the volume of network traffic used for streaming video and other types of media content. For example, media streaming services are currently responsible for the majority of traffic over mobile or wireless networks (e.g., cellular networks), and the traffic from these services is only expected to grow as mobile networks continue to rapidly evolve.

In an ideal world, the underlying network links would always be capable of providing enough capacity for these media streaming services, but that is far from reality, as the performance of these services can vary significantly depending on the quality of the underlying network links. For example, a drop in link quality often decreases the bandwidth or capacity of the underlying link, which may cause video playback to stall and/or re-buffer. Moreover, mobile networks typically experience more significant variations in link quality than fixed networks, as the conditions of wireless links in mobile networks are more dynamic in nature, particularly for client devices that are mobile rather than static. As a result, the performance of media streaming services over mobile networks is increasingly dependent on the conditions experienced over the wireless links to the clients or end users.

Existing media streaming technologies typically ignore variations in link quality altogether or they only adapt to them reactively. In particular, MPEG's Dynamic Adaptive Streaming over HTTP (MPEG-DASH) and Apple's HTTP Live Streaming (HLS) technologies are designed to adapt to changing network conditions, but only after they occur. For example, in response to a drop in link quality and/or a stall during playback of a video stream, these technologies may reactively reduce the bitrate or resolution of the video stream to minimize further stalls and re-buffering events. This reactive approach suffers from various performance limitations, however, as the link quality has already degraded by the time any remedial measures are performed, which may narrow the types of remedial measures that are available, limit their effectiveness, and/or require them to be more extreme. For example, upon experiencing a drop in link quality during video streaming, video playback may stall, which may require the video resolution to be significantly reduced in order to resume playback and minimize further stalls under the degraded link conditions. Moreover, if the drop in link quality is substantial, video playback may continue to stall even after the video resolution is reduced, or worse, playback may completely stop until the link quality improves.

Accordingly, this disclosure presents a media streaming solution that leverages link performance prediction (LPP) technology to proactively adapt to variations in link quality before they occur. In some embodiments, for example, LPP technology uses state of the art machine learning techniques and a comprehensive set of historical and real-time data feeds to dynamically predict the quality of any given radio access network (RAN) link, which enables application-level behavior to be optimized based on the predictions. In this manner, LPP can be used to improve the performance of applications that rely on wireless networks (e.g., 4G/5G cellular networks) by making them more aware of the underlying network behavior (e.g., bandwidth, latency, capacity, coverage holes, and so forth) while also providing forward-looking predictions on how individual connections or links will change over time. For example, LPP can provide estimations of current link capacity and predictions of how that will change in the near- or mid-term future, and applications and services can then adapt their task behaviors to stay within the given link capacity in order to provide the best possible user experience, such as by taking precautions to compensate for coverage holes and/or taking advantage of areas with strong coverage (e.g., areas within range of high-performing 5G millimeter wave (mmWave) cells).

The solution presented in this disclosure leverages LPP technology to optimize the performance of media streaming applications and services by proactively adapting to variations in link quality before they occur. In this manner, the media streaming experience can be proactively tuned to accommodate predicted variations in link performance while also prioritizing the performance metrics that are most important to the particular streaming service.

In particular, the algorithms and methodologies presented in this disclosure leverage link performance predictions to improve the performance and control of media streaming technologies, such as the MPEG-DASH media streaming standard used by most major streaming services. In some embodiments, for example, the described algorithms and methodologies may adapt the behavior of media streaming technologies to achieve optimal performance (e.g., using optimal buffer, resolution, and/or compression control) in view of the desired outcome and/or preferences of a particular streaming service along with any predicted variations in link quality. For example, media streaming using link performance prediction (LPP) enables different optimization points depending on the target behavior of the particular media service, such as best possible video quality (e.g., for movies and television shows) versus minimum delay (e.g., for real-time media content, such as image frames for augmented reality (AR), virtual reality (VR), and/or cloud gaming services).

The media streaming techniques described throughout this disclosure provide numerous advantages, such as improved user experience and more efficient utilization of media streaming resources. For example, the user experience and/or quality of service (QoS) provided by media streaming services is significantly improved, as optimal media quality (e.g., video resolution) can be delivered with greater consistency, stalls and re-buffering events during media playback can be avoided or reduced, and/or delay in the delivery of real-time media content can be minimized, among other examples. Moreover, the resources used for media streaming are utilized more efficiently, such as network resources (e.g., bandwidth consumption), content provider and/or cloud service provider resources, and client or end-user device resources (e.g., memory utilization for media buffering, power consumption), thus improving overall performance while also reducing costs.

FIG. 1 illustrates an example embodiment of a media streaming system 100 that leverages link performance prediction (LPP) technology. In the illustrated embodiment, media streaming system 100 includes a client device 110, a content provider server 120, a link performance prediction (LPP) server 130, a radio access network (RAN) 140, and a wide area network 150 (WAN). The client device 110 and the content provider server 120 are connected to each other via a data link 115 established over networks 140 and 150, and media content (e.g., video) is streamed from the content provider server 120 to the client device 110 over the data link 115. The LPP server 130 generates predictions 135 regarding the performance of the data link 115 established with the client device 110, and those predictions 135 are then provided to the client device 110 and/or the content provider server 120 in order to optimize the media streaming performance. For example, based on the link performance predictions 135, the behavior of the underlying media streaming technology may be proactively tuned or adjusted in order to adapt to variations in link quality before they occur, as described further below.

In various embodiments, for example, the content provider server 120 may include any type and/or combination of computing components and/or infrastructure used to stream media content. In particular, the content provider server 120 may stream any type of media content to the client device 110 over the data link 115 established between them, such as video (e.g., television shows, movies, sports, online video content, video games), images, audio, and so forth. For example, the content provider may provide a media streaming service, such as a video streaming service (e.g., YouTube, Netflix), a video game streaming service, an audio or radio streaming service, and so forth. Moreover, the client device 110 may include any type and/or combination of computing device and/or input/output (I/O) device used to consume a media stream, such as desktops, laptops, tablets, mobile phones, IoT devices, audio/video (A/V) devices, display devices (e.g., monitors, televisions, smart displays and/or interactive whiteboards, VR/AR glasses or headsets), speakers, and so forth. In various embodiments, for example, the client device 110 may perform playback of the media stream directly on integrated or connected I/O devices (e.g., a mobile device that performs video playback on an integrated screen), or the client device 110 may perform playback of the media stream on external I/O devices, such as via casting controls (e.g., a mobile device that leverages casting controls to cast audio/video playback to a smart television and/or home audio system).

In the illustrated embodiment, the data link 115 between the client device 110 and the content provider server 120 is established over a radio access network 140 and a wide area network 150. For example, the radio access network 140 may include a cellular network (e.g., a 2G, 3G, 4G, or 5G cellular network), and the wide area network 150 may include the Internet. The client device 110 may be wirelessly connected to a base station of the cellular network 140, which may then be connected to the Internet 150, and the content provider server 120 may also be connected to the Internet 150. In other embodiments, however, the data link 115 between the client device 110 and the content provider server 120 may be established over any type and/or number of communication networks.

The LPP server 130 generates predictions 135 regarding the performance of the data link 115 established with the client device 110, and those predictions 135 are then provided to the client device 110 and/or the content provider server 120 in order to optimize the media streaming performance. For example, based on the link performance predictions 135, the behavior of the underlying media streaming technology may be proactively tuned or adjusted in order to adapt to variations in link quality before they occur.

In some embodiments, for example, the LPP server 130 may use artificial intelligence to predict the network performance that applications and services will experience over time. In particular, predictions regarding network performance may be generated by processing a comprehensive collection of historical and real-time data feeds using advanced machine learning techniques.

For example, the historical data 132a may include network performance data collected across a wide range of mobile devices, such as the network performance experienced in different locations at specific times on specific days and under specific conditions. The real-time data may include a collection of data associated with real-time conditions, such as live traffic status 132b, abnormal events 132c, network performance 132d (e.g., current network load, radio conditions), client device information (e.g., location, motion, and/or routing information for client or end-user devices), and so forth. The LPP server 130 may also receive feedback 132e from client devices regarding link performance predictions provided by the server (e.g., indicating whether and/or to what extent the predictions were correct), which the LPP server 130 may use to tune or optimize future predictions.

Based on the various types of data 132a-e provided as input (e.g., historical, real-time, and feedback data), the LPP server 130 can predict future link performance for client devices with a high level of confidence and accuracy. For example, the LPP server 130 may generate a prediction 135 regarding the future performance of a network link 115 to a particular client device 110. In some embodiments, a prediction 135 generated by the LPP server 130 may include or indicate a time (e.g., time at which the predicted behavior will occur), a type of prediction (e.g., bandwidth or latency prediction), a predicted value (e.g., predicted amount of bandwidth or latency), an expected deviation (e.g., expected amount of deviation from the predicted bandwidth or latency value), and/or a probability (e.g., the likelihood or confidence of the prediction being correct), among other types of information.

Moreover, in some embodiments, services can subscribe to predictions that have direct relevance to their performance (e.g., applications running on the client device 110 and/or content provider server 120), and the LPP server 130 will then send predictions to those services to inform them of any significant changes in link performance over time. In some embodiments, the LPP server 130 may provide information regarding current link performance as well as forecasted link performance.

Link performance prediction (LPP) technology is described in further detail in the following patent application, the content of which is hereby expressly incorporated by reference: U.S. patent application Ser. No. 15/857,123, filed on Dec. 28, 2017, entitled "RADIO LINK QUALITY PREDICTION."

In the illustrated embodiment, for example, the client device 110 and/or the content provider server 120 may subscribe to predictions 135 from the LPP server 130 regarding the performance of the link 115 to the client device 110. The LPP server 130 then provides relevant predictions 135 to the client device 110 and/or the content provider server 120, which may use the predictions 135 to guide their behavior and optimize the media streaming experience. For example, based on the link performance predictions 135, the behavior of the underlying media streaming technology may be proactively tuned or adjusted in order to adapt to variations in link quality before they occur.

As an example, based on predictions regarding poor coverage areas that will likely be encountered en-route, media streaming parameters relating to content buffering, resolution, and/or compression may be adjusted to ensure that media playback continues without stalling even while the client device 110 has little or no coverage. Content providers and mobile operators can also leverage link performance predictions to perform optimizations relating to the content distribution network (CDN). For example, based on ink performance predictions, required content can be pre-fetched to a mobile edge computing (MEC) node closer to the client device's anticipated point of consumption.

This disclosure presents a variety of techniques for optimizing media streaming technologies using the link performance predictions, including: (1) proactive resolution control; (2) dynamic buffer control; (3) combined resolution and buffer control; and (4) compression control. The details of these techniques, along with how they can be individually and/or collectively used to accommodate the different tradeoffs and optimization points of different media streaming services (e.g., the ability to pre-buffer data, data utilization and network load, user experience based on media quality, stalls or freezes, sensitivity to delays, and so forth), are described in further detail throughout this disclosure.

A. Proactive Resolution Control

Proactive resolution control involves proactively adjusting the quality or resolution of streamed media (e.g., the video resolution) based on link performance predictions. Proactive resolution control is an optimization targeted at classic media streaming technologies, such as the MPEG-DASH standard and the Apple HLS standard, as those technologies are currently only capable of performing resolution control in a reactive manner (e.g., by reactively adjusting the video resolution only after detecting changes in network conditions).

Figure 2:
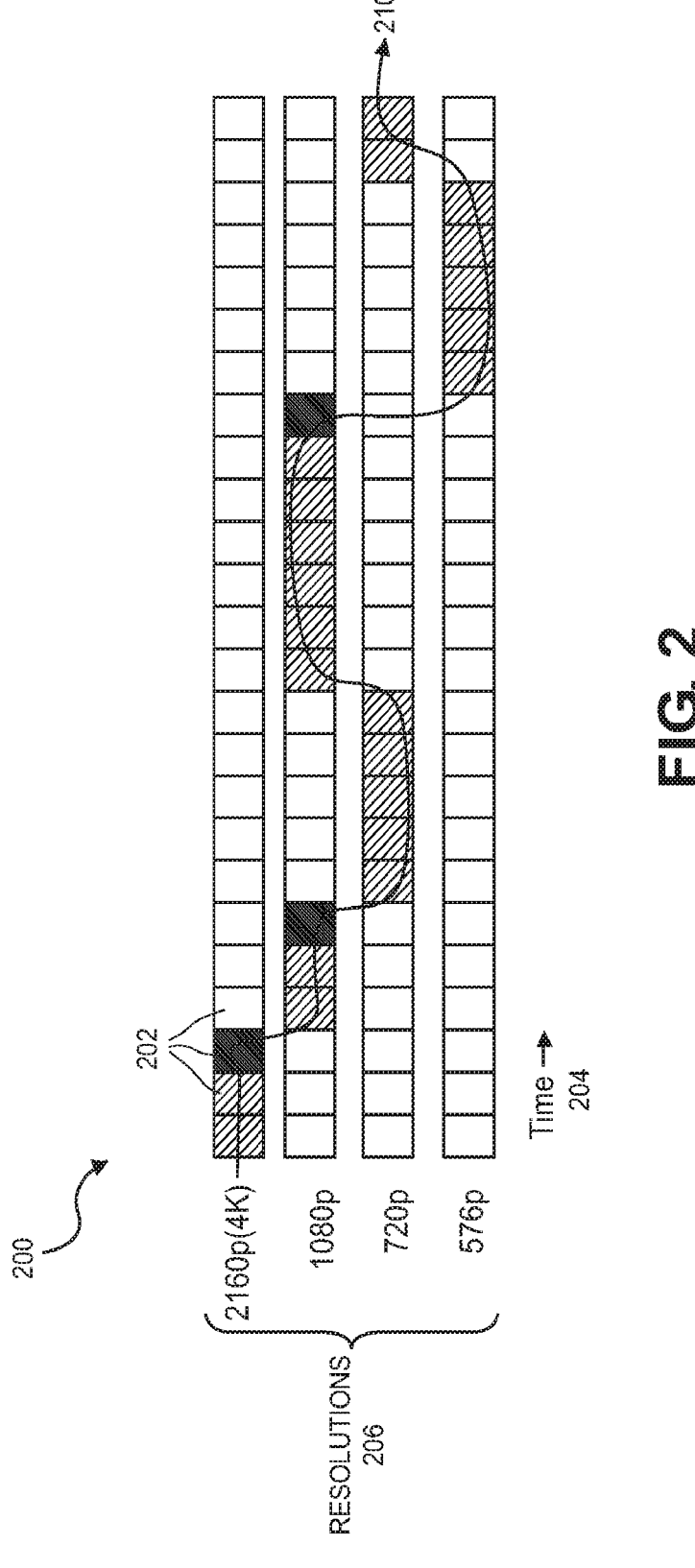
FIG. 2 illustrates an example of video streaming using the MPEG-DASH standard.
Figure 3:
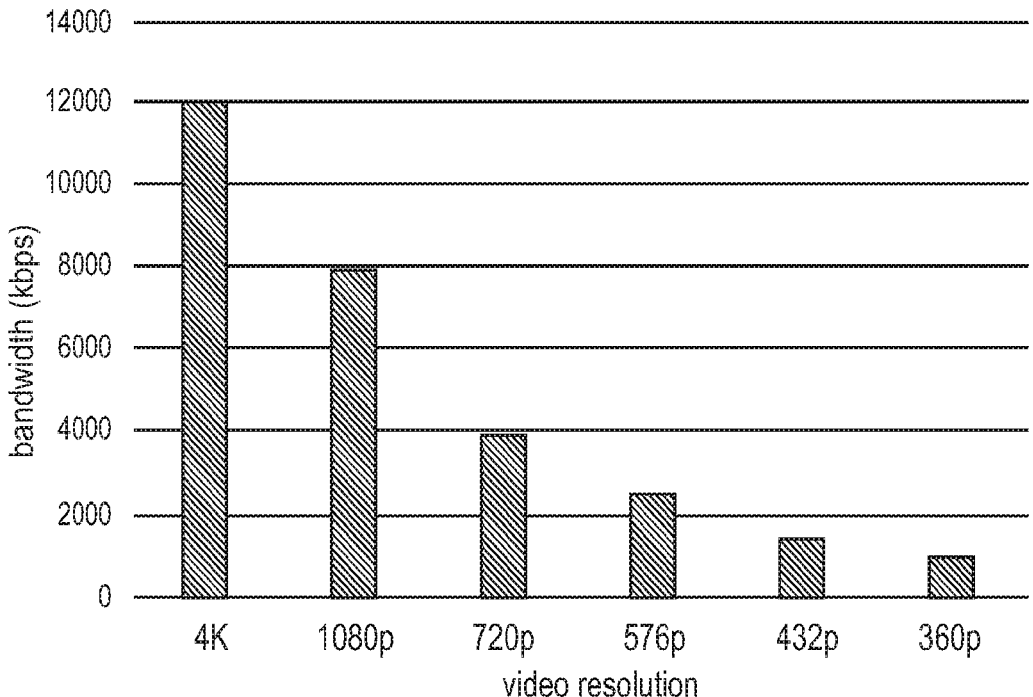
FIG. 3 illustrates an example of the bandwidth requirements for different video resolutions.

For example, FIG. 2 illustrates an example of video streaming 200 using the current implementation of the MPEG-DASH standard. As shown in FIG. 2, the MPEG-DASH standard works by cutting up a video into small blocks 202 of a certain time length, such as blocks that are five seconds long. Each block 202 is then encoded into multiple different resolutions 206 (e.g., 2160p (4K), 1080p, 720p, 576p) that require different amounts of bandwidth to transmit. An example of the bandwidth requirements for different video resolutions is shown in FIG. 3, but actual bandwidth requirements may vary depending on the underlying video content.

A media player on a client or end-user device then begins streaming the video at a particular resolution 206 from a content server. Once the media player starts streaming the video, it measures the time it takes to download a particular block 202 and compares the required download time with the length of the block. If the download time of the block 202 was less than-but almost equal to-the block length, then the best possible resolution 206 has already been achieved under the current network conditions. If the download time of the block 202 was significantly less than the block length, then the media player will switch to a higher resolution 206 for the following block. Finally, if the download time of the block 202 was longer than the block length, then the media player will switch to a lower resolution 206 for the following block, with the added drawback of video playback potentially stalling since the media player was unable to catch up with the video stream.

In the example of FIG. 2, the resolution 206 that is ultimately used to transmit each block 202 of the video is depicted by the shaded blocks in the sequential time slots 204 of the video stream. The resulting video stream 210 is represented by the arrow drawn through the shaded blocks, which depicts the transitions among different resolutions 206 as the blocks 202 are streamed sequentially over time 204. The video blocks that experience stalls during playback (e.g., due to a drop in link performance) are depicted with a darker shading.

This form of resolution control used by MPEG-DASH is a reactive approach rather than a forward-looking or proactive approach. As a result, when link performance drops, video playback may stall, and when link performance increases, video may be streamed at an unnecessarily low resolution until the increase is detected.

With link performance prediction (LPP) technology, however, resolution control can be implemented proactively rather than reactively. In particular, predictions regarding future link performance can be used to proactively adjust the quality or resolution of streamed media (e.g., the video resolution) to adapt to variations in link performance before they occur.

For example, with LPP, the media player will receive a link performance estimate ahead of time rather than waiting until a change in link performance actually occurs, and the media player can then proactively change the resolution to stay within the available bandwidth of the link. This prevents stalls and ensures that the best possible resolution is always used given the varying link conditions over time. The fundamental concept of MPEG-DASH remains the same, but the resolution is selected based on the network conditions that are predicted to occur in the near future, rather than, or in addition to, the network conditions that have already occurred.

For comparison, FIGS. 4A-B illustrate the differences in the respective forms of resolution control implemented by classic MPEG-DASH versus MPEG-DASH with LPP technology. In particular, FIG. 4A illustrates pseudocode for the reactive resolution control of classic MPEG-DASH, and FIG. 4B illustrates pseudocode for the proactive resolution control of MPEG-DASH with LPP technology. The pseudocode illustrated in FIGS. 4A-B is also shown below in TABLE 1.

TABLE 1

| Pseudocode for the resolution control of classic MPEG-DASH versus MPEG-DASH + LPP | |
|---|---|
| CLASSIC MPEG-DASH | MPEG-DASH WITH LPP |
| ... | ... |
| get_next_chunk: | get_next_chunk: |
|   start_timer_and_datacount |   download_chunk(resolution) |
|   download_chunk(resolution) | |
|   stop_timer_and_datacount |   bandwidth = |
| |   LPP_get_future_bandwidth |
| |   set_resolution(bandwidth) |
|   bandwidth = datacount / time | |
|   set_resolution(bandwidth) |   goto get_next_chunk |
| goto get_next_chunk | ... |
| ... | |

An example usage scenario for proactive resolution control is real-time video streaming, such as live sporting events, as it is desirable to maintain the buffer level at a minimum (e.g., to minimize delay in delivery of the real-time content) while still avoiding stalls.

B. Dynamic Buffer Control

Dynamic buffer control involves dynamically and proactively adjusting the buffer level based on link performance predictions. In some embodiments, dynamic buffer control can target the following optimization points:

(1) Maximized User Experience: The user experience can be maximized by maintaining a long-term viable resolution and overcoming short-term dips in network performance by pre-fetching data to build up a buffer. This is valuable in networks with large link performance variations or where there are coverage holes.

(2) Minimized Buffer Level: The buffer level can be minimized when link performance is significantly above the required level, as users have a tendency to "jump" within a video or between videos. For example, a larger buffer level will result in more data being discarded without being watched, thus resulting in a poor data utilization ratio. By minimizing the buffer level, the load is lowered on the network, the content providers, and the end users. Thus, for all parties involved (e.g., network operator, content provider, end user), this approach saves power and data transfer.

These optimization points are described in further detail below.

i. Maximized User Experience

Figure 5:
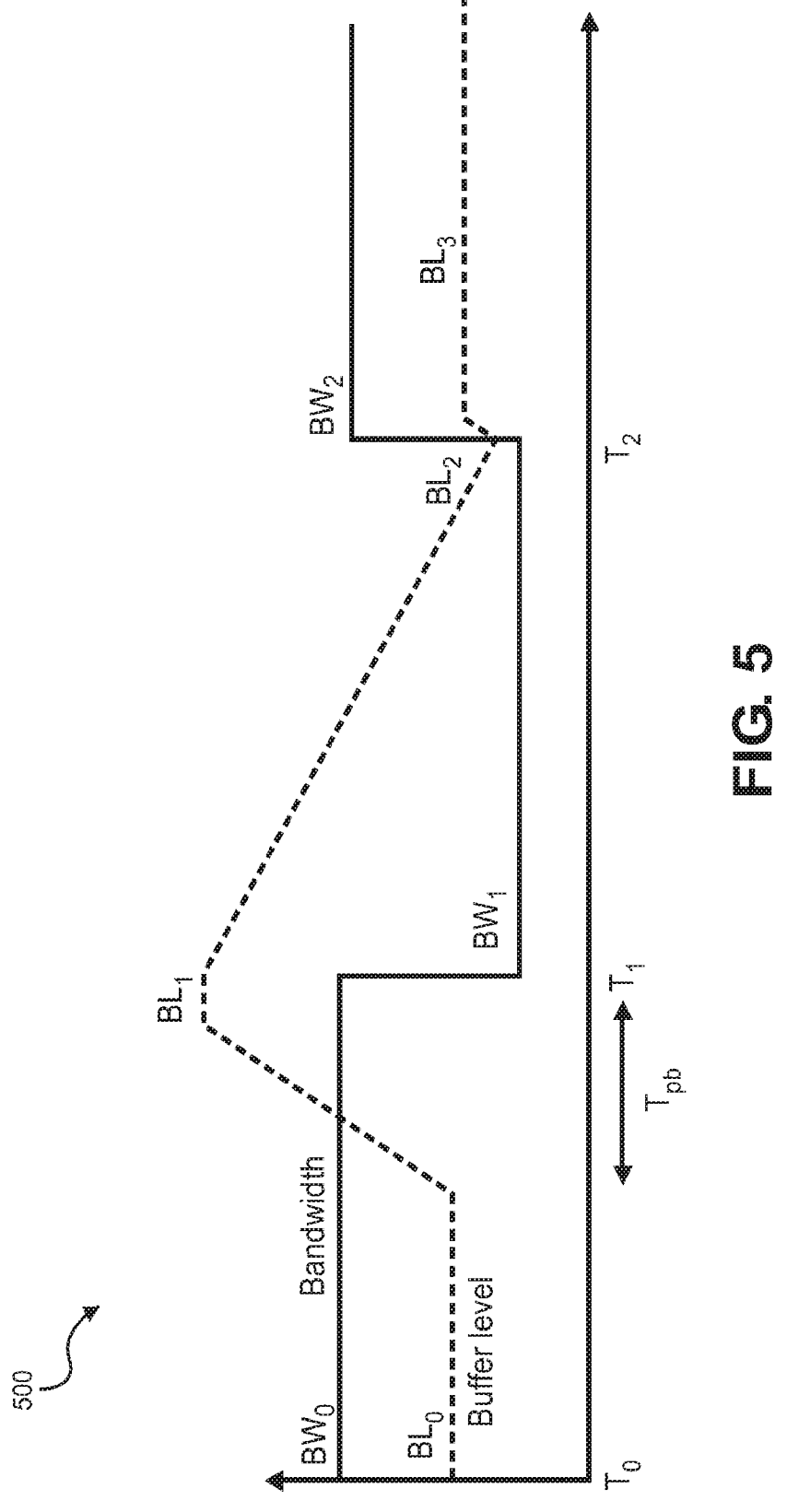
FIG. 5 illustrates an example of dynamic buffer control performed using link performance predictions in order to maximize the user experience.

FIG. 5 illustrates an example 500 of dynamic buffer control performed using link performance predictions in order to maximize the user experience. Dynamic buffer control targeting maximized user experience uses dynamic buffer levels to ensure that there are no stalls in the media streaming.

For example, given a media stream that has a required bandwidth of $BW_R$ and an available bandwidth of $BW_n$ at time $T_n$, in a scenario where the currently available bandwidth is predicted to drop from sufficient ($BW_n > BW_R$) to insufficient ($BW_{n+1} < BW_R$) during a shorter time, this can be handled by increasing the buffer level and pre-buffering data.

In the example of FIG. 5, at time $T_0$, there is an available bandwidth of $BW_0$, which is sufficient to feed the media stream with a buffer level of $BL_0$. However, at time $T_1$, the available bandwidth drops to bandwidth $BW_1$, which is below the required bandwidth ($BW_R$), but at time $T_2$, the available bandwidth increases back up to bandwidth $BW_2$, which is once again above the required bandwidth ($BW_R$). Thus, there must be enough buffered data at time $T_1$ to cover playback from time $T_2-T_1$ without hitting a buffer level of zero (BL=0), as that will trigger a stall.

As a result, the buffer level $BL_1$ at time $T_1$ needs to be at least enough to cover time $T_2-T_1$, and it is also typically desirable to include some additional margin for error (which is not shown in FIG. 5). Since the available bandwidth $BW_1$ at time $T_1$ will allow some media content to be downloaded over the time interval $[T_1, T_2]$, but not enough to feed the media stream in real time, only some of the media content from that time interval needs to be pre-buffered—it would only be necessary to pre-buffer all of the media content from that time interval if the available bandwidth $BW_1$ at time $T_1$ was predicted to be zero (e.g., $BW_1=0$).

Thus, the buffer level at time $T_1$ is increased to $BL_1$, which allows media playback to continue without stalling during the time interval $[T_1, T_2]$ despite the decrease in available bandwidth.

The following equation can be used to calculate the optimal buffer level $BL_1$ for a particular point in time $T_1$, where A is an aggressiveness factor, and $BW_R$ is the bandwidth required by the media stream:

$$BL_1 = \frac{(T_2 - T_1) \times (BW_R - BW_1)}{BW_R} \times A \tag{1}$$

The aggressiveness factor is a parameter that can be tuned based on the amount of risk that is acceptable under the circumstances (e.g., how aggressive an application is willing to be). In some embodiments, for example, by being less aggressive (e.g., taking less risk), an application gets more margin for incorrect predictions, but less benefit for correct predictions. Typically, the aggressiveness factor is tuned depending on the application type. A best-effort application is generally more aggressive, while a mission critical application may be less aggressive. The aggressiveness factor can also be tuned based on other factors, such as the LPP server's estimated accuracy of the prediction, the level of trust an application generally places in predictions from the LPP server, and so forth.

Examples of the buffer levels calculated for various scenarios using the above equation (1) are shown in TABLE 2. Note, the various bandwidths do not need to be fixed values but can vary with the calculations being updated accordingly.

TABLE 2

| Example buffer level calculations using equation (1) (aggressiveness (A) = 1) | | | | |
|---|---|---|---|---|
| $T_1$ (s) | $T_2$ (s) | $BW_1$ (Mbps) | $BW_R$ (Mbps) | → $BL_1$ (s) |
| 5 | 10 | 5 | 5 | 0 |
| 5 | 10 | 4 | 5 | 1 |
| 5 | 10 | 1 | 5 | 4 |
| 5 | 10 | 0 | 5 | 5 |
| 2 | 6 | 10 | 10 | 0 |
| 2 | 6 | 4 | 10 | 2.4 |
| 2 | 6 | 3 | 10 | 2.8 |

TABLE 2-continued

| | | Example buffer level calculations using equation (1) (aggressiveness (A) = 1) | | |
|---|---|---|---|---|
| $T_1$ (s) | $T_2$ (s) | $BW_1$ (Mbps) | $BW_R$ (Mbps) | $\rightarrow BL_1$ (s) |
| 2 | 6 | 0 | 10 | 4 |
| 7 | 25 | 5 | 8 | 6.75 |
| 7 | 25 | 3 | 8 | 11.25 |
| 7 | 25 | 0.5 | 8 | 16.875 |

Moreover, in order to increase the buffer level to $BL_1$ at time $T_1$, the pre-buffering needs to start at a certain time $T_{pb}$ in advance of $T_1$. The particular time $T_{pb}$ depends on how much spare bandwidth is available at time $T_0$, which can be determined based on the available bandwidth $BW_0$ at time $T_0$ relative to the required bandwidth $BW_R$. Note that if the available bandwidth $BW_0$ at time $T_0$ is equal to the required bandwidth $BW_R$ ($BW_0$=$BW_R$), however, then pre-buffering cannot be performed, as there is no spare bandwidth available for pre-buffering.

The following equations can be used to calculate the optimal amount of time $T_{pb}$ in which to begin pre-buffering in advance of time $T_1$ in order to increase the buffer to the desired buffer level $BL_1$ at time $T_1$ (where delta$BL_1$ represents the amount of extra buffer that needs to be fetched):

$$deltaBL_1 = BL_1 - BL_0 \tag{2}$$

$$T_{pb} = deltaBL_1 / \left( \frac{BW_0 - BW_R}{BW_R} \right) \tag{3}$$

Examples of the pre-buffer times ($T_{pb}$) calculated for various scenarios using the above equations (2) and (3) are shown in TABLE 3.

TABLE 3

| | Example pre-buffer time ($T_{pb}$) calculations using equations (2) and (3) | | |
|---|---|---|---|
| delta $BL_1$ (s) | $BW_0$ (Mbps) | $BW_R$ (Mbps) | $\rightarrow T_{pb}$ (s) |
| 7 | 5.5 | 5 | 70.0 |
| 7 | 8 | 5 | 11.7 |
| 7 | 10 | 5 | 7.0 |
| 7 | 20 | 5 | 2.3 |
| 25 | 5.5 | 5 | 250.0 |
| 25 | 10 | 5 | 25.0 |
| 25 | 20 | 5 | 8.3 |
| 25 | 10 | 8 | 100.0 |
| 25 | 20 | 8 | 16.7 |
| 25 | 50 | 8 | 4.8 | ii. Minimized Buffer Level

Figure 6:
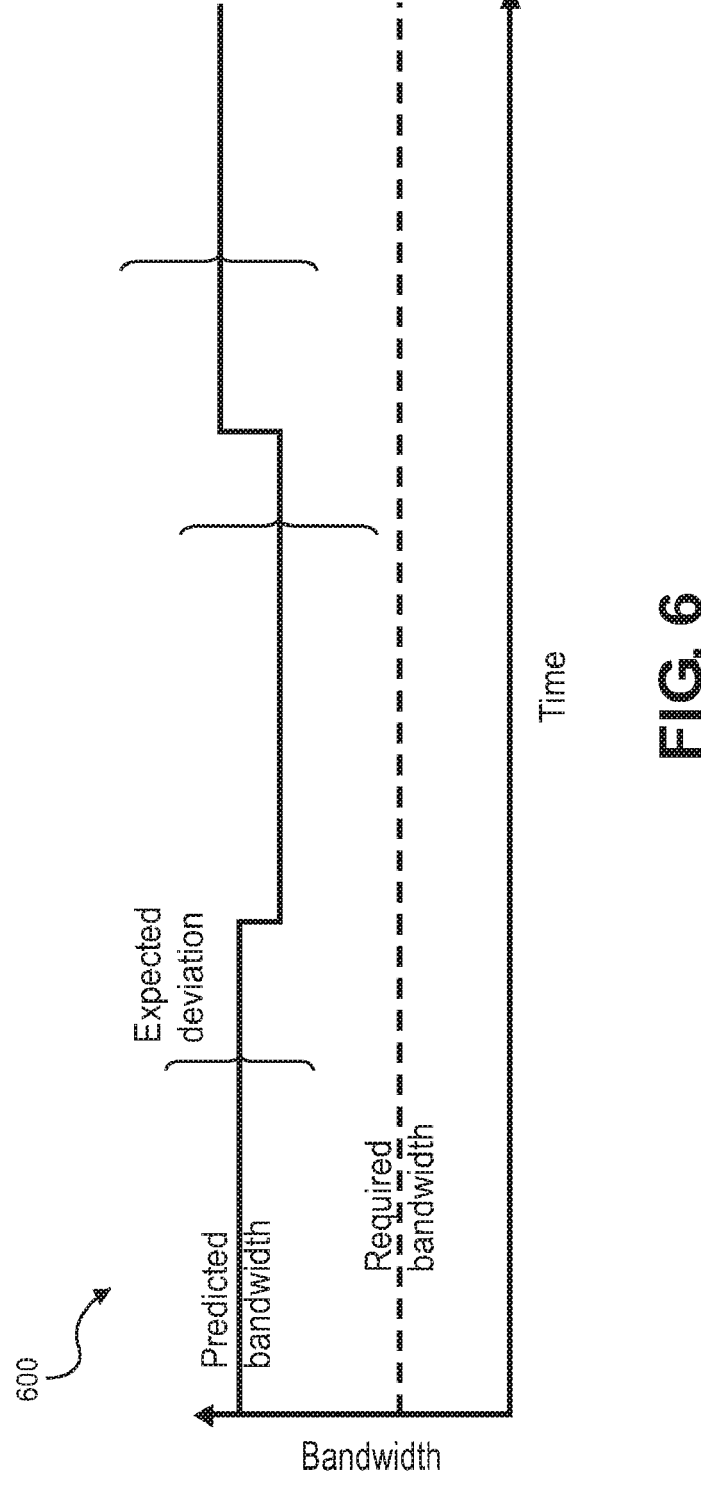
FIG. 6 illustrates an example of dynamic buffer control performed using link performance predictions in order to minimize the buffer level.

FIG. 6 illustrates an example 600 of dynamic buffer control performed using link performance predictions in order to minimize the buffer level. In some embodiments, for example, dynamic buffer control may be used to minimize the buffer level in order to conserve resources in certain circumstances, such as when the predicted bandwidth is confidently above the required stream bandwidth. For example, when the predicted bandwidth is confidently above the required stream bandwidth for a more extensive period of time (e.g., a period of time that is multiple times longer than the block length, such as 30-60 seconds for a block length of 2-5 seconds), the likelihood of a stall is relatively low, and thus the buffer level can be safely reduced during that time in order to conserve resources. In particular, the buffer level can be reduced relative to the probability of achieving the predicted bandwidth, including expected deviations.

For example, a prediction generated using link performance prediction (LPP) technology may include a predicted bandwidth at a future point in time, an expected deviation, and a probability of achieving those parameters. In some embodiments, buffer level minimization may be applied when the predicted bandwidth minus the expected deviation is greater than the required bandwidth for a long enough period of time (e.g., a period of time that is multiple times longer than the block length, such as 30-60 seconds for a block length of 2-5 seconds):

predicted bandwidth−deviation>required bandwidth

When the above preconditions are satisfied, the buffer level can then be reduced relative to the probability of achieving the predicted bandwidth.

In some embodiments, for example, the following equation may be used to calculate the reduced buffer level:

$$\text{new buffer level} = \tag{4}$$
$$\text{min of } \left\{ \begin{array}{c} Buffin + (BuffDef - BuffMin) \times (1 - P) \times A \\ BuffDef \end{array} \right.$$

$P$ = Probability $A$ = Aggressiveness $BuffDef$ = Default Buffer Level $BuffMin$ = Minimum Buffer Level This equation (4) enables buffer level minimization to be performed with varying levels of aggressiveness (A), which is a parameter that can be tuned based on the amount of risk that is acceptable under the circumstances. For example, the aggressiveness factor can be tuned based on a variety of application-dependent considerations, such as the impact of making an incorrect assessment (e.g., the impact of a stall caused by an insufficient buffer level derived from an incorrect bandwidth prediction). Examples of reduced buffer levels calculated for various scenarios using the above equation (4) are shown in TABLE 4.

TABLE 4

| | Example reduced buffer level calculations using equation (4) (BuffMin = 10; BuffDef = 30) | |
|---|---|---|
| Aggressiveness | Probability | $\rightarrow$ New Buffer Level |
| 5 | 1 | 10 |
| 5 | 0.95 | 15 |
| 5 | 0.9 | 20 |
| 5 | 0.85 | 25 |
| 5 | 0.8 | 30 |
| 5 | 0.75 | 30 |
| 1 | 1 | 10 |
| 1 | 0.95 | 11 |
| 1 | 0.9 | 12 |
| 1 | 0.85 | 13 |
| 1 | 0.8 | 14 |
| 0 | 1 | 10 |
| 0 | 0.95 | 10 |
| 0 | 0.9 | 10 |
| 0 | 0.85 | 10 |
| 0 | 0.8 | 10 |

C. Combined Resolution and Buffer Control

Figures 7A, 7B:
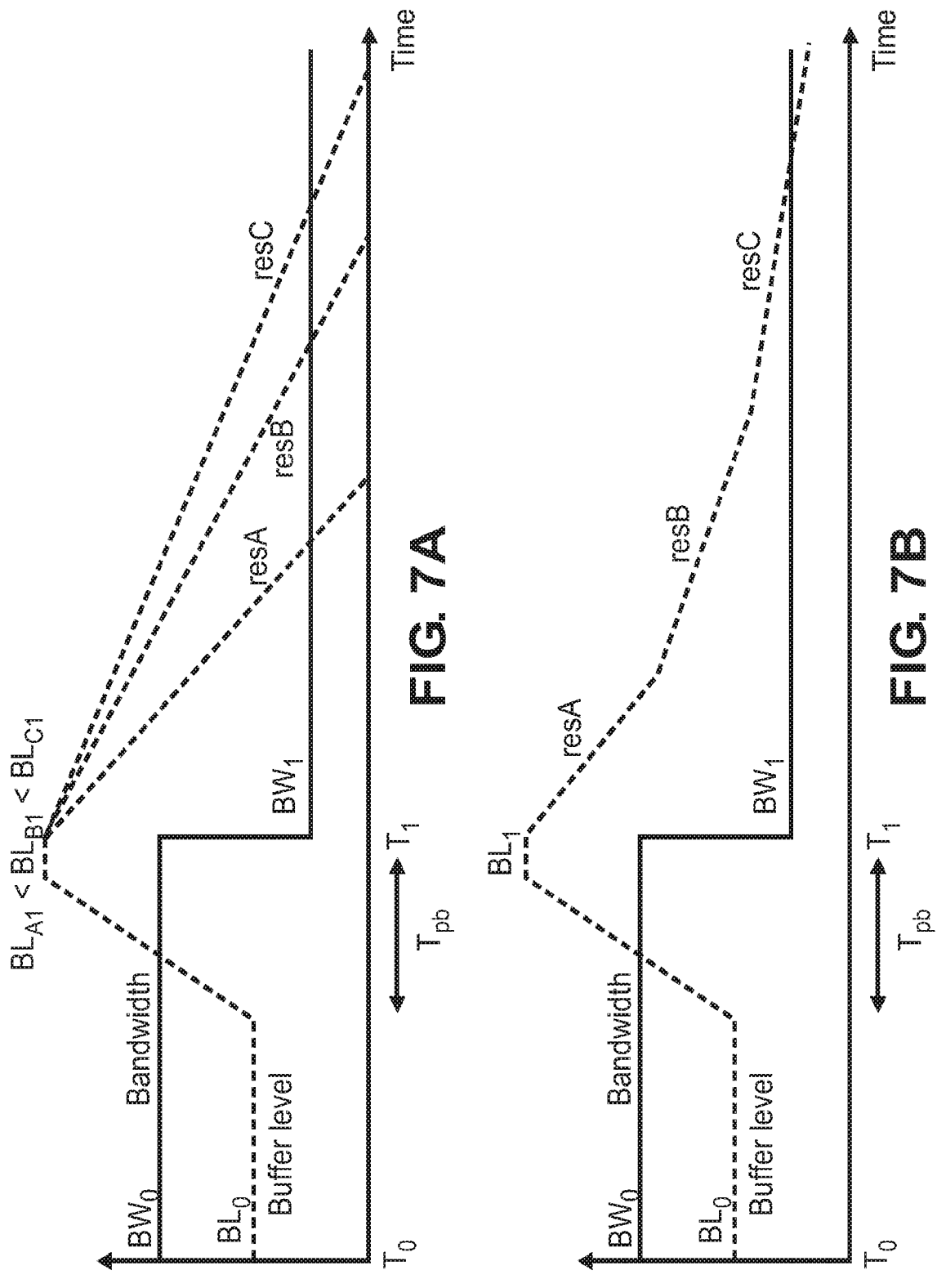
FIGS. 7A-B illustrate media streaming examples that leverage combined resolution and buffer control based on link performance predictions.

FIGS. 7A-B illustrate media streaming examples that leverage combined resolution and buffer control based on link performance predictions. For example, as explained above, dynamic buffer control is performed by dynamically pre-buffering media content on a client device, which involves filling a buffer with media content to a level that is high enough to avoid stalls based on the available bandwidth during a certain period in time (e.g., actual and/or predicted bandwidth). Thus, the client device must have enough memory available to fill the buffer to the requisite level based on the available bandwidth. This can be problematic when the available bandwidth will be low for an extended period of time, as the requisite buffer level will be higher during that period, which could potentially exceed the memory capacity of the client device. Thus, in some embodiments, this scenario may be addressed by combining pre-buffering with resolution control, as shown in FIGS. 7A-B.

FIG. 7A illustrates a media streaming example with a predicted bandwidth reduction, which is addressed by increasing the buffer level and encoding the buffered media content at one of three different resolutions (e.g., resolution A, B, or C) in various alternative scenarios. While the different resolutions each consume the same amount of memory in the buffer, the media playback time is significantly longer for the media content encoded at the lowest resolution (e.g., resolution C), as shown in this example. This is because media content is smaller in size and requires less bandwidth to transmit when encoded at lower resolutions versus higher resolutions (e.g., as shown and described in connection with FIG. 3), which means that a given amount of memory can store media content covering a longer playback time when the content is encoded at lower resolutions versus higher resolutions. Thus, as shown in FIG. 7A, in response to a predicted bandwidth reduction, a media player can optimize the buffer level and media resolution in order to achieve either maximum quality (e.g., highest resolution), maximum playback time, or some balance between quality and playback time, depending on the desired performance preferences of the particular media player.

FIG. 7B illustrates another media streaming example with a predicted bandwidth reduction, which is addressed by increasing the buffer level and encoding different portions of the buffered media content at different resolutions (e.g., resolutions A, B, and C). In this example, the buffered media content starts out at the highest resolution (resolution A) and gradually decreases to lower resolutions (resolutions B and C) in order to handle a long timeout. For example, in situations where poor link quality may persist for an uncertain amount of time, a media player can run with the highest resolution first and then fall back to gradually lower resolutions, as necessary.

D. Media Compression Control

Media compression control involves proactively adjusting the compression parameters used for streaming media based on link performance predictions, such as the parameters of a compression scheme used to compress video content into frames and/or tiles. Media compression control is particularly beneficial for applications that leverage real-time framebuffer streaming, such as video game streaming (e.g., remote or cloud-based gaming), virtual reality (VR), augmented reality (AR), and so forth.

Figure 8:
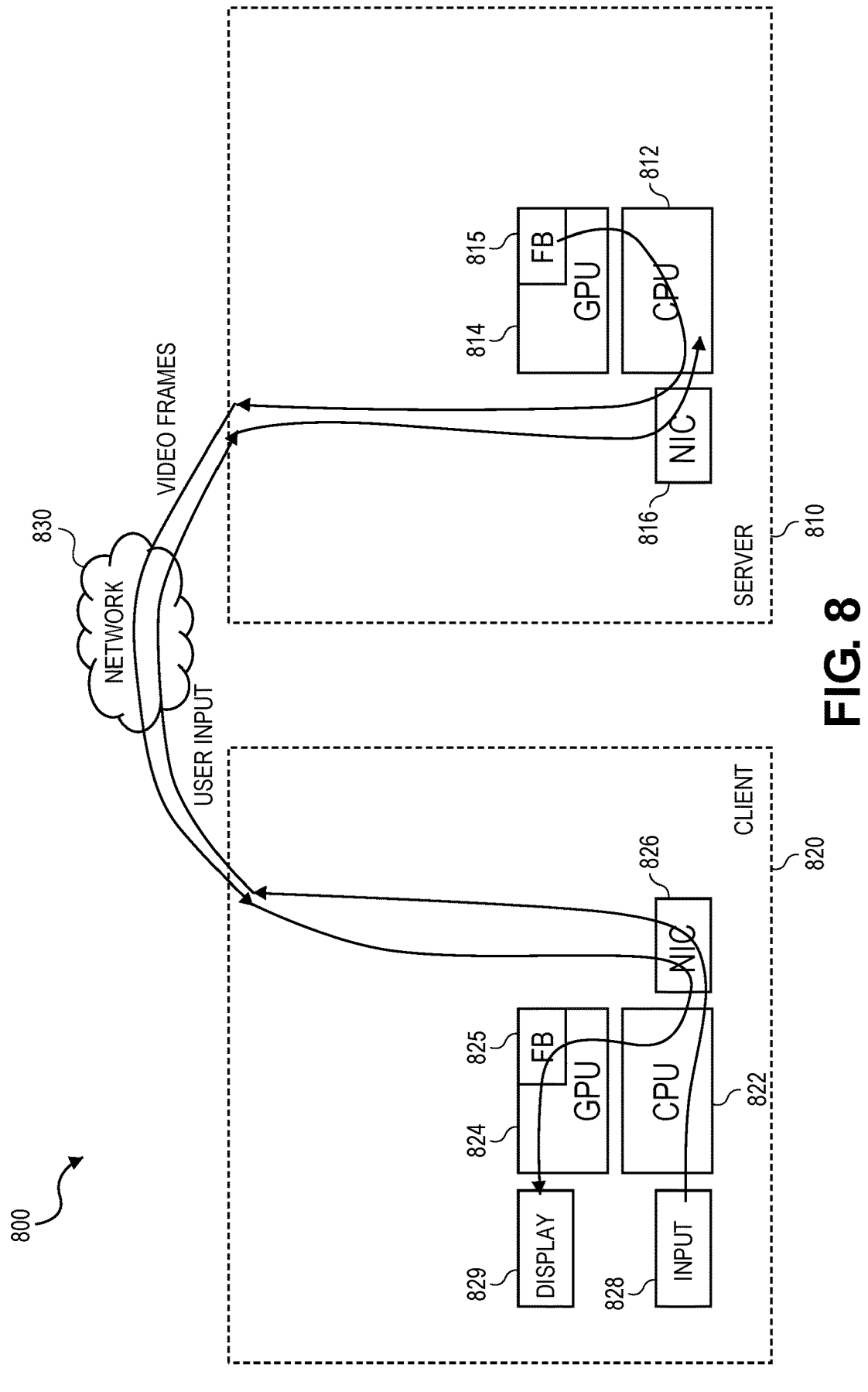
FIG. 8 illustrates an example embodiment of a video game streaming system.

FIG. 8 illustrates an example embodiment of a video game streaming system 800, which may be used to provide remote or cloud-based video gaming services. In the illustrated embodiment, for example, a video game hosted on a server 810 is streamed to, and displayed on, a client device 820.

The server 810 includes powerful computing hardware for hosting the video game, including a central processing unit (CPU) 812, a graphics processing unit (GPU) 814, and a network interface controller (NIC) 816. The GPU 814 renders the graphics associated with the video game, which are then stored in a framebuffer (FB) 815. However, unlike conventional gaming systems (e.g., video game consoles and other client-based gaming systems), the GPU 814 does not send the rendered graphics in the framebuffer (FB) 815 to a connected monitor, but rather through the CPU 812 and to the NIC 816, and then over a network 830 to the client device 820. Alternatively, the GPU 814 may be designed to send the graphics directly to the NIC 816 (bypassing the CPU 812), or the GPU 814 may host its own on-board NIC 816. Regardless of the particular implementation, the server 810 processes and packages the framebuffer 815 into a network stream that is delivered to the client 820. In some embodiments, this server-to-client streaming may be implemented using link performance prediction (LPP) technology, as described further below.

The client 820 is a computing device used by the person playing the video game, which is typically less powerful than the server 810. The client 820 receives, extracts, and processes the network stream from the server 810 (e.g., using the client-side NIC 826, CPU 822, and/or GPU 824), and then places the graphics in the client-side framebuffer 825 for display to the player via a display device 829, such as a monitor, television, VR/AR glasses or headset, and so forth. The client 820 also receives user input from the player via one or more input/output (I/O) devices 828 (e.g., mouse, keyboard, joystick, video game controller, and/or AR/VR glasses), and the client 820 passes the user input back to the server 810. The user input information is typically lightweight and does not generally require any extensive processing.

Thus, because the server-side framebuffer 815 contains each successive frame or image to be displayed on the screen of the client-side display device 829, the contents of the server-side framebuffer 815 must be continuously streamed from the server 810 to the client 820. However, this requires substantial bandwidth due to the massive amount of information per frame. For example, a single raw 4K frame is approximately 25 megabytes (MB) in size, and with a frame rate of 60-120 frames per second, transmitting a stream of raw 4K frames requires approximately 1.5-3 gigabits per second (Gbps) of bandwidth. Thus, streaming raw frames is often infeasible due to the excessive bandwidth requirements. As a result, the server 810 typically leverages compression techniques to compress frames in the framebuffer 815 before they are transmitted to the client 820, and this compression is subsequently reversed on the client side, where the client 820 leverages corresponding decompression techniques to decompress the frames.

Figure 9:
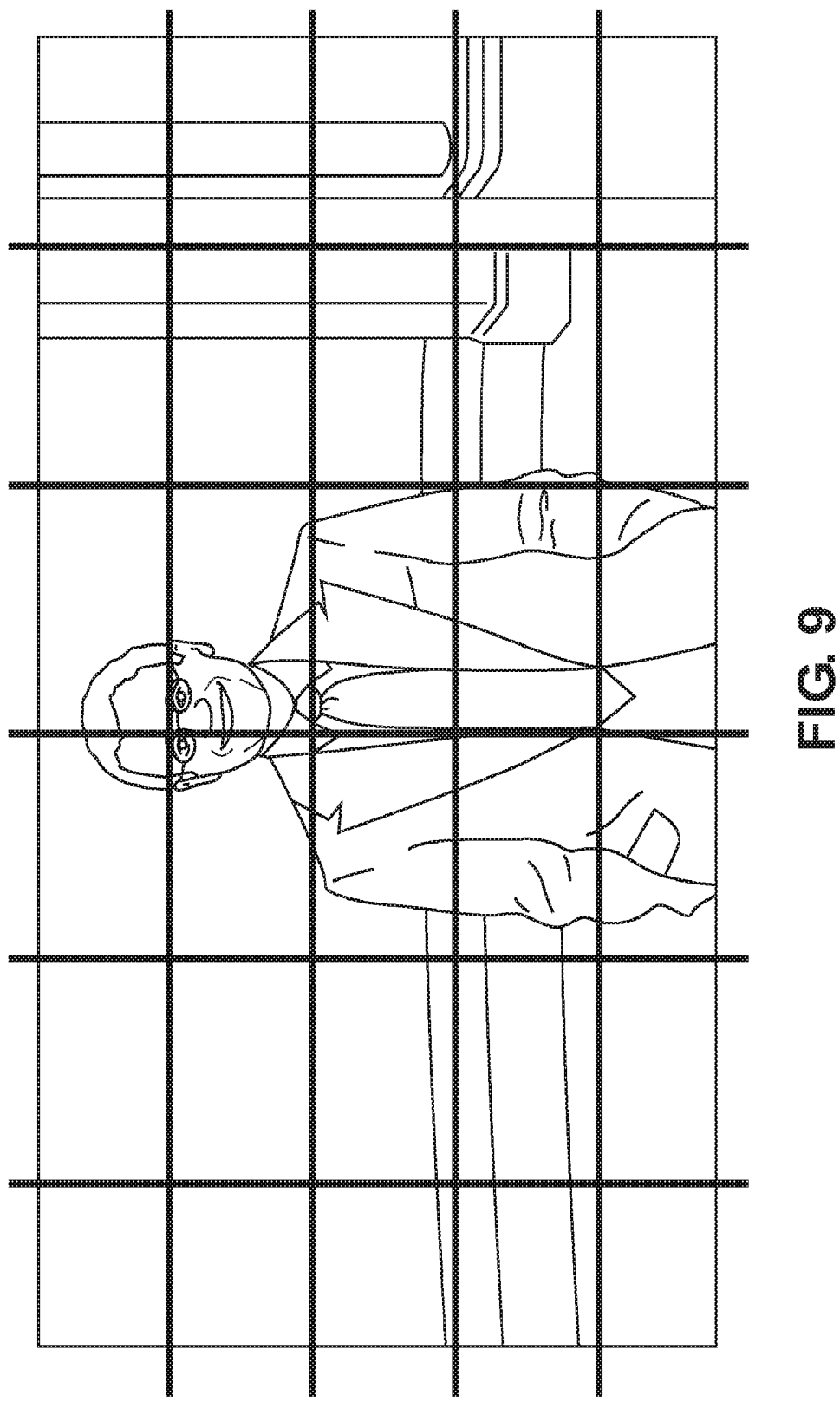
FIG. 9 illustrates an example of a video compression scheme that divides a frame into tiles.

A typical video compression methodology involves dividing each frame into tiles, as shown in FIG. 9. In particular, for each frame in a stream, the frame is divided into tiles and the tiles are compared to those of previous frame(s), and only tiles that have changed are transmitted. Thus, streaming a static image generates almost no traffic at all (aside from transmission of tiles in the initial frame), while streaming a rapidly changing environment often requires most or all tiles in each frame to be transmitted. Regardless of whether each frame in the framebuffer is transmitted partially (e.g., certain tiles only) or in its entirety (e.g., the full framebuffer contents), the underlying image data is typically compressed prior to transmission.

A common approach is to use JPEG compression, or alternatively, a more complex video compression scheme, such as H.264 compression. These types of compression schemes typically include one or more configurable compression parameters that can be adjusted to control certain characteristics of the compressed content, such as compression rate and/or quality (e.g., thus producing more or less compressed frames and/or tiles).

Moreover, in some embodiments, these compression parameters can be proactively adjusted based on link performance predictions in order to optimize the media streaming performance. For example, for a given framebuffer resolution, graphics displayed in the framebuffer, and number of tiles to be updated, the amount of required bandwidth may vary depending on the specific set of compression parameters that are used. In particular, the compression parameters may enable the compression rate to be increased and decreased at the cost of image or frame quality, which consequentially impacts the required bandwidth.

Figure 10:
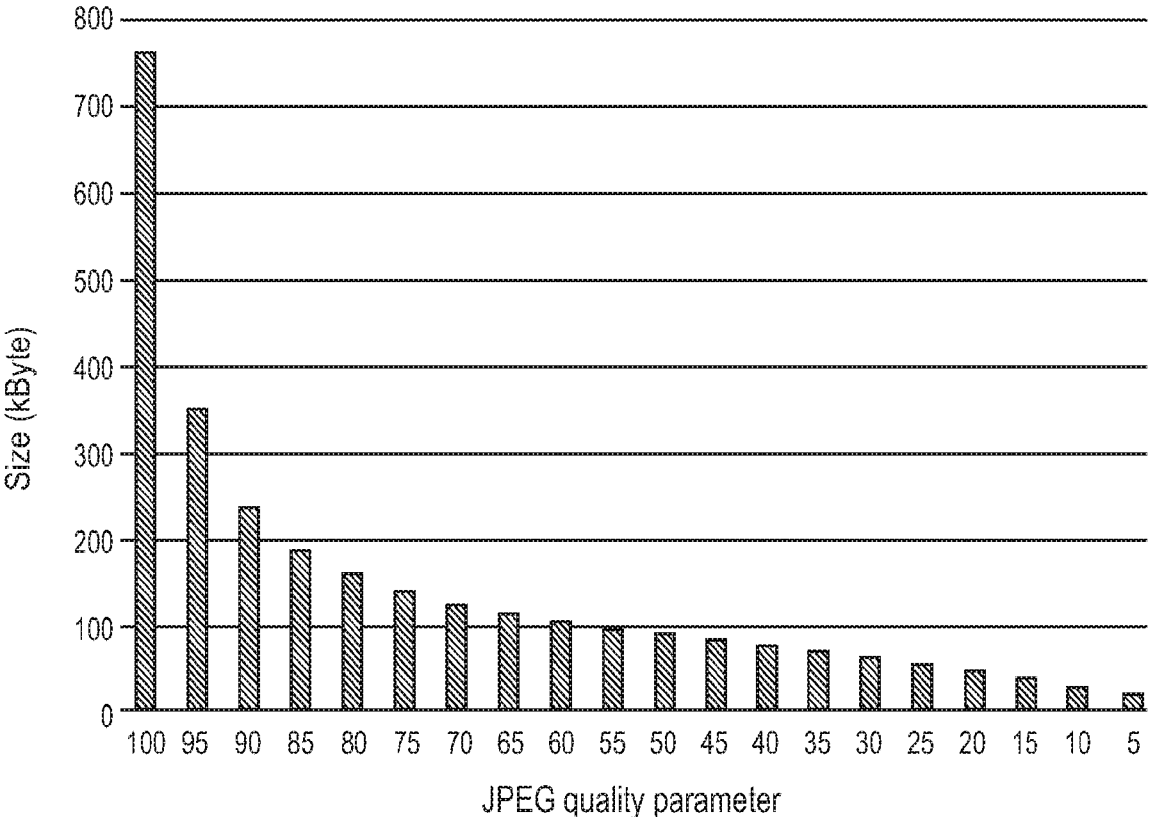
FIG. 10 illustrates a graph of the size of a compressed frame based on the value of the JPEG quality parameter.

For example, FIG. 10 illustrates a graph of the size of a compressed frame (in kilobytes (KB)) based on the value of the JPEG quality parameter (actual sizes may vary depending on the underlying framebuffer content). In particular, the JPEG quality parameter can range from 1 to 100. While it is generally desirable for the frame or image quality to be as high as possible, higher quality comes at the cost of increased bandwidth requirements. This becomes problematic if the required bandwidth eventually exceeds the available bandwidth, as it may result in lost data and lagging gameplay, which can severely impact the overall quality of gameplay for the player (e.g., due to inadvertently crashing a car, being shot by an enemy, and so forth).

Thus, it is crucial to ensure that the required bandwidth stays within the available bandwidth, which can be accomplished by proactively adjusting the compression parameters based on the predicted link performance. For example, using link performance prediction (LPP) technology, if the available bandwidth is predicted to decrease in the near future, the compression parameters can be proactively adjusted to reduce the required bandwidth and ensure that it remains within the available bandwidth, such as by increasing the compression rate at the cost of reducing the content quality. In particular, increasing the compression rate reduces the size of the compressed content at the cost of reduced quality, which in turn reduces the bandwidth required to stream that content.

A similar approach can be used—with some further adjustments—for an immersive reality system with a headset that displays content streamed from a remote location, such as a virtual reality (VR) and/or augmented reality (AR) headset. For example, FIG. 11 illustrates an example of the range of potential views in an immersive reality system 1100. Typically, an AR/VR headset displays a high-quality image of the area 1102a in the current field of view of a user, while also maintaining images in memory for surrounding areas 1102b-f that are outside the current field of view. This allows the headset to rapidly display the surrounding areas in the event the user quickly turns its head, thus minimizing the flickering that can occur when the headset is displaying streaming content that has to be downloaded in (near) real time.

Streaming a substantially larger image (or set of images) extending beyond the area in the current field of view to the headset, however, requires significantly more bandwidth.

However, when the user is moving rapidly, the image displayed by the headset does not need to have the same degree of quality as it normally would, such as when the user is standing still and staring at some detail in the current field of view. As a result, the area outside the user's current field of view can be transmitted or streamed at a lower resolution while still providing nearly the same user experience. This can be accomplished by dividing the image into sections 1102a-f with gradually decreasing resolutions the further they are from the current field of view, as shown in FIG. 11.

Moreover, in conjunction with bandwidth predictions derived using link performance prediction (LPP) technology, the resolutions of different sections of the image can be independently tuned (e.g., by adjusting the compression parameters) such that the total required bandwidth (e.g., the sum of the bandwidth required for each section) remains below the available bandwidth. This tuning can be performed using a variety of possible approaches for different optimization points, including:

(1) maximum field of view (FOV) quality (e.g., assigning the maximum possible quality to the FOV section);

(2) weighted quality (e.g., assigning weighted qualities to the range of FOV and non-FOV sections); and (3) combined maximum FOV quality and weighted non-FOV quality (e.g., assigning the maximum possible quality to the FOV section and weighted qualities to the non-FOV sections).

Figure 12:
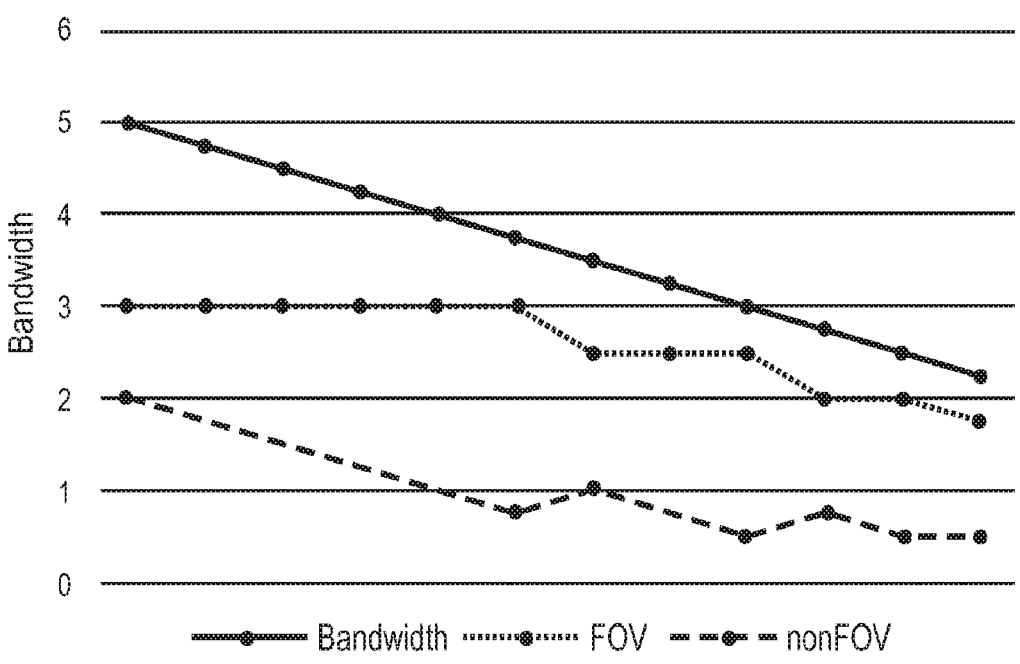
FIG. 12 illustrates an example of AR/VR compression control using maximum field of view (FOV) quality.

FIG. 12 illustrates an example of AR/VR compression control based on maximum field of view (FOV) quality. In this example, the field of view (FOV) section is allocated a portion of the (predicted) available bandwidth that achieves a quality n steps below the maximum possible quality that can be achieved by the total available bandwidth. The non-FOV section(s) are then allocated the remaining portion of the available bandwidth. In this manner, the FOV section is allocated an amount of bandwidth that achieves the maximum possible quality while also ensuring that some bandwidth remains for the non-FOV sections.

The "n steps" of quality generically refers to different increments (or decrements) of a specific image quality. In some cases, for example, quality may refer to the video resolution, which may be broken up into different tiers or steps, such as 4K, 1080p, 720p, 576p, 432p, and 360p (as shown in FIG. 3). Thus, if the maximum resolution is 4K, one step below the maximum resolution (n=1) is a resolution of 1080p, two steps below the maximum resolution (n=2) is a resolution of 720p, and so forth. As another example, quality may refer to a compression-based quality parameter, such as the quality parameter for JPEG compression (as shown in FIG. 10). Thus, if the maximum JPEG quality is 100, one step below the maximum quality (n=1) is a quality of 99, two steps below the maximum quality (n=2) is a quality of 98, and so forth. Quality can also be defined using any other suitable approach, including a combination of the above approaches or another approach altogether. In some embodiments, for example, a pre-defined application-specific table may be used to define different tiers or steps of quality.

In some embodiments, for example, the following equations may be used to calculate the bandwidth allocation for the FOV and non-FOV sections:

$$\text{FOV bandwidth}=\text{max\_resolution(LPP Bandwidth)}-n \qquad (5)$$

$$\text{nonFOV bandwidth}=\text{LPP Bandwidth}-\text{FOV bandwidth} \qquad (6)$$

In equation (6), it is assumed that the streaming content only contains one non-FOV section. If there are multiple non- FOV sections, however, then the remaining bandwidth may be allocated equally among the sections, allocated based on weights assigned to the respective sections (as described further below), and/or allocated among the sections using any other suitable approach.

As an example, for a stream with an FOV section and a single non-FOV section, assume the total available bandwidth is 5 Mbps (e.g., based on an LPP bandwidth prediction). When using JPEG compression, the best JPEG quality level possible with 5 Mbps of bandwidth is a JPEG quality of 95, which requires 4.7 Mbps. However, in order to leave sufficient bandwidth for the non-FOV section, the FOV section is allocated the bandwidth required for a quality n steps below the maximum quality. For example, for n=15, the FOV section is allocated the bandwidth required for 15 steps less than the maximum quality of 95, which is a quality of 80 (95-15=80). The bandwidth required for a JPEG quality of 80 is 3 Mbps, and thus the FOV section is allocated 3 Mbps of bandwidth, while the non-FOV section is allocated the remaining bandwidth, which is 2 Mbps: 5 Mbps (total)–3 Mbps (FOV)=2 Mbps (non-FOV).

Assuming the available bandwidth subsequently decreases from 5 Mbps to 4.8 Mbps (e.g., based on an LPP bandwidth prediction), the maximum possible quality for 4.8 Mbps is still a JPEG quality level of 95 (which only requires 4.7 Mbps). Thus, the bandwidth allocation for the FOV section remains unchanged, as it is once again allocated the bandwidth required for a quality of 80 (e.g., 15 steps less than the maximum quality of 95), which is 3 Mbps of bandwidth. The non-FOV section is then allocated the remaining bandwidth, which is 1.8 Mbps: 4.8 Mbps (total)–3 Mbps (FOV)=1.8 Mbps (non-FOV). Thus, the decrease in available bandwidth from 5 Mbps to 4.8 Mbps ultimately causes the bandwidth allocation for the non-FOV section to decrease from 2 Mbps to 1.8 Mbps.

Figure 13:
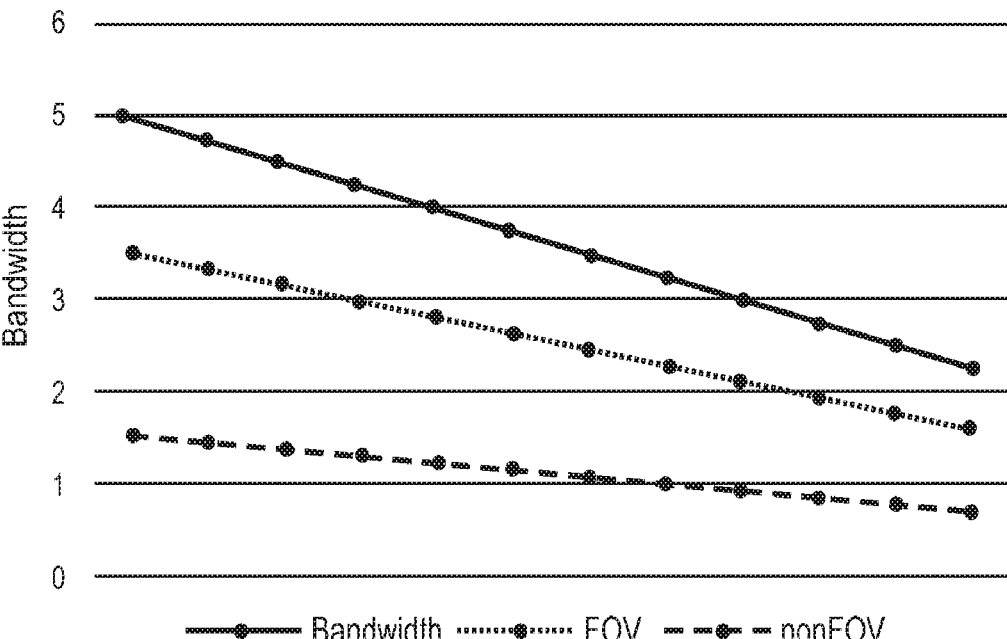
FIG. 13 illustrates an example of AR/VR compression control using weighted qualities.

FIG. 13 illustrates an example of AR/VR compression control based on weighted qualities. For example, for a stream with an FOV section and one or more non-FOV sections, each section is assigned a weight, where the sum of the weights equals a value of 1. The allocated bandwidth per section is then the assigned weight for that section multiplied with the total available bandwidth (e.g., based on an LPP bandwidth prediction).

In some embodiments, for example, the following equations may be used to calculate weighted bandwidth allocations for a stream with an FOV section and a non-FOV section:

$$FOV\ bandwidth = LPP\ Bandwidth * weight1 \qquad (7)$$

$$nonFOV\ bandwidth = LPP\ Bandwidth * weight2 \qquad (8)$$

$$weight1 + weight2 = 1 \qquad (9)$$

The above equations, along with the example calculations shown in FIG. 13, are based on a stream with two sections: an FOV section and a non-FOV section. However, this weighted approach can be applied to streams with any number of sections.

E. LPP Media Streaming Process Flow

FIG. 14 illustrates a flowchart 1400 for an example embodiment of media streaming using link performance predictions. In some embodiments, flowchart 1400 may be implemented and/or performed using the computing systems, devices, and networks described throughout this disclosure.

The flowchart begins at block 1402, where a link performance prediction (LPP) is received for a network link used for transmission of a media stream. For example, the network link may be a communication link between a computing device and a network, which is used to stream media content to the computing device. In some embodiments, for example, the media stream may be a video stream containing video content.

Moreover, the link performance prediction may indicate a predicted performance of the network link (e.g., predicted bandwidth/latency) during a future timeframe. In some embodiments, for example, the link performance prediction may include or indicate a future timeframe at which the predicted network behavior will occur, the type of network behavior or performance characteristic that is being predicted (e.g., bandwidth prediction or latency prediction), the predicted value of that performance characteristic (e.g., predicted amount of bandwidth or latency during the future timeframe), an expected deviation from the predicted performance value (e.g., an expected amount of deviation or variance from the predicted bandwidth or latency value), and/or a probability indicating the likelihood or confidence of the prediction being correct, among other types of information.

In some embodiments, for example, the computing device may be a mobile device (e.g., a wireless or cellular device, such as a smartphone), the network may be a radio access network (e.g., a wireless or cellular network), the network link may be a wireless radio link between the mobile device and the radio access network, and the link performance prediction may be a predicted bandwidth for the radio link during a future timeframe.

The flowchart then proceeds to block 1404 to identify a performance objective for the media stream based on the link performance prediction. For example, the performance objective may be an objective or optimization associated with the performance of media stream content that will be received or streamed within the media stream via the network link for playback during the future timeframe.

In some cases, for example, the performance objective may include minimizing playback stalls, lag, or delay for the media stream content to be played during the future timeframe, minimizing resource utilization for the media stream content to be played during the future timeframe, and/or maximizing the quality of the media stream content to be played during the future timeframe (e.g., the resolution or decompressed quality of the media stream content), among other examples.

Moreover, the particular performance objective(s) may vary depending on the link performance prediction (LPP) values. For example, if the LPP indicates a predicted bandwidth increase during the future timeframe, the performance objective may include minimizing resource utilization and/or maximizing the quality of the media stream content, whereas if the LPP indicates a predicted bandwidth decrease during the future timeframe, the performance objective may include minimizing playback stalls, lag, or delay for the media stream content.

The flowchart then proceeds to block 1406 to adjust one or more media streaming parameter(s) for the future media stream content (e.g., the content to be played during the future timeframe) based on the link performance prediction and the performance objective.

In various embodiments, for example, the media streaming parameter(s) can include any parameters associated with the streaming, playback, and/or consumption of the media stream or media stream content, such as (i) a buffer level of a media stream buffer used for buffering the media stream content; (ii) a resolution of the media stream content; and/or (iii) a compression rate for compression of the media stream content, among other examples.

For example, in some embodiments, the media streaming parameters may be parameters associated with the MPEG-DASH streaming protocol, such as the buffer level, resolution, and/or compression rate associated with the media stream content in an MPEG-DASH stream. For example, adjusting the parameters may cause the computing device to request the media content provider to stream the media content at a particular transmission frequency or rate (e.g., the computing device may request chunks of media stream content from the content provider at periodic intervals to achieve the desired transmission frequency/rate based on the predicted link performance and the desired buffer level), at a particular resolution (e.g., video resolution), and/or using a particular compression rate, among other examples.

As an example, the link performance prediction may include a predicted bandwidth decrease for the network link during the future timeframe, the performance objective may include minimizing playback stalls for the media stream content to be played during the future timeframe, and the media streaming parameters may be adjusted to proactively increase the buffer level of the media stream buffer based on the predicted bandwidth decrease, wherein the buffer level is to be increased to increase a playback length of the media stream content from the media stream buffer to minimize playback stalls during the future timeframe. Moreover, in some cases, the media streaming parameter(s) may also be adjusted to: (i) proactively decrease the resolution of the media stream content based on the predicted bandwidth decrease, wherein the resolution is to be decreased to reduce a required streaming bandwidth for the media stream content, wherein the required streaming bandwidth is to be reduced to minimize playback stalls during the future timeframe based on the predicted bandwidth decrease; or (ii) proactively increase the compression rate for compression of the media stream content based on the predicted bandwidth decrease, wherein the compression rate is to be increased to reduce a required streaming bandwidth for the media stream content, wherein the required streaming bandwidth is to be reduced to minimize playback stalls during the future timeframe based on the predicted bandwidth decrease.

As another example, the link performance prediction may include a predicted bandwidth increase for the network link during the future timeframe, the performance objective may include minimizing resource utilization for the media stream content to be played during the future timeframe, and the media streaming parameter(s) may be adjusted to proactively decrease the buffer level of the media stream buffer based on the predicted bandwidth increase, wherein the buffer level is to be decreased to reduce an amount of memory used by the media stream buffer for buffering the media stream content during the future timeframe.

As another example, the link performance prediction may include a predicted bandwidth increase for the network link during the future timeframe, the performance objective may include maximizing the quality of the media stream content to be played during the future timeframe, and the media streaming parameter(s) may be proactively adjusted to improve the quality of the media stream content to be played during the future timeframe based on the predicted bandwidth increase. For example, in order to improve the quality of the media stream content, the media stream parameter(s) may be adjusted to: (i) proactively increase the resolution of the media stream content based on the predicted bandwidth increase, wherein the resolution is to be increased to improve the quality of the media stream content to be played during the future timeframe based on the predicted bandwidth increase; or (ii) proactively reduce the compression rate for compression of the media stream content based on the predicted bandwidth increase, wherein the compression rate is to be reduced to improve the quality of the media stream content to be played during the future timeframe based on the predicted bandwidth increase.

As another example, the video stream may include an augmented reality or virtual reality (AR/VR) stream, the video content may include AR/VR content within the AR/VR stream, wherein the AR/VR content includes a plurality of AR/VR frame sections, wherein the plurality of AR/VR frame sections include a field-of-view (FOV) frame section and one or more non-FOV frame sections, wherein the FOV frame section is within a current field of view of a user and the one or more non-FOV frame sections are outside the current field of view of the user. Moreover, the link performance prediction may include a predicted bandwidth for the network link during the future timeframe, and the performance objective may include maximizing a quality of gameplay for the user during the future timeframe. In this example, the media streaming parameter(s) may be adjusted to maximize the quality of the AR/VR content without causing the required streaming bandwidth for the AR/VR content to exceed the predicted bandwidth for the network link during the future timeframe, wherein the required streaming bandwidth is to be maintained within the predicted bandwidth to minimize gameplay lag. For example, in order to maximize the quality without exceeding the predicted bandwidth, the media streaming parameter(s) may be adjusted to: (i) maximize a quality of the FOV frame section while maintaining the required streaming bandwidth for the plurality of AR/VR frame sections within the predicted bandwidth; and/or (ii) assign weighted qualities to the plurality of AR/VR frame sections such that the required streaming bandwidth for the plurality of AR/VR frame sections is within the predicted bandwidth.

The flowchart then proceeds to block 1408, where the media stream content to be played during the future timeframe is received via the network link based on the media streaming parameter(s). Upon receipt, the media stream content may be played back or consumed (e.g., displayed to a user and/or processed by an application), or the media stream content may be buffered for playback or consumption in the future.

At this point, the flowchart may be complete. In some embodiments, however, the flowchart may restart and/or certain blocks may be repeated. For example, in some embodiments, the flowchart may restart at block 1402 to continue receiving link performance predictions and adjusting media streaming parameters based on those predictions.

II. Link Performance Prediction Measurements

Various embodiments discussed herein are related to wireless communications, and in particular, technologies for Link Quality Prediction (LQP) or Link Performance Prediction (LPP). LQP/LPP improves wireless network performance by predicting future network behaviors/metrics (e.g., bandwidth (BW), latency, capacity, coverage holes, etc.) and making LPP service consumers more aware of these predicted network behaviors/metrics. As examples, LPP service consumers may include user applications running on UEs, edge computing applications running on edge compute nodes, NFs in a mobile network operator's core network, and server-side applications running on one or more servers in a datacenter or server farm. The LPP technology discussed herein uses machine learning (ML) techniques and a rich set of historical and real-time data feeds to dynamically predict the quality and/or performance of any given radio link and optimize application level behaviors. This allows LPP service consumers to make operational decisions such as, for example, taking precautions where there are coverage holes, increasing throughput where there are high-performing cells, entering an idle or sleep mode in crowded or overloaded cells, adjusting transmission power, adjusting antenna tilt and/or azimuth, and/or other like operational decisions. These LPPs provide improved customer experience as well as improvements in network/signaling resource utilization/conservation, which in turn enables more optimal infrastructure deployments. Various embodiments herein are related to different approaches to making these forward-looking LPPs for different types of network behaviors in various scenarios. The LPP technology discussed herein can also be used for other network planning and management tasks, such as equipment deployment planning, tuning self-organizing network (SON) functions, etc., to further improve network performance and reduce operating costs.

Embodiments discussed herein are also related to measuring bandwidth (BW) and latency characteristics over radio access networks (RANs) and/or entire mobile networks. The measured characteristics are used as feedback for the LPP/LQP machine learning training, for tracking link conditions in wireless networks, and/or for providing LPP indications/notifications to LPP service consumers according to various embodiments herein.

As discussed in more detail with respect to FIGS. 29-43, the link performance analysis is divided into multiple layers. Each prediction layer determines its own predicted performance metrics, which are then fused together by an LPP layer or LPP engine to make a link performance prediction. Each layer runs one or more ML algorithms or ML models, which are then used to determine respective predicted performance metrics. Each prediction layer provides its respective predicted performance metrics to the LPP layer/engine that fuses the results together to obtain an LPP. In embodiments, specific ML algorithms, or combinations of ML algorithms, are used at each prediction layer to determine the respective predicted performance metrics, and one or more layers may use different ML algorithms (or combinations of ML algorithms) than those used by other prediction layers. The LPP layer/engine generates and provides LPP indications to relevant applications/UEs/infrastructure to allow those applications/UEs/infrastructure to tailor their operations accordingly. The various prediction layers and the LPP layer/engine may be located in one or more servers in a server farm/data center or in one or more edge servers (e.g., MEC servers) deployed at the edge of a network.

Figure 15:
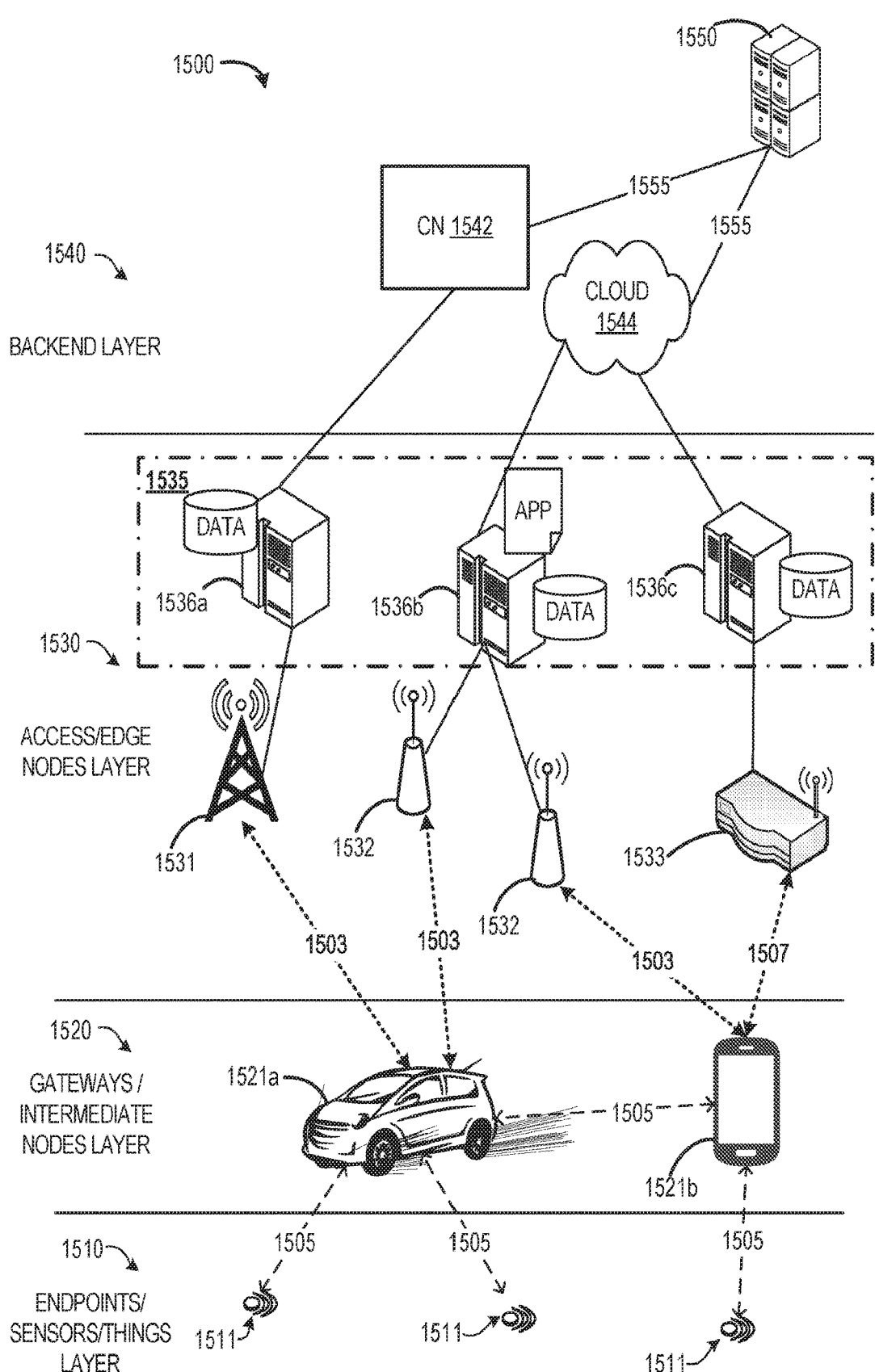
FIG. 15 illustrates an example edge computing environment in accordance with various embodiments.

FIG. 15 illustrates an example edge computing environment 1500 in accordance with various embodiments. FIG. 15 specifically illustrates the different layers of communication occurring within the environment 1500, starting from endpoint sensors or things layer 1510 (e.g., operating in an Internet of Things (IoT) network topology) comprising one or more IoT devices 1511 (also referred to as edge endpoints 1510 or the like); increasing in sophistication to gateways or intermediate node layer 1520 comprising one or more user equipment (UEs) 1521a and 1521b (also referred to as intermediate nodes 1520 or the like), which facilitate the collection and processing of data from endpoints 1510; increasing in processing and connectivity sophistication to access node layer 1530 (or "edge node layer 1530") comprising a plurality of network access nodes (NANs) 1531, 1532, and 1533 (collectively referred to as "NANs 1531-

1533" or the like) and a plurality of edge compute nodes 1536a-c (collectively referred to as "edge compute nodes 1536" or the like) within an edge computing system 1535; and increasing in connectivity and processing sophistication to a backend layer 1510 comprising core network (CN) 1542 and cloud 1544. The processing at the backend layer 1510 may be enhanced by network services as performed by a remote application server 1550 and/or other cloud services. Some or all of these elements may be equipped with or otherwise implement some or all aspects of the LPP embodiments discussed infra.

The environment 1500 is shown to include end-user devices, such as intermediate nodes 1520 and endpoints 1510, which are configured to connect to (or communicatively couple with) one or more multiple communication networks (also referred to as "access networks," "radio access networks," or the like) based on different access technologies (or "radio access technologies" or "RATS") for accessing application services. These access networks may include one or more of NANs 1531, 1532, and/or 1533. The NANs 1531-1533 are arranged to provide network connectivity to the end-user devices via respective links 1503, 1507 between the individual NANs and the one or more UEs 1511, 1521.

As examples, the communication networks and/or access technologies may include cellular technology such as LTE, MuLTEfire, and/or NR/5G (e.g., as provided by Radio Access Network (RAN) node 1531 and/or RAN nodes 1532), WiFi or wireless local area network (WLAN) technologies (e.g., as provided by access point (AP) 1533 and/or RAN nodes 1532), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), User Datagram Protocol (UDP), QUIC (sometimes referred to as "Quick UDP Internet Connections"), Stream Control Transmission Protocol (SCTP), Resource Reservation Protocol (RSVP), Virtual Private Network (VPN), Multi-Path TCP (MPTCP), Bidirectional-streams Over Synchronous HTTP (BOSH), Generic Routing Encapsulation (GRE), GeoNetworking protocol, Basic Transport Protocol (BTP), etc.).

The intermediate nodes 1520 include UE 1521a and UE 1521b (collectively referred to as "UE 1521" or "UEs 1521"). In this example, the UE 1521a is illustrated as a vehicle UE, and UE 1521b is illustrated as a smartphone (e.g., handheld touchscreen mobile computing device connectable to one or more cellular networks). However, these UEs 1521 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 1510 include UEs 1511, which may be IoT devices (also referred to as "IoT devices 1511"), which are uniquely identifiable embedded computing devices (e.g., within the Internet infrastructure) that comprise a network access layer designed for low-power IoT applications utilizing short-lived UE connections. The IoT devices 1511 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 1511 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 1511 can utilize technologies such as M2M or MTC for exchanging data with an MTC server (e.g., a server 1550), an edge server 1536 and/or edge computing system 1535, or device via a PLMN, ProSe or D2D communication, sensor networks, or IoT networks. The M2M or MTC exchange of data may be a machine-initiated exchange of data.

The IoT devices 1511 may execute background applications (e.g., keep-alive messages, status updates, etc.) to facilitate the connections of the IoT network. Where the IoT devices 1511 are, or are embedded in, sensor devices, the IoT network may be a WSN. An IoT network describes an interconnecting IoT UEs, such as the IoT devices 1511 being connected to one another over respective direct links 1505. The IoT devices may include any number of different types of devices, grouped in various combinations (referred to as an "IoT group") that may include IoT devices that provide one or more services for a particular user, customer, organizations, etc. A service provider (e.g., an owner/operator of server 1550, CN 1542, and/or cloud 1544) may deploy the IoT devices in the IoT group to a particular area (e.g., a geolocation, building, etc.) in order to provide the one or more services. In some implementations, the IoT network may be a mesh network of IoT devices 1511, which may be termed a fog device, fog system, or fog, operating at the edge of the cloud 1544. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1544 to Things (e.g., IoT devices 1511). The fog may be established in accordance with specifications released by the OFC, the OCF, among others. In some embodiments, the fog may be a tangle as defined by the IOTA foundation.

The fog may be used to perform low-latency computation/aggregation on the data while routing it to an edge cloud computing service (e.g., edge nodes 1530) and/or a central cloud computing service (e.g., cloud 1544) for performing heavy computations or computationally burdensome tasks. On the other hand, edge cloud computing consolidates human-operated, voluntary resources, as a cloud. These voluntary resource may include, inter-alia, intermediate nodes 1520 and/or endpoints 1510, desktop PCs, tablets, smartphones, nano data centers, and the like. In various implementations, resources in the edge cloud may be in one to two-hop proximity to the IoT devices 1511, which may result in reducing overhead related to processing data and may reduce network delay.

In some embodiments, the fog may be a consolidation of IoT devices 1511 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

In embodiments, the fog may operate at the edge of the cloud 1544. The fog operating at the edge of the cloud 1544 may overlap or be subsumed into an edge network 1530 of the cloud 1544. The edge network of the cloud 1544 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1536 or edge devices). The Fog layer resides on top of the edge layer and is a consolidation of networking devices such as the intermediate nodes 1520 and/or endpoints 1510 of FIG. 15.

Data may be captured, stored/recorded, and communicated among the IoT devices 1511 (or, for example, among the intermediate nodes 1520 and/or endpoints 1510 that have direct links 1505 with one another as shown by FIG. 15). Analysis of the traffic flow and control schemes may be implemented by aggregators that are in communication with the IoT devices 1511 and each other through a mesh network. The aggregators may be a type of IoT device 1511 and/or network appliance. In the example of FIG. 15, the aggregators may be edge nodes 1530, or one or more designated intermediate nodes 1520 and/or endpoints 1510. Data may be uploaded to the cloud 1544 via the aggregator, and commands can be received from the cloud 1544 through gateway devices that are in communication with the IoT devices 1511 and the aggregators through the mesh network. Unlike the traditional cloud computing model, in some implementations, the cloud 1544 may have little or no computational capabilities and only serves as a repository for archiving data recorded and processed by the fog. In these implementations, the cloud 1544 centralized data storage system and provides reliability and access to data by the computing resources in the fog and/or edge devices. Being at the core of the architecture, the Data Store of the cloud 1544 is accessible by both Edge and Fog layers of the aforementioned edge-fog network.

As mentioned previously, the access networks provide network connectivity to the end-user devices 1520, 1510 via respective NANs 1531-1533. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. In some embodiments, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. In these embodiments, the CRAN, CR, or vBBUP may implement a RAN function split, wherein one or more communication protocol layers are operated by the CRAN/CR/vBBUP and other communication protocol entities are operated by individual RAN nodes 1531, 1532. This virtualized framework allows the freed-up processor cores of the NANs 1531, 1532 to perform other virtualized applications, such as virtualized applications for LPP embodiments discussed herein.

The UEs 1521, 1511 may utilize respective connections (or channels) 1503, each of which comprises a physical communications interface or layer. The connections 1503 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. In some embodiments, the UEs 1511, 1521 and the NANs 1531-1533 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 1511, 1521 and NANs 1531-1533 may operate using LAA, enhanced LAA (eLAA), and/or further eLAA (feLAA) mechanisms. The UEs 1521, 1511 may further directly exchange communication data via respective direct links 1505, which may be LTE/NR Proximity Services (ProSe) link or PC5 interfaces/ links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

The UEs 1511, 1521 are capable of measuring various signals or determining/identifying various signal/channel characteristics. Signal measurement may be performed for cell selection, handover, network attachment, testing, and/or other purposes. The measurements collected by the UEs 1511, 1521 may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 1531-1533 reference time and a GNSS-specific reference time for a given GNSS), GNSS code measurements (e.g., The GNSS code phase (integer and fractional parts) of the spreading code of the $i^{th}$ GNSS satellite signal), GNSS carrier phase measurements (e.g., the number of carrier-phase cycles (integer and fractional parts) of the $i^{th}$ GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, FILS discovery frames, or probe response frames for IEEE 802.11 WLAN/WiFi networks. Other measurements may be additionally or alternatively used, such as those discussed in 3GPP TS 36.214 v15.4.0, 3GPP TS 38.215, IEEE 802.11, Part 11: "Wireless LAN Medium Access Control (MAC) and Physical Layer (PHY) specifications, IEEE Std.", and/or the like. The same or similar measurements may be measured or collected by the NANs 1531-1533.

The UE 1521*b* is shown to be configured to access an access point (AP) 1533 via a connection 1507. In this example, the AP 1533 is shown to be connected to the Internet without connecting to the CN 1542 of the wireless system. The connection 1507 can comprise a local wireless connection, such as a connection consistent with any IEEE 802.11 protocol, wherein the AP 1533 would comprise a wireless fidelity (WiFi®) router. In embodiments, the UEs 1521 and IoT devices 1511 can be configured to communicate using suitable communication signals with each other or with any of the AP 1533 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the embodiments is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 1531 and 1532 that enable the connections 1503 may be referred to as "RAN nodes" or the like. The RAN nodes 1531, 1532 may comprise ground stations (e.g., terrestrial access points) or satellite stations providing coverage within a geographic area (e.g., a cell). The RAN nodes 1531, 1532 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1531 is embodied as a NodeB, evolved NodeB (eNB), or a next generation NodeB (gNB), and the RAN nodes 1532 are embodied as relay nodes, distributed units, or Road Side Unites (RSUs). Any other type of NANs can be used.

Any of the RAN nodes 1531, 1532 can terminate the air interface protocol and can be the first point of contact for the UEs 1521 and IoT devices 1511. In some embodiments, any of the RAN nodes 1531/1532 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. In embodiments, the UEs 1511, 1521 can be configured to communicate using OFDM communication signals with each other or with any of the NANs 1531, 1532 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

For most cellular communication systems, the RAN function(s) operated by the RAN or individual NANs 1531-1532 organize downlink transmissions (e.g., from any of the RAN nodes 1531, 1532 to the UEs 1511, 1521) and uplink transmissions (e.g., from the UEs 1511, 1521 to RAN nodes 1531, 1532) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 1511, 1521 at each transmission time interval (TTI). A TTI is the duration of a transmission on a radio link 1503, 1505, and is related to the size of the data blocks passed to the radio link layer from higher network layers.

The area or region to be supplied with wireless network service or connectivity by the NAN 1531-1533 is divided into cells, each of which have a pattern dependent on the physical characteristics (e.g., terrain, physical objects or obstacles, etc.) and radio transmission/reception characteristics. The cell patterns may be in the form of shapes, such as circles, hexagons, squares, or the like, having a size that varies depending, in part, on the radio transmission/reception characteristics. Each of these cells is assigned with multiple channels or frequency carriers that are provided by a respective NAN 1531, 1532, 1533. The channels or frequencies used in one cell can be reused in other cells, provided that the same frequencies are not reused in adjacent cells, which would cause co-channel interference. For example, a first NAN 1531 may provide an LTE cell in a frequency band (or overall cell bandwidth) of 600 MHz to 6 gigahertz (GHz) with channel BWs (or carrier BWs) of 1.4, 3, 5, 10, 15, or 20 megahertz (MHz) (depending on the duplex mode of the frequency band), which may be aggregated together to create a channel BW up to 100 MHz (in LTE-Advance) or up to 640 MHz (in LTE-Advanced Pro). In a second example, a second NAN 1531 may provide a 5G/NR cell with a maximum carrier BW (or channel BW) of 100 MHz in frequency range 1 (FR1: 450 MHz to 6 GHz) or a maximum carrier BW (or channel BW) of 400 MHz in frequency range 2 (FR2: 24.25 GHz to 52.6 GHz) that can be aggregated with a maximum bandwidth of 800 MHz. In each of the aforementioned examples, the exact frequency band and the channel BWs that can be used may depend on the country and/or regulatory regime in which the NAN 1533 is located.

A given cell has a certain amount of radio resources within its frequency band that can be allocated to individual UEs 1511, 1521. The amount of resources per cell may be expressed a number of PRBs per TTI, and the amount of available resources (e.g., non-occupied PRBs) depends on the traffic load of a cell. The amount of data that can be transmitted in a PRB depends in part on radio link quality. Radio link quality may also change based on UE 1521, 1511 mobility within a particular cell (referred to as "intra-cell mobility" or the like) and mobility between cells (referred to as "inter-cell mobility" or the like). Additionally, radio signal properties/characteristics are affected by interference from other radio signals and physical obstacles (e.g., tress, buildings, statues, etc.) blocking a line-of-sight (LoS) of radio transmitters or receivers. The amount of data that can be transmitted in a PRB affects the realized and/or perceived performance of a wireless network or a given link 1503, 1505, 1507. In other words, the radio signal performance properties/characteristics impact the BW and/or network services that can be provided by individual cells and/or individual NANs 1531-1533, as well as the resource consumption of the UEs 1511, 1521 and the NANs 1531-1533 themselves. As discussed in more detail infra, the LPP technology discussed herein is used to predict future performance and/or characteristics of the wireless interfaces 1503, 1505, 1507 based on various criteria.

The NANs 1531/1532 may be configured to communicate with one another via respective interfaces or links (not shown), such as an X2 interface for LTE implementations (e.g., when CN 1542 is an Evolved Packet Core (EPC)), an Xn interface for 5G or NR implementations (e.g., when CN 1542 is an Fifth Generation Core (5GC)), or the like. The NANs 1531 and 1532 are also communicatively coupled to CN 1542. In embodiments, the CN 1542 may be an evolved packet core (EPC) network, a NextGen Packet Core (NPC) network, a 5G core (5GC), or some other type of CN. The CN 1542 may comprise a plurality of network elements, which are configured to offer various data and telecommunications services to customers/subscribers (e.g., users of UEs 1521 and IoT devices 1511) who are connected to the CN 1542 via a RAN. The components of the CN 1542 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN 1542 may be referred to as a network slice, and a logical instantiation of a portion of the CN 1542 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1542 components/functions.

The CN 1542 is shown to be communicatively coupled to an application server 1550 and a network 1550 via an IP communications interface 1555. the one or more server(s) 1550 comprise one or more physical and/or virtualized systems for providing functionality (or services) to one or more clients (e.g., UEs 1521 and IoT devices 1511) over a network (e.g., cloud 1544). The server(s) 1550 may include various computer devices with rack computing architecture component(s), tower computing architecture component(s), blade computing architecture component(s), and/or the like. The server(s) 1550 may represent a cluster of servers, a server farm, a cloud computing service, or other grouping or pool of servers, which may be located in one or more datacenters. The server(s) 1550 may also be connected to, or otherwise associated with one or more data storage devices (not shown). Moreover, the server(s) 1550 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1550 offer applications or services that use IP/network resources. As examples, the server(s) 1550 may provide traffic management services, cloud analytics, content streaming services, immersive gaming experiences, social networking and/or microblogging services, and/or other like services. In addition, the various services provided by the server(s) 1550 may include initiating and controlling software and/or firmware updates for applications or individual components implemented by the UEs 1521 and IoT devices 1511. The server(s) 1550 can also be configured to support one or more communication services (e.g., Voice-over-Internet Protocol (VoIP) sessions, PTT sessions, group communication sessions, social networking services, etc.) for the UEs 1521 and IoT devices 1511 via the CN 1542.

The cloud 1544 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1544 include application capabilities type, infrastructure capabilities type, and platform capabilities type. A cloud capabilities type is a classification of the functionality provided by a cloud service to a cloud service customer (e.g., a user of cloud 1544), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities.

Some cloud service categories that the cloud 1544 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

In some embodiments, the cloud 1544 may represent a network such as the Internet, a local area network (LAN) or a wide area network (WAN) including proprietary and/or enterprise networks for a company or organization, or combinations thereof. The cloud 1544 may be a network that comprises computers, network connections among the computers, and software routines to enable communication between the computers over network connections. In this regard, the cloud 1544 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1544 may be via a wired or a wireless connection using the various communication protocols discussed infra. More than one network may be involved in a communication session between the illustrated devices. Connection to the cloud 1544 may require that the computers execute software routines which enable, for example, the seven layers of the OSI model of computer networking or equivalent in a wireless (cellular) phone network. Cloud 1544 may be used to enable relatively long-range communication such as, for example, between the one or more server(s) 1550 and one or more UEs 1521 and IoT devices 1511. In some embodiments, the cloud 1544 may represent the Internet, one or more cellular networks, local area networks, or wide area networks including proprietary and/or enterprise networks, TCP/Internet Protocol (IP)-based network, or combinations thereof. In such embodiments, the cloud 1544 may be associated with network operator who owns or controls equipment and other elements necessary to provide network-related services, such as one or more base stations or access points, one or more servers for routing digital data or telephone calls (e.g., a core network or backbone network), etc. The backbone links 1555 may include any number of wired or wireless technologies, and may be part of a LAN, a WAN, or the Internet. In one example, the backbone links 1555 are fiber backbone links that couple lower levels of service providers to the Internet, such as the CN 1542 and cloud 1544.

In embodiments, the edge compute nodes 1536 may include or be part of an edge system 1535 (or edge network 1535). The edge system 1535 includes a collection of edge compute nodes 1536 and edge management systems (not shown by FIG. 15) necessary to run edge computing applications (e.g., MEC Apps 2636 of FIG. 26) within an operator network or a subset of an operator network. The edge compute nodes 1536 may also be referred to as "edge hosts 1536" or "edge servers 1536." The edge servers 1536 are physical computer systems that may include an edge platform (e.g., MEC platform 2637 of FIG. 26) and/or virtualization infrastructure (e.g., VI 2638 of FIG. 26), and provide compute, storage, and network resources to edge computing applications. Each of the edge servers 1536 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 1520 and/or endpoints 1510. The VI of the edge servers 1536 provide virtualized environments and virtualized resources for the edge hosts, and the edge computing applications may run as VMs and/or application containers on top of the VI. One example implementation of the edge system 1535 is a MEC system 1535, which is discussed in more detail infra with respect to FIGS. 26-28. It should be understood that the disclosed MEC systems and services deployment examples are only one illustrative example of edge computing systems/networks 1535, and that the example embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

As shown by FIG. 15, each of the NANs 1531, 1532, and 1533 are co-located with edge compute nodes (or "edge servers") 1536a, 1536b, and 1536c, respectively. These implementations may be small-cell clouds (SCCs) where an edge compute node 1536 is co-located with a small cell (e.g., pico-cell, femto-cell, etc.), or may be mobile micro clouds (MCCs) where an edge compute node 1536 is co-located with a macro-cell (e.g., an eNB, gNB, etc.). The edge compute node 1536 may be deployed in a multitude of arrangements other than as shown by FIG. 15. In a first example, multiple NANs 1531-1533 are co-located or otherwise communicatively coupled with one edge compute node 1536. In a second example, the edge servers 1536 may be co-located or operated by RNCs, which may be the case for legacy network deployments, such as 3G networks. In a third example, the edge servers 1536 may be deployed at cell aggregation sites or at multi-RAT aggregation points that can be located either within an enterprise or used in public coverage areas. In a fourth example, the edge servers 1536 may be deployed at the edge of CN 1542. These implementations may be used in follow-me clouds (FMC), where cloud services running at distributed data centers follow the UEs 1521 as they roam throughout the network.

In any of the aforementioned embodiments and/or implementations, the edge servers 1536 provide a distributed computing environment for application and service hosting, and also provide storage and processing resources so that data and/or content can be processed in close proximity to subscribers (e.g., users of UEs 1521, 1511) for faster response times The edge servers 1536 also support multi-tenancy run-time and hosting environment(s) for applications, including virtual appliance applications that may be delivered as packaged VM images, middleware application and infrastructure services, content delivery services including content caching, mobile big data analytics, and computational offloading, among others. Computational offloading involves offloading computational tasks, workloads, applications, and/or services to the edge servers 1536 from the UEs 1511/1521, CN 1542, cloud 1544, and/or server(s) 1550, or vice versa. For example, a device application or client application operating in a UE 1521/1511 may offload application tasks or workloads to one or more edge servers 1536. In another example, an edge server 1536 may offload application tasks or workloads to one or more UE 1521/1511 (e.g., for distributed ML computation or the like).

Various aspects of the LPP embodiments may be performed by one or more server(s) 1550, by one or more NFs in the CN 1542, by cloud 1544 (or one or more cloud computing nodes within the cloud 1544), and/or by one or more edge compute nodes 1536. The collection or combination of systems or devices that perform the LPP embodiments discussed herein may be collectively referred to as an "LPP service," which is discussed in more detail with respect to FIG. 29.

A. Embodiments for Link Performance Prediction Measurement

Figure 16:
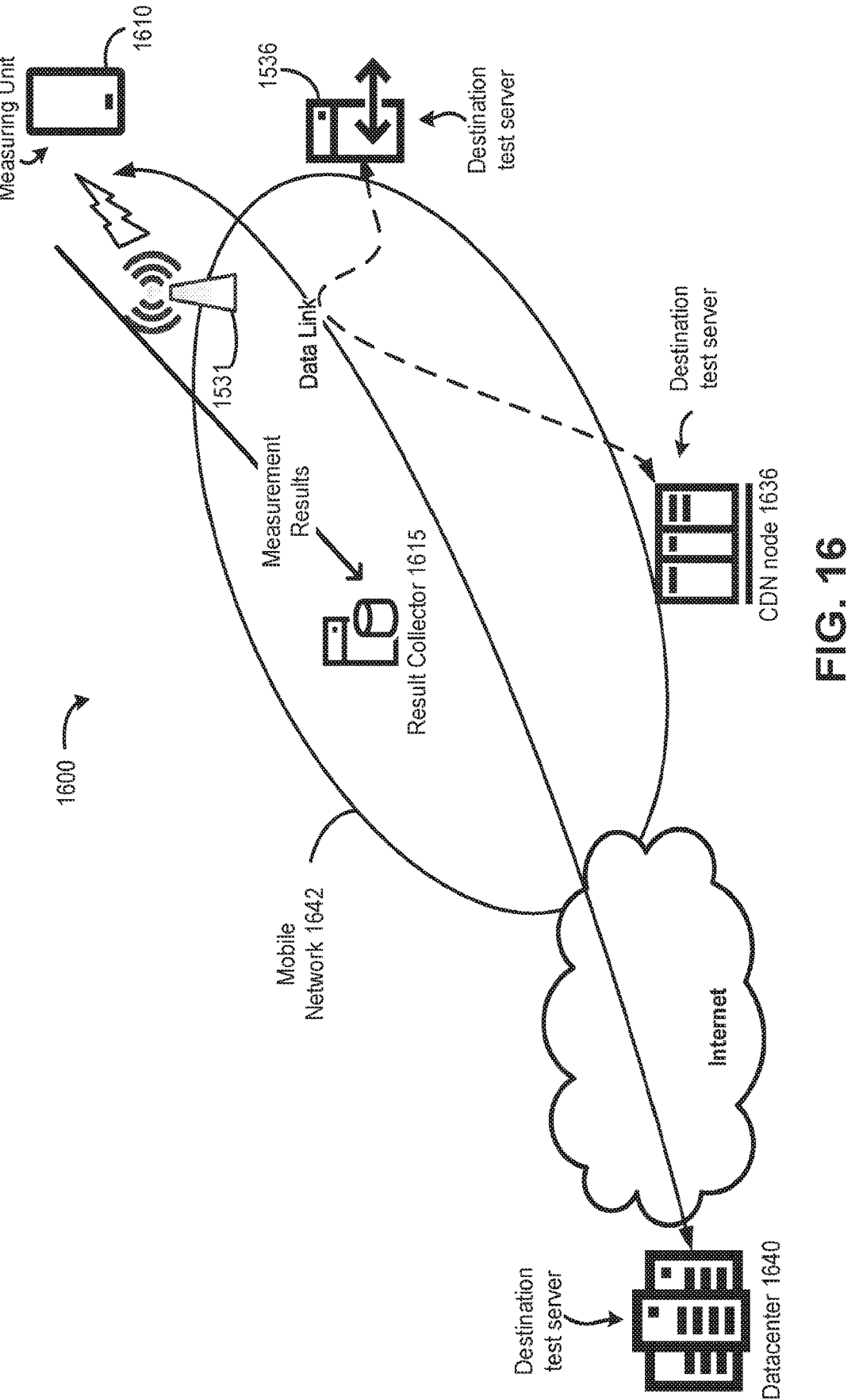
FIG. 16 shows an example network architecture according to various embodiments.

FIG. 16 shows an example network architecture 1600 according to various embodiments. Network architecture 1600 may be used for providing LPP measurements including bandwidth (BW) and latency measurements over access networks and/or RANs. The network architecture 1600 includes a mobile network 1642 that contains NAN(s) 1531, UEs 1610 (which may be the same as UEs 1511, 1521 of FIG. 15), and endpoints such as servers in a datacenter 1640, CDN node 1636, edge compute nodes 1536, and the like. The CDN node 1636 may be part of a CDN, which is a network of strategically placed CDN servers, each of which store (cache) and serve content to users within their vicinity. In various embodiments, UEs 1610 are leveraged to perform LPP measurements such as BW and latency measurements (referred to as measuring units), and one or more selected servers are leveraged to be as test endpoints (referred to as destination test points, destination test servers, or the like). In some embodiments, the measurement unit may be a NAN 1531-1533. The servers selected to be test endpoints may be located at different locations/areas of the network 1600. Additionally, measurement results (e.g., BW/latency measurements) are collected by a suitable result collection entity 1615, which in this example is shown as being located in the mobile network 1642. The result collection entity 1615 analyzes the measurement results/data for refining the LPP services discussed herein and/or for providing LPP indications to other LLP service consumers. In some embodiments, the result collection entity 1615 may be a network function (NF) in the CN 1542 (see e.g., FIG. 15). In other embodiments, the result collection entity 1615 may be located in one of the servers (e.g., one or more servers in datacenter 1640, CDN 1636, edge compute node 1536, or at the RAN or NAN 1531). In other embodiments, the result collection entity 1615 may be implemented by individual UEs 1610, and the measurement results can be stored locally and later communicated to the destination test server. The analysis of the measurement results/data can either be done on the measuring unit, result collection entity 1615, or elsewhere. The measurement results and/or the analyzed measurement results may be provided to the LPP service provider to assist in generating LPP indications/notifications as discussed herein.

Figure 17:
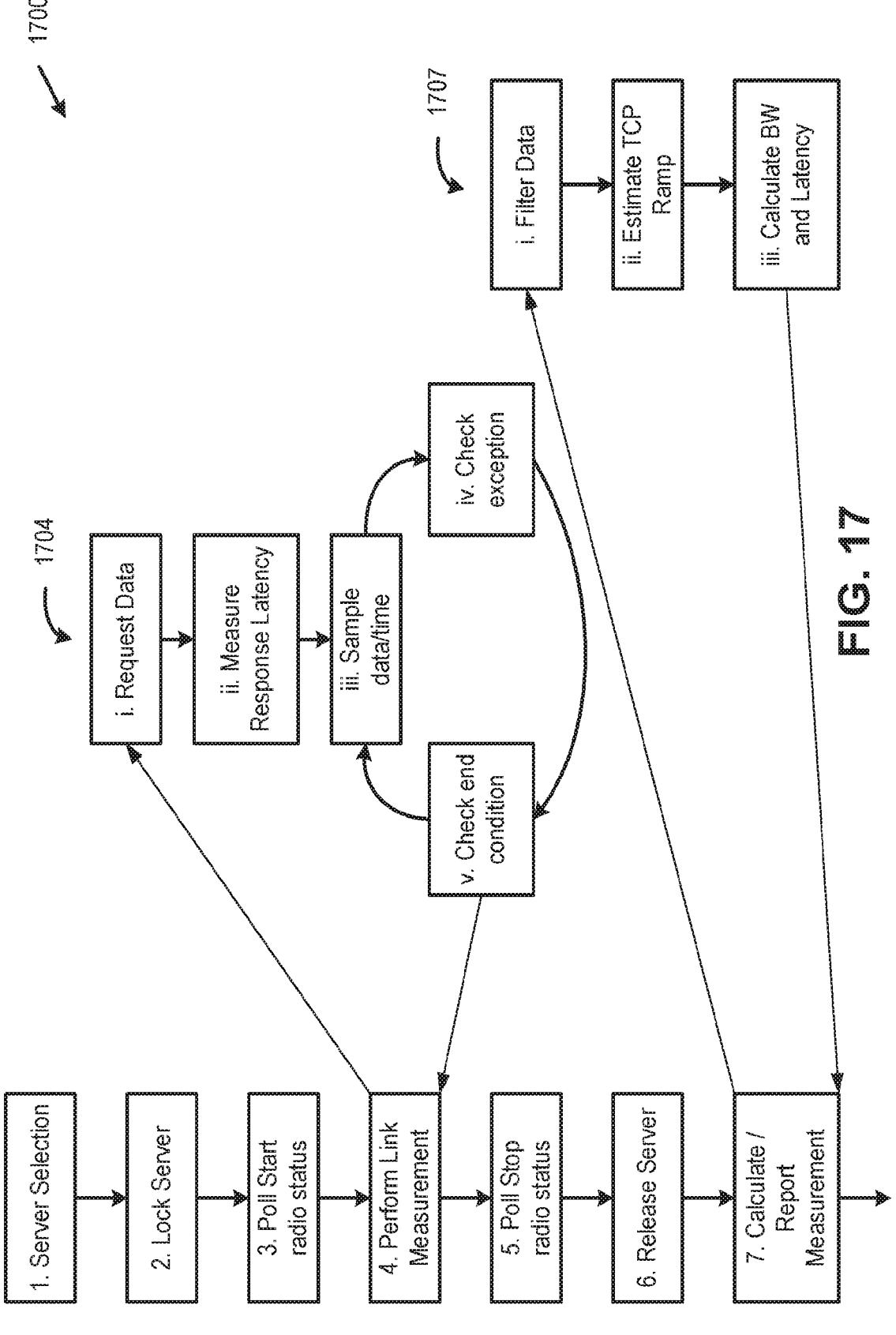
FIG. 17 shows an example bandwidth and latency measurement (BLM) process according to various embodiments.

FIG. 17 shows an example BW and latency measurement (BLM) process 1700 according to various embodiments. BLM process 1700 provides an efficient and accurate latency and BW measurements in mobile networks 1642 and/or networks 1600. Process 1700 may operate as follows: (1) server (e.g., destination test server) selection to test against; (2) lock the selected server; (3) Determine start radio signal condition and current cell; (4) Perform link measurement; (5) determine stop radio signal condition(s) and current cell parameter(s)/measurement(s); (6) release server; and (7) reporting the measurement(s). Subprocess 1704 is used for performing the measurement(s) at step (4), which includes (i) requesting data stream(s) from the server; (ii) determining a latency of the data stream; (iii) sampling data/timestamps; (iv) checking for exception conditions; and (v) checking for end-conditions. Subprocess 1707 is used for reporting the measurement(s) at step (7), and includes (i) filtering the data; (ii) estimating transport layer (e.g., TCP, QUIC, etc.) ramp; and (iii) calculating the bandwidth and latency. Aspects of each of these steps is discussed in more detail infra. The term "test" or "testing" in the context of the present disclosure refers to testing BW and/or latency measurements between two endpoints.

Step 1: Server Selection: Bandwidth and latency measurements are performed over a link between two endpoints, with the current location of the measuring unit being one of the endpoints. The first step of process 1700 is to decide on the second endpoint, for example, the destination test server. The server location should be chosen to reflect links at different locations in the network (e.g., network architecture 1600 of FIG. 16) such as at one or more edge compute nodes 1536, CDN nodes 1636, a centralized node (e.g., one or more NFs, cloud computing nodes or clusters, etc.) in the mobile network operator's network, or at different locations in the internet outside of the operator's network (see e.g., FIG. 16), such as one or more application servers (not shown by FIGS. 16-17).

Step 2: Lock Server: Prior to starting the BLM test, the destination server is locked for testing. Locking the selected server ensures that the server itself does not become a bottleneck in the test. The servers may implement multiple locking mechanisms, where each locking mechanism corresponds to a respective test. In some implementations, the server may operate multiple VMs or isolated user-spaces (e.g., containers, etc.) where each VM/isolated user-space operates an individual test. The locking mechanism(s) allow the server (or network operator) to specify how many tests may be run in parallel using, for example, an allocate/free mechanism with a counter of active sessions to ensure that the specified maximum is never exceeded.

In one embodiment, the locking mechanism(s) (aka "mutex") may be a semaphore (e.g., a binary/Boolean semaphore or a counting semaphore), wherein the testing server checks the value of a semaphore variable or performs an atomic test and set command on the semaphore (e.g., stored in memory of the test server) to determine whether the semaphore is in a locked state. For example, the semaphore may be set to a locked state, and its previous value (e.g., locked or unlocked) may be returned and examined by the test server. If the previous value of the semaphore is locked, that may indicate that another measurement unit (e.g., UE 1511, 1521) has locked the semaphore and is about to, or is currently, running a test. In such case, test server may refrain from initiating the BLM process 1700 until the semaphore becomes unlocked. Additionally, the test server may retest and reset the semaphore until the test and set command returns a previous value that indicates the semaphore has been unlocked (e.g., by another process or measurement unit). In another embodiment, the locking mechanism(s) may be a lock and timer mechanism, where the measurement unit may lock the server for a certain period of time to prevent measurement units from accessing the server (or the server's BLM testing functionality). In some embodiments, the locking mechanism(s) may be maintained in a lock management (or coordination) database, which is controlled by the testing server or some other entity/element (e.g., a lock management entity). In these embodiments, when a testing unit or the test server itself requests to perform the BLM process 1700, the test server checks (or lock management entity) if it is currently locked, and if this yes, the test server rejects the request. Where timers are used, the test server (or other lock management entity) may unlock the server (or the testing functionality) when the timer has expired.

In some embodiments, no locking mechanism(s) are used, and/or the use of the locking mechanism(s) may be based on the availability of a lock handling function at the destination server or the availability of an external lock management entity. Measurement accuracy may be improved when a lock mechanism is support (e.g., in comparison to when no lock mechanism is used) since the lock mechanism may ensure that bottleneck conditions do not occur at the server itself.

Step 3: Poll Start Radio Status. This step involves determining the radio/signal conditions of a current cell in which the measurement unit is located and/or camping before or when the process starts. This step involves determining the current location of the measurement unit, which may be based on a cell ID in which the UE 1511,1521 is located, GPS coordinates, triangulation methods, and/or other location/positioning techniques such as those discussed herein. Additionally, this step involves determining a current RAT being used by the UE 1511,1521, such as WiFi, WiMAX, WCDMA, LTE, NR, etc. Furthermore, this step involves determining the current signal/radio conditions experienced by the UE 1511, 1521, such as signal strength, SNR, and/or any other measurements such as those discussed herein.

Figure 18:
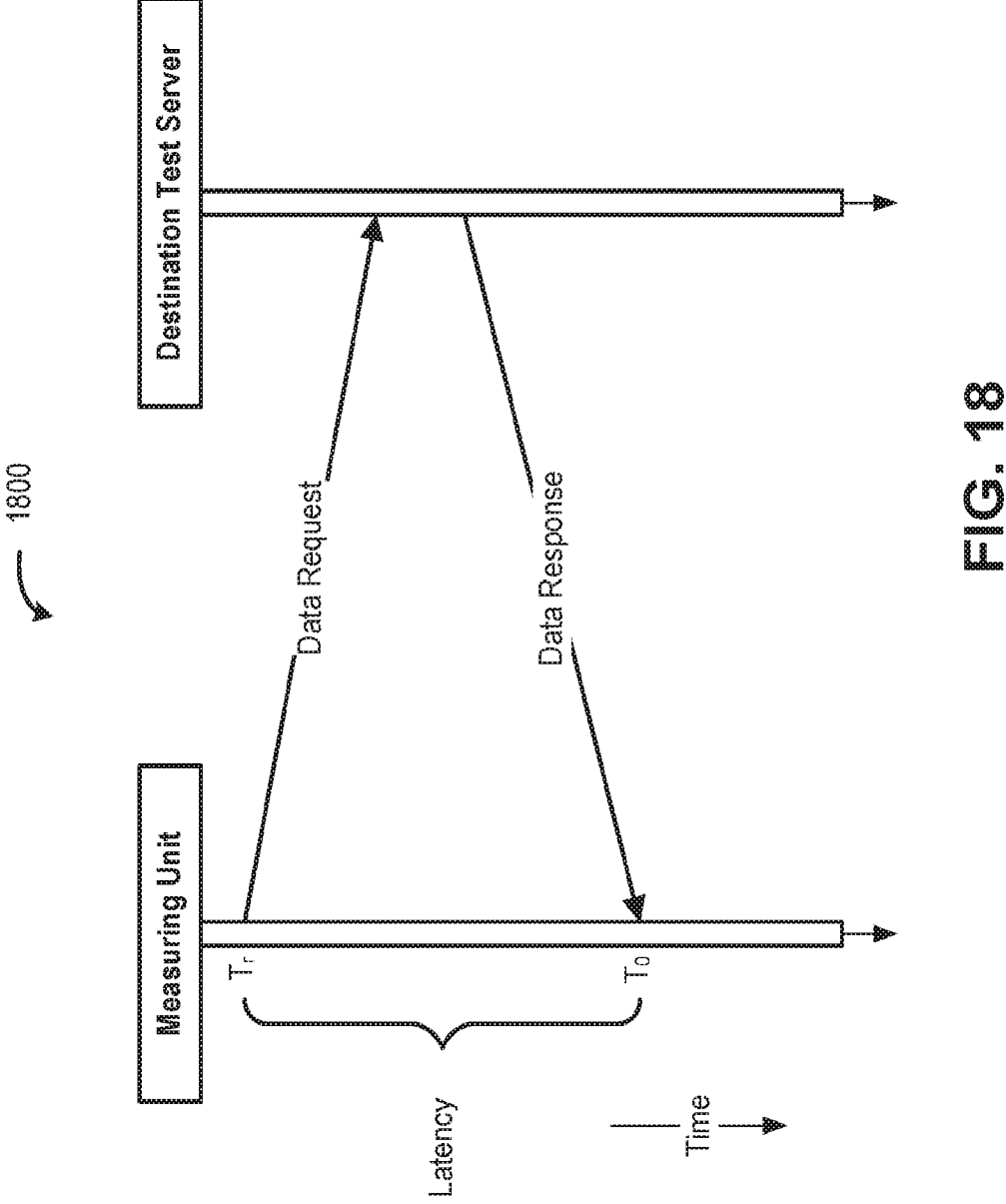
FIG. 18 shows an example latency measurement procedure according to various embodiments.

Step 4: Perform Link Measurement(s). This step is shown by subprocess 1704 of FIG. 17, and incudes the measurement unit requesting data (or data stream) from the test server, determining latency of the requested data (or data stream), sampling the data and/or timestamps, checking for exception conditions, and checking for end conditions.

i. Request data stream from server: The link measurement is started by making a data pull request (for downlink) or data push request (for uplink). The data transmission can be over any type of transport protocol such as TCP, UDP, QUIC, and/or the like. Furthermore, the transport protocol can be layered or otherwise used with a suitable application (service) layer protocol, such as using http/https, ftp, ssh, and/or some other type of service for the data transfer. In embodiments, the type of transport protocol and service/application layer protocol used is also accounted for when computing the measurement results.

ii. Determine Latency. FIG. 18 shows an example latency measurement procedure 1800 according to various embodiments. Procedure 1800 may be used to measure a round-trip time (RTT) for a requested data stream, which in this example, is a time between a data request ($T_r$) and a time when a first data packet is received by the measurement unit $T_0$). The example of FIG. 18 shows how downlink latency is measured. For downlink measurements, the measurement unit determines the latency by measuring the time from sending a pull request ($T_r$) until the first data packet arrives at the measurement unit ($T_0$). For uplink measurements (not shown), the measurement unit determines the latency by measuring the time from receiving a push notification ($T_r$) and when a data packet arrives at the test server ($T_0$). Receipt of the push notification/message may trigger the measurement unit to transmit the data packet to the test server. Additionally, the test server may send an acknowledgement (ACK) message to the measurement unit indicating the arrival time of the data packet at the test server ($T_0$).

iii. Sample data/timestamp. The measurement unit samples received data and/or associated timestamps in one or more intervals starting from time $T_0$ (see e.g., FIG. 18). As used herein, term "sampling" may refer to a process of converting an analog signal into a number of data points at different times, and/or the term "sampling" may refer to selecting a subset of data points from a set of data points to estimate characteristics of the set of data points. The number of data points used in a given sample may be referred to as a "quantization." Additionally, the term "precision" in "quantization precision" refers to the quantization after sampling; in other words, a "quantization precision" is the number of bits used to represent the quantized sample. The intervals are expressed in terms of time (e.g., every N microseconds (µs), where N is a number, and N µs is the length of each interval) and/or data (e.g., every M bytes, where M is a number, and M bytes is the length of each interval). For each interval, the measurement unit stores a number of bytes (or quantization) received since time $T_0$ as well as the time since (or after) time $T_0$. This is referred to as a time- and data-stamp ramp. The measurement unit measures and logs these intervals in a series until one or more of the following conditions occurs: a maximum data consumption is reached, a maximum time period since time $T_0$ is reached, and/or an exception occurs (discussed in more detail infra).

iv. Check for exception conditions. Throughout the measurement process, the measurement unit checks for and/or identifies exception conditions that, depending on settings, configurations, etc., are used to alter the measurement. The alterations to the measurement include aborting or terminating the measurement process, concluding the measurement process early, and/or reporting the exception along with the measurements, if any. The exception cases monitored may include, but are not limited to: detecting a change of an active cell; detecting a change in radio signal properties (e.g., above some preconfigured or configured threshold); detecting a signal loss, a decrease in signal strength, loss of network connectivity, and/or radio link failure; detecting a change in connection type (or RAT), for example, switching from LTE to WiFi; detecting a timeout due to no initial data being sent or received; detecting a timeout due to no data being sent or received for a predefined or configured time period; meeting or exceeding a data cap and/or data consumption for measurements exceeds an allocated quota for a certain time period (e.g., per day, month, etc.); and/or the like.

v. Check for end condition(s). The end conditions may include the aforementioned alterations to the measurement such as aborting or terminating the measurement process, concluding the measurement process early, and/or reporting the exception along with the measurements (if any are recorded). The end conditions to execute and/or perform may be predefined or configured by the network or LPP service provider.

Step 5: Poll Stop Radio Status. This step involves determining the radio/signal conditions of a current cell in which the measurement unit is located and/or camping before or when the process is to end. This step is similar to step 3 in which the radio properties are determined but are used to end of the measurement process. The same or similar measurements discussed with respect to step 3 may be used for this step.

Step 6: Release Server. When the measurement is concluded, the measurement unit or the testing server (or lock management entity) releases the aforementioned lock allocated to this measurement process (see e.g., step 2 discussed supra), if a lock mechanism was used.

Step 7: Report measurement and calculate result. The measured characteristics (and optionally including the detected exceptions) are reported to the result collection entity 1615, which is located in the mobile network 1642 (see e.g., FIG. 16). In other embodiments, the result collection entity 1615 may be implemented by the measurement unit, and the measurement results may be stored locally in local storage of the measuring unit. The analysis of the measurement results/data can either be done on the result collection entity 1615, the measuring unit, or by some other entity.

Figure 19:
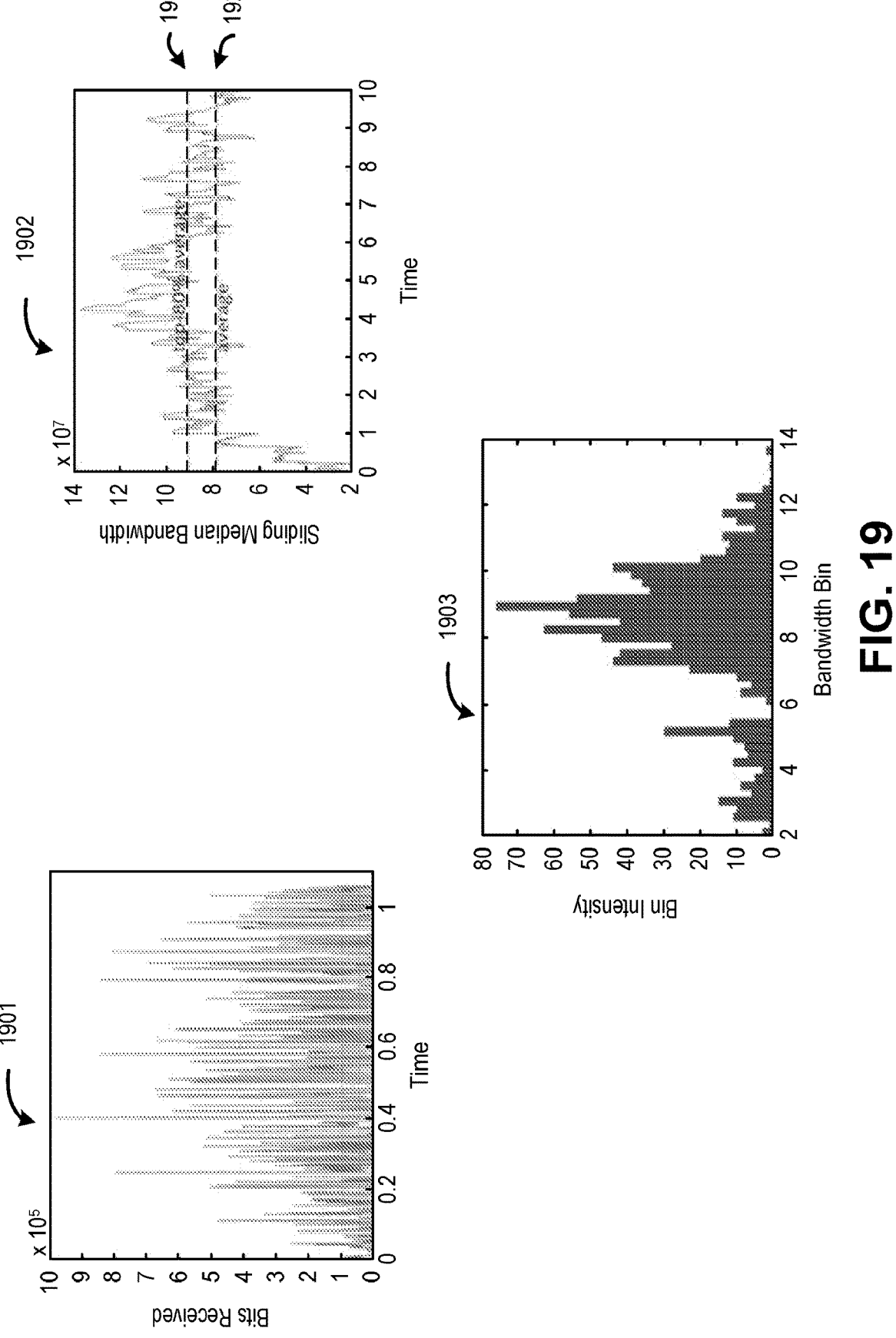

With reference to FIG. 19, the bandwidth for the specific cell, with the specific radio properties and with the specific destination is estimated by analyzing the data-/time-stamp curves. Graph 1901 of FIG. 19 shows a raw data/time-stamp plot. Analysis of the raw data/timestamps can be done in multiple ways. In one embodiment, the raw data/timestamps are analyzed first by including a basic data filter such as average or Gaussian filter, which is shown by graph 1902 of FIG. 19 shows. The estimation can then be done by an average (e.g., line 1921 in graph 1902), a noise reduced average, averaging but excluding the N % lowest values (e.g., line 1922 in graph 1902), a histogram (see e.g., graph 1903 in FIG. 19), and/or weighted histogram.

Certain transport types, such as TCP, have an initial behavior that does not characterize the long-term or other non-initial behaviors of the link. For TCP, this is related to the congestion protocol that only gradually allows for the number of outstanding packets to be increased, and hence, shows a ramp up in the beginning (see e.g., graph 1902 of FIG. 19). The aggressiveness in the ramp depends on the congestion protocol implementation, which can be any of multiple different congestion protocols. To determine the long-term link behavior, it is desirable to filter out this initial ramp phase as it can reduce the overall estimated link performance. This can be done by filtering the data, identifying when a knee in the ramp is reached, and then ignoring the data prior to the identified knee. Graph 2001 in FIG. 20 shows a sliding median for the data/timestamps shown by FIG. 19 (e.g., graph 1902) when the initial ramp has been removed. As can be seen when comparing graph 2002 in FIG. 20 with graph 1903 of FIG. 19, the lower part of the distribution has been removed and a more exact estimation of the long-term bandwidth can be determined.

The concepts described with respect to FIGS. 16-20 can in whole or in part be implemented as a dedicated function to measure and characterize link performance, which can be valuable to provide detailed information for a specific area/cell, time, usage scenario, and the like. However, such functions are themselves intrusive in the network as the data transfer itself adds to additional value. In other words, the data transfer for communicating the LPP measurements (e.g., the BW and latency measurements) can affect the radio conditions and/or increase resource overhead. Therefore, it may be beneficial to integrate the link measurements into normal application usage including, for example, media streaming services, cloud gaming services, file transfer services, and/or the like.

Typically, data transfers occur in chunks. The data transfer chunks may be for specific structured data (e.g., electronic files, documents, images/pictures, etc.) for file transfer services, individual image frames for cloud gaming services (including immersive or virtual reality and/or augmented reality gaming), individual media frames or media sequences for media streaming services, and/or the like. Media streaming services (e.g., Netflix®, YouTube®, etc.) commonly use an HTTP-based streaming technology for transferring data chunks, which provide reliability and deployment simplicity due to the already broad adoption of both HTTP and its underlying TCP/IP protocols. One such HTTP streaming technology is Dynamic Adaptive Streaming over HTTP (DASH), including 3GPP DASH ("3GPP-DASH") as standardized by 3GPP TS 26.247 v16.1.0 (2018-12), and MPEG-DASH as standardized by ISO/IEC DIS 23009-1:2019 (2019-08) (as well as ISO/IEC 23009-2 and ISO/IEC 23009-3).

Figure 21:
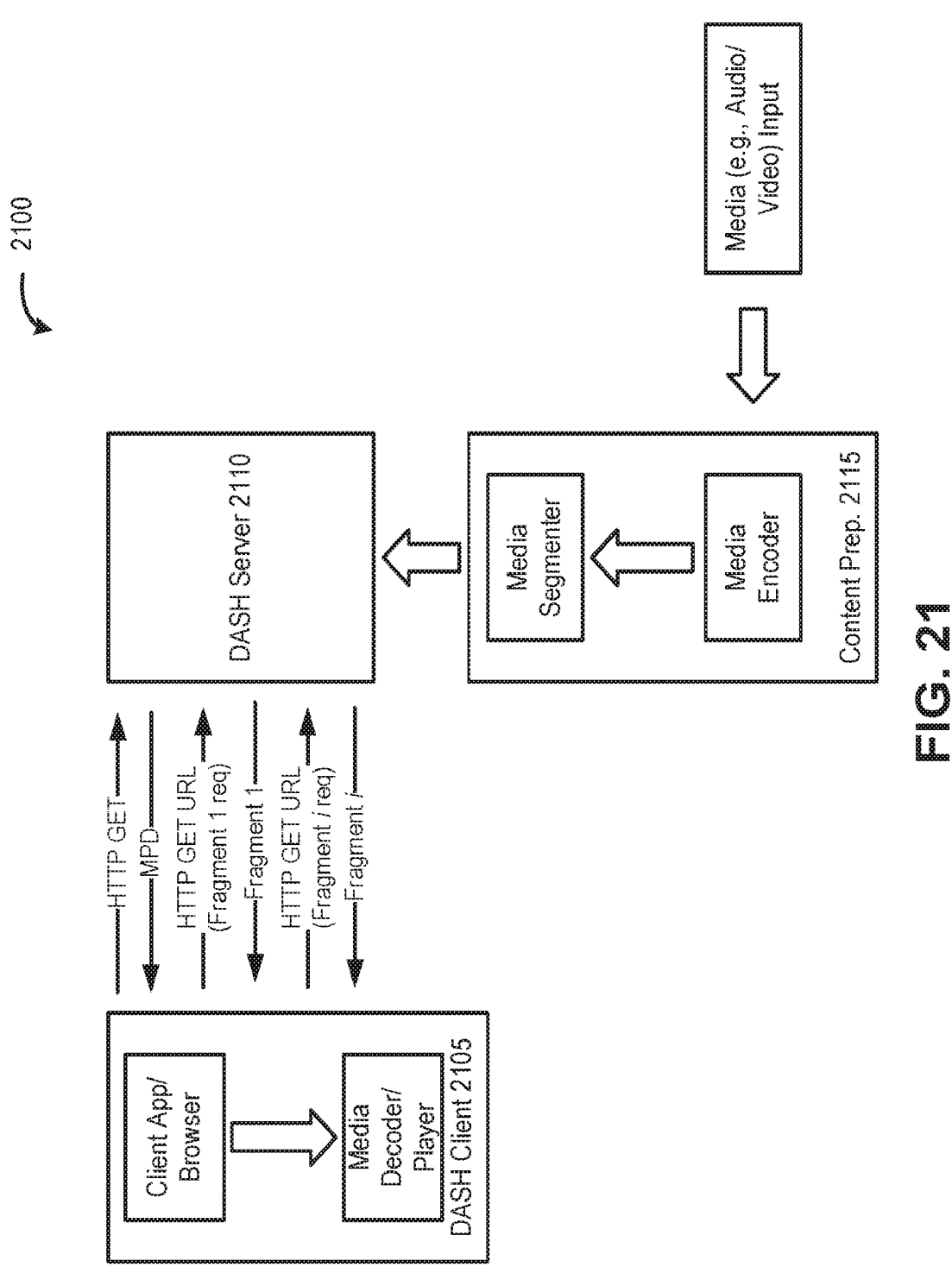
FIG. 21 shows a DASH-based streaming framework including DASH-related procedures between a DASH client and a DASH server according to some embodiments.

FIG. 21 shows a DASH-based streaming framework 2100 including DASH-related procedures between a DASH client 2105 (e.g., corresponding to measuring unit 1610 of FIG. 16) and a DASH server 2110 (e.g., a web server, CDN node, edge compute node, etc.) according to some embodiments. DASH is a bitrate streaming technique that breaks a data stream into a sequence of small HTTP-based data segments (e.g., 5 second blocks or chunks) that are encoded at a variety of different bitrates and/or resolutions, which require different amounts of BW to transmit to the client 2105. In FIG. 21, a media segmenter in a content preparation element 2115 (e.g., a media server, web server, application server, CDN node, edge compute node, etc.) is used to split input media into a serial or series of fragments or chunks. In some implementations, an HTTP caching element (e.g., a CDN node, edge compute node, etc.) can be deployed between the client 2105 and DASH server 2110.

The DASH-capable client 2105 requests new data in chunks using HTTP GET messages. The URL (e.g., in the HTTP GET requests shown by FIG. 21) is used to tell the server 2110 which segment the client is requesting. The client 2105 may automatically select a data stream segment to download and play back based on current network conditions experienced by the streaming client. Usually, the client 2105 (or a client application or web browser) selects a data stream segment with a highest bitrate possible that can be downloaded in time for playback without causing lags or buffering events in the playback. DASH provides an overview of elements and attributes that may be used to describe components and properties of a media presentation in a Media Presentation Description (MPD). The MPD is a metadata file that provides information on the structure and different versions of the media content representations stored in one or more server(s) including different bitrates, frame rates, resolutions, codec types, etc. The MPD is used to convey the index of each segment and associated metadata information. In addition, DASH also specifies the segment formats, for example, containing information on the initialization and media segments for the media engine to ensure mapping of segments into media presentation timeline for switching and synchronous presentation with other representations. Based on this MPD/metadata information that describes the relation of the segments and how they form a media presentation, the client requests the segments using HTTP GET or partial GET methods. In particular, a client application or web browser in the client 2105 will pull media from the web server 2110, segment by segment, in accordance with the MPD. The client fully controls the streaming session including management of on-time request and smooth playout of the sequence of segments, potentially adjusting bitrates or other attributes, for example, to react to changes of the device state or the user preferences.

Figure 22:
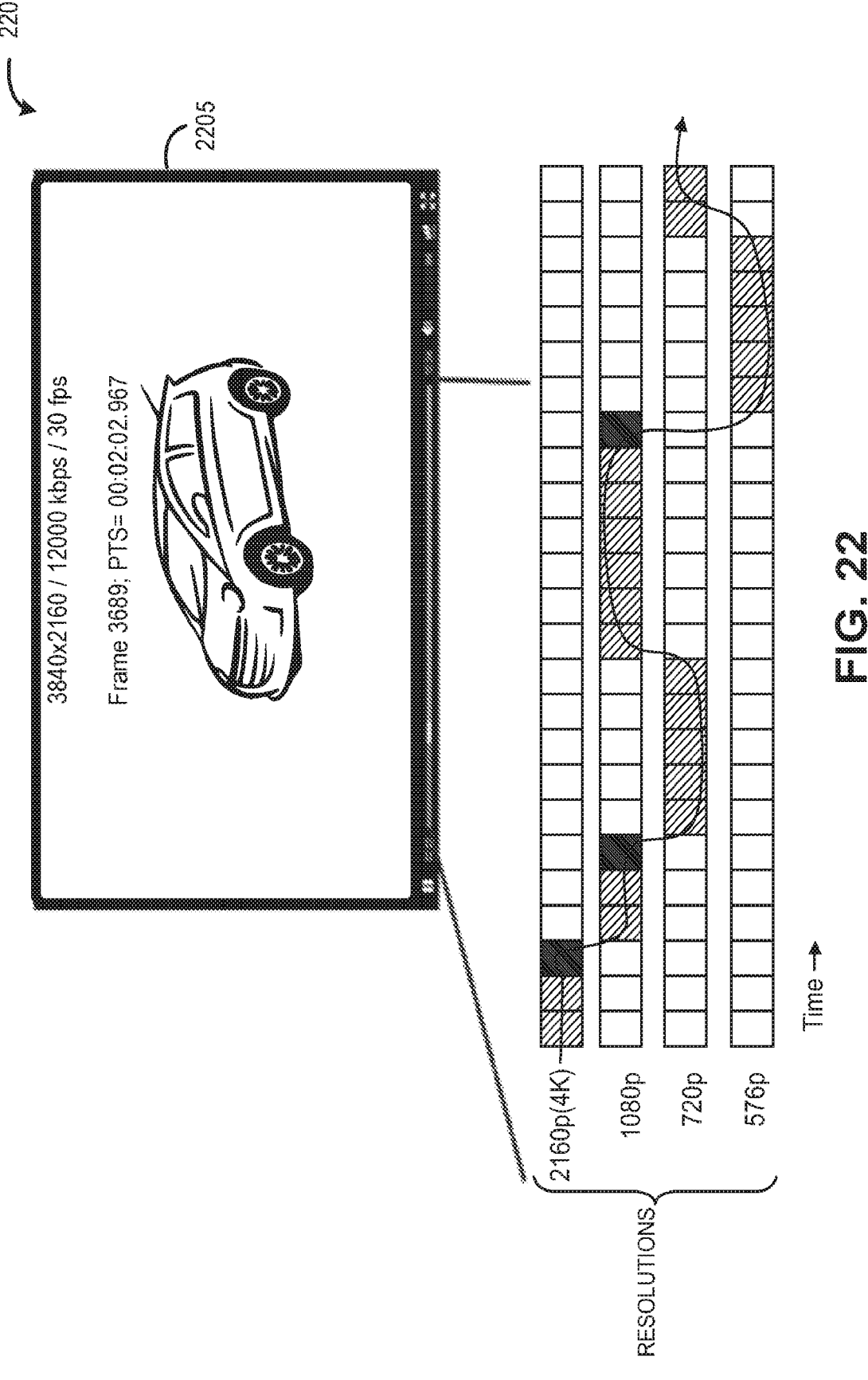
FIG. 22 shows a data transfer deployment example according to various embodiments.

FIG. 22 shows a data transfer deployment example 2200 according to various embodiments. In FIG. 22, once a streaming media player 2205 (e.g., corresponding to the client application in client 2105 of FIG. 21) starts streaming video content, the streaming media player 2205 measures the time it takes to download a block, chunk, or segment, and compares the download time with the length of the block. If the download time is less than but approximately equal to the block length (e.g., within some predetermined or configured threshold or range), then the current resolution is the best resolution, which is already achieved. If significantly less time is required to download the block (e.g., based on the aforementioned threshold or range), then the streaming media player 2205 will switch to a higher resolution for the following (next) block. If the download time is longer than the block length, then the streaming media player 2205 will switch to a lower resolution. This is illustrated in FIG. 22 by the line traversing the different blocks at different resolutions. According to various embodiments, the client 2105 may record these measurements for the LPP measurements as discussed herein.

In the aforementioned application areas (e.g., file transfer services, media streaming services, gaming services, etc.), the data chunk transfers occur with the purpose of fulfilling a need by itself. By leveraging these needs, and applying the aforementioned link characterization concepts, the measuring unit (e.g., client 2105 of FIG. 21) can provide non-intrusive measurements of the network. Although the steps shown by FIG. 17 can be applied, in these embodiments, there is generally not a need to select and lock a server since that is naturally handled by the application. It is however important to measure the radio state before and/or after the transfer occurs.

Figure 23:
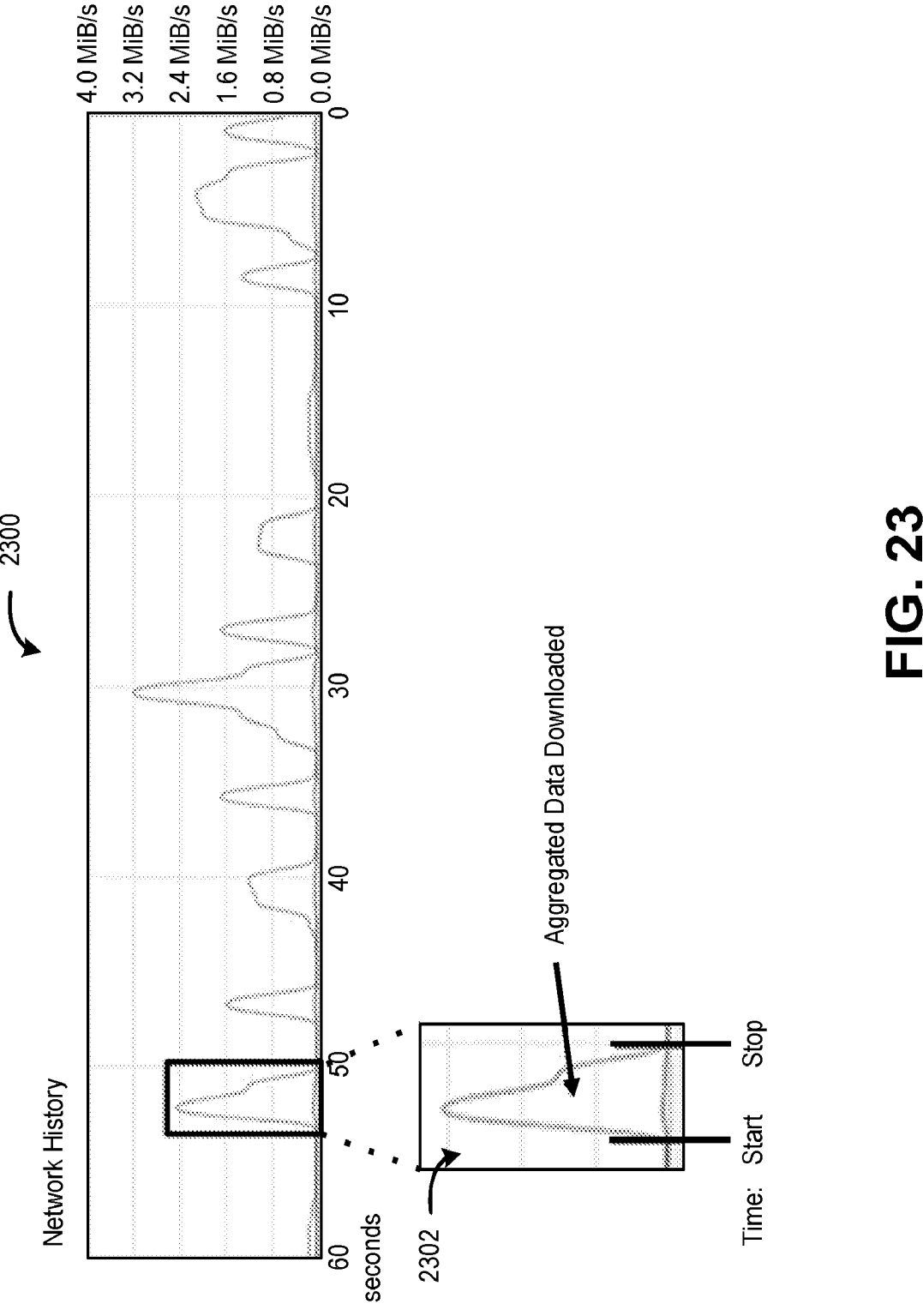
FIG. 23 illustrates an example network history graph, which shows a set of data chunks that are transferred over a period of time, where link characteristics were measured per chunk.

FIG. 23 illustrates an example network history graph 2300, which shows a set of data chunks that are transferred over a period of time, where link characteristics were measured per chunk. In this example, each chunk was handled individually, and each chunk has a request time, start and stop of data arrival, as well as a total amount of data transferred. This is shown by the representative chunk 2302 in FIG. 23. In this way, the LPP (e.g., BW and latency) measurement embodiments can be applied.

Figure 24:
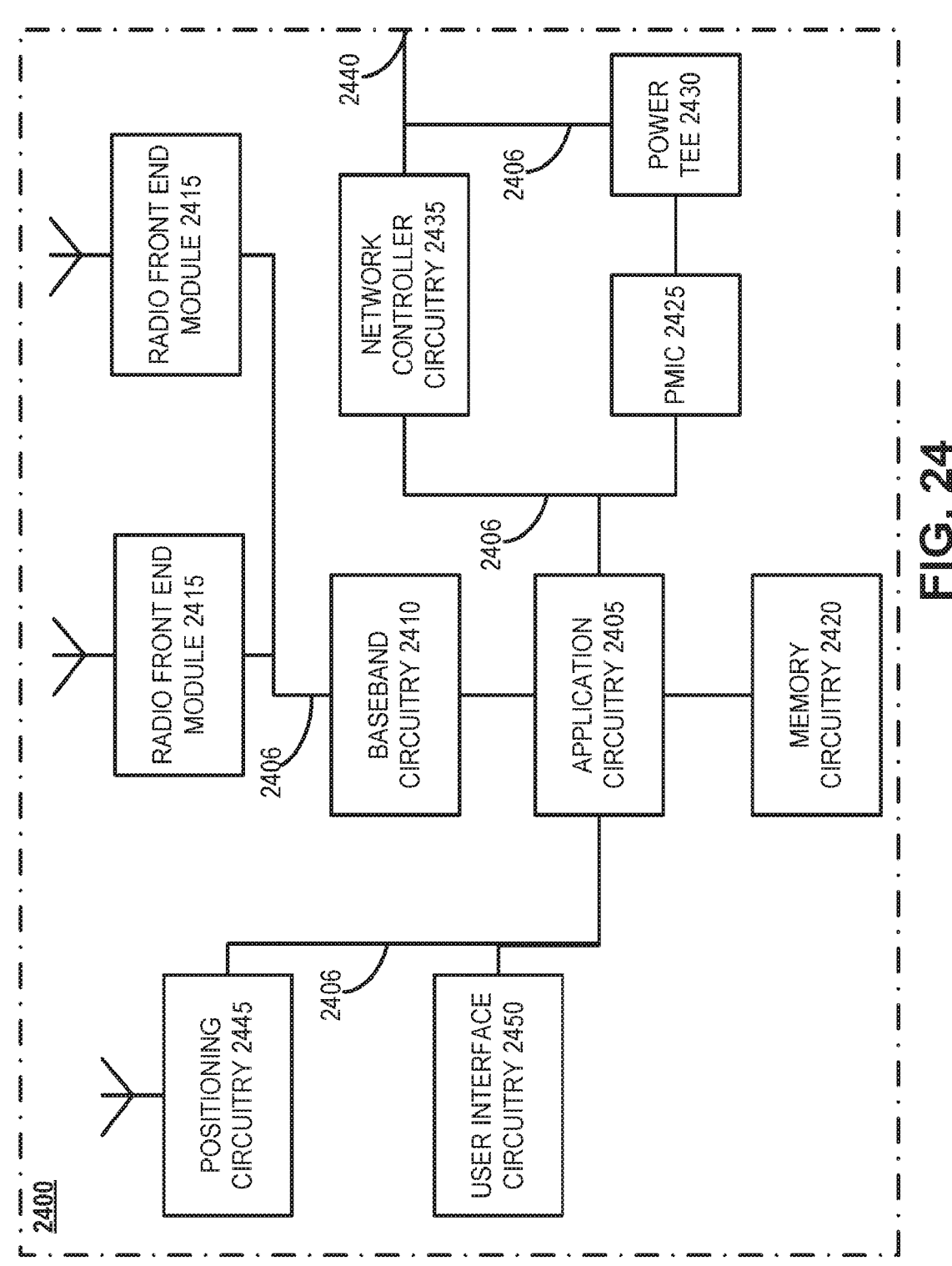
FIG. 24 illustrates an example of infrastructure equipment in accordance with various embodiments.

FIG. 24 illustrates an example of infrastructure equipment 2400 in accordance with various embodiments. The infrastructure equipment 2400 (or "system 2400") may be implemented as a base station, radio head, access network node (e.g., the edge nodes 1530 shown of FIG. 15), edge compute nodes 1536, server(s) 1550, and/or any other element/device discussed herein. In other examples, the system 2400 could be implemented in or by an intermediate node 1520 or endpoint 1510.

The system 2400 includes application circuitry 2405, baseband circuitry 2410, one or more radio front end modules (RFEMs) 2415, memory circuitry 2420, power management integrated circuitry (PMIC) 2425, power tee circuitry 2430, network controller circuitry 2435, network interface connector 2440, positioning circuitry 2445, and user interface 2450. In some embodiments, the device 2400 may include additional elements such as, for example, memory/storage, display, camera, sensor, or IO interface. In other embodiments, the components described below may be included in more than one device. For example, said circuitries may be separately included in more than one device for CRAN, CR, vBBU, or other like implementations.

Application circuitry 2405 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose 10, memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 2405 may be coupled with or may include memory/storage elements and may be configured to execute instructions stored in the memory/storage to enable various applications or operating systems to run on the system 2400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSPs), one or more FPGAs, one or more programmable logic devices (PLDs), one or more ASICs, one or more microprocessors or controllers, or any suitable combination thereof. In some embodiments, the application circuitry 2405 may comprise, or may be, a special-purpose processor/controller to operate according to the various embodiments herein. As examples, the processor(s) of application circuitry 2405 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 2400 may not utilize application circuitry 2405, and instead may include a special-purpose processor/controller to process IP data received from an EPC or 5GC, for example.

In some implementations, the application circuitry 2405 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable gate arrays (FPGAs); PLDs (e.g., complex PLDs (CPLDs), high-capacity PLDs (HCPLDs), etc.) and the like; ASICs such as structured ASICs and the like; programmable SoCs (PSoCs); and/or the like. In such implementations, the circuitry of application circuitry 2405 may comprise logic blocks or logic fabric, and other interconnected resources that may be programmed to perform various functions, such as the procedures, methods, functions, etc. of the various embodiments discussed herein. In such embodiments, the circuitry of application circuitry 2405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where subsystems of the edge nodes 1530, intermediate nodes 1520, and/or endpoints 1510 of FIG. 15 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 2405 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 2410 may be implemented, for example, as a solder-down substrate including one or more integrated circuits, a single packaged integrated circuit soldered to a main circuit board or a multi-chip module containing two or more integrated circuits. The baseband circuitry 2410 includes one or more processing devices (e.g., baseband processors) to carry out various protocol and radio control functions. Baseband circuitry 2410 may interface with application circuitry of system 2400 for generation and processing of baseband signals and for controlling operations of the RFEMs 2415. The baseband circuitry 2410 may handle various radio control functions that enable communication with one or more radio networks via the RFEMs 2415. The baseband circuitry 2410 may include circuitry such as, but not limited to, one or more single-core or multi-core processors (e.g., one or more baseband processors) or control logic to process baseband signals received from a receive signal path of the RFEMs 2415, and to generate baseband signals to be provided to the RFEMs 2415 via a transmit signal path. In various embodiments, the baseband circuitry 2410 may implement a real-time OS (RTOS) to manage resources of the baseband circuitry 2410, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 24, in one embodiment, the baseband circuitry 2410 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs

2415 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 2415 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 2410 and/or RFEMs 2415. The baseband circuitry 2410 may also support radio communications for more than one wireless protocol.

Continuing with the aforementioned embodiment, the baseband circuitry 2410 includes individual processing device(s) to implement PHY including HARQ functions, scrambling and/or descrambling, (en)coding and/or decoding, layer mapping and/or demapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 2450 may include one or more user interfaces designed to enable user interaction with the system 2400 or peripheral component interfaces designed to enable peripheral component interaction with the system 2400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 2415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 2415, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 2410 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 2420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 2420 may be implemented as one or more of solder down packaged integrated circuits, socketed memory modules and plug-in memory cards.

The memory circuitry 2420 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 2400, an operating system of infrastructure equipment 2400, one or more applications, and/or for carrying out the embodiments discussed herein. The computational logic may be stored or loaded into memory circuitry 2420 as instructions for execution by the processors of the application circuitry 2405 to provide or perform the functions described herein. The various elements may be implemented by assembler instructions supported by processors of the application circuitry 2405 or high-level languages that may be compiled into such instructions. The permanent copy of the programming instructions may be placed into persistent storage devices of memory circuitry 2420 in the factory during manufacture, or in the field through, for example, a distribution medium (not shown), through a communication interface (e.g., from a distribution server), and/or over-the-air (OTA).

In some embodiments, the infrastructure equipment 2400 may be a NAN 1531-1533 that is configured to collect data for the LPP services 2900 discussed herein. In these embodiments, the memory circuitry 2420 may store one or more applications and/or software components including program code, instructions, modules, assemblies, packages, protocol stacks, software engine(s), firmware, etc., which when running on the infrastructure equipment 2400 (e.g., executed by application circuitry 2405), collect spatial-temporal data (see e.g., FIG. 30 infra), and provides this information to one or more prediction layers 2905 in the LPPS 2900 via a suitable backhaul link via network controller circuitry 2435 and network interface connector 2440. As discussed in more detail infra, the spatial-temporal data such as operational parameters of the system 2400, signal measurements, and/or other like data as discussed herein, may be accessed using suitable APIs, Application Binary Interfaces (ABIs), middleware, drivers, configuration files, trusted application(s), etc., for accessing measurement data and/or other like information from the baseband circuitry and/or from network functions in the CN 1542. For example, these APIs, drivers, etc., may access measurement data of measurements directly measured by the infrastructure equipment 2400, measurements collected by UEs 1511, 1521 during minimization drive tests (MDTs), and/or measurement data collected by UEs 1511, 1521 and/or the infrastructure equipment 2400 measurements performed by the UEs 1511, 1521 for other purposes, such as measurements taken for cell selection, handovers, and/or the like. In another example, one or more APIs may be used to collect network load information from the CN 1542 (or one or more NFs within the CN 1542 or the like). In some embodiments, these applications, components, plug-ins, firmware, etc., may also subscribe to the LPPS 2900 to receive LPP notifications or "hints" from the LPPS 2900 (see e.g., FIGS. 37-43).

Figure 29:
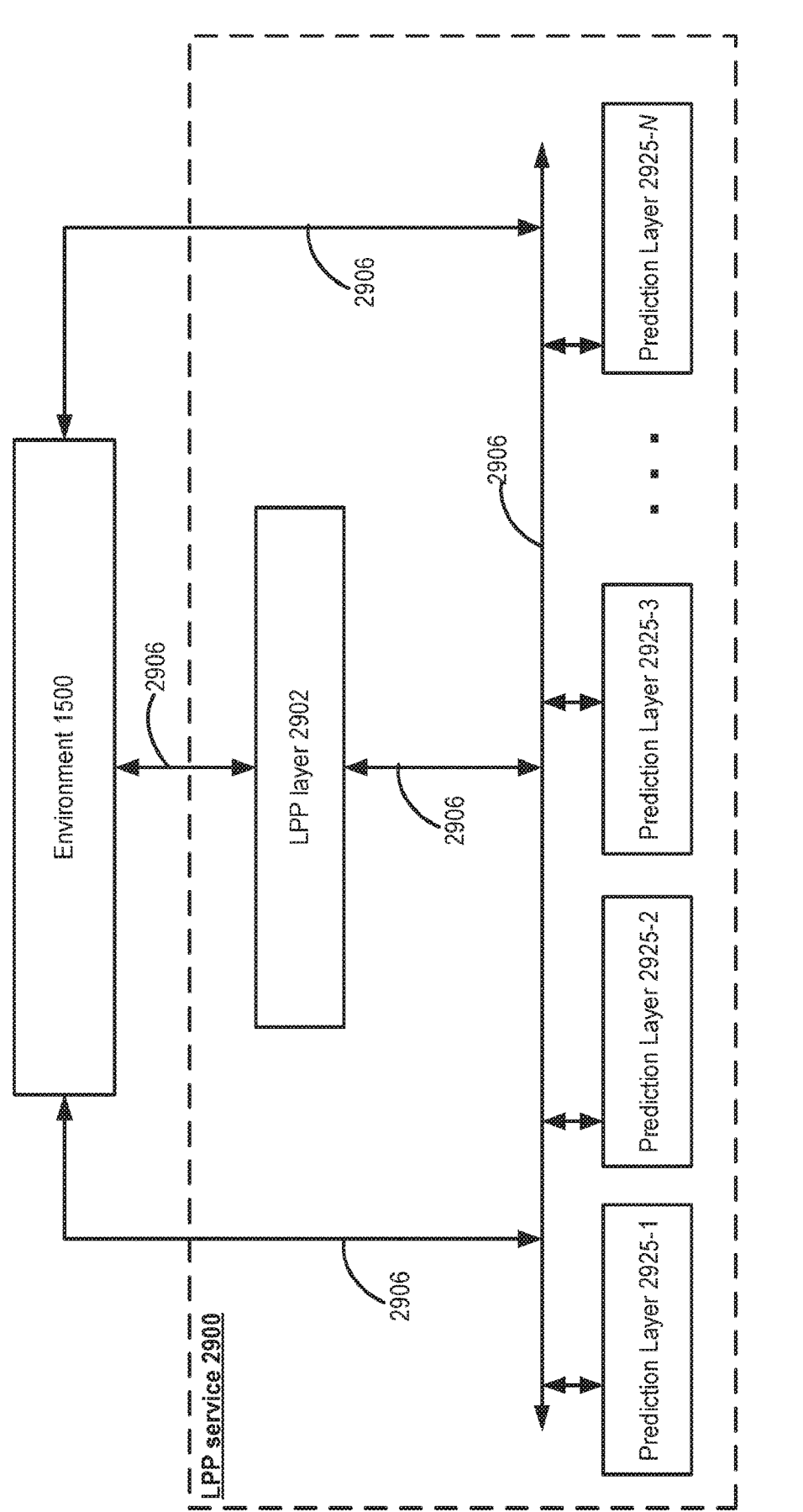
FIG. 29 illustrates example logical components and interaction points of an LPP service (LPPS) in accordance with various embodiments.

In other embodiments, the infrastructure equipment 2400 may be a server computer system that is configured to operate one or more prediction layers 2925-1 to 2925-N and/or the LPPS layer 2902 of FIG. 29. In these embodiments, the memory circuitry 2420 may store one or more applications and/or software components including program code, instructions, modules, assemblies, packages, protocol stacks, software engine(s), firmware, etc., which when running on the infrastructure equipment 2400 (e.g., executed by application circuitry 2405), perform various functions of the one or more prediction layers 2925-1 to 2925-N and/or the LPPS layer 2902, such as those discussed with respect to FIGS. 30-43 infra.

The PMIC 2425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 2430 may provide for electrical power drawn from a network cable to provide both power supply and data connectivity to the infrastructure equipment 2400 using a single cable.

The network controller circuitry 2435 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 2400 via network interface connector 2440 using a physical connection, which may be electrical (commonly referred to as a "copper interconnect"), optical, or wireless. The network controller circuitry 2435 may include one or more dedicated processors and/or FPGAs to communicate using one or more of the aforementioned protocols. In some implementations, the network controller circuitry 2435 may include multiple controllers to provide connectivity to other networks using the same or different protocols. In various embodiments, the network controller circuitry 2435 enables communication with associated equipment and/or with a backend system (e.g., server(s) 1530 of FIG. 15), which may take place via a suitable gateway device.

The positioning circuitry 2445 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2445 may include a Micro-Technology for Positioning, Navigation, and Timing (Micro-PNT) IC that uses a master timing clock to perform position tracking/estimation without GNSS assistance. The positioning circuitry 2445 may also be part of, or interact with, the baseband circuitry 2410 and/or RFEMs 2415 to communicate with the nodes and components of the positioning network. The positioning circuitry 2445 may also provide position data and/or time data to the application circuitry 2405, which may use the data to synchronize operations with various other infrastructure equipment, or the like.

The components shown by FIG. 24 may communicate with one another using interface circuitry 2406 or interconnect (IX) 2406, which may include any number of bus and/or interconnect (IX) technologies such as industry standard architecture (ISA), extended ISA (EISA), inter-integrated circuit (I²C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Intel® Common Express Link (CXL), Common Application Programming Interface (CAPI), OpenCAPI™, Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIX), Gen-Z Consortium IXs, Open Coherent Accelerator Processor Interface (OpenCAPI) IX, a HyperTransport interconnect, NVLink provided by NVIDIA®, and/or any number of other IX technologies. The IX technology may be a proprietary bus, for example, used in an SoC based system, and/or any number of other IX technologies.

Figure 25:
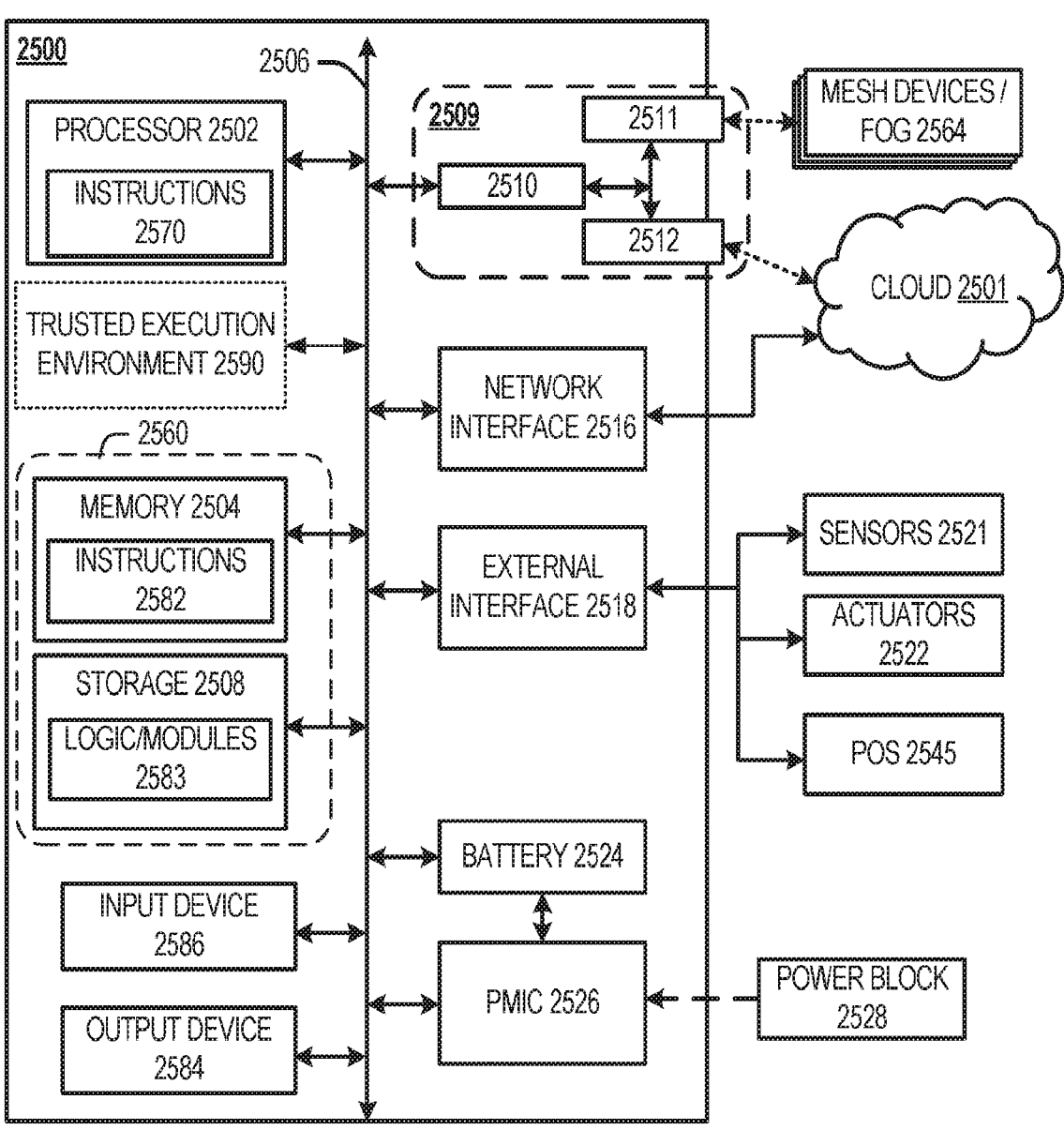
FIG. 25 illustrates an example of a platform in accordance with various embodiments.

FIG. 25 illustrates an example of a platform 2500 (also referred to as "system 2500," "device 2500," "appliance 2500," or the like) in accordance with various embodiments. In embodiments, the platform 2500 may be suitable for use as intermediate nodes 1520 and/or endpoints 1510 of FIG. 15, and/or any other element/device discussed herein with regard any other figure shown and described herein. Platform 2500 may also be implemented in or as a server computer system or some other element, device, or system discussed herein. The platform 2500 may include any combinations of the components shown in the example. The components of platform 2500 may be implemented as integrated circuits (ICs), portions thereof, discrete electronic devices, or other modules, logic, hardware, software, firmware, or a combination thereof adapted in the computer platform 2500, or as components otherwise incorporated within a chassis of a larger system. The example of FIG. 25 is intended to show a high level view of components of the computer platform 2500. However, some of the components shown may be omitted, additional components may be present, and different arrangement of the components shown may occur in other implementations.

The platform 2500 includes processor circuitry 2502. The processor circuitry 2502 includes circuitry such as, but not limited to one or more processor cores and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (10), memory card controllers such as secure digital/multi-media card (SD/MMC) or similar, universal serial bus (USB) interfaces, mobile industry processor interface (MIPI) interfaces and Joint Test Access Group (JTAG) test access ports. In some implementations, the processor circuitry 2502 may include one or more hardware accelerators, which may be microprocessors, programmable processing devices (e.g., FPGA, ASIC, etc.), or the like. The one or more hardware accelerators may include, for example, computer vision, machine learning, and/or deep learning accelerators. In some implementations, the processor circuitry 2502 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 2502 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 2502 may be coupled with or may include memory/storage and may be configured to execute instructions stored in the memory/storage to enable various applications or operating systems to run on the platform 2500. In these embodiments, the processors (or cores) of the processor circuitry 2502 is configured to operate application software to provide a specific service to a user of the platform 2500. In some embodiments, the processor circuitry 2502 may be a special-purpose processor/controller to operate according to the various embodiments herein.

As examples, the processor circuitry 2502 may include an Intel® Architecture Core™ based processor, such as a Quark™, an Atom™, an i3, an i5, an i7, an i9, or an MCU-class processor, Pentium® processor(s), Xeon® processor(s), or another such processor available from Intel® Corporation, Santa Clara, California. However, any number other processors may be used, such as one or more of Advanced Micro Devices (AMD) Zen® Core Architecture, such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 2502 may be a part of a system on a chip (SoC), System-in-Package (SiP), a multi-chip package (MCP), and/or the like, in which the processor circuitry 2502 and other components are formed into a single integrated circuit, or a single package, such as the Edison™ or Galileo™ SoC boards from Intel® Corporation. Other examples of the processor circuitry 2502 are mentioned elsewhere in the present disclosure.

Additionally or alternatively, processor circuitry 2502 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 2502 may comprise logic blocks or logic fabric including and other interconnected resources that may be programmed to perform various functions, such as the procedures, methods, functions, etc. of the various embodiments discussed herein. In such embodiments, the circuitry of processor circuitry 2502 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 2502 may communicate with system memory circuitry 2504 over an interconnect 2506 (e.g., a bus). Any number of memory devices may be used to provide for a given amount of system memory. As examples, the memory circuitry 2504 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 2504 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 2504 may also comprise persistent storage devices, which may be temporal and/or persistent storage of any type, including, but not limited to, non-volatile memory, optical, magnetic, and/or solid state mass storage, and so forth.

The individual memory devices of memory circuitry 2504 may be implemented as one or more of solder down packaged integrated circuits, socketed memory modules, and plug-in memory cards. The memory circuitry 2504 may be implemented as any number of different package types such as single die package (SDP), dual die package (DDP) or quad die package (QDP). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. In embodiments, the memory circuitry 2504 may be disposed in or on a same die or package as the processor circuitry 2502 (e.g., a same SoC, a same SiP, or soldered on a same MCP as the processor circuitry 2502).

To provide for persistent storage of information such as data, applications, operating systems (OS), and so forth, a storage circuitry 2508 may also couple to the processor circuitry 2502 via the interconnect 2506. In an example, the storage circuitry 2508 may be implemented via a solid-state disk drive (SSDD). Other devices that may be used for the storage circuitry 2508 include flash memory cards, such as SD cards, microSD cards, xD picture cards, and the like, and USB flash drives. In low power implementations, the storage circuitry 2508 may be on-die memory or registers associated with the processor circuitry 2502. However, in some examples, the storage circuitry 2508 may be implemented using a micro hard disk drive (HDD). Further, any number of new technologies may be used for the storage circuitry 2508 in addition to, or instead of, the technologies described, such resistance change memories, phase change memories, holographic memories, or chemical memories, among others.

The storage circuitry 2508 stores computational logic 2583 (or "modules 2583") in the form of software, firmware, or hardware commands to implement the techniques described herein. The computational logic 2583 may be employed to store working copies and/or permanent copies of computer programs, or data to create the computer programs, for the operation of various components of platform 2500 (e.g., drivers, etc.), an operating system of platform 2500, one or more applications, and/or for carrying out the embodiments discussed herein. The computational logic 2583 may be stored or loaded into memory circuitry 2504 as instructions 2582, or data to create the instructions 2582, for execution by the processor circuitry 2502 to provide the functions described herein. The various elements may be implemented by assembler instructions supported by processor circuitry 2502 or high-level languages that may be compiled into such instructions (e.g., instructions 2570, or data to create the instructions 2570). The permanent copy of the programming instructions may be placed into persistent storage devices of storage circuitry 2508 in the factory or in the field through, for example, a distribution medium (not shown), through a communication interface (e.g., from a distribution server (not shown)), or over-the-air (OTA).

The instructions 2582 and/or modules 2583 (also referred to as "program code" or "programming instructions") provided via the memory circuitry 2504 and/or the storage circuitry 2508 of FIG. 25 are embodied as one or more non-transitory computer readable storage media (NTCRSM) 2560 including program code, a computer program product or data to create the computer program, with the computer program or data, to direct the processor circuitry 2502 of platform 2500 to perform electronic operations in the platform 2500, and/or to perform a specific sequence or flow of actions, for example, as described with respect to the flowchart(s) and block diagram(s) of operations and functionality depicted by FIGS. 15-23 and 30-43. In some embodiments, the programming instructions (or data to create the programming instructions) to be executed may be in a pre-configured form that may require configuration instructions to install or provision the programming instructions to an apparatus (such as any of the devices/components/systems described herein). When installed/provisioned, configured and executed, the programming instructions can complete or perform various programming operations associated with operating system functions, one or more applications, and/or aspects of the present disclosure (including various programming operations associated with FIGS. 15-23 and 30-43.

In various embodiments, the instructions 2582 and/or modules 2583 may include, or may be, program code for one or more applications, components, plug-ins, firmware, etc., which when running on the system 2500, collect spatial-temporal data, and provides this information to one or more prediction layers 2905 in the LPPS 2900 via a suitable access network (e.g., a NAN 1531, 1532, 1533 and CN1542 or cloud 1544). An example of such an application is discussed infra with respect to FIG. 30. As discussed in more detail infra, the spatial-temporal data such as operational parameters of the system 2900, signal measurements, and/or other like data as discussed herein, which may be accessed using suitable APIs, drivers, etc., (e.g., a modem driver for accessing signal measurements and/or other like information from the modem 2510). In some embodiments, these applications, components, plug-ins, firmware, etc., may also subscribe to the LPPS 2900 to receive LPP notifications or "hints" from the LPPS 2900 (see e.g., FIGS. 37-43).

In alternate embodiments, programming instructions (or data to create the instructions) may be disposed on multiple NTCRSM 2560. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 2560 may be embodied by devices described for the storage circuitry 2508 and/or memory circuitry 2504. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 2583, instructions 2582, 2570 discussed previously) may be written in any combination of one or more programming languages, scripting language, mark-up languages, and/or the like, such as Python, PyTorch, Ruby, Scala, Smalltalk, Java™, C++, C#, the "C" programming language, the Go (or "Golang") programming language, JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Efficient XML Interchange (EXI), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 2500, partly on the system 2500, as a stand-alone software package, partly on the system 2500 and partly on a remote computer or entirely on the remote computer or server. In the latter scenario, the remote computer may be connected to the system 2500 through any type of network, including a LAN or WAN, or the connection may be made to an external computer (e.g., through the Internet using an Internet Service Provider).

In an example, the instructions 2570 on the processor circuitry 2502 (separately, or in combination with the instructions 2582 and/or logic/modules 2583 stored in computer-readable storage media) may configure execution or operation of a trusted execution environment (TEE) 2590. The TEE 2590 operates as a protected area accessible to the processor circuitry 2502 to enable secure access to data and secure execution of instructions. In some embodiments, the TEE 2590 may be a physical hardware device that is separate from other components of the system 2500 such as a secure-embedded controller, a dedicated SoC, or a tamper-resistant chipset or microcontroller with embedded processing devices and memory devices. In other embodiments, the TEE 2590 may be implemented as secure enclaves, which are isolated regions of code and/or data within the memory of the system 2500. Only code executed within a secure enclave may access data within the same secure enclave, and the secure enclave may only be accessible using the secure application (which may be implemented by an application processor or a tamper-resistant microcontroller). Various implementations of the TEE 2590, and an accompanying secure area in the processor circuitry 2502 or the memory circuitry 2504 and/or storage circuitry 2508 may be provided, for instance, through use of Intel® Software Guard Extensions (SGX) or ARM® TrustZone® hardware security extensions; a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, the IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like. Other aspects of security hardening, hardware roots-of-trust, and trusted or protected operations may be implemented in the device 2500 through the TEE 2590 and the processor circuitry 2502.

In other embodiments, the TEE 2590 may be implemented as secure enclaves, which are isolated regions of code and/or data within the processor and/or memory/storage circuitry of the system 2500. Only code executed within a secure enclave may access data within the same secure enclave, and the secure enclave may only be accessible using the secure application (which may be implemented by an application processor or a tamper-resistant microcontroller). Various implementations of the TEE 2590, and an accompanying secure area in the processor circuitry 2502 or the memory circuitry 2504 and/or storage circuitry 2508 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 2500 through the TEE 2590 and the processor circuitry 2502. In some embodiments, the memory 2504 and/or storage 2508 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory 2504 and/or storage 2508 may be divided into one or more trusted memory regions for storing applications or software modules of the TEE 2590.

Although the instructions 2582 are shown as code blocks included in the memory circuitry 2504 and the computational logic 2583 is shown as code blocks in the storage circuitry 2508, it should be understood that any of the code blocks may be replaced with hardwired circuits, for example, built into an FPGA, ASIC, or some other suitable circuitry. For example, where processor circuitry 2502 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 2504 and/or storage circuitry 2508 may store program code of an operating system (OS), which may be a general purpose OS or an OS specifically written for and tailored to the computing platform 2500. For example, the OS may be Unix or a Unix-like OS such as Linux e.g., provided by Red Hat Enterprise, Windows10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "μC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the platform 2500, attached to the platform 2500, or otherwise communicatively coupled with the platform 2500. The drivers may include individual drivers allowing other components of the platform 2500 to interact or control various 10 devices that may be present within, or connected to, the platform 2500. For example, the drivers may include a display driver to control and allow access to a display device, a touchscreen driver to control and allow access to a touchscreen interface of the platform 2500, sensor drivers to obtain sensor readings of sensor circuitry 2521 and control and allow access to sensor circuitry 2521, actuator drivers to obtain actuator positions of the actuators 2522 and/or control and allow access to the actuators 2522, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from TEE 2590.

The components may communicate over the IX 2506. The IX 2506 may include any number of technologies, including ISA, extended ISA, I²C, SPI, point-to-point interfaces, power management bus (PMBus), PCI, PCIe, PCIx, Intel® UPI, Intel® Accelerator Link, Intel® CXL, CAPI, Open-CAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (UP) system, a FlexRay system, and/or any number of other IX technologies. The IX 2506 may be a proprietary bus, for example, used in a SoC based system.

The interconnect 2506 couples the processor circuitry 2502 to the communication circuitry 2509 for communications with other devices. The communication circuitry 2509 is a hardware element, or collection of hardware elements, used to communicate over one or more networks (e.g., cloud 2501) and/or with other devices (e.g., mesh devices/fog 2564). The communication circuitry 2509 includes baseband circuitry 2510 (or "modem 2510") and radiofrequency (RF) circuitry 2511 and 2512.

The baseband circuitry 2510 includes one or more processing devices (e.g., baseband processors) to carry out various protocol and radio control functions. Baseband circuitry 2510 may interface with application circuitry of platform 2500 (e.g., a combination of processor circuitry 2502, memory circuitry 2504, and/or storage circuitry 2508) for generation and processing of baseband signals and for controlling operations of the RF circuitry 2511 or 2512. The baseband circuitry 2510 may handle various radio control functions that enable communication with one or more radio networks via the RF circuitry 2511 or 2512. The baseband circuitry 2510 may include circuitry such as, but not limited to, one or more single-core or multi-core processors (e.g., one or more baseband processors) or control logic to process baseband signals received from a receive signal path of the RF circuitry 2511 and/or 2512, and to generate baseband signals to be provided to the RF circuitry 2511 or 2512 via a transmit signal path. In various embodiments, the baseband circuitry 2510 may implement a real-time OS (RTOS) to manage resources of the baseband circuitry 2510, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 25, in one embodiment, the baseband circuitry 2510 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the communication circuitry 2509 is a cellular radiofrequency communication system, such as millimeter wave (mmWave) communication circuitry or some other suitable cellular communication circuitry. In the first example, the protocol processing circuitry 2502 would operate MAC, RLC, PDCP, SDAP, RRC, and NAS functions. In a second example, the protocol processing circuitry may operate one or more IEEE-based protocols when the communication circuitry 2509 is WiFi communication system. In the second example, the protocol processing circuitry would operate WiFi MAC and LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 2510 and/or RF circuitry 2511 and 2512. The baseband circuitry 2510 may also support radio communications for more than one wireless protocol.

Continuing with the aforementioned embodiment, the baseband circuitry 2510 includes individual processing device(s) to implement PHY including HARQ functions, scrambling and/or descrambling, (en)coding and/or decoding, layer mapping and/or demapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 2509 also includes RF circuitry 2511 and 2512 to enable communication with wireless networks using modulated electromagnetic radiation through a non-solid medium. Each of the RF circuitry 2511 and 2512 include a receive signal path, which may include circuitry to convert analog RF signals (e.g., an existing or received modulated waveform) into digital baseband signals to be provided to the baseband circuitry 2510. Each of the RF circuitry 2511 and 2512 also include a transmit signal path, which may include circuitry configured to convert digital baseband signals provided by the baseband circuitry 2510 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 2511 or 2512 using metal transmission lines or the like.

The RF circuitry 2511 (also referred to as a "mesh transceiver") is used for communications with other mesh or fog devices 2564. The mesh transceiver 2511 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of RF circuitry 2511, configured for a particular wireless communication protocol, may be used for the connections to the mesh devices 2564. For example, a WLAN unit may be used to implement WiFi™ communications in accordance with the IEEE 802.11 standard. In addition, wireless wide area communications, for example, according to a cellular or other wireless wide area protocol, may occur via a WWAN unit.

The mesh transceiver 2511 may communicate using multiple standards or radios for communications at different ranges. For example, the platform 2500 may communicate with close/proximate devices, e.g., within about 10 meters, using a local transceiver based on BLE, or another low power radio, to save power. More distant mesh devices 2564, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 2512 (also referred to as a "wireless network transceiver," a "cloud transceiver," or the like) may be included to communicate with devices or services in the cloud 2501 via local or wide area network protocols. The wireless network transceiver 2512 includes one or more radios to communicate with devices in the cloud 2501. The cloud 2501 may be the same or similar to cloud 1544 discussed previously. The wireless network transceiver 2512 may be a LPWA transceiver that follows the IEEE 802.15.4, or IEEE 802.15.4g standards, among others, such as those discussed herein. The platform 2500 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4 specification may be used.

In one example implementation, the communication circuitry 2509 may be, or may include, a software defined radio (SDR) in which RF operating parameters including, but not limited to, frequency range, modulation type, and/or output power can be set or altered by software, and/or the technique by which this is achieved. Additionally or alternatively, the communication circuitry 2509 may be, or may include, a software defined multiradio (SDMR), which is a device or technology where multiple radio technologies (or RATs) coexist and share their wireless transmission and/or reception capabilities, including but not limited to regulated parameters, by operating them under a common software system. In either of these example implementations, each of the transceivers 2511 and 2512 may be radio applications, which are software application executing in a SDR or SDMR. Radio applications are typically designed to use certain RF band(s) using agreed-to schemes for multiple access, modulation, channel and data coding, as well as control protocols for all radio layers needed to maintain user data links between adjacent radio equipment, which run the same radio application.

Any number of other radio communications and protocols may be used in addition to the systems mentioned for the mesh transceiver 2511 and wireless network transceiver 2512, as described herein. For example, the radio transceivers 2511 and 2512 may include an LTE or other cellular transceiver that uses spread spectrum (SPA/SAS) communications for implementing high-speed communications. Further, any number of other protocols may be used, such as WiFi® networks for medium speed communications and provision of network communications. The transceivers 2511 and 2512 may include radios that are compatible with, and/or may operate according to any one or more of the following radio communication technologies and/or standards including but not limited to those discussed herein.

Network interface circuitry/controller (NIC) 2516 may be included to provide wired communication to the cloud 2501 or to other devices, such as the mesh devices 2564 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 2500 via NIC 2516 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 2516 may include one or more dedicated processors and/or FPGAs to communicate using one or more of the aforementioned network interface protocols. In some implementations, the NIC 2516 may include multiple controllers to provide connectivity to other networks using the same or different protocols. For example, the platform 2500 may include a first NIC 2516 providing communications to the cloud over Ethernet and a second NIC 2516 providing communications to other devices over another type of network.

The interconnect 2506 may couple the processor circuitry 2502 to an external interface 2518 (also referred to as "10 interface circuitry" or the like) that is used to connect external devices or subsystems. The external devices include, inter alia, sensor circuitry 2521, actuators 2522, and positioning circuitry 2545. The sensor circuitry 2521 may include devices, modules, or subsystems whose purpose is to detect events or changes in its environment and send the information (sensor data) about the detected events to some other a device, module, subsystem, etc. Examples of such sensors 2521 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 2518 connects the platform 2500 to actuators 2522, allow platform 2500 to change its state, position, and/or orientation, or move or control a mechanism or system. The actuators 2522 comprise electrical and/or mechanical devices for moving or controlling a mechanism or system, and converts energy (e.g., electric current or moving air and/or liquid) into some kind of motion. The actuators 2522 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 2522 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 2500 may be configured to operate one or more actuators 2522 based on one or more captured events and/or instructions or control signals received from a service provider and/or various client systems.

The positioning circuitry 2545 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2545 may include a Micro-Technology for Positioning, Navigation, and Timing (Micro-PNT) IC that uses a master timing clock to perform position tracking/estimation without GNSS assistance. The positioning circuitry 2545 may also be part of, or interact with, the communication circuitry 2509 to communicate with the nodes and components of the positioning network. The positioning circuitry 2545 may also provide position data and/or time data to the application circuitry, which may use the data to synchronize operations with various infrastructure (e.g., radio base stations), for turn-by-turn navigation, or the like.

In some examples, various 10 devices may be present within, or connected to, the platform 2500, which are referred to as input device circuitry 2586 and output device circuitry 2584 in FIG. 25. The input device circuitry 2586 and output device circuitry 2584 include one or more user interfaces designed to enable user interaction with the platform 2500 and/or peripheral component interfaces designed to enable peripheral component interaction with the platform 2500. Input device circuitry 2586 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 2584 may be included to show information or otherwise convey information, such as sensor readings, actuator position(s), or other like information. Data and/or graphics may be displayed on one or more user interface components of the output device circuitry 2584. Output device circuitry 2584 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 2500. The output device circuitry 2584 may also include speakers or other audio emitting devices, printer(s), and/or the like. In some embodiments, the sensor circuitry 2521 may be used as the input device circuitry 2586 (e.g., an image capture device, motion capture device, or the like) and one or more actuators 2522 may be used as the output device circuitry 2584 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 2524 may be coupled to the platform 2500 to power the platform 2500, which may be used in embodiments where the platform 2500 is not in a fixed location. The battery 2524 may be a lithium ion battery, a lead-acid automotive battery, or a metal-air battery, such as a zinc-air battery, an aluminum-air battery, a lithium-air battery, a lithium polymer battery, and/or the like. In embodiments where the platform 2500 is mounted in a fixed location, the platform 2500 may have a power supply coupled to an electrical grid. In these embodiments, the platform 2500 may include power tee circuitry to provide for electrical power drawn from a network cable to provide both power supply and data connectivity to the platform 2500 using a single cable.

Power management integrated circuitry (PMIC) 2526 may be included in the platform 2500 to track the state of charge (SoCh) of the battery 2524, and to control charging of the platform 2500. The PMIC 2526 may be used to monitor other parameters of the battery 2524 to provide failure predictions, such as the state of health (SoH) and the state of function (SoF) of the battery 2524. The PMIC 2526 may include voltage regulators, surge protectors, power alarm detection circuitry. The power alarm detection circuitry may detect one or more of brown out (under-voltage) and surge (over-voltage) conditions. The PMIC 2526 may communicate the information on the battery 2524 to the processor circuitry 2502 over the interconnect 2506. The PMIC 2526 may also include an analog-to-digital (ADC) convertor that allows the processor circuitry 2502 to directly monitor the voltage of the battery 2524 or the current flow from the battery 2524. The battery parameters may be used to determine actions that the platform 2500 may perform, such as transmission frequency, mesh network operation, sensing frequency, and the like. As an example, the PMIC 2526 may be a battery monitoring integrated circuit, such as an LTC5020 or an LTC2990 from Linear Technologies, an ADT7488A from ON Semiconductor of Phoenix Arizona, or an IC from the UCD90xxx family from Texas Instruments of Dallas, TX.

A power block 2528, or other power supply coupled to a grid, may be coupled with the PMIC 2526 to charge the battery 2524. In some examples, the power block 2528 may be replaced with a wireless power receiver to obtain the power wirelessly, for example, through a loop antenna in the platform 2500. A wireless battery charging circuit, such as an LTC5020 chip from Linear Technologies of Milpitas, California, among others, may be included in the PMIC 2526. The specific charging circuits chosen depend on the size of the battery 2524, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Figure 26:
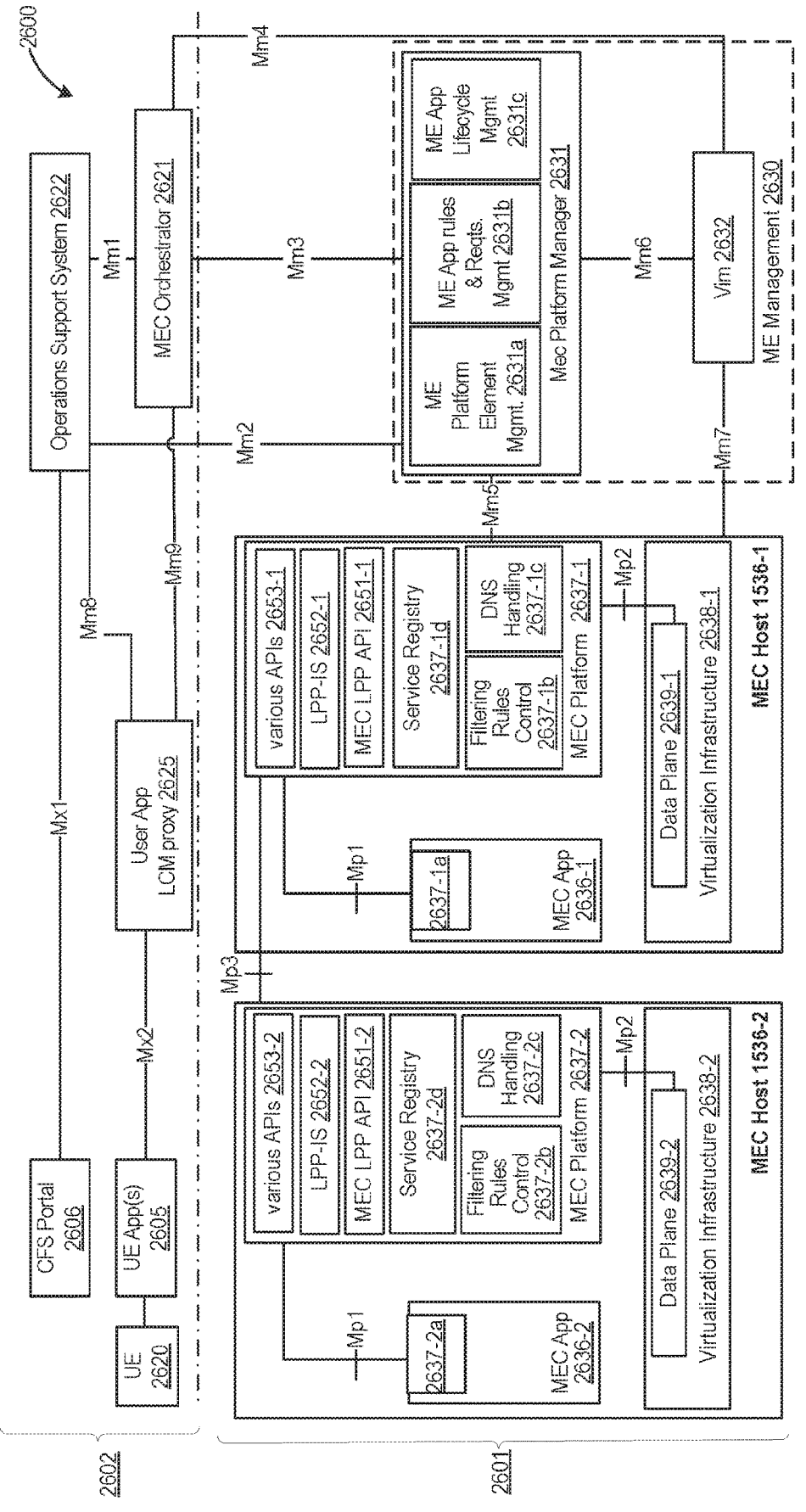
FIG. 26 depicts a block diagram for an example Multi-access Edge Computing (MEC) system architecture according to various embodiments.

FIG. 26 depicts a block diagram for an example Multi-access Edge Computing (MEC) system architecture 2600 according to various embodiments. As mentioned previously, the edge compute nodes 1536 of FIG. 15 may be implemented using MEC technologies depicted by FIG. 26. MEC offers application developers and content providers cloud-computing capabilities and an Information Technology (IT) service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, the MEC system 2600 allows applications to, inter alia, exchange data, provide data to aggregation points, and access to data in databases which provide an overview of the local situation derived from a multitude of sensors.

The illustrated logical connections between various entities of the MEC architecture 2600 may be access-agnostic and not dependent on a particular deployment. MEC enables implementation of MEC applications (MEC Apps) 2636-1 and 2636-2 (collectively referred to as "MEC Apps 2636" or the like) as software-only entities that run on top of a Virtualization Infrastructure (VI) 2638-1 and 2638-2 (collectively referred to as "VI 2638" or the like), which is located in or close to the network edge. A MEC app 2636 is an application that can be instantiated on a MEC host 1536 within the MEC system 2600 and can potentially provide or consume MEC services 2637a. The term "user application" in the context of MEC refers to an MEA 2636 that is instantiated in the MEC system 2600 in response to a request from a user (e.g., UE 1511, 1521) via a device application. FIG. 26 shows the general entities involved, and these entities can be grouped into multi-access edge system level 2602, multi-access edge host level 2601, and network level entities (not shown). The multi-access edge host level 2601 includes a MEC host 1536-1 and MEC host 1536-2 (which may be the same or similar to the MEC servers 1536 discussed previously, and are collectively referred to as "MEC host 1536" or the like) and Multi-access Edge (ME) management 2630, which provide functionality to run MEC Apps 2636 within an operator network or a subset of an operator network. The multi-access edge system level 2602 includes multi-access edge system level management 2602, UE 2620 (which may be the same or similar to the intermediate nodes 1520 and/or endpoints 1510 discussed herein), and third party entities. The network level (not shown) includes various external network level entities, such as a 3GPP network (e.g., CN 1542 of FIG. 15), a local area network (e.g., a LAN, WLAN, PAN, etc.), and an external network (e.g., CN 1542 and/or cloud 1544 of FIG. 15). The multi-access edge host level 2601 includes multi-access edge host level management and one or more MEC hosts 1536. The multi-access edge host level management may include various components that handle the management of the multi-access edge specific functionality of a particular MEC platform 2637, MEC host 1536, and the MEC Apps 2636 to be run. The MEC host 1536 includes the MEC platform 2637, MEC Apps 2636, and VI 2638.

The MEC system 2600 includes three groups of reference points, including "Mp" reference points regarding the multi-access edge platform functionality; "Mm" reference points, which are management reference points; and "Mx" reference points, which connect MEC entities to external entities. The interfaces/reference points in the MEC system 2600 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces in other embodiments.

The MEC host 1536 is an entity that contains an MEC platform 2637 and VI 2638 which provides compute, storage, and network resources for the purpose of running MEC Apps 2636. Each of the VIs 2638 includes a respective data plane (DP) 2639 (including DP 2639-1 and 2639-2) that executes respective traffic rules 2637-1 *b* and 2637-2 *b* (collectively referred to as "traffic rules 2637 *b*") received by the MEC platform 2637, and routes the traffic among applications (e.g., MEC Apps 2636), MEC services 2637-1 *a* and 2637-2 *a* (collectively referred to as "MEC services 2637 *a*"), DNS server/proxy (see e.g., via DNS handling entities 2637-1 *c* and 2637-2 *c*), 3GPP network, local networks, and external networks. The MEC DP 2639 may be connected with the (R)AN nodes 1531 and CN 1542 of FIG. 15, and/or may be connected with the AP 1533 of FIG. 15 via a wider network, such as the internet, an enterprise network, or the like. The other entities depicted and/or discussed herein may be the same or similar as those discussed with regard to FIG. 15.

The MEC platforms 2637-1 and 2637-2 (collectively referred to as "MEC platform 2637" or the like) within a MEC host 1536 may be a collection of essential functionality required to run MEC Apps 2636 on a particular VI 2638 and enable them to provide and consume MEC services 2637 *a*, and that can provide itself a number of MEC services 2637 *a*. The MEC platform 2637 can also provide various services and/or functions, such as offering an environment where the MEC Apps 2636 can discover, advertise, consume and offer MEC services 2637 *a* (discussed infra), including MEC services 2637 *a* available via other platforms when supported. The MEC platform 2637 may be able to allow authorized MEC Apps 2636 to communicate with third party servers located in external networks. The MEC platform 2637 may receive traffic rules from the MEC platform manager 2631, applications, or services, and instruct the data plane accordingly (see e.g., Traffic Rules Control 2637 *b*). The MEC platform 2637 may send instructions to the DP 2638 within the VI 2638 via the Mp2 reference point. The Mp2 reference point between the MEC platform 2637 and the DP 2638 of the VI 2638 may be used to instruct the DP 2638 on how to route traffic among applications, networks, services, etc. In some implementations, the MEC platform 2637 may translate tokens representing UEs 2620 in the traffic rules into specific IP addresses. The MEC platform 2637 also receives DNS records from the MEC platform manager 2631 and configures a DNS proxy/server accordingly. The MEC platform 2637 hosts MEC services 2637 *a* including the multi-access edge services discussed infra, and provide access to persistent storage and time of day information. Furthermore, the MEC platform 2637 may communicate with other MEC platforms 2637 of other MEC servers 1536 via the Mp3 reference point.

The VI 2638 may represent the totality of all hardware and software components which build up the environment in which MEC Apps 2636 and/or MEC platform 2637 are deployed, managed and executed. The VI 2638 may span across several locations, and the network providing connectivity between these locations is regarded to be part of the VI 2638. The physical hardware resources of the VI 2638 includes computing, storage and network resources that provide processing, storage and connectivity to MEC Apps 2636 and/or MEC platform 2637 through a virtualization layer (e.g., a hypervisor, VM monitor (VMM), or the like). The virtualization layer may abstract and/or logically partition the physical hardware resources of the MEC server 1536 as a hardware abstraction layer. The virtualization layer may also enable the software that implements the MEC Apps 2636 and/or MEC platform 2637 to use the underlying VI 2638, and may provide virtualized resources to the MEC Apps 2636 and/or MEC platform 2637, so that the MEC Apps 2636 and/or MEC platform 2637 can be executed.

The MEC Apps 2636 are applications that can be instantiated on a MEC host 1536 within the MEC system 2600 and can potentially provide or consume MEC services 2637*a*. The term "MEC service" refers to a service provided via a MEC platform 2637 either by the MEC platform 2637 itself or by a MEC App 2636. MEC Apps 2636 may run as VM on top of the VI 2638 provided by the MEC server 1536, and can interact with the MEC platform 2637 to consume and provide the MEC services 2637*a*. The MEC Apps 2636 are instantiated on the VI 2638 of the MEC server 1536 based on configuration or requests validated by the ME management 2630. The MEC Apps 2636 can also interact with the MEC platform 2637 to perform certain support procedures related to the lifecycle of the MEC Apps 2636, such as indicating availability, preparing relocation of user state, etc. The MEC Apps 2636 may have a certain number of rules and requirements associated to them, such as required resources, maximum latency, required or useful services, etc. These requirements may be validated by the ME management 2630, and can be assigned to default values if missing. MEC services 2637-1*a* and 2637-2*a* (collectively referred to as "MEC services "2637*a*" or the like) are services provided and/or consumed either by the MEC platform 2637 and/or MEC Apps 2636. The service consumers (e.g., MEC Apps 2636 and MEC platform 2637) may communicate with particular MEC services 2637*a* over individual APIs (including MEC LPP API 2651-1, 2651-2 and various APIs 2653-1, 2653-2 in FIG. 26). When provided by an application, a MEC service 2637*a* can be registered in a list of services in the service registries 2637-1*d* and 2637-2*d* (collectively referred to as "service registry 2637*d*" or the like) to a respective the MEC platform 2637 over the Mp1 reference point. Additionally, the MEC Apps 2636 can subscribe to one or more services 2637*a* for which it is authorized over the Mp1 reference point. In various embodiments, one or more MEC Apps 2636 are configured to collect data for the LPP services discussed herein (e.g., LPPS 2900 of FIG. 29). In these embodiments, the MEC platform 2637 may operate these MEC Apps 2636 to perform the various functionalities of the LPP layer 2902 (or LPP engine) and/or one or more prediction layers 2925-1 to 2925-N of FIG. 29, and/or perform the various functionalities of the embodiments discussed infra with respect to FIGS. 30-43.

The MEC system 2600 may support a feature called UserApps. When the MEC system 2600 supports the feature UserApps, the ME management 2630 may support the instantiation of MEC Apps 2636 (or user applications) on multiple MEC hosts 1536 following a single instantiation request, and when required by the operator in response to a request by the user. The application instance may need to fulfill a number of potential constraints predefined for the application 2605. Once instantiated, connectivity may be established between the UE 2620 and the application instance. Potential constraints may include latency, location, compute resources, storage resources, network capability, security conditions, and the like. As part of the user application (or MEC app 2636) instantiation, the MEC system 2600 will create an associated application context that the MEC system 2600 maintains for the lifetime of the user application (or MEC app 2636). The application context is a set of reference data about an application instance that is used to identify it, enable lifecycle management operations and associate it with its device application, The term "user context" in the context of MEC refers to application-specific runtime data maintained by a MEC app 2636, which is associated with a user of that application. The application context contains information specific to the application instance such as its unique identifier within the MEC system 2600 and the address (e.g., URI or the like) provided for clients (e.g., UE 2620) that are external to the MEC system 2600 to interact with the user application.

When the MEC system 2600 supports the feature User-Apps, the system 2600 may, in response to a request by a user, support the establishment of connectivity between the UE 2620 and an instance of a specific MEC App 2636 fulfilling the requirements of the MEC App 2636 regarding the UE 2620. If no instance of the MEC App 2636 fulfilling these requirements is currently running, the multi-access edge system management may create a new instance of the application 2605 on a MEC host 1536 that fulfils the requirements of the application 2605. Once instantiated, connectivity is established between the UE 2620 and the new MEC App 2636 instance. Requirements of the application can include latency, location, compute resources, storage resources, network capability, security conditions, and the like. When the MEC system 2600 supports the UserApps feature, the system 2600 may support the on-boarding of MEC Apps 2636 during the execution of an instantiation request, may allow the establishment of connectivity between the UE 2620 and a specific instance of an MEC App 2636, may support the capability to terminate the MEC App 2636 instance when no UE 2620 is connected to it anymore, and may support the termination of the MEC App 2636 running on multiple MEC servers 1536 following a single termination request.

As shown by FIG. 26, the Mp1 reference point is between the MEC platform 2637 and the MEC Apps 2636. The Mp1 reference point may provide service registration 2637*d*, service discovery, and communication support for various services, such as the MEC services 2637-1*a* provided by MEC host 1536-1 and MEC services 2637-2*a* provided by MEC host 1536-2 (collectively referred to as "MEC services 2637*a*" or the like). In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of MEC services 2637*a* include Radio Network Information Service (RNIS), location services, and bandwidth management services. The RNIS, when available, provides authorized MEC Apps 2636 with radio network related information, and expose appropriate up-to-date radio network information to the MEC Apps 2636. The radio network information (RNI) may include, inter alia, radio network conditions, measurement and statistics information related to the user plane, information related to UEs 2620 served by the radio node(s) associated with the MEC host 1536 (e.g., UE context and radio access bearers), changes on information related to UEs 2620 served by the radio node(s) associated with the MEC host 1536, and/or the like. The RNI may be provided at the relevant granularity (e.g., per UE 2620, per cell, per period of time).

The service consumers (e.g., MEC Apps 2636 and MEC platform 2637) may communicate with the RNIS over an RNI API 2653 to obtain contextual information from a corresponding RAN. RNI may be provided to the service consumers via an access node (e.g., (R)AN nodes 1531, 1532, or AP 1533 of FIG. 15). The RNI API 2653 may support both query and subscription (e.g., a pub/sub) based mechanisms that are used over a Representational State Transfer (RESTful) API 2653 or over a message broker of the MEC platform 2637 (not shown by FIG. 26). A MEC App 2636 may query information on a message broker via a transport information query procedure, wherein the transport information may be pre-provisioned to the MEC App 2636 via a suitable configuration mechanism. The various messages communicated via the RNI API 2653 may be in XML, JSON, Protobuf, or some other suitable format.

The RNI may be used by MEC Apps 2636 and MEC platform 2637 to optimize the existing services and to provide new types of services that are based on up to date information on radio conditions. As an example, a MEC App 2636 may use RNI to optimize current services such as video throughput guidance. In throughput guidance, a radio analytics MEC App 2636 may use MEC services to provide a backend video server with a near real-time indication on the throughput estimated to be available at the radio downlink interface in a next time instant. The throughput guidance radio analytics application 2636 computes throughput guidance based on the required radio network information it obtains from a multi-access edge service running on the MEC server 1536. RNI may be also used by the MEC platform 2637 to optimize the mobility procedures required to support service continuity, such as when a certain MEC App 2636 requests a single piece of information using a simple request-response model (e.g., using RESTful mechanisms) while other MEC Apps 2636 subscribe to multiple different notifications regarding information changes (e.g., using a pub/sub mechanism and/or message broker mechanisms).

The location services (LS), when available, may provide authorized MEC Apps 2636 with location-related information, and expose such information to the MEC Apps 2636. With location related information, the MEC platform 2637 or one or more MEC Apps 2636 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 2620 currently served by the radio node(s) associated with the MEC server 1536, information about the location of all UEs 2620 currently served by the radio node(s) associated with the MEC server 1536, information about the location of a certain category of UEs 2620 currently served by the radio node(s) associated with the MEC server 1536, a list of UEs 2620 in a particular location, information about the location of all radio nodes currently associated with the MEC server 1536, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host or MEC server 1536, or a subset thereof, according to a desired deployment. In this regard, the OMA Zonal Presence API 2653 provides means for MEC Apps 2636 to retrieve information about a zone, the access points associated to the zones and the users that are connected to the access points. In addition, the OMA Zonal Presence API 2653, allows authorized application to subscribe to a notification mechanism, reporting about user activities within a zone. In various embodiments, a MEC server 1536 may access location information or zonal presence information of individual UEs 2620 using the OMA Zonal Presence API 2653 to identify the relative location or positions of the UEs 2620.

The bandwidth management services (BWMS) provides for the allocation of bandwidth (BW) to certain traffic routed to and from MEC Apps 2636, and specify static/dynamic up/down BW resources, including BW size and BW priority. MEC Apps 2636 may use the BWMS to update/receive BW information to/from the MEC platform 2637. In some embodiments, different MEC Apps 2636 running in parallel on the same MEC server 1536 may be allocated specific static, dynamic up/down BW resources, including BW size and BW priority. The BWMS includes a BW management (BWM) API 2653 to allowed registered applications to statically and/or dynamically register for specific BW allocations per session/application. The BWM API 2653 includes HTTP protocol bindings for BWM functionality using RESTful services or some other suitable API mechanism.

Referring back to FIG. 26, multi-access edge management comprises multi-access edge system level management and the multi-access edge host level management 2630. The ME management 2630 comprises the MEC platform manager 2631 and the VI manager (VIM) 2632, and handles the management of MEC-specific functionality of a particular MEC server 1536 and the applications running on it. In some implementations, some or all of the multi-access edge management components may be implemented by one or more servers located in one or more data centers, and may use virtualization infrastructure that is connected with Network Functions Virtualization (NFV) infrastructure used to virtualize core network elements, or using the same hardware as the NFV infrastructure.

The MEC platform manager 2631 is responsible for managing the life cycle of applications including informing the multi-access edge orchestrator (MEC-O) 2621 of relevant application related events. The MEC platform manager 2631 may also provide MEP element management functions 2631*a* to the MEC platform 2637, manage MEC App rules and requirements 2631*b* including service authorizations, traffic rules, DNS configuration and resolving conflicts, and manage MEC App 2636 lifecycles (MEALC mgmt 2631*c*). The MEC platform manager 2631 may also receive virtualized resources fault reports and performance measurements from the VIM 2632 for further processing. The Mm5 reference point between the MEC platform manager 2631 and the MEC platform 2637 is used to perform platform configuration, configuration of the MEPE mgmt 2631*a*, the MERR mgmt 2631*b*, the MEALC mgmt 2631*c*, management of application relocation, etc.

The VIM 2632 may be an entity that allocates, manages and releases virtualized (compute, storage and networking) resources of the VI 2638, and prepares the VI 2638 to run a software image. To do so, the VIM 2632 may communicate with the VI 2638 over the Mm7 reference point between the VIM 2632 and the VI 2638. Preparing the VI 2638 may include configuring the VI 2638, and receiving/storing the software image. When supported, the VIM 2632 may provide rapid provisioning of applications, such as described in "Openstack++ for Cloudlet Deployments", available at http://reports-archive.adm.cs.cmu.edu/anon/2015/CMU-CS-15-123.pdf. The VIM 2632 may also collect and report performance and fault information about the virtualized resources, and perform application relocation when supported. For application relocation from/to external cloud environments, the VIM 2632 may interact with an external cloud manager to perform the application relocation, for example using the mechanism described in "Adaptive VM Handoff Across Cloudlets", and/or possibly through a proxy. Furthermore, the VIM 2632 may communicate with the MEC platform manager 2631 via the Mm6 reference point, which may be used to manage virtualized resources, for example, to realize the application lifecycle management. Moreover, the VIM 2632 may communicate with the MEC-O 2621 via the Mm4 reference point, which may be used to manage virtualized resources of the MEC server 1536, and to manage application images. Managing the virtualized resources may include tracking available resource capacity, etc.

The multi-access edge system level management includes the MEC-O 2621 as a core component, which has an overview of the complete MEC system 2600. The MEC-O 2621 may maintain an overall view of the MEC system 2600 based on deployed multi-access edge hosts 1536, available resources, available MEC services 2637*a*, and topology. The Mm3 reference point between the MEC-O 2621 and the MEC platform manager 2631 may be used for the management of the application lifecycle, application rules and requirements and keeping track of available MEC services 2637*a*. The MEC-O 2621 may communicate with the user application lifecycle management proxy (UALMP) 2625 via the Mm9 reference point in order to manage MEC Apps 2636 requested by UE application 2605.

The MEC-O 2621 may also be responsible for on-boarding of application packages, including checking the integrity and authenticity of the packages, validating application rules and requirements and if necessary adjusting them to comply with operator policies, keeping a record of on-boarded packages, and preparing the VIM(s) 2602 to handle the applications. The MEC-O 2621 may select appropriate MEC host(s) 2601 for application instantiation based on constraints, such as latency, available resources, and available services. The MEC-O 2621 may also trigger application instantiation and termination, as well as trigger application relocation as needed and when supported.

The Operations Support System (OSS) 2622 refers to the OSS of an operator that receives requests via the Customer Facing Service (CFS) portal 2606 (and over the Mx1 reference point) and from UE applications 2605 for instantiation or termination of MEC Apps 2636, and decides on the granting of these requests. The CFS portal 2606 (and the Mx1 interface) may be used by third-parties to request the MEC system 2600 to run applications 2606 in the MEC system 2600. Granted requests may be forwarded to the MEC-O 2621 for further processing. When supported, the OSS 2622 also receives requests from UE applications 2605 for relocating applications between external clouds and the MEC system 2600. The Mm2 reference point between the OSS 2622 and the MEC platform manager 2631 is used for the MEC platform manager 2631 configuration, fault and performance management. The Mm1 reference point between the MEC-O 2621 and the OSS 2622 is used for triggering the instantiation and the termination of multi-access edge applications 2636 in the MEC system 2600.

The UE app(s) 2605 (also referred to as "device applications" or the like) is one or more applications running in a device, computing system, etc. (e.g., UE 2620), that has the capability to interact with the MEC system 2600 via the user application lifecycle management proxy 2625. The UE app(s) 2605 may be, include, or interact with one or more client applications, which in the context of MEC, is application software running on a device, computing system, etc. that utilizes functionality provided by one or more specific MEC application(s) 2636. The user application lifecycle management proxy ("user app LCM proxy") 2625 may authorize requests from UE applications 2605 in the UE and interacts with the OSS 2622 and the MEC-O 2621 for further processing of these requests. The term "lifecycle management," in the context of MEC, refers to a set of functions required to manage the instantiation, maintenance and termination of a MEC application 2636 instance. The user app LCM proxy 2625 may interact with the OSS 2622 via the Mm8 reference point, and is used to handle UE applications 2605 requests for running applications in the MEC system 2600. A user application 2605 may be an MEC App 2636 that is instantiated in the MEC system 2600 in response to a request of a user via an application running in the UE 2620 (e.g., UE application 2605). The user app LCM proxy 2625 allows UE applications 2605 to request on-boarding, instantiation, termination of user applications and when supported, relocation of user applications in and out of the MEC system 2600. It also allows informing the UE applications 2605 about the state of the user applications 2605. The user app LCM proxy 2625 is only accessible from within the mobile network, and may only be available when supported by the MEC system 2600. A UE application 2605 may use the Mx2 reference point between the user app LCM proxy 2625 and the UE application 2605 to request the MEC system 2600 to run an application in the MEC system 2600, or to move an application in or out of the MEC system 2600. The Mx2 reference point may only be accessible within the mobile network and may only be available when supported by the multi-access edge system.

In order to run an MEC App 2636 in the MEC system 2600, the MEC-O 2621 receives requests triggered by the OSS 2622, a third-party, or a UE application 2605. In response to receipt of such requests, the MEC-O 2621 selects a MEC server 1536 to host the MEC App 2636 for computational offloading. These requests may include information about the application to be run, and possibly other information, such as the location where the application needs to be active, other application rules and requirements, as well as the location of the application image if it is not yet on-boarded in the MEC system 2600.

In various embodiments, the MEC-O 2621 selects one or more MEC servers 1536 for computational intensive tasks. The selected one or more MEC servers 1536 may offload computational tasks of a UE application 2605 based on various operational parameters, such as network capabilities and conditions, computational capabilities and conditions, application requirements, and/or other like operational parameters. The application requirements may be rules and requirements associated to/with one or more MEC Apps 2636, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 2636 to be able to run; multi-access edge services that the MEC Apps 2636 can take advantage of, if available; connectivity or mobility support/requirements (e.g., application state relocation, application instance relocation); required multi-access edge features, such as VM relocation support or UE identity; required network connectivity (e.g., connectivity to applications within the multi-access edge system, connectivity to local networks, or to the Internet); information on the operator's MEC system deployment or mobile network deployment (e.g., topology, cost); requirements on access to user traffic; requirements on persistent storage; traffic rules 2637*b*; DNS rules 2637*c*; etc.

The MEC-O 2621 considers the requirements and information listed above and information on the resources currently available in the MEC system 2600 to select one or several MEC servers 1536 within the MEC system 2600 to host MEC Apps 2636 and/or for computational offloading. After one or more MEC servers 1536 are selected, the MEC-O 2621 requests the selected MEC host(s) 1536 to instantiate the application(s) or application tasks. The actual algorithm used to select the MEC servers 1536 depends on the implementation, configuration, and/or operator deployment. In various embodiments, the selection algorithm may be based on the task offloading embodiments discussed herein, for example, by taking into account network, computational, and energy consumption requirements for performing tasks of application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 2621 may decide to select one or more new MEC servers 1536 to act as a master node, and initiates the transfer of an application instance or application-related state information from the one or more source MEC servers 1536 to the one or more target MEC servers 1536.

As mentioned previously, the MEC system architecture 2600 provides support for applications. In the context of FIG. 26, the UE app 2605 is an application instance running on a UE 2620, which may subscribe to LPP services/notifications from the LPPS 2900 and/or request and receive LPP services to/from the system. Additionally, the UE app 2605 is an application instance running on a UE 2620, which may be used by the LPPS 2900 to collect real-time and spatio-historical data from the UE 2620 (or from components therein). These application instances obtain or otherwise interact with a LPP service via MEC LPP API 2651*a* and 2651*b* (collectively referred to as "MEC LPP API 2651"). MEC hosts 1536 may be co-located with edge infrastructure (e.g., NANs 1531, 1532, and 1533 of FIG. 15) and may communicate with each other through the Mp3 interface.

In embodiments, LPP Information Services (LPP-IS) 2652-1 and 2652-2 (collectively referred to as "MEC LPP-IS 2652") permits information exposure pertinent to the support of link quality/performance prediction use cases to MEC app 2636 instances. The LPP-IS 2652 may be produced by the MEC platform 2637 or by the MEC Apps 2636. In the framework of LPPS 2900, the UE 2620 is hosting an LPP client application (see e.g., LPP App 3020 of FIG. 30), and is connected to a certain MEC host 1536 and a related MEC App 2636 operating within that MEC host 1536. In presence of multiple MEC hosts 1536, the LPP-IS 2652 permits exposure of LPP information between MEC Apps 2636 running on different MEC hosts 1536, and exposure of LPP information with remote systems/services via the LPP API 2651. The remote systems/services may be remote application server instances (e.g., server(s) 1550 of FIG. 15), which can be located outside the Edge system 1535 (e.g., private clouds owned by the operator or by the OEM such as cloud 1544) and may access the LPP notifications via the LPP API 2651.

LPP-IS 2652 also permits a single network operator to offer a LPP service(s) over a region that may span different countries and involve multiple networks, MEC systems 2600, and MEC app 2636 providers. For that purpose, the MEC LPP-IS 2652 includes the following functionalities.

In some aspects, the MEC platform 2637 can include a MEC LPP API 2651 and provide MEC LPP-IS 2652, which can include the following functionalities: (a) gathering of relevant UE information from an access network for purposes of performing UE authorization for LPP services (e.g., obtaining a list of LPP authorized UEs 2620, obtaining relevant information about the authorization based on UE subscription information/data, and obtaining UE configuration parameters such as a common set of radio link configuration parameters and/or UE capabilities, if available); (b) gathering of relevant radio link and/or backhaul link information from the access network for determining and providing LPPs to the UEs 2620; (c) exposure of the information obtained in (a)-(b) to MEC apps 2636 in the same MEC host 1536 or MEC apps 2636 in other MEC hosts 1536 via the MEC LPP API 2651; (d) for core network based implementations, enablement of MEC apps 2636 to communicate securely with the LPP-related core network functions (e.g., enabling communication between the MEC host and an "LPP control function" in the core network); (e) enablement of MEC apps 2636 in different MEC systems 2600 to communicate securely with each other; and (d) gathering and processing information available in other MEC hosts 1536 via one or more other MEC APIs 2653 (e.g., gathering and processing information obtained from the RNI API, LS API, BWM API, a WLAN API, and/or other APIs that may be implemented within the MEC platform 2637 such as those discussed herein) in order to predict radio network congestion, BW measurements/resources, UE 2620 location(s)/mobility, and provide suitable notifications (e.g., LPP notifications) to the UE 2620.

From that perspective, the LPP-IS 2652 is relevant to Mp1 and Mp3 reference points in the MEC architecture 2600. In particular, the relevant information is exposed to MEC apps 2636 via the Mp1 reference point, and the Mp3 reference point may enable the possibility to transfer this information between different MEC platforms 2637. The MEC LPP API 2651 provides information to MEC apps 2636 in a standardized way, which provides interoperability in multi-vendor scenarios. Nevertheless, MEC apps 2636 may communicate in a direct way (e.g., without the use of MEC platform 2637). Inter-system communication may be realized between MEC Orchestrators 2621. As an alternative, or, in addition to that, possible Mp3 enhancements (or new reference points between MEC systems 2600) may be defined.

In some aspects, the MEC host 1536-2 in FIG. 26 can also implement a MEC LPP API 2651-2, which can provide an interface to one or more of the apps instantiated within MEC host 5, such as MEC APP 2636-2. In this regard, MEC host 1536-1 and MEC host 1536-2 can communicate with each other via the Mp3 interface as well as the MEC LPP APIs 2651-1, 2651-2. Additionally, one or more of the MEC apps 2636-1 instantiated within MEC host 1536-1 can communicate with one or more of the MEC apps 2636-2 instantiated within MEC host 1536-2 via the MEC LPP APIs 2651-1, 2651-2 as well as the Mp3 interface between the MEC host 1536-1 and MEC host 1536-2.

In some aspects, each of the MEC hosts 1536 can be owned/managed by a different mobile services operator (while it can be operated directly by a MEC vendor or a third party). In some aspects, MEC apps 2636 instantiated on MEC host 1536-1 and MEC host 1536-2 can be used to provide LPP-related services, and can be operated by the mobile services operator, by a MEC vendor, or by a third party (e.g., OEM, or OEM supplier, or system integrator).

In some aspects, the MEC LPP APIs 2651 can be provided as a general middleware service, providing information gathered from UEs 2620 and other network elements (e.g., NANs 1531, 1532, and/or 1533 of FIG. 15), and exposed as a service within the MEC hosts 1536 (e.g., as a RESTful API) for the higher layers (e.g., the MEC apps 2636 instantiated within the MEC hosts 1536). In some aspects, the MEC LPP APIs 2651 can be configured to gather information and data from various sensors. In this regard, the deployment of the MEC LPP APIs 2651 is ensuring continuity of the service across different mobile networks, for the same OEM (e.g., UE manufacturer) and/or mobile network operator (MNO).

In some embodiments, MEC apps 2636 can be configured to host and/or store LPP-related data and/or configuration parameters, such as collected measurement data, UE operational/performance data (e.g., application usage statistics, processor and/or memory utilization, and/or other like data such as those disused herein), UE capability information, and/or the like. The availability of this LPP-related data and/or configuration parameters also in absence of network coverage is ensured by the usage of an Mp3 interface (or another type of interface) between the MEC hosts 1536.

In some embodiments, MEC apps 2636 can be configured to host one or more prediction layers as discussed herein, such as a data collection layer (or UE feedback layer), cell load layer (or cell model layer), an intra-cell layer, a cell mobility layer (or cell transition layer), a geoposition layer (or geographical position layer), a network topology layer, and/or other like prediction layers. The various prediction layers may provide respective predicted performance metrics in absence of network coverage by the usage of an Mp3 interface (or another type of interface) between the MEC hosts 1536.

In the aforementioned embodiments, MEC app 2636-1 can be configured to connect to MEC host 1536-2 (through MEC LPP API 2651-2 in MEC host 1536-2), and MEC app 2636-2 can be configured to connect to MEC host 1536-1 (through V2X MEC API 2651-1 in MEC host 1). In case of a multi-operator architecture, multiple MEC hosts 1536 can be configured to communicate with each other via the MEC LPP APIs 2651 and synchronize in order to transfer the relevant LPP-related data (e.g., real-time data and/or spatio-historical data) and/or predicted performance metrics so that they can be available across the multi-operator architecture in absence of network coverage or during network infrastructure/equipment failures. In this way, the LPP service (e.g., LPPS 2900 of FIG. 29) can have access to the LPP-related data and/or the predicted performance metrics even when the UEs 2620 are not in network coverage or when failures or overload situations occur at different parts of the network.

In some embodiments, one or more MEC apps 2636 within a MEC host 1536 can be instantiated to perform functionalities of an LPP engine (e.g., LPP layer 2902 of FIG. 29), which may provide the LPP-IS 2652. Additionally, MEC hosts 1536 can use MEC LPP APIs 2651 to perform various LPP-IS 2652 functions. In particular, these one or more MEC apps 2636 can be instantiated within a MEC host 1536 to perform various aspects of the LPP embodiments discussed herein, as well as the following functionalities: obtaining LPP subscription information for UE 2620; determining whether the UE 2620 is authorized to obtain LPP notifications, which may or may not be in response to a request for LPP services; communicating LPP-related data and/or configuration parameters; and so forth.

Figure 27:
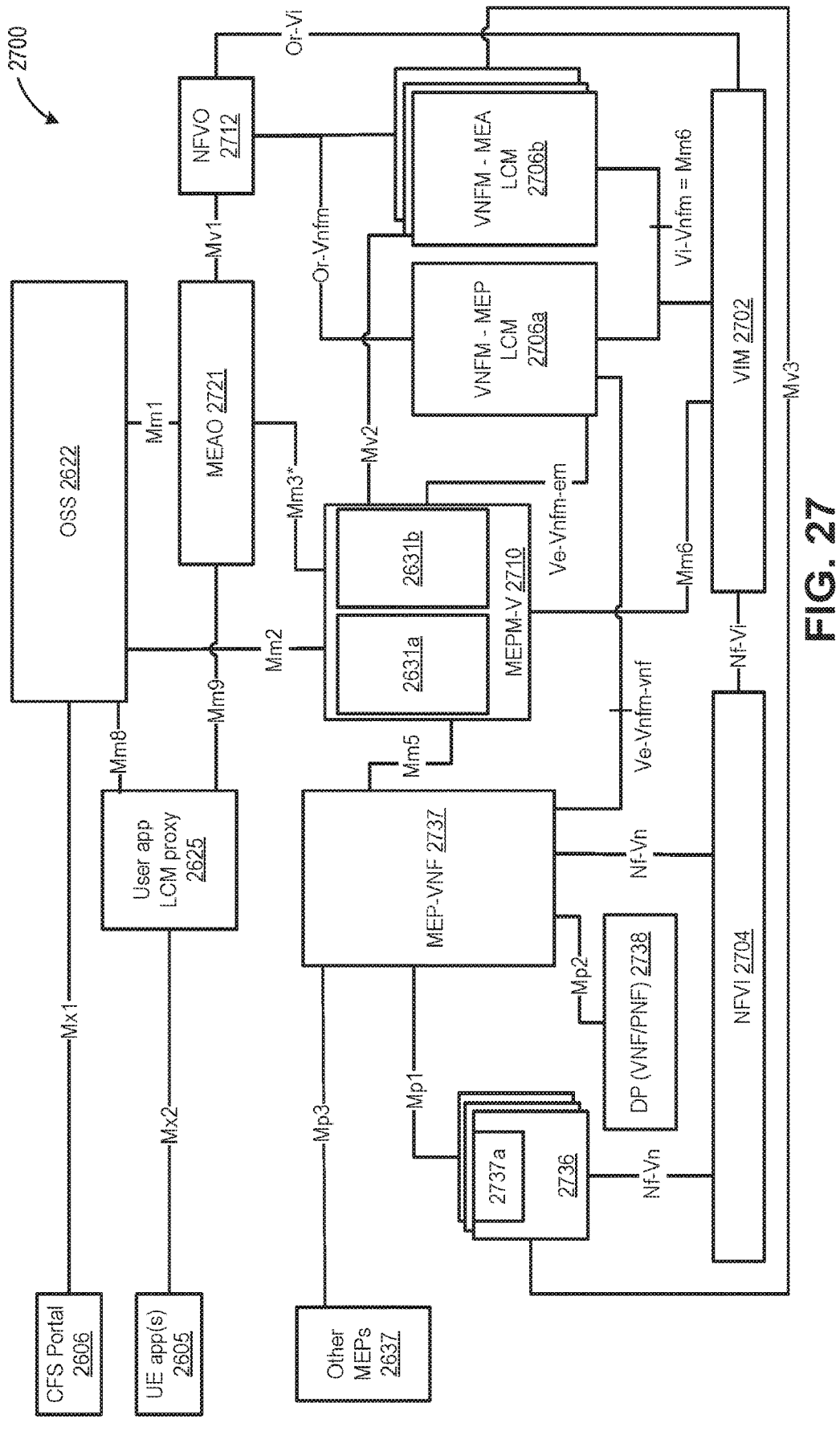
FIG. 27 illustrates an example multi-access edge system architecture in accordance with various embodiments.

FIG. 27 illustrates an example multi-access edge system architecture 2700 (or a multi-access edge system architecture) in accordance with various embodiments. MEC system 2700 of FIG. 27 is a second embodiment of a system architecture of the MEC system 2600 discussed previously. Like numbered elements in FIG. 27 are the same as discussed previously with respect to FIG. 26. The MEC system 2700 includes architectures and infrastructures that are used to virtualize one or more network functions (NFs) onto physical resources comprising a combination of industry-standard server hardware, storage hardware, or switches, or alternatively comprising proprietary hardware. Typically, mobile network operators virtualize their NFs using Network Functions Virtualization (NFV), and use virtualization infrastructure (VI) to consolidate various network elements, which are referred to as Virtualized Network Functions (VNFs). In other words, NFV can be used to execute virtual or reconfigurable implementations of one or more components/functions of a CN 1542. As mentioned previously, the MEC system 2600 (or individual MEC servers 1536/2601) may include VI to consolidate and virtualize various MEC components and MEC applications on top of the VI. In this regard, the system 2700 is an architecture where MEC elements are deployed in an NFV environment, which may provide maximum utilization of the underlying VI. In particular, the system 2700 is a MEC architecture that is deployed in NFV environments, wherein the MEP 2637 is deployed as a VNF, the MEAs 2636 appear as VNFs towards the NFV MANO components (MEAs 2636 with specific NFV functionality are referred to as an "MEA-VNFs 2736" or the like), and the VI 2638 is deployed as an NFVI 2704 and its virtualized resources are managed by a VIM 2702.

In addition to elements discussed previously with respect to FIG. 26, the system 2700 is illustrated as including a virtualized infrastructure manager (VIM) 2702, a network function virtualization infrastructure (NFVI) 2704, a VNF manager (VNFM) 2706, virtualized network functions (VNFs) including, inter alia, MEP-VNF 2737 and MEA-VNFs 2736, a MEC Edge Platform Manager—NFV (MEPM-V) 2710, and an NFV Orchestrator (NFVO) 2712. In embodiments, the MEP 2637 is realized as a VNF (e.g., MEP-VNF 2737 in FIG. 27) and is managed according to typical NFV procedures. In these embodiments, the MEPM 2631 is transformed into the Multi-access Edge Platform Manager—NFV (MEPM-V) 2710, where the MEPM-V 2710 acts as an Element Manager (EM) of the MEP-VNF 2737. The MEPM-V 2710 delegates Life Cycle Management (LCM) parts/tasks to one or more VNFM(s) 2706, including VNFM-MEP LCM 2706A and VNFM-MEA LCM 2706B. In particular, the VNFM 2706 is used to perform LCM of the MEP-VNF including LCM of the MEP 2637 performed by the VNFM-MEP LCM 2706A and LCM of the MEAs 2636 performed by the VNFM-MEA LCM 2706B.

Additionally, the MEC-O 2621 is transformed into a Multi-access Edge Application Orchestrator" (MEAO) 2721 that uses the NFVO 2712 for resource orchestration, and for orchestration of the set of MEA-VNFs as one or more NFV Network Services (NSs). The MEA-VNFs 2736 are managed like individual VNFs, where certain orchestration and Life Cycle Management (LCM) tasks are delegated to the NFVO 2712 and VNFM 2706a,b functional blocks. In some embodiments, the MEP-VNF 2737, the MEPM-V 2710, and VNFM-MEA LCM 2706B may be deployed as a single package or ensemble. In other embodiments, the VNFM-MEP LCM 2706A and VNFM-MEA LCM 2706B are part of a generic VNFM 2706, and the MEP-VNF 2737 and the MEPM-V 2710 are provided by a single vendor.

The VIM 2702 manages the resources of the NFVI 2704. The NFVI 2704 includes physical or virtual resources and applications (including hypervisors) used to execute system 2700. The VIM 2702 manages the life cycle of virtual resources with the NFVI 2704 (e.g., creation, maintenance, and tear down of virtual machines (VMs) associated with one or more physical resources); tracks VM instances; tracks performance, fault, and security of VM instances and associated physical resources; and exposes VM instances and associated physical resources to other management systems. The NFVO 2712 coordinates, authorizes, releases, and engages resources of the NFVI 2704 in order to provide requested services (e.g., to execute a core network function, component, or slice).

The VNFM 2706 manages VNFs used to execute core network 1542 components/functions. The VNFM 2706 manages the life cycle of the VNFs and tracks performance, fault, and security of the virtual aspects of VNFs. The MEPM-V 2710 tracks the performance, fault and security of the functional aspects of VNFs. The tracking data from the VNFM 2706 and the MEPM-V 2710 may comprise, for example, performance measurement (PM) data used by the VIM 2702 or the NFVI 2704. Both the VNFM 2706 and the MEPM-V 2710 can scale up/down the quantity of VNFs of the system 2700.

The Mm3* reference point between MEAO 2721 and the MEPM-V 2710 is based on the Mm3 reference point discussed previously. The Mm3* reference point in this embodiment may be altered to account for the split between MEPM-V 2710 and VNFM-MEA LCMs 2706B. In addition to the reference points discussed previously with respect to FIG. 26, system 2700 includes the reference points Mv1, Mv2 and Mv3 between elements of the MEC architecture and NFV architectures to support the management of MEA-VNFs 2736 and respective MEC services 2737a. The Mv1 reference point connects the MEAO 2721 and the NFVO 2712 and is the same or similar to the Os-Ma-nfvo reference point in NFV architectures. The Mv2 reference point connects the VNFM-MEA LCM 2706B with the MEPM-V 2710 to allow LCM related notifications to be exchanged between these entities. The Mv2 reference point is the same or similar to the Ve-Vnfm-em reference point in NFV architectures. The Mv3 reference point connects the VNFM-MEA LCM 2706B with MEA-VNF 2736 instance(s) to allow the exchange of messages related to, for example, MEA LCM or initial deployment-specific configurations.

The Mv3 reference point is the same or similar to the Ve-Vnfm-vnf reference point in NFV architectures.

Furthermore, the following reference points are used as they are defined for NFV architectures: The Nf-Vn reference point that connects each MEA-VNF 2736 with the NFVI 2704; the Nf-Vi reference point that connects the NFVI 2704 and the VIM 2702; the Os-Ma-nfvo reference point that connects the OSS 2622 and the NFVO 2712, which is primarily used to manage NSs (e.g., a number of VNFs connected and orchestrated to deliver a service); the Or-Vnfm reference point that connects the NFVO 2712 and the VNFM 2706*a,b*, which is primarily used for the NFVO 2712 to invoke VNF LCM operations; the Vi-Vnfm reference point that connects the VIM 2702 and the VNFM 2706*a,b*, which is primarily used by the VNFM 2706*a,b* to invoke resource management operations to manage cloud resources that are needed by the VNF 2737 and/or data plane (DP)-VNF 2738 (where Vi-Vnfm reference point corresponds to the Mm6 reference point discussed previously); the Or-Vi reference point that connects the NFVO 2712 and the VIM 2702, which is primarily used by the NFVO 2712 to manage cloud resources capacity; the Ve-Vnfm-em reference point that connects the VNFM 2706*a,b* that manages the lifecycle of the MEP 2637 with the MEPM-V 2710; the Ve-Vnfm-vnf reference point that connects the VNFM 2706*a,b* that manages the lifecycle of the MEP 2637 with the MEP-VNF 2737; the Nf-Vn reference point that connects the MEP-VNF 2737 and the NFVI 2704; the Nf-Vi reference point that connects the NFVI 2704 and the VIM 2702; the Os-Ma-nfvo reference point that connects the OSS 2622 and the NFVO 2712, which is primarily used to manage NSs, for example, a number of VNFs connected and orchestrated to deliver a service; the Or-Vnfm reference point that connects the NFVO 2712 and the VNFM 2706*a,b* that manages the lifecycle of the ME platform, which is primarily used for the NFVO 2712 to invoke VNF LCM operations; the Vi-Vnfm reference point that connects the VIM 2702 and the VNFM 2706*a,b* that manages the lifecycle of the MEP 2637, which is primarily used by the VNFM 2706*a,b* to invoke resource management operations to manage the cloud resources that are needed by the VNF; and the Or-Vi reference point that connects the NFVO 2712 and the VIM 2702. It is primarily used by the NFVO 2712 to manage cloud resources capacity.

When MEC is deployed in a NFV environment, the data plane (DP) 2738 may be implemented as a Physical Network Function (PNF) (e.g., as DP-PNF 2738), a VNF (e.g., as DP-VNF 2738), or combination thereof. When implemented as a DP-PNF 2738, the DP is connected to the NS that contains the MEA-VNFs 2736, and the Mpg reference point is kept as a MEC-internal reference point also in the NFV-based deployment of MEC. In another embodiment, for performance enhancements, the Service Function Chaining (SFC) functionality provided by the underlying NFVI 2704 may be reused for traffic routing. In such a deployment, the DP 2738 and the Mp2 reference point are omitted from the system 2700. The SFC functionality in the NFVI 2704 is configured by the NFVO 2712 in the VIM 2702 based on the NFP of the NFV NS, using the Or-Vi reference point. In these embodiments, the MEAO 2721 translates the traffic rules into an NFP and sends it to the NFVO 2712. The MEP 2737 may not control the traffic redirection directly via the Mp2 reference point, but instead may pass requests to activate/deactivate/update traffic rules to the MEPM-V 2710, which will then be forwarded to the MEAO 2721. When receiving such a request, the MEAO 2721 may request the NFVO 2712 to update the NFP accordingly. Furthermore, although not shown by FIG. 27, the system

2700 may also include a network manager (NM). The NM may provide a package of end-user functions with the responsibility for the management of a network, which may include network elements with VNFs, non-virtualized network functions, or both (e.g., management of the VNFs may occur via the MEPM-V 2710).

In some aspects, one or more ME apps 2636 within MEC host 1536 or ME apps 2736 in MEC system 2700 can be instantiated to perform functionalities of a V2X application function. Additionally, MEC hosts 2601 can use MEC V2X APIs to perform various V2X functions. In particular, one or more MEA 2636/2736 can be instantiated within MEC host 1536 or MEC system 2700 to perform functionalities associated with a V2X application function. In some aspects, these MEAs 2636/2736 can be configured to perform the following V2X application functions: obtaining V2X subscription information for a vUE 1521*a*, determining whether the vUE 1521*a* is authorized to perform V2X communications in response to a request for V2X services, communicating V2X configuration parameters such as a common set of V2X configuration parameters, and so forth.

In some aspects, the MEP 2637 and/or MEP-VNF 2737 can include a MEC V2X API, which can be used to perform the following functionalities: (a) gathering of V2X relevant information from the 3GPP network for purposes of performing UE authorization for V2X communications (e.g., obtaining a list of V2X authorized UEs, obtaining relevant information about the authorization based on the UE subscription, and obtaining V2X configuration parameters such as a common set of V2X configuration parameters which can include PC5 configuration parameters); (b) exposure of the information obtained in (a) to MEC apps in the same host or MEC apps in other MEC hosts; (c) enablement of MEC apps to communicate securely with the V2X-related 3GPP core network logical functions (e.g., enabling communication between the MEC host and a V2X control function in the core network); (d) enablement of MEC apps in different MEC systems to communicate securely with each other; and (e) gathering and processing information available in other MEC APIs (e.g., gathering and processing information obtained from a RNI API, Location API, WLAN API, and other APIs that may be implemented within the MEP 2637 and/or MEP-VNF 2737) in order to predict radio network congestion, and provide suitable notifications to the UE.

In some aspects, a second MEC host 1536 can also implement a MEC V2X API which can provide an interface to one or more of the apps instantiated within MEC host 1536, such as MEC app 2636. In this regard, hosts 2601 can communicate with each other via the MP3 interface as well as the MEC V2X APIs. Additionally, one or more of the apps instantiated within host 1536 can communicate with one or more of the apps instantiated within host 1536 via the MEC V2X APIs as well as the interface between the hosts 2601.

In some aspects, each of the MEC hosts 2601 can be owned/managed by a different mobile services operator (while it can be operated directly by a MEC vendor or a third party). In some aspects, MEC applications instantiated on hosts 2601 can be used to provide V2X-related services, and can be operated by the mobile services operator, by a MEC vendor, or by a third party (e.g. OEM, or OEM supplier, or system integrator).

In some aspects, the MEC V2X APIs can be provided as a general middleware service, providing information gathered from vehicles and other V2X elements, and exposed as a service within the hosts (e.g., as a RESTful API) for the higher layers (e.g., the MEC apps instantiated within the hosts). In some aspects, the MEC V2X APIs can be configured to gather information and data from sensors. In this regard, the deployment of the MEC V2X APIs is ensuring continuity of the service across different mobile networks, for the same OEM (e.g., automobile manufacturer). If a standard implementation of a V2X API is introduced (e.g. by ETSI MEC), this functionality can ensure the same basic V2X service characteristics for all OEMs in a 5G communication system with MEC functionalities.

In some aspects, MEC apps 2636 and 2736 can use the corresponding MEC V2X APIs to retrieve information from the 3GPP network. In some aspects, MEC apps 2636 and 2736 can be configured to host V2X configuration parameters such as PC5 configuration parameters (or a common set of V2X configuration parameters that can be available within a multi-PLMN communication environment). The availability of these V2X configuration parameters also in absence of network coverage is ensured by the usage of an Mp3 interface (or another type of interface) between the hosts. In some aspects, MEC app 2636/2736 can be configured to connect to MEC host 1536 (through V2X MEC API in MEC host 1536), and MEC app 2636/2736 can be configured to connect to MEC Host 1536 (through V2X MEC API in MEC host 1536). In case of a multi-operator architecture, multiple MEC hosts can be configured to communicate with each other via the MEC V2X APIs and synchronize in order to transfer the relevant V2X configuration parameters, so that they can be available across the multi-operator architecture in absence of cellular coverage (e.g., outside of the 3GPP domain). In this way, a UE 1521a can have access to V2X configuration parameters even when the UE is not under coverage of its 3GPP network.

Figure 28:
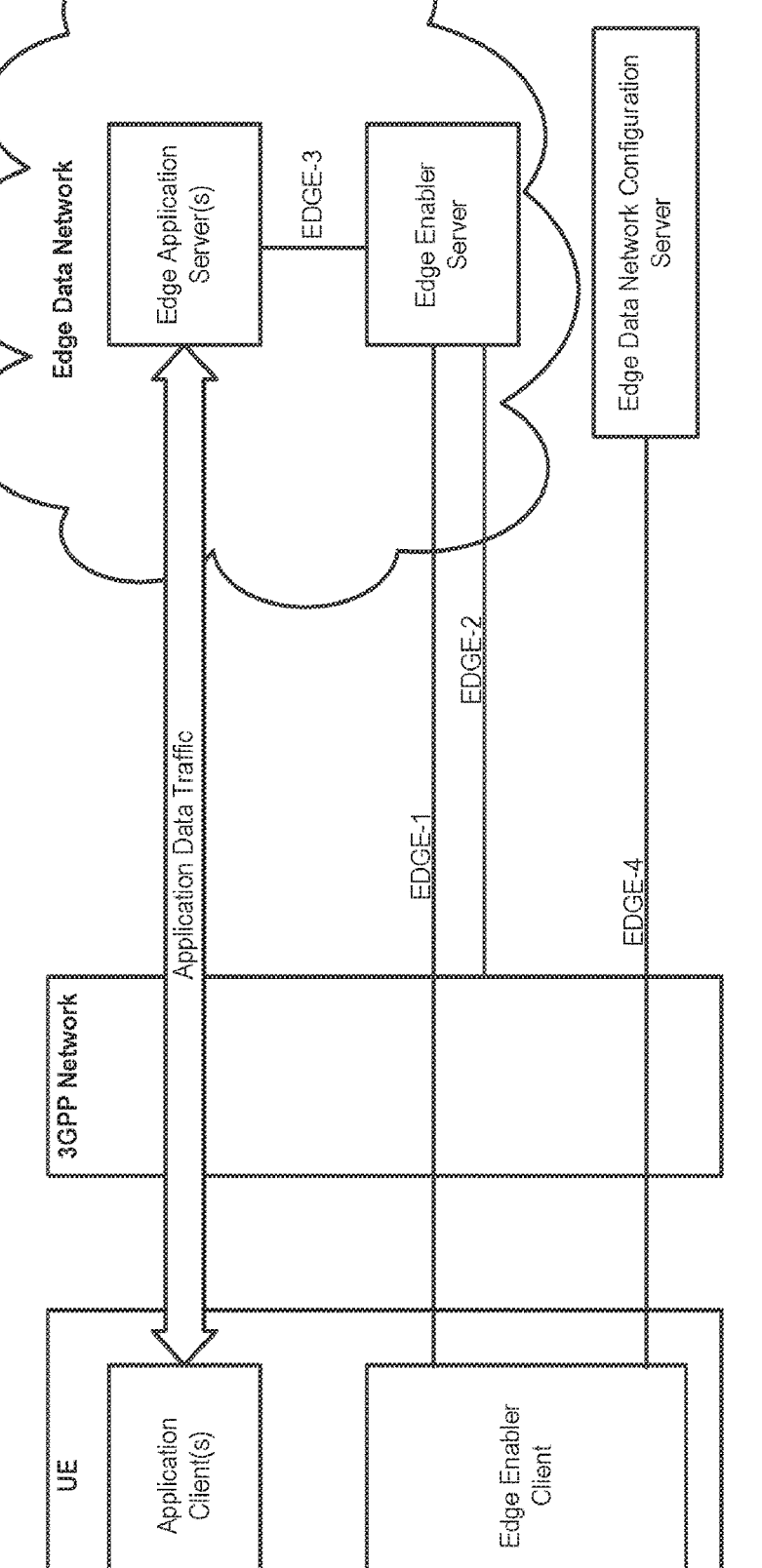
FIG. 28 shows an example 3GPP-based application architecture for enabling Edge Applications.

FIG. 28 shows an example 3GPP-based application architecture for enabling Edge Applications (see e.g., 3GPP TR 23.758 v0.3.0 (2019 Jul. 18)). In some implementations, the edge compute nodes 1536 of FIG. 15 may be implemented using edge compute technologies depicted by FIG. 28 (with or without the MEC technologies discussed previously). In FIG. 28, the Edge Enabler Server is a functional entity resident in the Edge Hosting Environment providing services for the Edge Application Servers and Edge Enabler Clients. The Edge Enabler Server provides supporting functions needed for Edge Application Servers to run in an Edge Data Network including provisioning of configuration information to enable the exchange of Application Data Traffic with the Edge Application Server(s); and providing information related to the Edge Application Servers, such as availability, to the Edge Enabler Client. The interactions related to enabling Edge Computing between the Edge Enabler Server and the Edge Enabler Client are supported by the EDGE-1 reference point. The interactions related to Edge Enabler Layer between the Edge Enabler Server and the 3GPP Network are supported by the EDGE-2 reference point.

The Edge Hosting Environment is an environment providing support required for Edge Application Server's execution. The Edge Application Server(s) are application servers (AS) resident in the Edge Hosting Environment (e.g., the Edge Data Network), where an AS is application software resident in the cloud performing server function(s). The interactions related to Edge Enabler Layer between the Edge Enabler Server and the Edge Application Servers are supported by the EDGE-3 reference point.

The Edge Enabler Client is a functional entity resident in a UE (e.g., UEs 1511, 1521 of FIG. 15) providing services for the Application Clients including, for example, retrieval and provisioning of configuration information to enable the exchange of Application Data Traffic with the Edge Application Server; and discovery of Edge Application Servers available in the Edge Data Network.

The Edge Data Network Configuration Server provides supporting functions needed for the UE to connect with an Edge Enabler Server including, for example, provisioning of Edge Data Network configuration information to the Edge Enabler Client. The Edge Data Network configuration information includes information for the UE to connect to the Edge Data Networks with its service area information; and information for establishing a connection with Edge Enabler Servers (such as URI). The interactions related to Edge Enabler Layer, between the Edge Data Network Configuration Server and the Edge Enabler Client are supported by the EDGE-4 reference point.

B. Link Performance Prediction Aspects

Referring now to FIG. 29, wherein example logical components and interaction points of an LPP service (LPPS) 2900, in accordance with various embodiments, is illustrated. As shown, for the illustrated embodiments, the LPPS 2900 includes an LPP layer 2902 and a plurality of prediction layers 2925-1 to 2925-N (collectively referred to as "prediction layers 2925" or the like). In the illustrated embodiment, the components of the LPPS 2900 interact with one or more elements in the edge computing environment 1500 discussed previously with respect to FIG. 15.

The LPPS 2900 predicts how network performance (e.g., performance of environment 1500) changes over time with a relatively high degree of confidence. For example, the LPPS 2900 is capable of predicting link performance in time and space, which allows applications, UEs 1511, 1521, and/or network infrastructure able to shift delay tolerant traffic in time and/or space in order to smooth out peak demand and improve overall network resource utilization. The ability to forecast and communicate link performance predictions can also help applications, UEs 1511, 1521, and/or network infrastructure modify their behavior to account for congested or otherwise sub-optimal network conditions.

In embodiments, the LPPS 2900 uses spatial and temporal (spatio-temporal) historical data and/or real-time data to predict link quality. The spatio-temporal historical data is data related to the performance experienced over multiple locations (e.g., space) and at multiple time instances (e.g., temporal). The spatio-temporal historical data provides ability to locate performance at specific location and time. Real-time data includes data/information such as live traffic status (e.g., vehicles on a given roadway or the like), abnormal events (e.g., natural disasters and the like), network load (e.g., resource utilization of NANs 1531, 1532, 1533, edge compute nodes 1536, and the like), radio conditions (e.g., amount of occupied radio resources, amount of signaling taking place over the radio links 1503, 1505, 1507, interference measurements, etc.), UE 1511, 1521 location (e.g., geographic position within a given cell), UE 1511, 1521 motion/mobility (e.g., speed and direction of travel within a given cell or between cells), and/or routing information (e.g., number and types of hops between source and destination nodes or the like), if known. The LPPS 2900 uses the historical and real-time data collected across a wide range of mobile devices (e.g., UEs 1511, 1521) and network elements (e.g., NANs 1531, 1532, and 1533, edge compute nodes 1536, core network elements in CN 1542, etc.), allowing the LPPS 2900 to build a view of the network performance that users and services will likely experience over time. Consumers (e.g., UEs 1511, 1521 and NANs 1531, 1532, 1533, application/service providers, etc.) can subscribe to predictions that have direct relevance to network performance and/or their service performance. The LPPS 2900 responds to the consumer indicating any significant changes in performance over time. These embodiments are discussed in more detail infra with respect to FIGS. 37-41.

Each of the prediction layers 2925 provide functionality independent of functionality provided by other layers 2925, as well as different functionality of the LPP layer 2902. For example, the LPP layer 2902 may implement a data fusion engine (also referred to as an "LPP engine") (discussed in more detail infra), the prediction layer 2925-1 may implement one or more first ML models/algorithms to generate a first type of predicted performance metrics, the prediction layer 2925-2 may implement one or more second ML models/algorithms to generate a second type of predicted performance metrics, and so forth to the prediction layer 2925-N, which may implement one or more Nth ML models/ algorithms to generate an Nth type of predicted performance metrics (where N is a number).

In various embodiments, each prediction layer 2925 runs one or more ML models to determine respective predicted performance metrics, and provides their respective predicted performance metrics to the LPP layer 2902. Machine learning algorithms build mathematical models, referred to as a "machine learning model" or simply "model", based on sample data, known as "training data", in order to make predictions or decisions without being explicitly programmed to perform such tasks. Generally, an ML algorithm is a computer program that learns from experience with respect to some task and/or some performance measure, and an ML model is an object or data structure created after an ML algorithm is trained with one or more training datasets. After training, the ML model may be used to make predictions on new datasets. Although the term "ML algorithm" refers to different concepts than the term "ML model," these terms as discussed herein may be used interchangeably for the purposes of the present disclosure. In embodiments, specific ML algorithms, or combinations of ML algorithms, are used at individual prediction layers 2925 to determine respective predicted performance metrics, and one or more layers 2925 may use different ML algorithms (or combinations of ML algorithms) than those used by other prediction layers 2925. Examples implementations of different prediction layers 2925 are discussed infra with regard to FIGS. 30-36.

In some embodiments, at least one of the layers 2925 is responsible for collecting data from one or more UEs 1511/1521 and/or NANs 1531-1533 in environment 1500, which may be processed by that layer 2925 and provided to other layers 2925 for determining their respective predicted performance metrics. In such embodiments, the layers 2925 that are responsible for data collection may obtain data from applications, components, or the like at the data sources (e.g., the UEs 1511, 1521, NANs 1531-1533, etc.) that collect data from system software (e.g., operating systems, device drivers, firmware, utility applications, etc.) and/or various user/client applications operating on those devices via a suitable API, middleware, software glue, proxy applications, trusted applications, etc., and provide the collected data to the data collection layer(s) 2925. In some embodiments, these applications, components, etc., may be custom plug-ins configured to interact with, and collected data/ metrics from the system software, other applications, etc.

The LPP layer 2902 obtains the predicted performance metrics from the prediction layers 2925 and fuses the predicted performance metrics together to obtain an LPP for an LPPS consumer (not shown by FIG. 29). The LPP layer

2902 may include any suitable technology to fuse the predicted performance metrics provided by the prediction layers 2925. Data fusion is a process of integrating and/or combining data collected from multiple sources at different spatial and temporal scales in order to make inferences about that data. In some embodiments, these "inferences" may be the link performance predictions, while in other embodiments, the LPP layer 2902 implements suitable ML model(s)/algorithm(s) to generate the link performance predictions based on the inferences.

For example, the LPP layer 2902 may be trained during a training phase using predetermined data inputs to establish model parameters (e.g., initial state distribution) and to associate at least some of the states with inferences having meaningful significance. The established model parameters are stored in memory (e.g., memory circuitry 2420 of FIG. 24 or the like). Then during an operational phase, the LPP layer 2902 performs data fusion on real (live) data from the prediction layers 2925, and in order to increase the accuracy of the model, continually modifies the established model parameters as necessary based on a comparison between a prediction and what is actually received.

In various embodiments, the LPP layer 2902 (or the LPP engine) is configured to perform Multi-Cell Multi-Layer (MCML) data fusion techniques. In such embodiments, the LPP layer 2902 takes data from one or more prediction layers 2925 and combines that data with data from one or more other prediction layers 2925 to derive the link performance prediction for corresponding LPPS consumers. In one MCML example, the LPP layer 2902 may take an output from a cell transition prediction layer (see e.g., FIGS. 33-34), which is in the form of expected cells a UE 1511, 1521 will visit, and pairs that output with outputs provided by a cell load prediction layer (see e.g., FIG. 31) to predict a performance of individual cells based on mobility of the UE 1511, 1521. In a second MCML example, network data and/or parameters (e.g., a mobile network associated with CN 1542 of FIG. 15), data from traffic and/or mobility patterns, subscriber information, and data from GPS are fed in to different prediction layers 2925 for training and prediction of performance metrics from those prediction layers 2925 are fused to predict final network performance at a particular time/date. As mentioned previously, each prediction layer 2925 can be trained with data from different sources (network, traffic, GPS, subscriber information).

In various embodiments, MCML data fusion accounts for different operational states, operational contexts, and/or mobility states. For example, as discussed in more detail infra, a cell transition prediction layer (see e.g., FIGS. 33-34) may be used to predict the cells that a UE 1511, 1521 will visit at particular time instances based on a current cell in which the UE 1511, 1521 is camping, a previous cell visited by the UE 1511, 1521, and travel direction and velocity measurements. When the UE 1511, 1521 is stationary (not moving), the link performance prediction is based on a current cell's behavior, and the LPP layer 2902 fuses the current cell's characteristics and cell load, including real-time and predicted future behavior(s) and/or load(s), to obtain the LPP. When the UE 1511, 1521 is moving in a relatively dense area (e.g., where cell sizes are relatively small, such as in a city), and the predicted cell behaviors and predicted cell load(s) of each cell predicted to be visited by the UE 1511, 1521 is combined (fused) together for the LPP. When the UE 1511, 1521 is moving in a relatively sparse area (e.g., where cell sizes are relatively large, such as in a rural area), the link performance prediction is based on intra-cell behavior(s) (e.g., predicted signal strength, signal quality, power changes, etc., within individual cells; see e.g., FIG. 32) for each cell predicted to be visited by the UE 1511, 1521, and the intra-cell behavior(s) of each predicted cell is combined (fused) with respective predicted cell behaviors and respective predicted cell load(s). When the UE 1511, 1521 is moving using a navigation application, the cell transition prediction layer predicts the cell transitions using a cell movement/mobility pattern determined from obtained route/journey data, navigation settings, and/or other information from the navigation application, and each cell predicted to be visited by the UE 1511, 1521 is combined (fused) with respective predicted cell behaviors and respective predicted cell load(s). In these embodiments, if network topology information and/or backhaul link performance predictions are available, then the predicted cell behavior(s) and/or load(s) may be combined (fused) with these additional network topology predictions and/or backhaul link predictions.

In some embodiments, MCML data fusion involves the LPP layer 2902 (or LPP engine) requesting, from the cell transition prediction layer for a UE 1511, 1521, a prediction of various cell that the UE 1511, 1521 may visit given a current cell. These predictions may be based on spatio-temporal history data associated with the UE 1511, 1521 (e.g., mobility data) and/or the current cell. The cell transition prediction layer returns data including the expected future cells the UE 1511, 1521 may visit, the expected probability of visiting each cell in a given region, a predicted time interval (or amount of time) for the UE 1511, 1521 to travel to each cell, and an predicted amount time that the UE 1511, 1521 will remain in each cell. Then, the LPP layer 2902 requests predicted cell/link characteristics and/or behaviors for each cell indicated by the cell transition prediction layer at the time interval the UE 1511, 1521 is expected to enter each cell and the amount of time the UE 1511, 1521 is predicted to be in each cell. The LPP layer 2902 combines (fuses) the returned predicted cell/link characteristics and/or behaviors for each cell to determine a predicted link performance (e.g., the LPP) given the current and future cell load as well as expected deviation(s). The LPP layer 2902 now knows the probability that the UE 1511, 1521 will enter or travel through a particular cell, the predicted amount of time the UE 1511, 1521 will take to enter the particular cell, the amount of predicted time to be spent in the particular cell, as well as the LPP for each cell at each time instance. The LPP layer 2902 then looks at a time window from a current time to some future time instance (e.g. 30 seconds, 1 minutes, 2 minutes, etc., from the current time depending on how steady the link is), and breaks this time window into time intervals (e.g. 1 second). The time interval for the UE 1511, 1521 to reach respective cells is added to the time window with respective characteristics/loads, and the probability that the UE 1511, 1521 will visit the respective cells. Then, the LPP layer 2902 runs through the time window, and filters out probabilities that are deemed to be too low for consideration. As an example, changes detected to be larger than a certain level (e.g., 5%, 10% deviation, etc.) may be filtered out. The determined LPP for each remaining portions of the time window may be sent to the UE 1511, 1521 or other LPPS consumer, taking into account the amount of delay and predicted location of the UE 1511, 1521 (or other LPPS consumer).

Additionally or alternatively, one or more other data fusion techniques may be used to combine or fuse the predicted performance metrics. Examples of these known data fusion techniques may include, but are not limited to, data association techniques (e.g., Nearest Neighbors, K-Means Probabilistic Data Association (PDA) and/or PDA Filter (PDAF), Principle Component Analysis (PCA), Joint Probabilistic Data Association (JPDA), Distributed JPDA (JPDA-D), Multiple Hypothesis Test (MHT), Distributed MHT (MHT-D), graphical modeling, and/or the like), state estimation techniques (e.g., maximum likelihood, maximum posterior, Kalman filter, distributed Kalman filter, particle filter, distributed particle filter, covariance intersection, covariance union, Optimal Theory, Regularization, Uncertainty Ellipsoids, and/or the like), decision fusion techniques (e.g., Bayesian methods (e.g., evidence theory, robust statistics, recursive operators, etc.), Dempster-Shafer Inference, Abductive Reasoning, Semantic methods, and/or the like), intelligent aggregation techniques (e.g., one or more ML techniques such as neural networks (including any neural network discussed herein), genetic algorithms, fuzzy logic, etc.), and/or any other suitable data fusion techniques.

The link performance predictions are used to generate the LPP notifications that the LPPS 2900 provides to LPPS consumers such as applications, UEs 1511/1521, and/or NANs 1531-1533, which allow the LPPS consumers to tailor their operations accordingly. The LPP notifications, in one embodiment, are conceptually similar to traffic notifications provided by a navigation application or vehicular driving applications. While the traffic notifications provide up-to-date information about current and forecasted traffic conditions, the LPP notifications provide information about current and forecasted link quality or performance.

In some embodiments, the LPPS 2900 may provide intelligent network management services to network operators. For example, network operators may use the LPP notifications to autonomously manage transmitter power, antenna direction, angle, and tilt; and other parameters of the NANs 1531, 1532, 1533. Additionally or alternatively, the link performance predictions in the LPP notifications may be fed into for Self-Organizing Network (SON) functions in LTE or 5G/NR implementations. In some embodiments, the LPPS 2900 may be used for network degradation control, which entails identifying instances of poor performance and troubleshooting. (e.g., identifying when equipment should be repaired or replaced).

In some embodiments, the LPPS 2900 may be used for efficient small cell backhaul planning. For example, the link performance predictions in the LPP notifications may be used to identify locations to deploy small cells (e.g., RAN nodes 1532, AP 1533, or the like) to enhance coverage and/or capacity while taking into account the associated backhaul and power requirements for such deployments. Additionally or alternatively, in some embodiments, the LPPS 2900 may be used for backhaul link resource allocation. In these embodiments, the link performance predictions may indicate the load or usage of different backhaul links at different time periods on different days, and network operators can reduce operating costs by powering down backhaul links which are expected to require low usage at particular times before powering them back up at predicted peak usage times.

By providing the LPP notifications to users, network operators, and service providers, network operators and service providers may tailor their applications/services to utilize network resources in a more efficient manner than using conventional technologies. As an example, individual NANs 1531, 1532, 1533 may schedule background traffic (e.g., paging, control signaling, heartbeat signaling, and/or other like traffic/signaling that takes place even when there is no user or application interaction with a UE 1511, 1521) for transmission during peaks in network performance. In this example, the peaks in network performance may be based on a predicted time and/or mobility when a UE 1511, 1521 will be proximate to a serving NAN 1531, 1532, 1533 or a predicted period during which the network should have sufficient capacity headroom.

The LPP notifications may also be used by network operators and service providers to improve Quality of Service (QoS) and/or Quality of Experience (QoE), which are traditionally associated with network performance metrics. Static network performance metrics only provide a partial, snapshot view of the QoS and/or QoE. Using the LPP notifications, network operators and service providers can adjust traffic routes, mode of operation, and/or other parameters to optimize QoS and QoE since they will have advance warning regarding any significant changes in expected network performance.

The LPPS 2900 itself may be an abstraction layer between service providers (e.g., operators/owners of server(s) 1550 of FIG. 15) and the underlying mobile access network (e.g., an owner/operator of CN 1542 and/or some or all of the NANs 1531, 1532) giving an abstracted view of the access network link quality, which allows service providers and/or application developers to make proactive decisions to improve QoS/QoE.

In a first example, a service provider is a content streaming service and/or platform that uses CDN edge compute nodes 1530 to stream content to UEs 1521. In this example, the service provider uses the LPP notifications to adapt streaming buffers operated by the CDN edge compute nodes 1530 to cover for poor coverage areas (e.g., coverage holes) that will likely be encountered by travelling UEs 1521. Using the LPP notifications from the LPPS 2900, the CDN edge compute nodes 1530 may pre-fetch and stream required content (e.g., for storage in a local buffer at the UEs 1521) prior to a UE 1521 entering or travelling through a poor coverage area (or coverage hole). Additionally or alternatively, content may be pre-fetched an loaded to CDN edge compute nodes 1530 along a predicted travel path/route of a UE 1521 (e.g., closer to the UE's 1521 anticipated point of consumption), and the amount of content streamed to the UE 1521 at different points along the predicted path/route may be based on predicted network performance at those different points.

In a second example, a service provider provides over-the-top (OTT) real-time services including, for example, television, messaging (e.g., instant messaging, online chats, etc.), and voice calling. In this example, the service provider uses the LPP notifications to provide advance warnings to users indicating when an OTT connection will likely be lost, and how long the connection may take to be reconnected.

In a third example, a service provider provides interactive map and navigation services, which provides to UEs 1521*a* turn-by-turn directions for a selected route. In this example, the service provider may use the LPP notifications to optimize the travel routes based on physical traffic (e.g., volume of vehicles travelling in a certain road or highway) and/or predicted network connectivity, which may be useful for semi-autonomous or fully-autonomous vehicle systems. Furthermore, these optimizations may be useful in industrial contexts, such as in "smart factories" or manufacturing plants, where mobile IoT devices 1511 can use LPP notifications for route optimization purposes.

In a fourth example, a mobile network operator (e.g., an owner/operator of CN 1542 and/or some or all of the NANs 1531, 1532) uses to guarantee a certain level of network performance (e.g., Service Level Guarantees) for enterprise-level customers. In this example, the mobile network operator may use the LPP notifications and/or the LPPS 2900 to quantify their network performance at varying levels of granularities showing their customers that they can provide a consistent high-quality QoS/QoE.

In some embodiments, the layers 2925/2902 may communicate with one another through one or more connectors 2906. The connectors 2906 may be software connectors that connect the various layers 2902/2925 of the LPPS 2900 to one another so each layer 2902/2925 does not need to know the underlying details of other layers 2902/2925. The connectors 2906 facilitate message passing/routing between individual layers 2902/2925, which may include encapsulating data from one layer 2902/2925 for consumption by an intended destination layer 2902/2925 or components thereof. As an example, the connectors 2906 may be an exogenous connector, which coordinates and controls a totality of interactions/communications of the layers 2902/2925 where the connectors 2906 perform the method or procedure calls on behalf of a requesting/calling layer 2902/2925. Additionally or alternatively, the connectors 2906 may be middleware or "software glue," which connects two or more separate components by translating or adapting instructions/commands obtained from one layer 2902/2925 into instructions/commands that can be understood by another layer 2902/2925. In these ways, individual layers 2925/2902 may be replaced with new/different layers 2925/2902 without requiring each remaining layer 2925/2902 to be updated to communicate with the new/different layers 2925/2902. Therefore, the LPPS 2900 may provide relatively easy abstraction since each layer 2925/2902 is loosely coupled from one another. Additionally, in some embodiments (e.g., where one or more of the layers 2925 are operated by different edge servers 1530), the connectors 2906 may operate on top of one or more communication protocols, such as those discussed herein.

In some embodiments, the LPPS 2900 may be implemented as a centralized service wherein the various prediction layers 2925 and/or the LPP layer 2902 are located in one or more servers in one or more server farms or data centers (e.g., individual servers 1550 of FIG. 15). In other embodiments, the LPPS 2900 may be implemented as an edge computing service wherein the various prediction layers 2925 and/or the LPP layer 2902 are located in one or more edge servers 1536 deployed at the edge of a network (e.g., CN 1542, cloud 1544, or the like). In one example implementation, the plurality of prediction layers 2925 and the LPP layer 2902 are operated by the cloud 1544 of FIG. 15, such as by individual cloud compute nodes in the cloud 1544. In another example implementation, each of the prediction layers 2925 are operated by individual edge compute nodes 1536, and the LPP layer 2902 is operated by the cloud 1544. In another example implementation, each of the prediction layers 2925 are distributed across multiple edge compute nodes 1536. In another example implementation, each edge compute node 1536 operates a respective LPPS 2900. In any of the aforementioned implementations, each prediction layer 2925 and the LPP layer 2902 may be operated in respective VMs and/or isolated user-space instances (e.g., Docker® containers, Kubernetes™ provided by the Cloud Native Computing Foundation™, Linux Containers (LXC), etc.) in one or more cloud servers and/or edge compute nodes 1536. Other implementations are possible in other embodiments.

Figure 30:
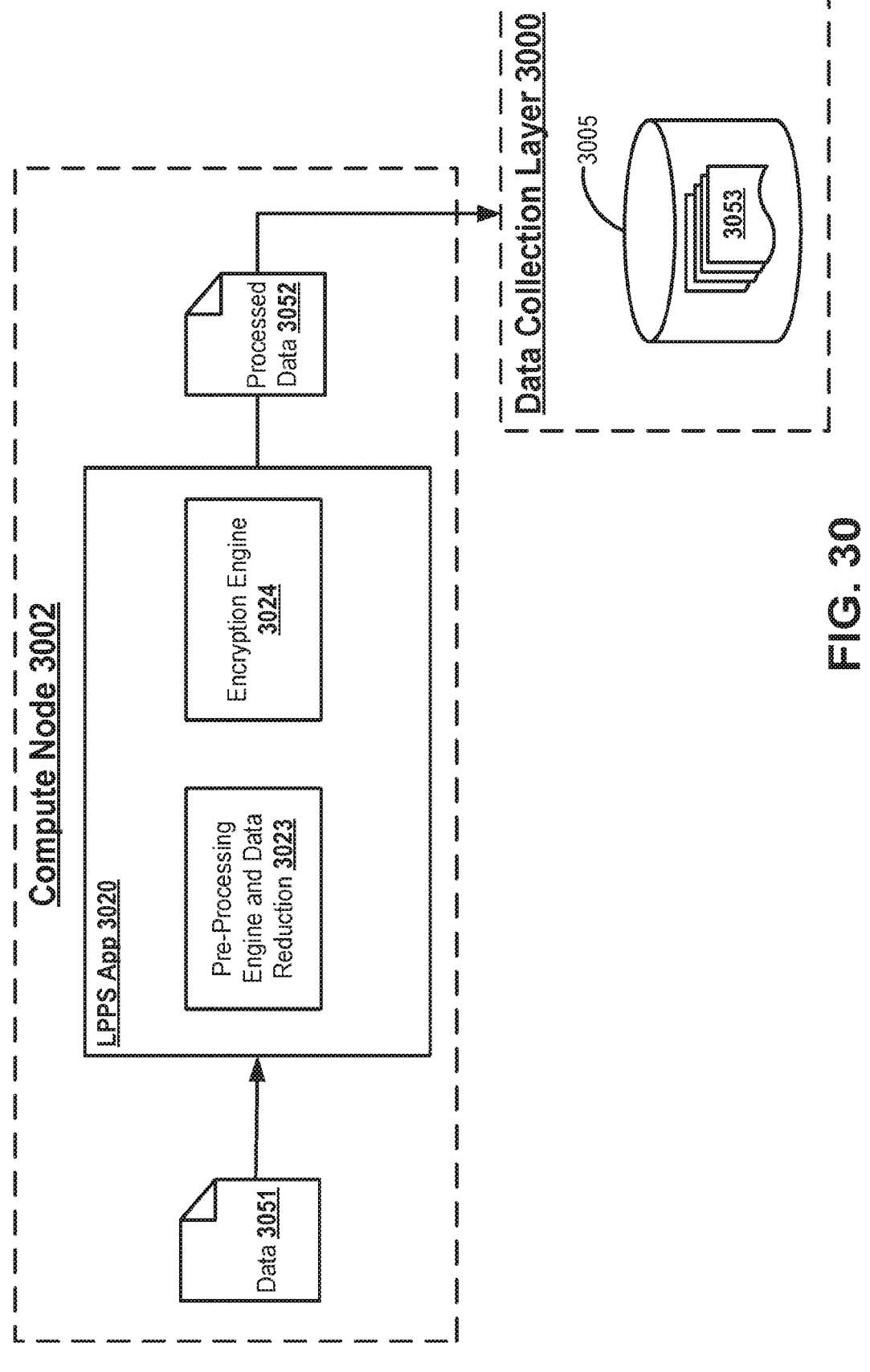
FIG. 30 depicts example logical components and interaction points of a data collection prediction layer in accordance with various embodiments.

FIG. 30 depicts example logical components and interaction points of a data collection prediction layer 3000 in accordance with various embodiments. The data collection layer 3000 (also referred to as a "feedback layer" or the like)

corresponds to one of the prediction layers 2925-1 to 2925-N of FIG. 29, and the compute node 3002 corresponds to a device or system from which data is to be collected, such as a UE 1511, 1521, a NAN 1531-1533, or the like. Additionally, the LPPS application (app) 3020 is an application to be operated by the compute node 3002, which obtains and/or collects data 3051 from various sources, performs various operations on the data 3051, and provides processed data 3052 to the data collection layer 3000. In some embodiments, the LPPS app 3020 may also be used to subscribe to, or consume, LPP notifications from the LPPS 2900 of FIG. 29 as discussed elsewhere herein.

In the example of FIG. 30, the LPPS app 3020 collects data 3051 (e.g., raw data), which is fed to a pre-processing engine 3023. The LPPS app 3020 may collect the data 3051 from various components of the compute node 3002 using suitable APIs, ABIs, drivers, libraries, etc. In some embodiments, the data collection layer 3000 may request or instruct the LPPS app 3020 to collect certain types of data 3051 such as one or more of the types of data/measurements discussed herein. This process may also be referred to as "feature extraction."

In an example, the LPPS app 3020 may use a suitable driver, API, etc., to collect signal measurement data from modem or baseband circuitry of the compute node 3002 (e.g., baseband circuitry 2410 of FIG. 24 or baseband circuitry 2510 of FIG. 25). In another example, the LPPS app 3020 may use individual drivers, APIs, etc., to collect processor utilization and memory utilization from processor circuitry of the compute node 3002 (e.g., application circuitry 2405 of FIG. 24 or processor circuitry 2502 of FIG. 25) and memory circuitry of the compute node 3002 (e.g., memory circuitry 2420 of FIG. 24 or memory circuitry 2504 of FIG. 25), respectively. In another example, the LPPS app 3020 may use respective APIs, ABIs, etc., to collect application parameters/data from various applications running on or stored by the compute node 3002. In another example, the LPPS app 3020 may use respective APIs, drivers, etc., to collect sensor data (e.g., speed/velocity data, position data, orientation data, etc.) from various sensors of the compute node 3002 (e.g., positioning circuitry 2445 of FIG. 24, sensor circuitry 2521 and/or positioning circuitry 2545 of FIG. 25, etc.). The LPPS app 3020 may additionally or alternatively collect data from the compute node 3002 according to other methods or techniques.

The pre-processing engine 3023 performs various preprocessing and/or data reduction operations on the data 3051, which may include, inter alia, converting the data 3051 into digital data (e.g., where data 3051 comprises analog signals or samples of such signals), normalizing (e.g., indexing, partitioning, augmenting, re-formatting, canonicalizing, etc.), editing, scaling, encoding, sorting, ordering, collating, and/or performing other transformations on the data 3051. The pre-processing engine 3023 may also remove out-of-range values from the data 3051, impossible combinations of data, removing corrupt or inaccurate data, and/or the like. These pre-processing operations may be performed in order to ease the learning process of other prediction layers 2925.

The pre-processed data may then be passed to the encryption engine 3024 where the pre-processed data is encrypted using a suitable cipher or encryption algorithm to produce processed data 3052. The processed data 3052 is then sent to the data collection layer 3000. Additionally, the processed data 3052 may be packaged into appropriate messages for communication according to know mechanisms and protocols, such as those discussed herein.

In some embodiments, the LPPS app 3020 may be a user or client system, such as the UEs 1511, 1521 of FIG. 15, and/or the computing system 2500 of FIG. 25. In these embodiments, the data 3051 collected by the LPPS app 3020 and/or the data 3052 provided to the data collection layer 3000 may include, for example, cell identifier (ID) of a cell on which the LPPS app 3020 is currently camping, a network ID of a NAN 1531-1533 to which the LPPS app 3020 is attached, position information or geolocation of the NAN 1531-1533; a network ID of an edge compute node 1536 providing services to the compute node 3002 (if any); position information or geolocation of the edge compute node 1536 (if any); a compute node ID, mobility state information (e.g. whether the LPPS app 3020 is moving or stationary, as well as speed and direction of travel), operational parameters, measurement information (e.g., channel state and/or quality measurements of fronthaul links 1503, 1505, and/or 1507, BW measurements, latency measurements, etc.), GPS/GNSS information of the compute node 3002 (e.g., geolocation information and speed/direction of movement from positioning circuitry 2545 of FIG. 25 or the like), navigation application information (e.g., planned route or journey configuration or the like), and/or other like data. In these embodiments, the compute node ID may be a raw ID, obfuscated ID, or temporary ID. As examples, the compute node ID may be an International Mobile Subscriber Identity (IMSI); Mobile Station International Subscriber Directory Number (MSISDN); a Radio Network Temporary Identifier (RNTI) including a cell-RNTI (C-RNTI), temporary C-RNTI, random access (RA)-RNTI, and/or any other RNTI(s) such as those discussed by 3GPP TS 38.300, 3GPP TS 36.300, and/or TS 36.401; a Subscriber or SAE Temporary Mobile Subscriber Identity (S-TMSI), Subscription Permanent ID (SUPI), Globally Unique Temporary UE Identity (GUTI), a Media Access Control (MAC) address, an IP address, manufacturer/device serial number(s) including component serial number(s), and/or the like.

In some embodiments, the LPPS app 3020 may be a NAN 1531-1533 and/or the infrastructure equipment 2400 of FIG. 24. In these embodiments, the data 3051 collected by the LPPS app 3020 and/or the data 3052 provided to the data collection layer 3000 may include, for example, cell ID assigned to the NAN 1531-1533, a network to which the LPPS app 3020 belongs, compute node ID, operational parameters, measurement information (e.g., channel state and/or quality measurements of fronthaul links 1503 and/or 1507, channel state and/or quality measurements of backhaul links/interfaces, BW measurements, latency measurements, etc.), GPS/GNSS information (e.g., geolocation information from positioning circuitry 2445 of FIG. 24 or the like), and/or other like data. In these embodiments, the data 3051, 3052, 3053 related to the NAN 1531-1533 may be referred to as "NAN characteristics" or the like. In these embodiments, the compute node ID may be a raw ID, obfuscated ID, or temporary ID. As examples, the compute node ID may be a Global eNB ID, a gNB ID, a Global gNB ID, an NG-RAN ID such as any of those discussed in 3GPP TS 38.401, Access Point Name (APN), MAC address, an IP address, manufacturer/device serial number(s) including component serial number(s), and/or the like.

In either of the aforementioned embodiments, the cell ID may include, for example, a E-UTRAN Cell Global Identifier (ECGI), an NR Cell Global Identifier (NCGI), a Service Set Identifier (SSID), or the like. In either of the aforementioned embodiments, the network ID may be, for example, a domain name, a Fully Qualified Domain Name (FQDN), a Public Land Mobile Network (PLMN) ID, Service Area Identifier (SAI), Shared Network Area ID (SNA-ID), Data Network Name (DNN), Network Slice Selection Assistance Information (NSSAI), Network Access ID (NAI), an enterprise network ID, or some other suitable network identity information.

In either of the aforementioned embodiments, the operational parameters may include information regarding the device/equipment capabilities, as well as contexts and/or constraints under which the compute node 3002 (or the LPPS app 3020) is operating. Examples of the operational parameters may include configuration information or UE/equipment model (e.g., a hardware platform make and model, hardware component types and arrangement within the hardware platform, associated peripheral and/or attached devices/systems, processor architecture, currently running operating systems and/or applications and/or their requirements, etc.), subscription data (e.g., data plan and permissions for network access), security levels or permissions (e.g., possible authentication and/or authorization required to access the LPPS app 3020), etc.); computational capacity (e.g., a total or maximum processor speed of one or more processors, a total number of VMs capable of being operated by the LPPS app 3020, a memory or storage size/capacity, an average computation time per workload, a reuse degree of computational resources, etc.); current or predicted computational load and/or computational resources (e.g., processor utilization or occupied processor resources, memory or storage utilization, etc.); current or predicted unoccupied computational resources (e.g., available or unused memory and/or processor resources, available VMs, etc.); network/ communication capabilities (e.g., UE capabilities as defined by 3GPP/ETSI standards, communication interfaces/circuitries of the compute node (e.g., WiFi, LTE/NR, Bluetooth/ BLE, NFC, Ethernet, and/or other like chipsets), link adaptation capabilities, configured and/or maximum transmit power, achievable data rate per channel usage, antenna configurations, supported RATs, supported functionalities of each supported RAT, subscription information of the LPPS app 3020, etc.); energy budget (e.g., battery power budget); and/or other like capabilities.

The operational contexts and/or constraints may also indicate any type of information about how a particular compute node is operating and/or the conditions under which the LPPS app 3020 is operating. The operational contexts and/or constraints include, for example, an operational state of the LPPS app 3020 (e.g., an on/off state of the LPPS app 3020, whether the LPPS app 3020 is in an idle mode, sleep mode, active state, etc., a currently running activity/application instance and any paused activities/application instances, etc.); a time of day and/or a date that the operational parameters, measurements, etc. are reported and/or collected; overload conditions experienced by the LPPS app 3020; application parameters such as computational needs, input/output characteristics, and volume of exchanged data with an edge compute node 1536, or the like; conditions of individual hardware components (e.g., temperature, load, utilization, current or predicted available power, energy consumption measurements, etc.); environmental information of an environment surrounding a LPPS app 3020 (e.g., temperature, ambient light, sound/volume, altitude, humidity, moisture, information/data related to geographic objects (e.g., mountains) and/or human-created objects (e.g., buildings, highways, etc.), weather data for a given location, the geolocation or other positioning information, and/or other like environmental measurements); operating system (OS) and/or application parameters and requirements; and/or other like contextual information.

The fronthaul and/or backhaul link conditions may include network performance information related to network traffic measurements (e.g., measurements of the amount and type of traffic flowing through or across one or more network nodes), as well as various performance measurements. The performance measurements may include information/data related to BW, channel/link throughput and/or data rate, latency, jitter, error rate, a number of active UEs 1511, 1521 and/or user sessions, packet delay, call and/or connection drops, loss rate, data volume measurements, round trip times (RTTs) and/or round-trip delay times (RTDs), QoS parameters, etc. The fronthaul link conditions may include the aforementioned traffic and performance measurements, as well as information/data related to signal strength measurements (e.g., reference signal received power (RSRP), received signal strength indicator (RSSI), etc.), signal quality measurements (e.g., reference signal received quality (RSRQ), energy per bit to noise power spectral density ratio (Eb/N0), signal-to-noise ratio (SNR), signal-to-interference-plus-noise ratio (SINR), etc.), channel state information (CSI), channel or network access information (e.g., a number of radio resource control (RRC) connection/setup/reconfiguration attempts, a number of random access and/or random access channel (RACH) attempts, a number of radio link failures (RLFs), a number of handovers (HOs)/HO attempts/HO failures, etc.), and/or other like measurement data such as those discussed elsewhere herein.

Any of the aforementioned operational parameters may be measured or otherwise determined stochastically or deterministically. The stochastic operational parameters (or stochastic components of the operational parameters) may be randomly determined or measured, or may have a random probability distribution or pattern that is analyzed statistically but may not be predicted precisely. The deterministic operational parameters (or deterministic components of the operational parameters) may be measurements or information produced without randomness. In other words, the deterministic operational parameters when measured or determined are likely to produce the same outcome given a particular situation and/or context.

In embodiments, the data 3052 may be stored in a database 3005 as records 3053 for later analysis by the different layers 2925. In these embodiments, the data 3052 may be loaded into the database 3005 and/or some other data store (not shown) and stored as database objects (DBOs), key-value pairs, and/or some other suitable data structure. In some embodiments, the data 3052 may be provided directly to the LPP engine 2902 for direct usage. As discussed in more detail infra, the data 3052/3053 may be used for other prediction layers 2925.

In some embodiments, the pre-processing engine 3023 phrases the data 3051 into a supervised learning problem, while in other embodiments, the data collection layer 3000 phrases the data 3052/3053 into a supervised learning problem. In other embodiments, other prediction layers that use the data 3052/3053 may phrase the data 3052/3053 individual for their respective ML models.

Figure 31:
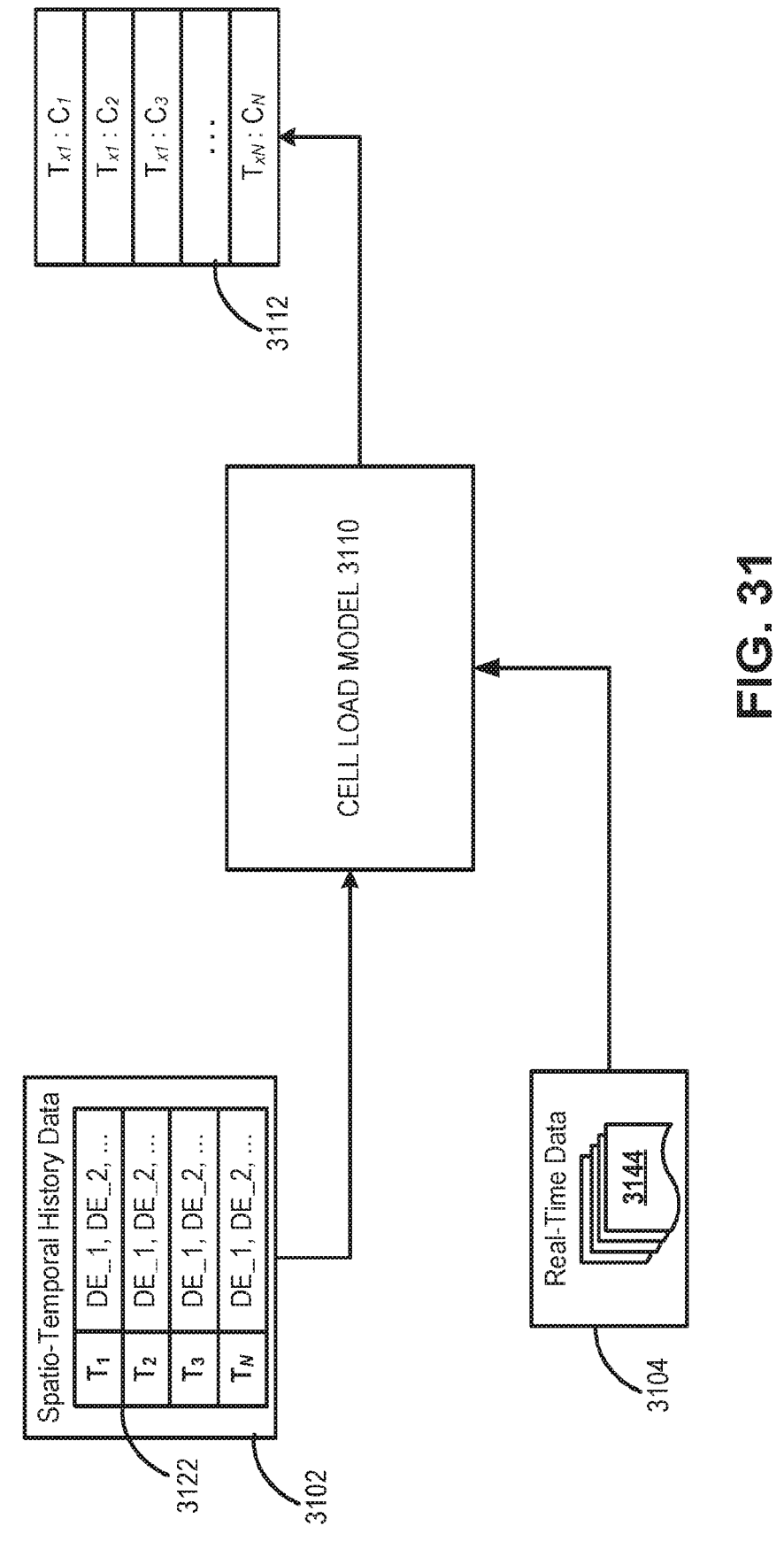
FIG. 31 illustrates an example cell load prediction layer according to various embodiments.

FIG. 31 illustrates an example cell load prediction layer 3100 according to various embodiments. The cell load prediction layer 3100 (also referred to as a "cell model layer" or the like) corresponds to one of the prediction layers 2925-1 to 2925-N of FIG. 29. The cell load prediction layer 3100 uses data that is specific to individual cells in order to produce performance metrics related the individual cells for current behaviors or to produce performance metrics related the individual cells for future predicted behaviors. In other words, the cell load layer 3100 determines, for each cell or NAN 1531-1533, predicted performance metrics (e.g., a predicted BW, and/or the like) given certain signaling/radio properties, position, operational parameters, time of day, and/or other like information about the compute node 3002 that was by the data collection layer 3000.

In embodiments, the cell load prediction layer 3100 can obtain and/or store cell characteristics, which is data or information about a particular cell and/or NAN 1531-1533 that provides that cell, such as the type of RAT(s) supported in or by the NAN 1531-1533 providing the cell, frequency band or spectrum supported in the cell, BW(s) and/or BW parts (BWPs) of the frequency band, a number of carrier frequencies in the frequency band, transmission range or size/shape of the cell, maximum and/or average transmit power of the NAN 1531-1533 providing the cell, geographic coordinates of the cell (or within the cell), and/or other like cell parameters or characteristics. For example, a first cell or NAN 1531-1533 providing an LTE cell may have different characteristics (e.g., maximum channel BW, total cell BW, etc.) than a second cell or NAN 1531-1533 providing a 5G/NR cell. In another example, cell or NAN 1531-1533 located in an industrial area or an urban environment may experience more noise or interference than a cell or NAN 1531-1533 located in a rural area. In another example, cell or NAN 1531-1533 located in an industrial area or an urban environment may have a smaller cell size/shape and/or maximum transmit power than a cell or NAN 1531-1533 located in a rural area. The various characteristics of a cell or NAN 1531-1533 may cause the cell or NAN 1531-1533 to exhibit different behaviors at different time instances under different operational parameters or constraints.

Additionally, the cell load prediction layer 3100 includes one or both of two prediction sub-layers, namely spatial-temporal history layer 3102 and a real-time load layer 3104. The spatial-temporal-history layer 3102 analyses spatial-temporal-history data 3122 of the various link performance prediction options (e.g., predicted BW, predicted latency, etc.) for different scenarios such as different destinations, cell loads, signal quality, time of day, day of the week, date, special events, and/or the like. The spatial-temporal-history data 3122 may include data/measurements 3052, 3053 collected from the compute node 3002 and/or the data collection layer 3000 of FIG. 30 at previous time instances (e.g., in the past), predicted performance metrics computed for the compute node 3002 at previous time instances, and/or link performance predictions computed for the compute node 3002 at previous time instances.

The spatial-temporal-history data 3122 may be stored in a database and represented as timed data structure. In the example of FIG. 31, the spatial-temporal-history data 3122 includes records or database objects for respective time instances including a first time instance ($T_1$), a second time instance ($T_2$), a third time instance ($T_3$), up to an Nth time instance ($T_N$) where N is a number. Each of these records or database objects includes one or more data elements (DEs) such as a first DE (DE_1), a second DE (DE_2), and so forth. As an example, a value of DE_1 in each record or database object may be a BW measurement taken at each of time instances $T_1$-$T_N$, a value of DE_2 in each record or database object may be a cell load measurement taken at each of time instances $T_1$-$T_N$, The real-time load layer 3104 processes incoming real-time data 3144 from a network operator (or CN 1542, cloud 1544, or the like) about the cell's load. The real-time data 3144 may indicate the cell's current or most up-to-date load parameters, but could also include historic data pertaining to the cell's loads, which can then in turn be communicated over to the spatial-temporal history layer 3102. In one implementation, the real-time data 3144 may be a suitable message including an information element (IE), field, or other like data structure, which contains a value. The value could be an enumerated value (e.g., one of "Low Load", "Medium Load", "High Load", "Overload") or one of a range of values indicated an amount of occupied or utilized network resources (e.g., an integer from 1 to M, where M is a number such as a maximum number of PRBs or a maximum number of BWs or BWPs).

As shown by FIG. 31, the spatial-temporal-history data 3122 and the real-time data 3144 (or subsets thereof) are supplied to the cell load model 3110, which is a machine learning (ML) model used to predict one or more cell characteristics, such as an expected cell performance at a given location and time instance. In embodiments, individual cell load models 3110 may be generated for respective cells or NANs 1531-1533. In some embodiments, the cell load model 3110 is generated from one or more ML algorithms using a sample of the spatial-temporal-history data 3122 and the real-time data 3144 during a training phase. In such embodiments, the cell load model 3110 makes predictions on new or different versions or datasets of the spatial-temporal-history data 3122 and the real-time data 3144. In various embodiments, the cell load model 3110 may be further refined or updated based on new/updated datasets.

In some embodiments, the cell load model 3110 may be a Recurrent Neural Network (RNN) with a Long Short Term Memory (LSTM). RNNs are a type of neural network having connections between nodes form a directed graph along a temporal sequence, which allows temporal patterns to be identified in time-series data. RNNs can use their internal state (e.g., stored in memory) to process sequences of inputs, and keep track of arbitrary long-term dependencies in the input sequences. In such embodiments, the cell load model 3110 comprises one or more cells (e.g., memory cells) to store values over arbitrary time intervals, an input gate to control a flow of new values into the cell(s), a forget gate to control whether values in the cell(s) remain in the cell(s), and an output gate to control whether the values in the cell(s) is/are used to compute an output activation of the cell load model 3110. Weights assigned to the connections between the gates may be determined during the training phase, and these weights may determine how the gates operate.

In some embodiments, the cell load model 3110 (or the data collection layer 3000 or the pre-processing engine 3023 of FIG. 30) phrases the spatial-temporal-history data 3122 and the real-time data 3144 (or the data 3051, 3052, 3053 of FIG. 30) into a supervised learning problem, wherein the data is arranged into a set of input and output pairs. During the training phase, the cell load model 3110 is provided with the set of input and output pairs and learns an association between the pairs. Additionally, the training targets for individual cell load models 3110 may be different from one another since each cell load model 3110 may have to learn different behaviors depending on the cell characteristics of its corresponding cell or NAN 1531-1533.

The cell characteristic predictions output by the cell load model 3110 may include any of the aforementioned cell characteristic types (e.g., predicted BW. Predicted cell load, etc.). The predicted cell characteristics are output by the cell load model 3110 as a time series data structure 3112. In the example of FIG. 31, the time series data structure 3112 includes a cell characteristic prediction (C) for each future time instance ($T_{xi}$). For example, as shown by FIG. 31, the time series data structure 3112 includes a first cell characteristic prediction ($C_1$) for a first future time instance ($T_{x1}$), a second cell characteristic prediction ($C_2$) for a second future time instance ($T_{x2}$) up to an Nth cell characteristic prediction ($C_N$) for a second future time instance ($T_x$) where N is a number. Once generated, the time series data structure 3112 is provided to the LPP layer 2902 for data fusion.

Figure 32:
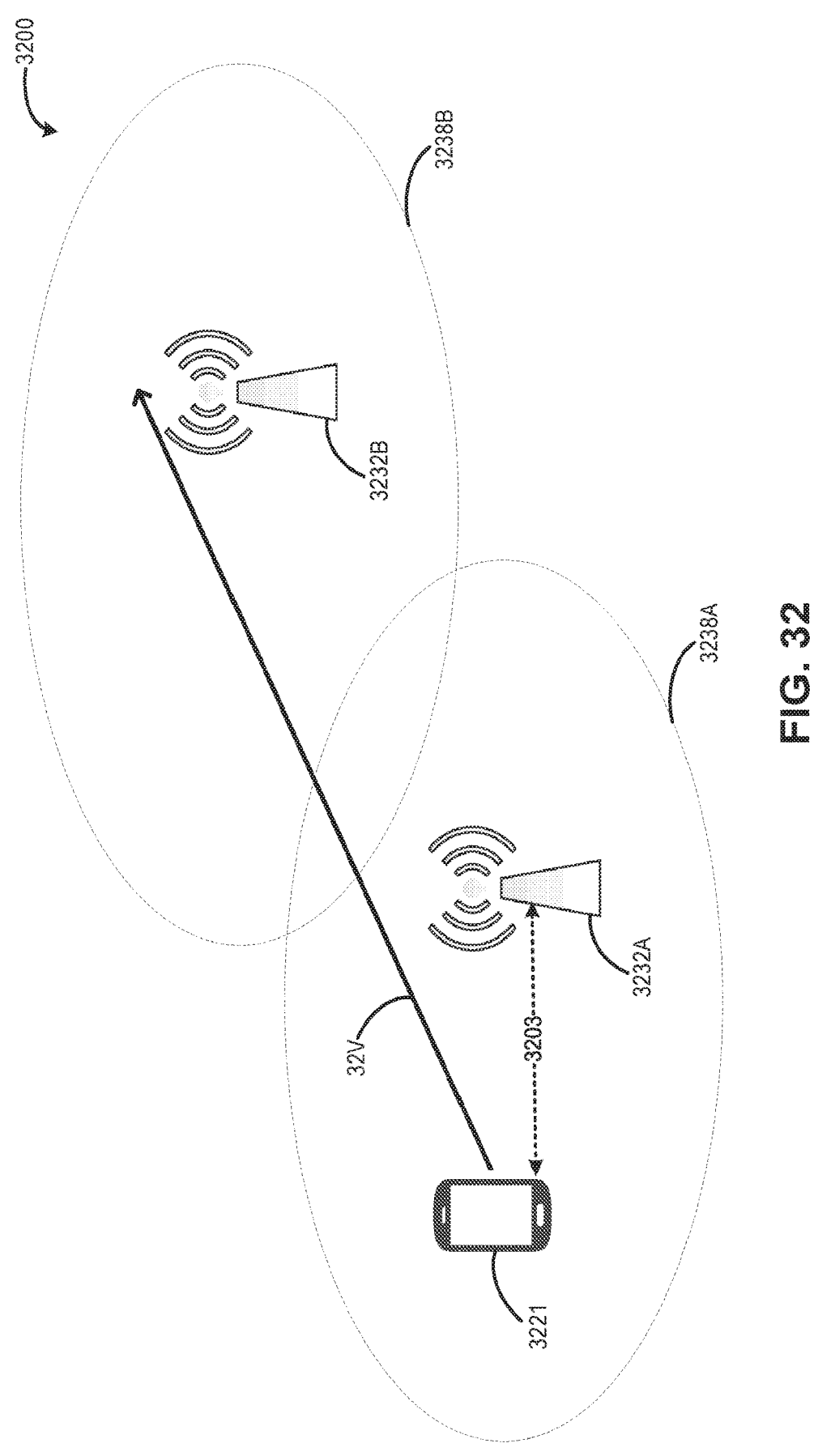
FIG. 32 shows a scenario involving intra-cell characteristic predictions according to various embodiments.

FIG. 32 shows a scenario 3200 involving intra-cell characteristic predictions according to various embodiments. In scenario 3200, the UE 3221 may be the same or similar to the UEs 1521, 1522 of FIG. 15 and/or the compute node 3002 of FIG. 30; the link 3203 may be the same or similar as the link 1503 of FIG. 15; and the NANs 3232A and 3232B may be the same or similar as the NANS 1531-1532 of FIG. 15.

In scenario 3200, the NANs 3232A and 3232B are configured to provide communication services in respective cells 3238A and 3238B. Additionally, the UE 3221 is traveling through cell 3238A and will eventually be handed over from NAN 3232A to NAN 3232B when the UE 3221 approaches an edge of the cell 3238A and/or enters cell 3238B. The travel direction of the UE 3221 is represented by the vector line 32V.

In embodiments, one of the prediction layers 2925 includes an intra-cell layer, which may have a same or similar structure/implementation as the cell load prediction layer 3100 of FIG. 31, and/or may operate in a same or similar manner as the cell load prediction layer 3100 of FIG. 31. In embodiments, an intra-cell layer may be generated for each cell 3238 or NAN 3232. The cell load prediction layer 3100 is used to predict BW and cell load at a given time instance, whereas the intra-cell layer 2925 is used to predict signal quality and/or signal strength taking into account UE 3221 mobility as well as one or more other parameters. As mentioned previously with respect to FIGS. 30-31, the data collection layer 3000 collects and stores spatio-temporal history data, which may be done on a continuous or periodic basis, and updated or new temporal spatio-temporal history data is used to train and further refine the cell load model 3110 to provide better and/or more accurate predicted performance metrics. Similarly, the intra-cell layer 2925 utilizes the spatio-temporal history data and/or real-time load data to identify or determine how signal properties change over time and space.

In these embodiments, the intra-cell layer 2925 analyses a change in signal quality (e.g., using RSRQ, SNR, SINR, and/or the like) and/or signal strength (e.g., using RSSI, RSRP, and/or the like) using known or predicted movement patterns, and predicts how these signal parameters will change for a given UE 3221 at a given time instance and/or at a particular position or geolocation within a cell 3238A-B. For instance, and with reference to FIG. 32, when the UE 3221 travels through cell 3238A, the signal strength and/or quality of link 3203 may increase and/or improve as the UE 3221 moves closer to NAN 3232A, and the signal strength and/or quality of link 3203 may decrease and/or degrade as the UE 3221 moves away from NAN 3232A and approaches cell 3238B. Additionally, when the UE 3221 is handed over to cell 3238B from cell 3238A, the signal strength or quality is weak or degraded but then increases or improves as the UE 3221 moves toward the NAN 3232B and/or closer to the center of cell 3238B. As the UE 3221 moves closer to the edge of cell 3238B, the signal strength/quality will decrease, and finally the UE 3221 will be handed over to another cell (not shown by FIG. 32). In a different scenario with a small-angle directional antenna the signal will start to weakened/decrease and may increase/improve until a peak at which point the UE 3221 is handed over to another cell. Additionally or alternatively, signal strength/quality may degrade as the UE 3221 approaches physical objects in a cell 3238, such as man-made or natural objects that may obstruct or otherwise block a line-of-sight (LoS) between the UE 3221 and the NAN 3232.

Similar to the cell load layer 3100, intra-cell layer 2925 may include a spatial-temporal history sublayer and/or a real-time load sublayer, which collect and record, in suitable data structures, signal strength/quality measurements with respect to time/date and position/geolocation in a same or similar manner as described previously with respect to spatial-temporal history layer 3102 and real-time load layer 3104 of FIG. 31. In scenario 3200, these sublayers may track the signal strength/quality increase and decreases as the UE 3221 travels from cell 3238A to cell 3238B. Additionally, the intra-cell layer may output predicted intra-cell performance metrics in a time series data structure similar to the time series data structure 3112 of FIG. 31. The predicted intra-cell performance metrics output by the intra-cell layer may include, for example, a predicted signal strength or signal quality at a given position within a cell 3238 at a particular time instance.

In some embodiments, the intra-cell layer 2925 may not use exact physical locations (or geolocations) of the UE 3221, and instead may use predicted or known movement patterns for predicting the signal strength/quality. For example, the movement direction 32V may be a known direction when the NANs 3232A-B are deployed along a road, a railway, or currently observed velocity changes (delta) versus typically observed speeds/velocities which may be cause by, for example, traffic running slower than normal due to an automobile accident. Additionally, the travel speed may also be predicted based on, for example, a speed limit of the road or known train traveling speeds. These aspects are discussed in more detail with respect to FIGS. 33-34.

Figure 33:
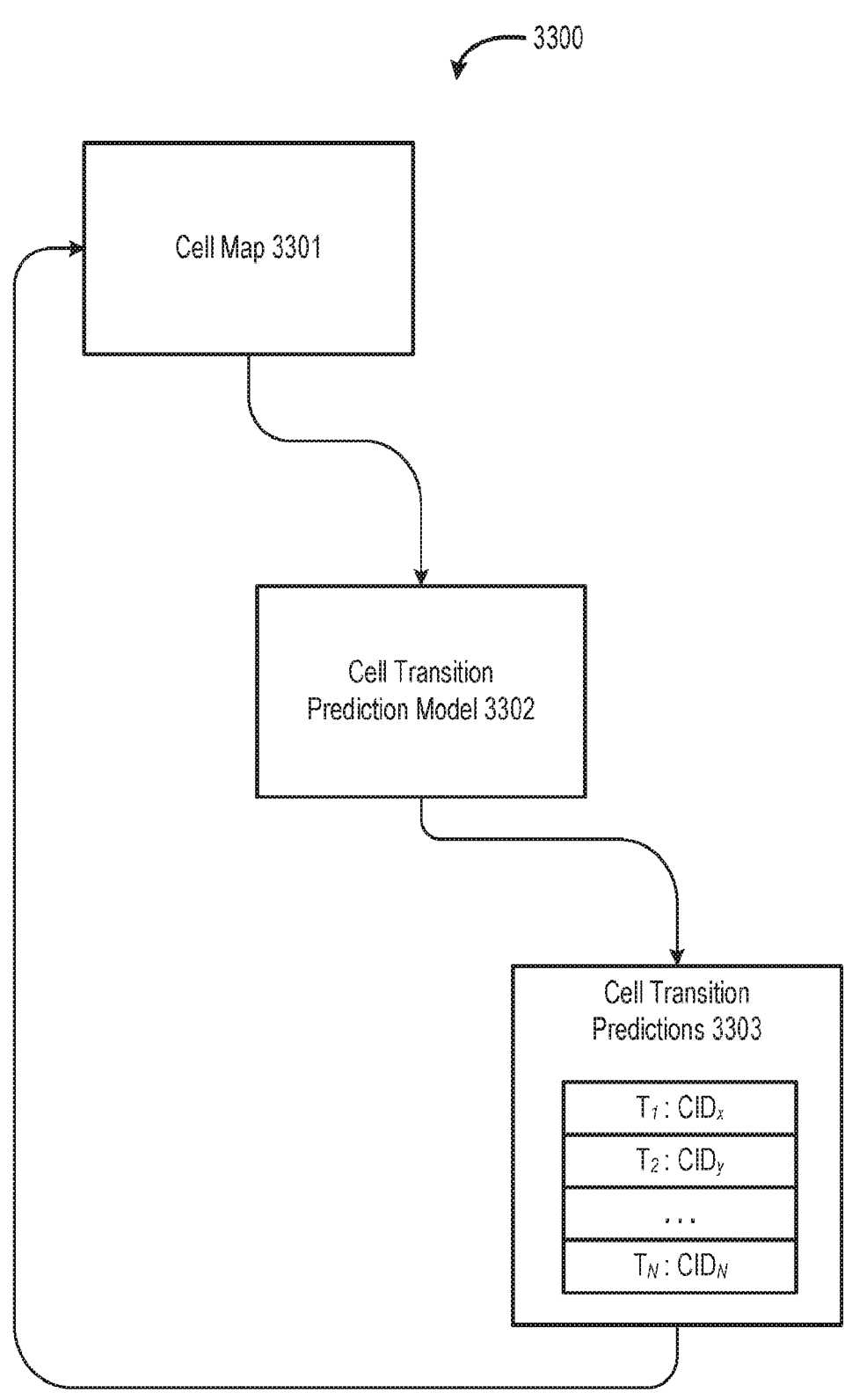
FIG. 33 depicts an example cell transition prediction layer according to various embodiments.

FIG. 33 depicts an example cell transition prediction layer 3300 according to various embodiments. The cell transition layer 3300 is used to predict how a UE transitions between cells based on cell map 3301, the spatio-temporal history data discussed previously, and real-time data discussed previously. The cell map 3301 is a logical and/or mathematical representation of a group of cells or NANs 1531-1533 in a given region or deployment area, and may include for example, a graph data structure such as a tree or arborescence graph. In some embodiments, the cell map 3301 can be pre-configured or otherwise supplied by a network operator that owns, operates, and/or has deployed the cells or NANs 1531-1533. In some embodiments, a graph drawing algorithm may be used to generate the graph data structure 3301 based on positioning information (e.g., geolocation coordinates) of one or more NANs 1531-1533 and/or other like data.

Initially, the cell map 3301 may include or represent the topology of various cells (or NANs 1531-1533) and a subset of spatio-temporal history data indicating UE travel directions and speeds. Additionally, the cell transition predictions 3303 may also be based on other parameters besides travel speed and direction. For example, UEs 1511, 1521 could be handed over to cells/NANs 1531-1533 experiencing better radio conditions than other cells/NANs 1531-1533, or cells/NANs 1531-1533 having less load characteristics than other cells/NANs 1531-1533. In some embodiments, this subset of the spatio-temporal history data may include cell handover history for the cells represented in the cell map 3301. In such embodiments, the cell map 3301 may be a graph data structure that includes nodes representing each cell and edges between the nodes representing a number of handovers between the nodes representing those cells. Alternatively, the edges between the nodes may represent a probability of handover between the nodes representing those cells, which may be based on the number of handovers taking place between the cells, a time that the handovers took place, and/or other like spatio-temporal history data. In either of these embodiments, the edges may also represent a direction of travel from one node (cell) to another node (cell). After this initial cell map 3301 is processed by the cell transition prediction layer 3300, the cell map 3301 may include or represent cell transition predictions. In such embodiments, the cell map 3301 may be a graph data structure that includes nodes representing each cell and edges between the nodes representing a direction, time, and probability of transition.

Next, the cell map 3301 is fed into a cell transition prediction model 3302, which uses one or more ML techniques to learn the cell transitions and/or UE traveling behaviors using the collected spatio-temporal history data discussed previously with respect to FIGS. 30-32. In various embodiments, the cell transition prediction model 3302 is trained using a sequence prediction algorithm, and is stored in or as a suitable data structure. Sequence prediction is an ML and/or deep learning problem that is used to predict the likelihood that an event of a sequence will occur by only observing the previous events of that sequence. In embodiments, after training, real time cell transitions prediction takes place by supplying the cell prediction model 3302 with relatively recent spatial-temporal history data (e.g., current cell, a previous cell, UE mobility information (e.g., travel direction and speed), current operational parameters of one or more UEs, and/or the like).

In some cases, UEs may travel along a fairly deterministic path, such as when the cells/NANs 1531-1533 in the cell map 3301 are deployed along a set of train tracks, in or around a subway, a road or highway, or the like, at least when compared to scenarios where users are randomly traveling around a city or the like. However, even within a relatively crowded city there are typically, cells/NANs 1531-1533 are not usually deployed in a manner that would allow UEs to attach to a random cell/NAN 1531-1533. Instead, there are usually a limited number of cells/NANs 1531-1533 near a given cell/NAN 1531-1533 to which a UE can attach. In some more rare cases, a UE could be attached to a first cell/NAN 1531-1533 and then attach to a second cell/NAN 1531-1533 that is not neighbor of the first cell/NAN 1531-1533 such as, for example, when a user travels in an elevator, travels from one subway station to another subway station, or when a UE is turned off and turned back on at a later time in another location. Even in these rarer cases, UEs usually travel in a somewhat deterministic manner, such that there may not be very many options for a UE to transition to a non-neighboring cell/NAN 1531-1533. For example, after entering a first subway station, there will likely be a relatively small number of potential cells/NANs 1531-1533 that a UE could transition to after traveling on the subway, assuming that there are only a small number of cells/NANs 1531-1533 at each subway station in the subway system. In any of the aforementioned scenarios, there are relatively few cells/NANs 1531-1533 that a UE can transition to given a current cell/NAN 1531-1533. And, the cell transition prediction layer 3300 lists the different options for cell transition and the probability for those options.

In one embodiment, the sequence prediction algorithm is a Compact Prediction Tree (CPT) algorithm. A CPT comprises three data structures: a prediction tree (PT), an inverted Index (II), and a lookup table (LT). The PT is recursively defined node containing an item, a list of children nodes, and a pointer to its parent node. A sequence is represented within a tree data structure as a full branch or a partial branch starting from a direct child of the root node. The prediction tree is constructed by checking if a current node has a direct child matching the first item of the sequence. If it does not, a new child is inserted to the root node with a value of the first item. Then a newly created child node becomes the current node, and the process is repeated for the next item in the training sequence. The II quickly finds in which sequences a given item appears. The II is a hash table containing a key for each unique item encountered during the training, where each key leads to a bitset that indicates IDs of the sequences where the item appears. A bitset contains n bits, where n is the number of training sequences. The presence of an item in the s-th sequence is indicated by setting the s-th bit to 1 in its bitset, and 0 otherwise. The LT contains sequence IDs, each of which points to the last node of the sequence in the PT. The LT is updated after each sequence insertion in the PT. Training is done using a training dataset including a set of sequences (e.g., the initial cell map 3301 discussed previously, or a cell map 3301 included previously predicted cell transitions), and sequences are inserted one at a time in the PT and the II. Prediction for a given sequence S (e.g., cell transitions of the cell map 3301) by performing the intersection of the bitsets of the last x items from the sequence S, where x is a number. The resulting bitset indicates a set of sequences Y that is/are similar to sequence S. For each similar sequence Y, each item of a consequent with respect to the sequence S is stored in a count table (CT). The consequent of a sequence Y with respect to a sequence S is the subsequence of sequence Y starting after the last item in common with sequence S until the end of sequence Y. The CT stores candidate items in association with a corresponding score. For example, the CT is a hash table where the candidate items are keys and the scores the associated values. The score for a candidate item represents the likelihood that the candidate item is the next item in the similar sequence Y. The item with the highest score within the CT is the predicted item.

In another embodiment, the sequence prediction algorithm is a random decision forest (also referred to as "random forest" or "random forest regression") algorithm. In this embodiment, the cell transition prediction model 3302 constructs a tree data structure by splitting a source dataset into subsets that constitute successor child nodes. The splitting is based on select a random subset of features for each candidate split in the decision tree. Splitting is repeated on each derived subset in a recursive manner. Then bootstrap aggregation is performed by building multiple decision trees (e.g., an "ensemble") by repeatedly resampling the training dataset with replacement. Then the cell transition prediction model 3302 predicts the cell transitions by aggregating the predictions of the ensemble. The aggregation may be performed by averaging the predictions from all the individual trees or by taking a majority vote.

In another embodiment, the sequence prediction algorithm is a Graph Traversal (or graph search) algorithm such as Breadth First Search (BFS), Depth First Search (DFS) algorithms, or the like. In BFS, the cell transition prediction model 3302 may start from a selected node in the cell map 3301, such as a current cell in which a UE is camping, and explores all neighboring nodes at a present depth prior to moving on to the nodes at the next depth level. In DFS, the cell transition prediction model 3302 may start from a selected node, such as a current cell in which a UE is camping, and traverses each edge in the cell map 3301 by exploring as far as possible along each branch from the starting node before backtracking. In either of these embodiments, the cell transition prediction model 3302 may traverse the cell map 3301 in order of handover or transition probability.

During the prediction phase, the cell transition prediction model 3302 outputs cell transition predictions 3303, which includes a listing or other indication of the next cells the UE may transition to a different time instances. In the example of FIG. 33, the cell transition predictions 3303 include a cell ID (CID) (e.g., $CID_1$ to $CID_N$) for each future time instance (e.g., $T_1 \circ T_N$). In some embodiments, the cell transition prediction 3303 may be fed back into the cell map 3301, which may then be fed into the cell transition prediction layer 3302 for updated or refined cell transition predictions 3303.

Figure 34:
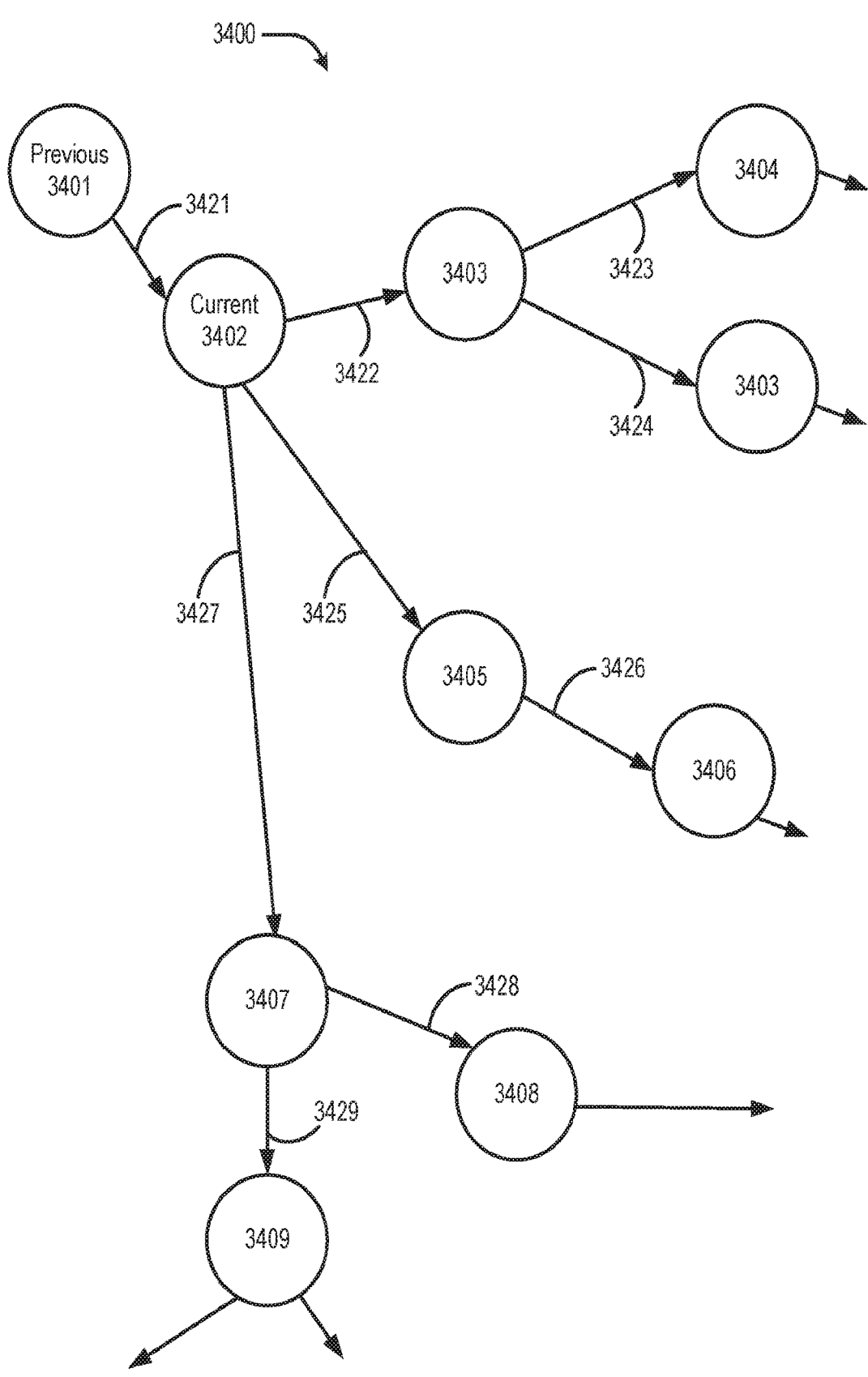
FIG. 34 illustrates an example cell transition graph according to an example embodiment.

Referring now to FIG. 34, which illustrates an example cell transition graph 3400 according to an example embodiment. The cell transition graph 3400 is a graph data structure mathematically representing cells in a cell map to which a UE (e.g., the UEs 1511, 1521 of FIG. 15, the compute node 3002 of FIG. 30, and/or the UE 3221 of FIG. 32) has or may travel. As an example, the cell transition graph 3400 may be output by the cell transition prediction layer 3302 of FIG. 33 as cell transition predictions 3303 (see e.g., FIG. 33), and/or may be fed into the cell transition prediction layer 3302 as or with a cell map 3301 for further refinement of the cell transition predictions 3303.

A "graph" in this context refers to a data structure or data type that comprises a number of (or set of) nodes (also referred to as "vertices," "points," or "objects"), which are connected by a number of (or set of) edges, arcs, or lines. In the example of FIG. 29, the cell transition graph 3400 includes 10 nodes including a previous cell 3401, a current cell 3402, and multiple potential cells 3403 to 3409 (collectively referred to as "potential cells 3403-3409" or the like). Additionally, the previous cell 3401 is connected to the current cell 3402 by edge 3421; the current cell 3402 is connected to potential cell 3403 by edge 3422; the potential cell 3403 is connected to potential cell 3404 by edge 3423; the potential cell 3403 is connected to potential cell 3403 by edge 3424; the current cell 3402 is connected to potential cell 3405 by edge 3425; the potential cell 3405 is connected to potential cell 3406 by edge 3426; the current cell 3402 is connected to potential cell 3407 by edge 3427; the potential cell 3407 is connected to potential cell 3408 by edge 3428; and the potential cell 3408 is connected to potential cell 3409 by edge 3429. Additionally, in some embodiments, the cells 3401-3409 include numbers that may represent an identifier of the cell or NAN 1531-1533 such as a global base station ID (e.g., global gNB ID, global eNB ID, global ng-eNB ID, global en-gNB ID, WiFi AP (globally unique) MAC address, etc.), a Cell Global Identifier (CGI) (e.g., NR CGI, E-UTRAN CGI (ECGI), WiFi AP SSID, etc.), or some other identifier.

A graph may be an undirected graph having edges having no orientation and/or pairs of nodes are unordered, or a directed graph having edges with an orientation or pairs of vertices that are ordered. An edge has two or more vertices to which it is attached, called endpoints. Edges may also be directed or undirected; undirected edges are referred to as "lines" and directed edges are referred to as "arcs" or "arrows." The two or more vertices forming an edge may be referred to as the "endpoints" of that edge, and the edge is said to be incident to the vertices. The cell transition graph 3400 of FIG. 34 is a directed graph with directed edges 3421-3429. The edges 3421-3429 (or "arrows 3421-3429") represent a direction of travel from one cell to another cell, a time, and probability of a transition from one cell to another.

The probabilities of the edges 3421-3429 represent a probability or likelihood that the UE will transition to that cell 3405 based on the current cell 3402 in which the UE is camping. The probabilities may be based on various criteria such as an expected time in a cell, current relative speed for cell transitions, other UE change patterns, and/or other like information. Depending on available spatio-temporal history data, real-time data, and/or usage scenario, the cell transition layer can take the following parameters into consideration: generic client transition pattern, client specific motion pattern based on client specific identified provided by UE feedback, patterns dependent on time of day (e.g., to office in the morning, home in the afternoon), day of week (e.g. home earlier on Friday), patterns mapping to supported 3GPP radio standard (e.g. a client moved between LTE cells if currently in an LTE cell), abnormal patterns (e.g. all other clients take a detour around a roadwork on interstate), as well as relative transition time (e.g. road traffic moves slower than normal, determined by clients earlier transition times, other clients current transition time or Geographic positioning feedback, so time in cell is longer than normal).

A cell transition prediction layer (e.g., cell transition prediction layer 3300 of FIG. 33) handles the respective cells logical relationship and how the UE transitions between cells. The cell transition prediction layer (e.g., cell transition prediction layer 3300 of FIG. 33) uses the UE's current position (e.g., current cell 3402 in FIG. 34) as well as the spatio-temporal history data to produce a prediction of the potential cells 3403-3409 that may be visited, or a probability that the UE will transition to a given potential cell 3403-3409 at a particular future time instance, given the current cell 3402, a travel direction of the UE, the velocity of the UE, and/or other like information.

In addition to the cell transition prediction layer 3300 of FIG. 33 and discussed with respect to FIG. 34, the prediction layers 2925 may also include a geographic position prediction layer (not shown by FIGS. 33-34). The geographic position prediction layer considers the physical positions/locations of the cells/NANs 1531-1533 as well as UE position/location information. In various embodiments, the geographic position prediction layer maps or correlates radio signal properties or predictions determined by the cell load prediction layer 3100 of FIG. 31 to a physical positions/locations of UEs 1511, 1521, which may be collected by the data collection layer 3000 of FIG. 30. The geographic position prediction layer can also use real-time signal measurements collected by the data collection layer 3000 of FIG. 30, as well as traffic conditions determined by any of the prediction layers discussed herein.

The geographic position prediction layer may use various UE mobility information to determine a UE's geoposition, such as sensor data indicating a speed and direction of travel of a UE, GNSS data, mapping application or navigation application route data, turn-by-turn navigation data, signal based position calculations (e.g., based on signal strength measurements, triangulation, etc.), LTE location based services, and/or the like. In embodiments, the geographic position prediction layer generates a geoposition ML model for respective cells/NANs 1531-1533 using the UE mobility information (or a subset of the UE mobility information).

The geoposition ML model may be generated using any of the ML algorithms discussed herein or some other suitable ML algorithm. As mentioned previously, the geoposition ML model correlates the predicted signal quality for each UE with one or more measurements taken at the given geolocation at the one or more time instances. The geoposition ML model is then used to determine predicted signal quality for a given UE at a given geolocation at one or more time instances, which may be output as a suitable data structure similar to those discussed herein.

In addition to the cell transition prediction layer 3300 of FIG. 33 and discussed with respect to FIG. 34, the prediction layers 2925 may also include a network topology prediction layer (NTPL), which predicts performance of an overall route between a source node (e.g., a UE 1511, 1521, an edge compute node 1536, or server 1550 sending data) and a destination node (e.g., a UE 1511, 1521, an edge compute node 1536, or server 1550 receiving data). The NTPL considers parts of link performance other than parameters associated with the wireless connection itself. These other parts of link performance include, for example, intra-network and inter-network link (intra/inter-network link) performance as well as service provider load and location. The intra/inter-network link performance may be based on, for example, RAN backhaul connections, datacenter connections and topology, connections and topology of NFs in the CN 1542, connections to different service provider platforms, and/or the like. The NTPL analyzes the routes that traffic from a link 1503, 1505, 1507 will take to an intended destination, such as edge compute nodes 1536, CN 1542, cloud 1544, and/or server(s) 1550 of FIG. 15, including the individual hops or intermediary devices between the source and destination nodes. In some embodiments, the NTPL generates a network topology ML model (NTMM) using a network topology map and/or a subset of network element characteristics. The NTMM may be generated using any of the ML algorithms discussed herein and/or some other suitable ML algorithm. In one example, the ML algorithms/ models used to generate the NTMM may be the same as those used for the cell transition prediction layer 3300 of FIG. 33. After training, the NTMM is used to predict link quality for one or more backhaul links and/or for a given link 1503, 1505, 1507 based on the backhaul links in a route between the source and destination nodes.

For the intra/inter-network link performance prediction, the NTMM associates the connection topology (or network topology) with capacity and load levels of individual intra/ inter-network links. The NTMM may be trained on measured link performance to different service provider platforms (or individual servers 1550) locations in a network, or service provider platforms (or individual servers 1550) positions with respect to a position/location of each cell or NAN 1531-1533. In these embodiments, individual services provided by the service provider platforms (or individual servers 1550) are then mapped to a closest matching service provider platforms (or individual server 1550) position/ location. In embodiments, the NTMM uses correlation and pattern matching techniques to relate how different cells or NANs 1531-1533 view the service provider platform (or individual server 1550) positions/locations to speed up the learning and/or training process(es).

In some embodiments, the positions/locations of the service provider platforms, individual servers 1550, and/or network elements may be based on a network topology map. The network topology map may be the same or similar to the cell map 3301 of FIG. 33, but describes or represents the topology of a network operator's network where nodes represent various network elements and edges represent connections between the network elements. In some embodiments, the NTMM can be preconfigured with a network operator's backend topology information in a same or similar manner as discussed previously with respect to FIGS. 33-34. Additionally or alternatively, various ML techniques may be used to learn the relative positions/ locations of different endpoints/destination nodes, and how routes between different source and destination nodes change over time.

The network element characteristics used for the intra/ inter-network link performance prediction may include information such as load levels of individual network elements or servers 1550 at different times and/or load levels for different intra/inter-network links between network elements in a network. In some embodiments, the load on intra/inter-network links can be estimated based on capacity and load on cells. In some embodiments, load on intra/inter-network links can be measured by interfacing with network infrastructure in the network topology (e.g., switches, routers, server farm servers, edge compute nodes 1536, network elements in the CN 1542, etc.).

For the air-interface portion of the route performance prediction, the NTMM may obtain input data for each cell or NAN 1531-1533. This input data include, for example, a cell ID, cell load, noise and/or interference measurements (e.g., SNR or the like), signal strength, service provider server location, service provider server load, among other measurements or parameters. This information may be provided by the data collection layer 3000 of FIG. 30 and/or directly from the NANs 1531-1533 and/or UEs 1511, 1521. As alluded to previously, the amount of data that can be transmitted in a PRB affects the realized and/or perceived performance of a wireless network or a given link 1503, 1505, 1507, and the number of PRB slots is a function of cell load and the cell ID. Additionally, the slot bandwidth per-PRB is a function of noise measurements (and/or signal strength measurements) and the cell ID. The noise measurements and/or signal strength measurements are weakly dependent on each other, but this dependency is dependent on cell behavior. In embodiments, the total air interface performance is a function of these two functions (e.g., the number of PRB slots being a function of cell load and cell ID, and the slot bandwidth per-PRB being a function of noise measurements (and/or signal strength measurements) and cell ID) as well as a service provider server location and load. In such embodiments, the NTMM can include these functions, which may be trained using a suitable ML algorithm, such as a regression analysis.

Figure 35:
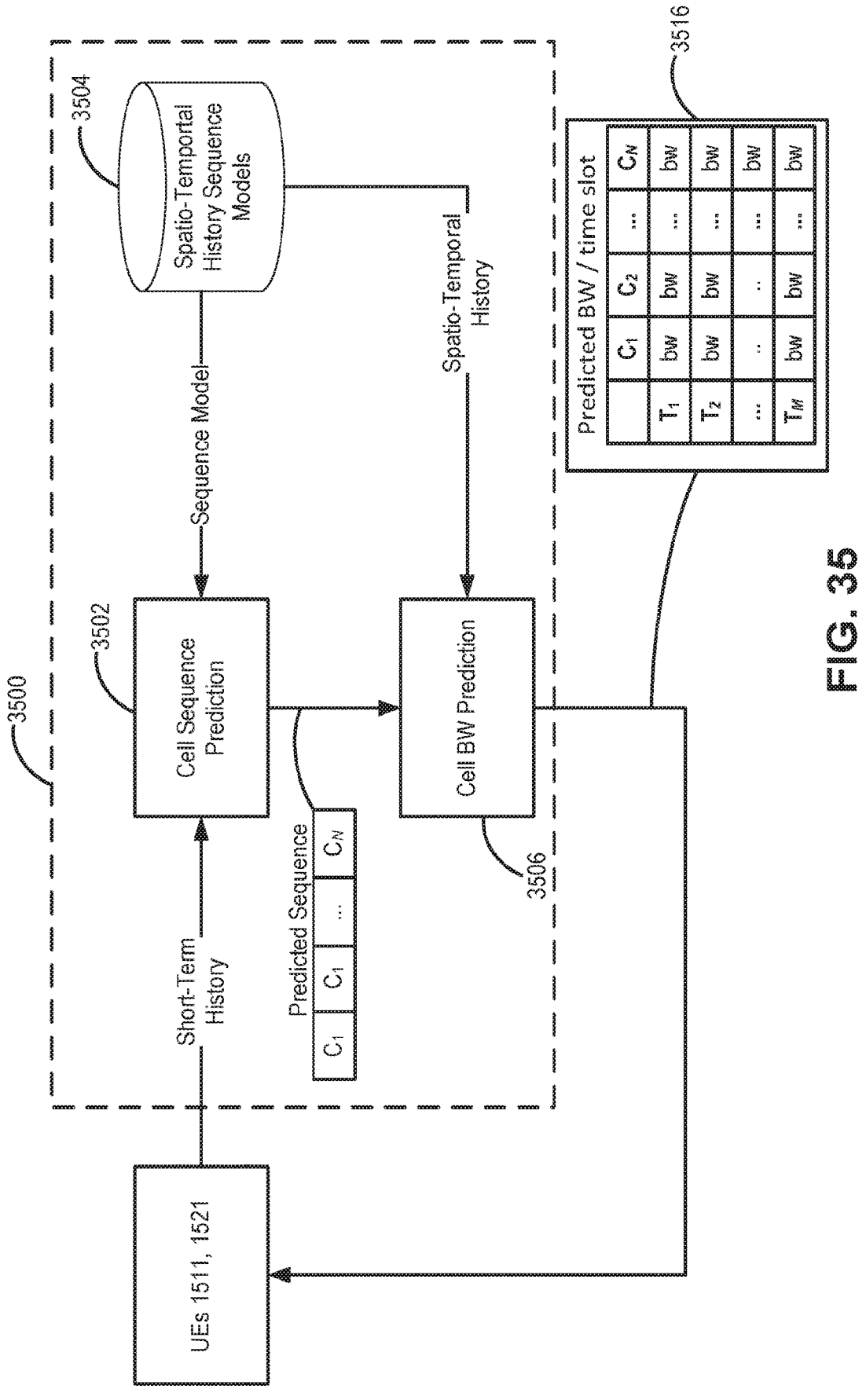
FIG. 35 illustrates an example data fusion engine that performs cell transition and cell load data fusion for bandwidth prediction according to various embodiments.

FIG. 35 illustrates an example data fusion engine 3500 that performs cell transition and cell load data fusion for BW prediction according to various embodiments. FIG. 35 depicts an example of bandwidth prediction using cell sequence and cell load ML models performed by the data fusion engine 3500. The data fusion engine 3500 may correspond to the LPP layer 2902 of FIG. 29.

In this example, UEs 1511, 1521 send short-term history data to a cell sequence prediction model 3502 within the data fusion engine 3500. The short-term history data may include any of the measurements and/or operational parameters discussed herein that were collected or measured by the UEs 1511, 1521 during a predetermined time period, which may be expressed as a number of days, hours, minutes, seconds, or the like. The cell sequence prediction model 3502 also obtains one or more sequence models from the spatio-temporal history sequence models database 3504. The cell sequence models (and/or the spatio-temporal history sequence models database 3504) are stored by a suitable database system and are continuously updated based on the cell change history of multiple UEs 1511, 1521. The cell sequence prediction model 3502 uses the short-term history data and the one or more sequence models to predict a cell change (or transition) sequence at different time intervals (e.g., predicted cell sequence including cells $C_1, C_2, \ldots C_N$ in FIG. 35 where N is a number).

The predicted cell change sequence is fed to the cell BW prediction model 3506. Additionally, the spatio-temporal history data is fed to the cell BW prediction model 3506. The cell BW prediction model 3506 uses the predicted cell change sequence and the spatio-temporal history data to predict a BW and other parameters at different time instances or time intervals. As shown by FIG. 35, the cell BW prediction model 3506 outputs a data structure 3516, which includes a predicted BW for each cell in the predicted cell sequence (e.g., including cells $C_1, C_2, \ldots C_N$ in FIG. 35) at individual time instances (e.g., predicted cell sequence including cells $T_1, T_2, \ldots T_M$ in FIG. 35 where M is a number). The data structure 3516 (or portions thereof) is then sent as an LPP notification to the UEs 1511, 1521 so that the UEs 1511, 1521 can adjust their operational parameters accordingly. Additionally or alternatively, the data structure 3516 (or portions thereof) may be sent as an LPP notification to one or more NANs 1531-1533 that are serving UEs 1511, 1521 and/or that are in a vicinity of the UEs 1511, 1521 so that the one or more NANs 1531-1533 can adjust their operational parameters accordingly. Additionally or alternatively, the data structure 3516 may be sent as an LPP notification to one or more edge compute nodes 1536, the CN 1542, the cloud 1544, and/or server provider platforms (e.g., server(s) 1550 of FIG. 15) that are serving UEs 1511, 1521 so that these devices can adjust their operational parameters accordingly. In some embodiments, the data structure 3516 may be sent as an LPP notification to the one or more NANs 1531-1533, which extract one or more of the predicted BWs and transmit the extracted predicted BWs to the UEs 1511, 1521 in some other network-specific message/signaling. Other variations of these embodiments are also possible.

Figure 36:
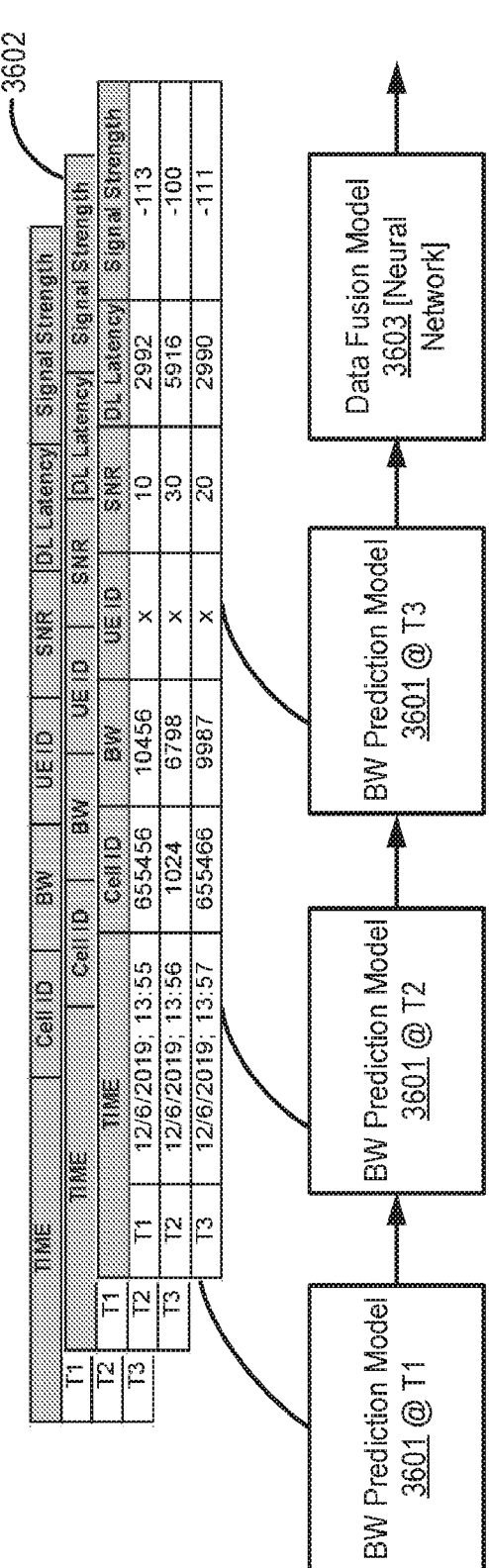
FIG. 36 illustrates an example data fusion engine that performs bandwidth prediction according to various embodiments.

FIG. 36 illustrates an example data fusion engine 3600 that performs BW prediction according to various embodiments. FIG. 36 depicts an example of BW prediction using an LS™ based machine learning model, which is learned using spatio-temporal history data 3602 of multiple UEs 1511, 1521. The data fusion engine 3600 may correspond to the data fusion engine 3500 of FIG. 35 and/or the LPP layer 2902 of FIG. 29.

In this example, each of the tables of the spatio-temporal history data 3602 may correspond to an individual UE 1511, 1521. As shown by FIG. 36, each of the spatio-temporal history data 3602 tables includes a cell ID, BW measurement, a UE ID, SNR measurement, downlink (DL) latency measurement, signal strength measurement for respective time instances (e.g., time instances T1, T2, and T3 in FIG. 36 where T is a number). The spatio-temporal history data 3602 of the multiple UEs 1511, 1521 is fed into a BW prediction ML model 3601, which predicts a BW for each of the time instances indicated by the spatio-temporal history data 3602 (e.g., time instances T1, T2, and T3 in FIG. 36 where T is a number). Each of the predicted BWs at each of the time instances is then fed into a data fusion model 3603. In this way, the data fusion model 3603 inherently learns a cell change path and BW changes over multiple time intervals, and relationships between BW, signal strength, and SNR. During prediction, additional or alternative UE spatio-historical history data (e.g., BW, latency, signal strength, SNR, cell ID, etc.) is used to predict BW and other parameters for future time intervals/instances.

Any suitable ML model may be used for the BW prediction model 3601 and the data fusion model 3603. In one example implementation, the BW prediction model 3601 is an LTSM neural network (NN) such as an LTSM RNN, and the data fusion model 3603 is another suitable NN, which may include a convolutional NN (CNN), a deep CNN (DCN), a deconvolutional NN (DNN), another RNN, a gated recurrent unit (GRU), a deep belief NN, a feed forward NN (FFN), a deep feed forward NN (DFF), a deep stacking network, a Markov chain, a perception NN, etc. In another example implementation, the BW prediction model 3601 is an LTSM, and the data fusion model 3603 is another LTSM.

FIGS. 37-41 illustrate example LPPS procedures 3700-4100, respectively, for practicing various embodiments discussed herein. The procedures 3700-4100 may be performed by an LPPS consumer, an LPPS provider, and in some cases, one or more other entities. In embodiments, the LPPS consumer may be a UE 1511, 1521, a NAN 1531-1533, an edge compute node 1536, a service provider platform (e.g., one or more servers 1550) of FIG. 15, the compute node 3002 of FIG. 30, the UE 3221 and/or a NAN 3232A-B of FIG. 32, or some other device or system discussed herein. Additionally, the LPPS provider may be the LPPS 2900 and/or the LPP layer 2902 of FIG. 29. From the LPPS consumer's perspective, the LPPS provider is a resource representing the LPP information or LPP notifications. In embodiments, the connections for passing the various messages described below may be sent over a secure communication channel, which may be SSL or the like. The communication channels between the LPPS consumer, LPPS provider, and/or any other element discussed infra may be established and maintained using any of the mechanisms discussed herein, or the like.

Figure 37:
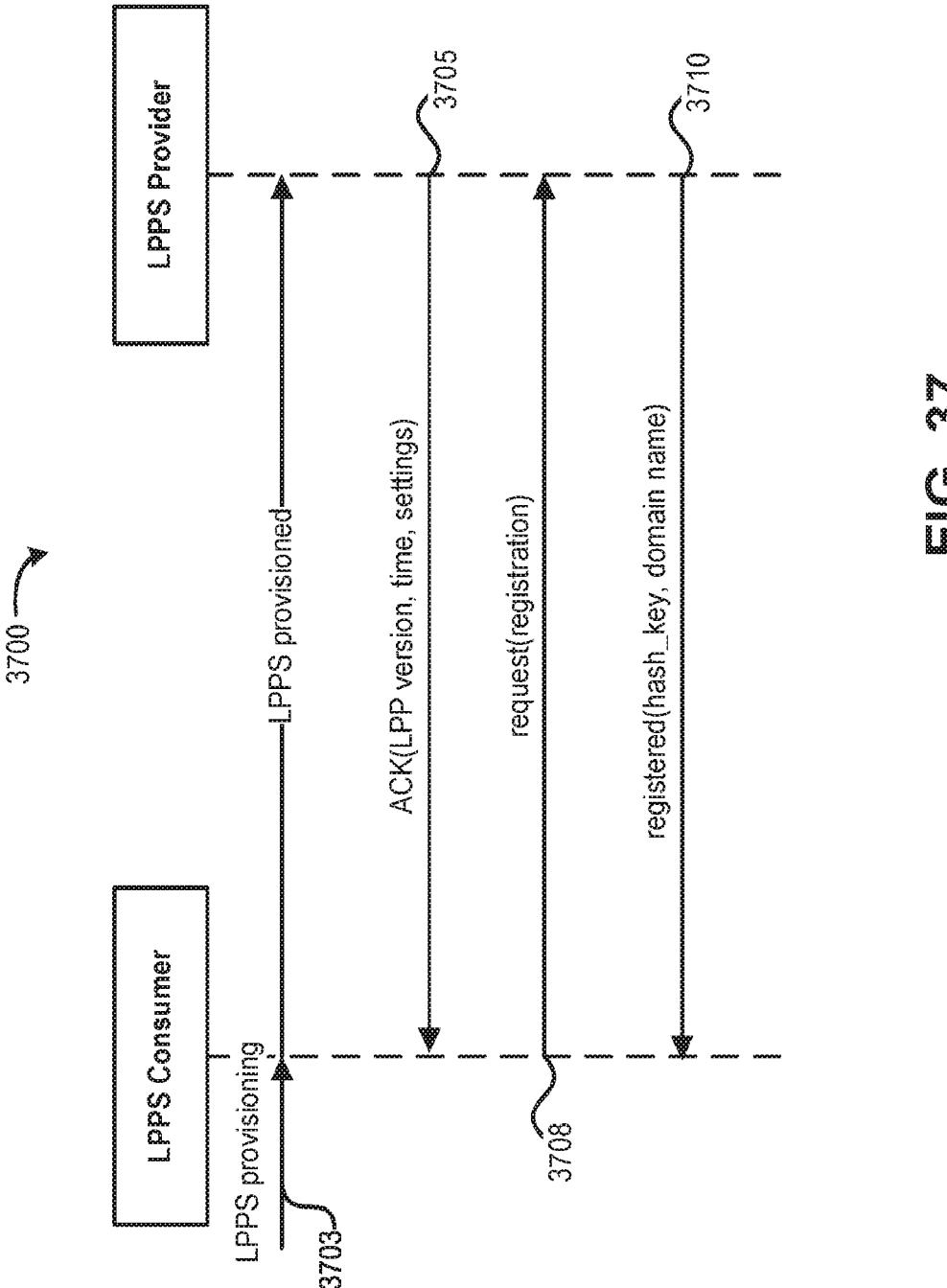
FIG. 37 illustrates an example LPPS registration procedure according to an example embodiment.

Referring now to FIG. 37, which illustrates an example LPPS registration procedure 3700 according to an example embodiment. The procedure 3700 may be used by the LPPS consumers to register with the LPPS provider. Procedure 3700 begins at operation 3703 where LPPS provisioning takes place, and the LPPS consumer sends an indication to the LPPS provider indicating completion of the LPPS provisioning. The LPPS provisioning may involve loading and installing a suitable LPPS application on the LPPS consumer device. At operation 3705, the LPPS provider sends an acknowledgement (ACK) message to the LPPS consumer indicating receipt of the provisioning completion indication. The ACK message may include information such as a version of the LPPS provided by the LPPS provider, a time of receipt of the provisioning indication, and settings/configuration for receiving LPP services. At operation 3708, the LPPS consumer sends a registration request message to the LPPS provider, and at operation 3710, the LPPS provider sends a registration acceptance message to the LPPS consumer. In embodiments, the registration request message may include various LPPS consumer data and/or capabilities, and the registration accept message includes a unique key (hash_key) and a domain name of the LPPS provider. In embodiments, the LPPS Provider may use a suitable mechanism to validate the LPPS consumer when registering. The domain name in the registration acceptance message may uniquely identify the LPPS provider and may be used to send LPPS requests to the LPPS provider. Additionally, the hash_key may be included in the requests for LPP notifications, which is then used to access information about the LPPS consumer that is stored by the LPPS provider. Additionally or alternatively, the LPPS Provider may use the hash_key to validate the LPPS consumer. Moreover, the procedures 3800-4200 of FIGS. 38-42, respectively, may be performed once registration is complete.

Figure 38:
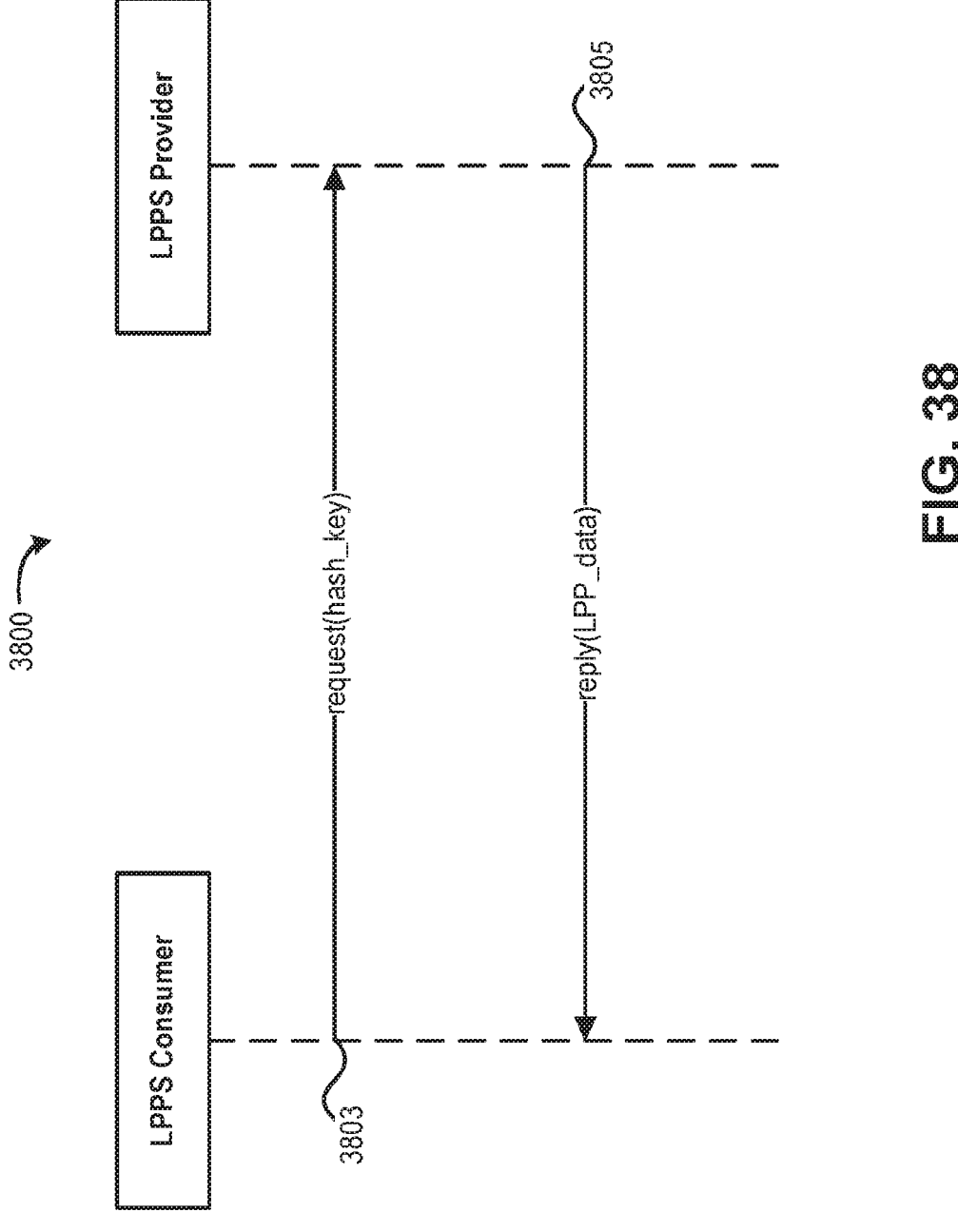
FIGS. 38-39 illustrate example LPPS procedures according to various example embodiments.

FIG. 38 illustrates an example LPPS procedure 3800 according to a first example embodiment. This first example embodiment is a request/reply model, wherein an LPPS consumer requests LPP notifications from the LPPS provider. Procedure 3800 begins at operation 3803 where the LPPS consumer sends a request message to the LPPS provider. In embodiments, the request message includes a request for an LPP notification. In embodiments, the request message may include the hash_key that the LPPS consumer obtained during the registration procedure 3700 of FIG. 37, as well as other parameters that may be needed to provider LPP notifications to the LPPS consumer. At operation 3805, the LPPS provider sends a reply message, which includes an LPP notification (LPP_data). The LPPS consumer may then adjust its operational parameters based on the LPP_data. Operations 3803 and 3805 may repeat as necessary, for example, when the LPPS consumer is triggered or otherwise desires to receive an LPP notification.

Figure 39:
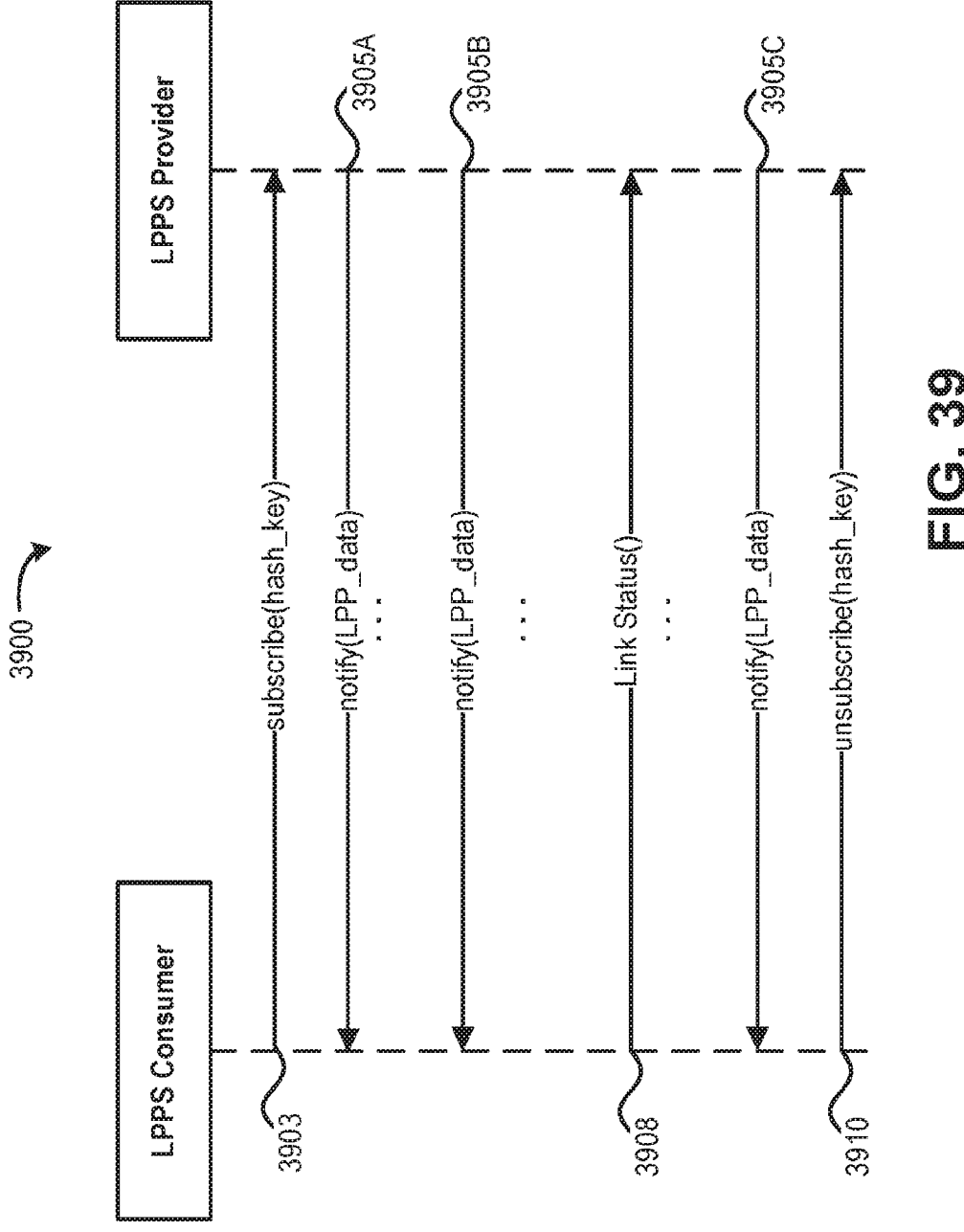

FIG. 39 illustrates an example LPPS procedure 3900 according to a second example embodiment. The second example embodiment is a subscribe/notify model, wherein the LPPS consumer subscribes to receive LPP notifications from the LPPS provider. Procedure 3900 begins at operation 3903 where the LPPS consumer sends a subscribe message to the LPPS provider. In embodiments, the subscribe message includes a subscription request to receive one or more LPP notifications from the LPPS provider. In embodiments, the subscribe message may include the hash_key that the LPPS consumer obtained during the registration procedure 3700 of FIG. 37, as well as other parameters that may be needed to provider LPP notifications to the LPPS consumer. In such embodiments, the LPPS provider may add the LPPS consumer to a subscribers list or other like data structure with the information included in the subscribe message. The subscribers list may include various LPPS consumers for which LPP notifications are to be generated.

At operation 3905A, the LPPS provider sends a notification message, which includes an LPP notification (LPP_data). The LPPS consumer may then adjust its operational parameters based on the LPP_data. After some time, the LPPS provider sends another notification message including LPP_data at operation 3905B and 3905C. In embodiments, the LPPS provider may generate and send notification messages each time it is triggered to send such messages to the LPPS consumer. The triggers may be time-based triggers wherein the LPPS provider sends notification messages when a timer expires or at periodic time intervals. The triggers may be asynchronous triggers wherein the LPPS provider sends notification messages each time an LPP notification is generated and indicated as available for transmission to the LPPS consumer. Other triggers, such as location-based triggers, application/event-based triggers, and the like, may be used in other embodiments. The LPPS provider may continue to send notification messages until the LPPS consumer sends an unsubscribe message at operation 3910. In embodiments, the unsubscribe message may include the hash_key that the LPPS consumer obtained during the registration procedure 3700 of FIG. 37 and an indication or an instruction for the LPPS provider to stop sending notification messages to the LPPS consumer.

In some embodiments, the LPPS consumer may send link status message, which is shown as being performed at operation 3908 in FIG. 39. The link status message may include measurement data or other like data related to link 1503, 1505, 1507 performance, which may be used by the various prediction layers 2925, 2902 for future link performance predictions. The LPPS consumer may send link status messages at some predetermined or configured interval. Additionally, the LPPS consumer may send link status messages during any of the other LPPS procedures 3700-3800 and 4000-4200.

Figure 40:
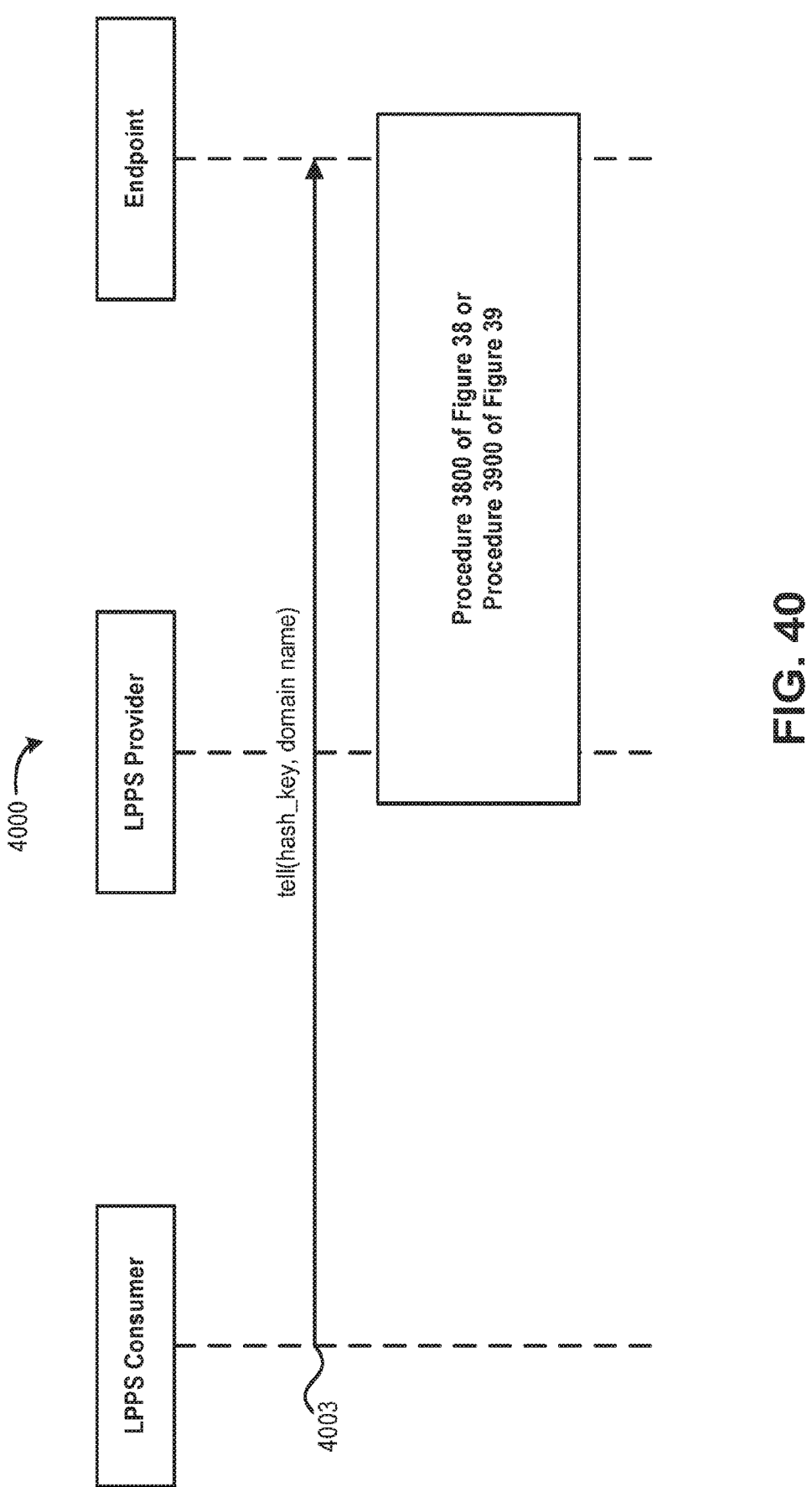
FIG. 40 illustrates an example multi-endpoint LPPS procedure according to an example embodiment.

FIG. 40 illustrates an example multi-endpoint LPPS procedure 4000 according to an example embodiment. The procedure 4000 is used to provide LPP notifications to an endpoint that is different than the LPPS consumer. In embodiments, the endpoint may be any of the devices or systems discussed herein. In one example, the LPPS consumer may be a UE 1511, 1521, and the endpoint may be a service provider platform or an edge compute node 1536. Procedure 4000 begins at operation 4003 where the LPPS consumer sends a tell message to the endpoint via the LPPS provider. In embodiments, the tell message may be sent immediately after the registration procedure 3700 of FIG. 37 is complete, or at some other time after registration is complete. In some embodiments, the LPPS provider acts as a transparent relay node and forwards the tell message to the endpoint. In other embodiments, the LPPS provider extracts pertinent information from the tell message, and repackages this information (and/or adds additional information) into another tell message, which is then sent to the endpoint. In either of these embodiments, the tell message may be sent using out of band channels to provide the information to the endpoint. In either of these embodiments, the tell message includes the hash_key that the LPPS consumer obtained during the registration process 3700, and a domain name of the LPPS provider. This information is used by end point to obtain LPP notifications from the LPPS provider (see e.g., discussion of operation 3710 of FIG. 37). Next, the endpoint performs the LPPS request procedure 3800 of FIG. 38 or the LPPS subscribe procedure 3900 of FIG. 39. In embodiments, the endpoint takes the place of, or acts as an LPPS consumer as discussed previously with respect to FIGS. 38-39.

Figure 41:
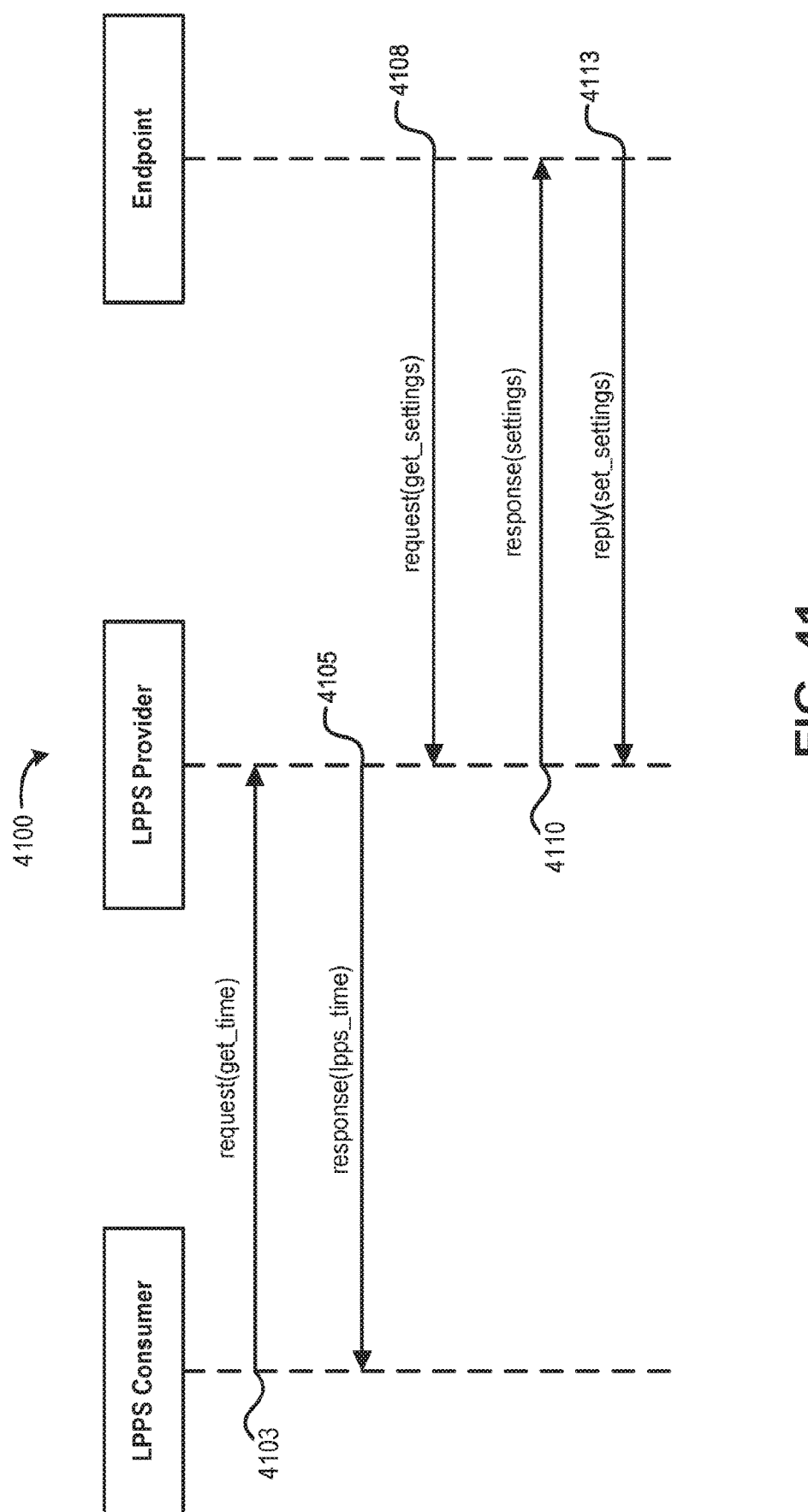
FIG. 41 illustrates an example time and settings synchronization (sync) LPPS procedure according to an example embodiment.

FIG. 41 illustrates an example time and settings synchronization (sync) LPPS procedure 4100 according to an example embodiment. The procedure 4100 is used by the LPPS consumer and endpoint to synchronize their local time and local LPPS settings with a reference time and LPPS settings of the LPPS provider. Procedure 4100 begins at operation 4103 where the LPPS consumer sends a request message to the LPPS provider. In embodiments, the request message may be sent immediately after the registration procedure 3700 of FIG. 37 is complete, or at some other time after registration is complete. In embodiments, this request message may include a request for a reference (or global) LPPS time (e.g., "get_time" in FIG. 41). At operation 4105, the LPPS provider sends a response message, which includes the reference LPPS time (e.g., "lpps_time" in FIG. 41). In some embodiments, the request and response messages of operations 4103 and 4105, respectively, may be sent according to the Network Time Protocol (NTP), and may include data/information as required by the NTP. For example, the response message may include a reference identifier (REFID) indicating a clock synchronization source, and a 64 bit timestamp and/or an 128 bit date stamp. The synchronization source may be a network (e.g., CN 1542 or cloud 1544) or one or more external (or global) synchronization sources such as a GNSS time. In other embodiments, the LPPS provider may instruct the LPPS consumer to use a component or embedded device as a synchronization source such as, for example, when the LPPS consumer includes a relatively stable atomic clock, a crystal oscillator included in positioning circuitry (e.g., positioning circuitry 2445 or 2545 of FIGS. 24-25, respectively), which can be used to derive an absolute timing for synchronization. Other message and/or time formats may be used in other embodiments.

At operation 4108, the endpoint sends a request message requesting LPPS settings from the LPPS producer. In embodiments, this request message may include a request for LPPS setting/configuration information (e.g., "get_settings" in FIG. 41). At operation 4110, the LPPS provider sends a response message, which includes the LPPS settings (e.g., "settings" in FIG. 41). In response to receipt of the response message, the endpoint may adjust or change its local settings according to the settings/configuration information in the response message (if necessary). At operation 4113, the endpoint sends a reply message indicating that the endpoint's local settings have been changed (e.g., "set_settings" in FIG. 41). It should be noted that in various embodiments, operations 4103 and 4105 may be performed by the endpoint and the LPPS provider, and operation 4108-4113 may be performed by the LPPS consumer and the LPPS provider.

The various messages in each of the procedures 3700-4100 may be suitable HTTP (e.g., HTTP/1.x, HTTP/2, HTTP/3, HTTPS, SPDY, etc.) messages. For example, the request messages (and the reply message in FIG. 41) may be HTTP GET, POST, PUT, CONNECT messages or the like, with a suitable request line. The request/reply messages may include a body portion with the described information as well as other information such as an LPPS consumer instance ID (e.g., an application instance ID for LPPS app 3020 of FIG. 30). Additionally, the various response messages may be suitable HTTP response messages including a suitable status code such as "200 OK" in the header of the HTTP message, which indicates that the LPPS consumer's request succeeded. Additionally, the requested information may be included in the body of the HTTP response messages. In this embodiment, the HTTP response message may include other HTTP status codes, such as a bad request status code (400) (e.g., when incorrect parameters are passed in the request), a not found status code (404) (e.g., when a Universal Resource Indicator (URI) provided in the request cannot be mapped to a valid resource URI), a forbidden status code (403) (e.g., when the operation is not allowed given the current status of the resource), and/or other like HTTP status codes. In the aforementioned examples, the response body may include a ProblemDetails data type indicating/including information about the particular error. Other message formats may be used in other embodiments, and the request/response data may be located in the header or body portion of such messages. Additionally or alternatively, a message format used for procedures 3700-4100 includes the convention for packet definition discussed by ETSI TS 102 636-4-1 V1.1.1 (2011-06). Example message formats for this purpose are shown by FIG. 36. The messages may be exchanged directly between vehicles and/or RSUs or through intermediate relay stations (or relays) as illustrated by FIG. 35.

Figure 42:
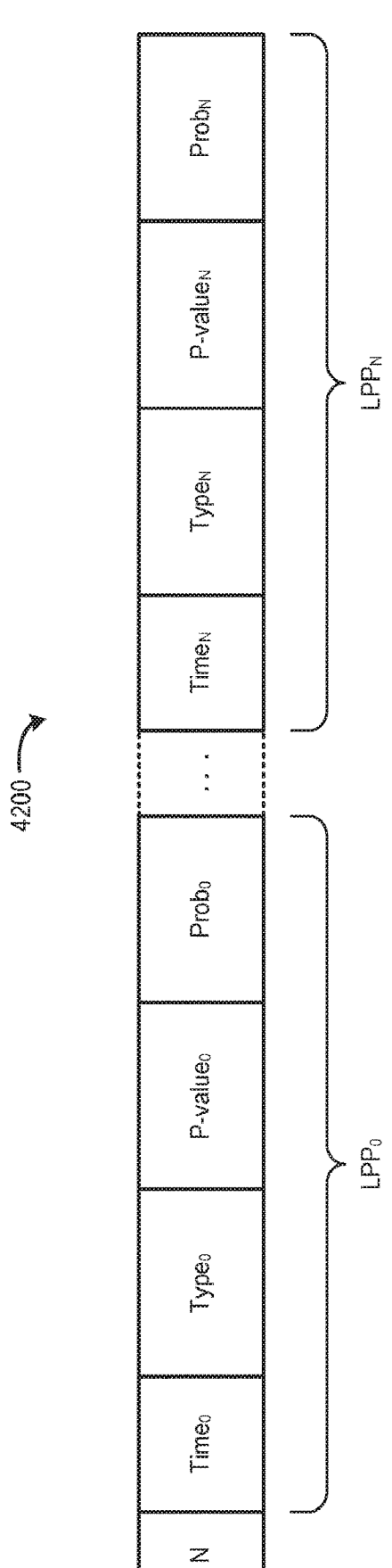
FIG. 42 illustrates an example LPP protocol data unit (PDU) according to various embodiments.

FIG. 42 illustrates an example LPP protocol data unit (PDU) 4200 according to various embodiments. The PDU 4200 may be any suitable data structure used by LPPS providers to convey link performance predictions to LPPS consumers. In various embodiments, the PDU 4200 may be the LPP notifications discussed previously.

In some embodiments, the LPP PDU 4200 may be a segment or datagram when conveyed via a transport layer protocol (e.g., TCP, UDP, QUIC, RSVP, SCTP, VPN, MPTCP, GRE, GeoNetworking protocol, BTP, etc.), or a packet when conveyed via a network layer or internet layer protocol (e.g., IPv4, IPv4, etc.). In some embodiments, the PDU 4200 could be a frame when conveyed via a link layer, data link layer, or some other layer 2 protocol (e.g., Ethernet data link layer; Point-to-Point (PPP); 3GPP MAC, RLC, PDCP, or SDAP layers, etc.). In other embodiments, the PDU 4200 could be an message or other like data structure when conveyed via an application layer protocol (e.g., Session Initiation Protocol (SIP), Session Description Protocol (SDP), HTTP, SPDY, etc.). In any of the aforementioned embodiments, the PDU 4200 is identified by one or more values in a header portion of the message (not shown by FIG. 42) and has a variable size with following fields.

The N field indicates a number of LLPs that are contained within the LPP PDU 4200. Following the N field is each $LPP_x$ of the number of LPPs 0-N, where x is a number from 0 to N, and N is a number of link performance predictions indicated by the N field. Each $LPP_x$ includes a $time_x$ field, a $type_x$ field, a $p\text{-}value_x$ field, and a $prob_x$ field. The $time_x$ field includes a value that indicates a timestamp for the x-th link performance prediction. The timestamp may be in NTP format or any other suitable timestamp format, such as those discussed herein. The $type_x$ field includes a value that indicates the type of the x-th link performance prediction. The type may be a predicted BW, a predicted latency, a predicted transmission power, a predicted bit error rate, a predicted signal strength measurement, a predicted interference measurement, a predicted noise measurement, a predicted packet loss rate, and/or a prediction of any other measurement type, such as those discussed herein. The $p\text{-}value_x$ field includes a value of the predicted measurement type indicated by the $type_x$ field. The units of the value in the $p\text{-}value_x$ field is dependent on the type of prediction indicated by the $type_x$ field. The $prob_x$ field includes a value that indicates a probability that the x-th link performance prediction indicated by the $p\text{-}value_x$ field will actually occur at the timestamp indicated by the $time_x$ field. In some embodiments, the value in the $prob_x$ field is an estimated standard deviation of the link performance prediction. The values included in any of the aforementioned fields may be numerals or characters, but the type of information included in each field may be dependent on the type of protocol used to convey the LPP PDU 4200.

FIG. 43 depicts an example process 4300 for practicing the various embodiments discussed herein. In particular, process 4300 may be performed by an LPPS provider, such as the LPPS 2900 of FIG. 29, to provide LPPs to one or more LPPS consumers, such as the UEs 1511, 1521, NANs 1531-1533, edge system/network 1535, edge compute nodes 1536, CN 1542, cloud 1544, and/or server(s) 1550 of FIG. 15, and/or any other device or system discussed herein. While particular examples and orders of operations are illustrated FIG. 43, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Process 4300 begins at operation 4305 where the LPPS provider obtains obtained predicted performance metrics from individual prediction layers of a plurality of prediction layers. In embodiments, each prediction layer of the plurality of prediction layers uses an ML algorithm to generate an ML model to generate respective predicted performance metrics. In various embodiments, at least one prediction layer of the plurality of prediction layers uses an ML algorithm and/or ML model that is different than ML algorithms and/or ML models used by other prediction layers of the plurality of prediction layers. The plurality of prediction layers may be the prediction layers 2925-1 to 2925-N of FIG. 29 and/or any of the prediction layers discussed previously with respect to FIGS. 29-34.

At open loop operation 4310, the LPPS provider processes each link (e.g., links 1503, 1505, 1507 of FIG. 15), in turn, for example, by performing operations 4315 to 4325 for each link. Additionally or alternatively, At open loop operation 4310, the LPPS provider performs operations 4315 to 4325 for each of one or more LPPS consumers (e.g., each of a plurality of UEs 1511, 1521 being served by one or more NANs 1531-1533 of FIG. 15). At operation 4315, the LPPS provider determines an LPP for the link based on the obtained predicted performance metrics and/or various combinations thereof. In some embodiments, the LPPS provider employs a suitable data fusion technique to determine the LPP, and/or predicts a value of the LPP based on a suitable probability distribution. At operation 4320, the LPPS provider generates an LPP notification (e.g., LPP PDU 4200 of FIG. 42) indicating the determined LPP. At operation 4325, the LPPS provider sends the LPP notification to the LPPS consumer or one or more endpoints (see e.g., FIGS. 40-41). At close loop operation 4330, the LPPS provider proceeds back to operation 4310 process the next link (or LPPS consumer), if any. When there are no more links (or LPPS consumers) to process, process 4300 may end or repeat as necessary.

In various embodiments, the LPPS provider may be an apparatus comprising processor circuitry (e.g., application circuitry 2405 of FIG. 24) coupled with network interface circuitry (e.g., network controller circuitry 2435 of FIG. 24). The network interface circuitry communicatively couples the apparatus with one or more NANs 1531-1533, each of which provide network connectivity to one or UEs 1511, 1521 via respective links 1503, 1507 between the individual NANs 1531-1533 and the one or more UEs 1511, 1521.

According to a first embodiment, the processor circuitry is arranged to operate an LPP engine to perform 4310 to 4330, which includes controlling the network interface circuitry to send the LPP notification at operation 4325. In the first embodiment, the plurality of prediction layers are operated by remote computing devices, and the network interface circuitry may obtain the predicted performance metrics from these remote computing devices at operation 4305. As an example of the first embodiment, individual prediction layers are operated by respective edge computing servers (e.g., edge compute nodes 1536 of FIG. 15), application servers (e.g., one or more servers 1550 of FIG. 15), or RANs (e.g., including RAN nodes 1531-1532 of FIG. 15), and the network interface circuitry is arranged to receive the predicted performance metrics from the respective edge computing servers, application servers, and/or RANs. In the first embodiment, the apparatus may be disposed in a server computing system that is part of a cloud computing service (e.g., cloud 1544 of FIG. 15), a cellular core network (e.g., CN 1542 of FIG. 15), a service provider platform (e.g., one or more servers 1550 of FIG. 15), an edge network (e.g., an edge compute node 1536 within edge network 1535 of FIG. 15), and/or the like.

According to a second embodiment, the processor circuitry is arranged to operate an LPP engine to perform 4305 to 4330, which includes controlling the network interface circuitry to send the LPP notification at operation 4325. In the second embodiment, the plurality of prediction layers and the LPP engine are operated by the apparatus and/or a system in which the apparatus is deployed, and the processor circuitry obtains the predicted performance metrics from the individual prediction layers at operation 4305. The system in which the apparatus is deployed may be one or more cluster nodes in a cloud computing service (e.g., cloud 1544 of FIG. 15). As an example of the second embodiment, the plurality of prediction layers and the LPP engine are operated by respective VMs and/or application containers (e.g., Docker® containers, Kubernetes™, etc.) on top of virtualization infrastructure provided by the apparatus or a system in which the apparatus is disposed. In the second embodiment, the processor circuitry obtains the predicted performance metrics from the individual prediction layers at operation 4305 using a suitable API(s), proxy application(s), trusted application(s), virtual/VM switch(es), VM network address translator(s) (NAT), etc. In the second embodiment, the apparatus may be disposed in a server computing system that is part of a cloud computing service (e.g., cloud 1544 of FIG. 15), a cellular core network (e.g., CN 1542 of FIG. 15), or a service provider platform (e.g., one or more servers 1550 of FIG. 15), and the processor circuitry or virtualization infrastructure is arranged to operate the individual prediction layers.

III. Examples

For one or more embodiments, at least one of the systems or components set forth in one or more of the preceding figures may be configured to perform one or more operations, techniques, processes, and/or methods as set forth in the example section below.

A. LPP Media Streaming Examples

Example A01 includes a computing device for receiving a media stream, comprising: network interface circuitry to communicate over a network; and processing circuitry to: receive, via the network interface circuitry, a link performance prediction for a network link between the computing device and the network, wherein the link performance prediction is to indicate a predicted performance of the network link during a future timeframe; identify a performance objective for the media stream based on the link performance prediction, wherein the performance objective is associated with media stream content to be played during the future timeframe, wherein the media stream content is to be received in the media stream over the network link; adjust one or more media streaming parameters for the media stream content to be played during the future timeframe, wherein the one or more media streaming parameters are to be adjusted based on the link performance prediction and the performance objective; and receive, via the network interface circuitry, the media stream content to be played during the future timeframe, wherein the media stream content is to be received over the network link based on the one or more media streaming parameters.

Example A02 includes the computing device of Example A01, wherein: the computing device comprises a mobile device; the network comprises a radio access network; the network link comprises a radio link between the mobile device and the radio access network; and the link performance prediction comprises a predicted bandwidth for the radio link during the future timeframe.

Example A03 includes the computing device of Example A01, wherein the one or more media streaming parameters comprise at least one of: a buffer level of a media stream buffer, wherein the media stream buffer is for buffering the media stream content to be played during the future timeframe; a resolution of the media stream content to be played during the future timeframe; or a compression rate for compression of the media stream content to be played during the future timeframe.

Example A04 includes the computing device of any of Examples A01-A03, wherein the performance objective for the media stream comprises at least one of: minimizing playback stalls for the media stream content to be played during the future timeframe; minimizing resource utilization for the media stream content to be played during the future timeframe; or maximizing a quality of the media stream content to be played during the future timeframe.

Example A05 includes the computing device of Example A04, wherein: the link performance prediction comprises a predicted bandwidth decrease for the network link during the future timeframe; the performance objective comprises minimizing playback stalls for the media stream content to be played during the future timeframe; and the processing circuitry to adjust the one or more media streaming parameters for the media stream content to be played during the future timeframe is further to: proactively increase the buffer level of the media stream buffer based on the predicted bandwidth decrease, wherein the buffer level is to be increased to increase a playback length of the media stream content from the media stream buffer to minimize playback stalls during the future timeframe.

Example A06 includes the computing device of Example A05, wherein the processing circuitry to adjust the one or more media streaming parameters for the media stream content to be played during the future timeframe is further to: proactively decrease the resolution of the media stream content based on the predicted bandwidth decrease, wherein the resolution is to be decreased to reduce a required streaming bandwidth for the media stream content, wherein the required streaming bandwidth is to be reduced to minimize playback stalls during the future timeframe based on the predicted bandwidth decrease; or proactively increase the compression rate for compression of the media stream content based on the predicted bandwidth decrease, wherein the compression rate is to be increased to reduce a required streaming bandwidth for the media stream content, wherein the required streaming bandwidth is to be reduced to minimize playback stalls during the future timeframe based on the predicted bandwidth decrease.

Example A07 includes the computing device of Example A04, wherein: the link performance prediction comprises a predicted bandwidth increase for the network link during the future timeframe; the performance objective comprises minimizing resource utilization for the media stream content to be played during the future timeframe; and the processing circuitry to adjust the one or more media streaming parameters for the media stream content to be played during the future timeframe is further to: proactively decrease the buffer level of the media stream buffer based on the predicted bandwidth increase, wherein the buffer level is to be decreased to reduce an amount of memory used by the media stream buffer for buffering the media stream content during the future timeframe.

Example A08 includes the computing device of Example A04, wherein: the link performance prediction comprises a predicted bandwidth increase for the network link during the future timeframe; the performance objective comprises maximizing the quality of the media stream content to be played during the future timeframe; and the processing circuitry to adjust the one or more media streaming parameters for the media stream content to be played during the future timeframe is further to: proactively adjust the one or more media streaming parameters to improve the quality of the media stream content to be played during the future timeframe based on the predicted bandwidth increase.

Example A09 includes the computing device of Example A08, wherein the processing circuitry to proactively adjust the one or more media streaming parameters to improve the quality of the media stream content to be played during the future timeframe based on the predicted bandwidth increase is further to: proactively increase the resolution of the media stream content based on the predicted bandwidth increase, wherein the resolution is to be increased to improve the quality of the media stream content to be played during the future timeframe based on the predicted bandwidth increase; or proactively reduce the compression rate for compression of the media stream content based on the predicted bandwidth increase, wherein the compression rate is to be reduced to improve the quality of the media stream content to be played during the future timeframe based on the predicted bandwidth increase.

Example A10 includes the computing device of any of Examples A01-A03, wherein: the media stream comprises a video stream; and the media stream content comprises video content within the video stream.

Example A11 includes the computing device of Example A10, wherein: the video stream comprises an augmented reality or virtual reality (AR/VR) stream; the video content comprises AR/VR content within the AR/VR stream, wherein the AR/VR content comprises a plurality of AR/VR frame sections, wherein the plurality of AR/VR frame sections comprise a field-of-view (FOV) frame section and one or more non-FOV frame sections, wherein the FOV frame section is within a current field of view of a user and the one or more non-FOV frame sections are outside the current field of view of the user; the link performance prediction comprises a predicted bandwidth for the network link during the future timeframe; the performance objective comprises maximizing a quality of gameplay for the user during the future timeframe; and the processing circuitry to adjust the one or more media streaming parameters for the media stream content to be played during the future timeframe is further to: maximize a quality of the AR/VR content without causing a required streaming bandwidth for the AR/VR content to exceed the predicted bandwidth for the network link during the future timeframe, wherein the required streaming bandwidth is to be maintained within the predicted bandwidth to minimize gameplay lag.

Example A12 includes the computing device of Example A11, wherein the processing circuitry to maximize the quality of the AR/VR content without causing the required streaming bandwidth for the AR/VR content to exceed the predicted bandwidth for the network link during the future timeframe is further to: maximize a quality of the FOV frame section while maintaining the required streaming bandwidth for the plurality of AR/VR frame sections within the predicted bandwidth; or assign weighted qualities to the plurality of AR/VR frame sections such that the required streaming bandwidth for the plurality of AR/VR frame sections is within the predicted bandwidth.

Example A13 includes at least one non-transitory computer-readable storage medium having instructions stored thereon, wherein the instructions, when executed on processing circuitry, cause the processing circuitry to: receive, via network interface circuitry, a link performance prediction for a network link between a computing device and a network, wherein the link performance prediction is to indicate a predicted performance of the network link during a future timeframe; identify a performance objective for a media stream based on the link performance prediction, wherein the performance objective is associated with media stream content to be played during the future timeframe, wherein the media stream content is to be received in the media stream over the network link; adjust one or more media streaming parameters for the media stream content to be played during the future timeframe, wherein the one or more media streaming parameters are to be adjusted based on the link performance prediction and the performance objective; and receive, via the network interface circuitry, the media stream content to be played during the future timeframe, wherein the media stream content is to be received over the network link based on the one or more media streaming parameters.

Example A14 includes the storage medium of Example A13, wherein: the computing device comprises a mobile device; the network comprises a radio access network; the network link comprises a radio link between the mobile device and the radio access network; and the link performance prediction comprises a predicted bandwidth for the radio link during the future timeframe.

Example A15 includes the storage medium of Example A13, wherein the one or more media streaming parameters comprise at least one of: a buffer level of a media stream buffer, wherein the media stream buffer is for buffering the media stream content to be played during the future timeframe; a resolution of the media stream content to be played during the future timeframe; or a compression rate for compression of the media stream content to be played during the future timeframe.

Example A16 includes the storage medium of any of Examples A13-A15, wherein the performance objective for the media stream comprises at least one of: minimizing playback stalls for the media stream content to be played during the future timeframe; minimizing resource utilization for the media stream content to be played during the future timeframe; or maximizing a quality of the media stream content to be played during the future timeframe.

Example A17 includes the storage medium of Example A16, wherein: the link performance prediction comprises a predicted bandwidth decrease for the network link during the future timeframe; the performance objective comprises minimizing playback stalls for the media stream content to be played during the future timeframe; and the instructions that cause the processing circuitry to adjust the one or more media streaming parameters for the media stream content to be played during the future timeframe further cause the processing circuitry to: proactively increase the buffer level of the media stream buffer based on the predicted bandwidth decrease, wherein the buffer level is to be increased to increase a playback length of the media stream content from the media stream buffer to minimize playback stalls during the future timeframe.

Example A18 includes the storage medium of Example A17, wherein the instructions that cause the processing circuitry to adjust the one or more media streaming parameters for the media stream content to be played during the future timeframe further cause the processing circuitry to: proactively decrease the resolution of the media stream content based on the predicted bandwidth decrease, wherein the resolution is to be decreased to reduce a required streaming bandwidth for the media stream content, wherein the required streaming bandwidth is to be reduced to minimize playback stalls during the future timeframe based on the predicted bandwidth decrease; or proactively increase the compression rate for compression of the media stream content based on the predicted bandwidth decrease, wherein the compression rate is to be increased to reduce a required streaming bandwidth for the media stream content, wherein the required streaming bandwidth is to be reduced to minimize playback stalls during the future timeframe based on the predicted bandwidth decrease.

Example A19 includes the storage medium of Example A16, wherein: the link performance prediction comprises a predicted bandwidth increase for the network link during the future timeframe; the performance objective comprises minimizing resource utilization for the media stream content to be played during the future timeframe; and the instructions that cause the processing circuitry to adjust the one or more media streaming parameters for the media stream content to be played during the future timeframe further cause the processing circuitry to: proactively decrease the buffer level of the media stream buffer based on the predicted bandwidth increase, wherein the buffer level is to be decreased to reduce an amount of memory used by the media stream buffer for buffering the media stream content during the future timeframe.

Example A20 includes the storage medium of Example A16, wherein: the link performance prediction comprises a predicted bandwidth increase for the network link during the future timeframe; the performance objective comprises maximizing the quality of the media stream content to be played during the future timeframe; and the instructions that cause the processing circuitry to adjust the one or more media streaming parameters for the media stream content to be played during the future timeframe further cause the processing circuitry to: proactively adjust the one or more media streaming parameters to improve the quality of the media stream content to be played during the future timeframe based on the predicted bandwidth increase.

Example A21 includes the storage medium of Example A20, wherein the instructions that cause the processing circuitry to proactively adjust the one or more media streaming parameters to improve the quality of the media stream content to be played during the future timeframe based on the predicted bandwidth increase further cause the processing circuitry to: proactively increase the resolution of the media stream content based on the predicted bandwidth increase, wherein the resolution is to be increased to improve the quality of the media stream content to be played during the future timeframe based on the predicted bandwidth increase; or proactively reduce the compression rate for compression of the media stream content based on the predicted bandwidth increase, wherein the compression rate is to be reduced to improve the quality of the media stream content to be played during the future timeframe based on the predicted bandwidth increase.

Example A22 includes the storage medium of any of Examples A13-A15, wherein: the media stream comprises a video stream; and the media stream content comprises video content within the video stream.

Example A23 includes the storage medium of Example A22, wherein: the video stream comprises an augmented reality or virtual reality (AR/VR) stream; the video content comprises AR/VR content within the AR/VR stream, wherein the AR/VR content comprises a plurality of AR/VR frame sections, wherein the plurality of AR/VR frame sections comprise a field-of-view (FOV) frame section and one or more non-FOV frame sections, wherein the FOV frame section is within a current field of view of a user and the one or more non-FOV frame sections are outside the current field of view of the user; the link performance prediction comprises a predicted bandwidth for the network link during the future timeframe; the performance objective comprises maximizing a quality of gameplay for the user during the future timeframe; and the instructions that cause the processing circuitry to adjust the one or more media streaming parameters for the media stream content to be played during the future timeframe further cause the processing circuitry to: maximize a quality of the AR/VR content without causing a required streaming bandwidth for the AR/VR content to exceed the predicted bandwidth for the network link during the future timeframe, wherein the required streaming bandwidth is to be maintained within the predicted bandwidth to minimize gameplay lag.

Example A24 includes the storage medium of Example A23, wherein the instructions that cause the processing circuitry to maximize the quality of the AR/VR content without causing the required streaming bandwidth for the AR/VR content to exceed the predicted bandwidth for the network link during the future timeframe further cause the processing circuitry to: maximize a quality of the FOV frame section while maintaining the required streaming bandwidth for the plurality of AR/VR frame sections within the predicted bandwidth; or assign weighted qualities to the plurality of AR/VR frame sections such that the required streaming bandwidth for the plurality of AR/VR frame sections is within the predicted bandwidth.

Example A25 includes a method of media streaming using link performance predictions, comprising: receiving, via network interface circuitry, a link performance prediction for a network link between a computing device and a network, wherein the link performance prediction is to indicate a predicted performance of the network link during a future timeframe; identifying a performance objective for a media stream based on the link performance prediction, wherein the performance objective is associated with media stream content to be played during the future timeframe, wherein the media stream content is to be received in the media stream over the network link; adjusting one or more media streaming parameters for the media stream content to be played during the future timeframe, wherein the one or more media streaming parameters are to be adjusted based on the link performance prediction and the performance objective; and receiving, via the network interface circuitry, the media stream content to be played during the future timeframe, wherein the media stream content is to be received over the network link based on the one or more media streaming parameters.

Example A26 includes the method of Example A25, wherein: the computing device comprises a mobile device; the network comprises a radio access network; the network link comprises a radio link between the mobile device and the radio access network; and the link performance prediction comprises a predicted bandwidth for the radio link during the future timeframe.

Example A27 includes the method of Example A25, wherein the one or more media streaming parameters comprise at least one of: a buffer level of a media stream buffer, wherein the media stream buffer is for buffering the media stream content to be played during the future timeframe; a resolution of the media stream content to be played during the future timeframe; or a compression rate for compression of the media stream content to be played during the future timeframe.

Example A28 includes the method of any of Examples A25-A27, wherein the performance objective for the media stream comprises at least one of: minimizing playback stalls for the media stream content to be played during the future timeframe; minimizing resource utilization for the media stream content to be played during the future timeframe; or maximizing a quality of the media stream content to be played during the future timeframe.

Example A29 includes the method of Example A28, wherein: the link performance prediction comprises a predicted bandwidth decrease for the network link during the future timeframe; the performance objective comprises minimizing playback stalls for the media stream content to be played during the future timeframe; and adjusting the one or more media streaming parameters for the media stream content to be played during the future timeframe comprises: proactively increasing the buffer level of the media stream buffer based on the predicted bandwidth decrease, wherein the buffer level is to be increased to increase a playback length of the media stream content from the media stream buffer to minimize playback stalls during the future timeframe.

Example A30 includes the method of Example A29, wherein adjusting the one or more media streaming parameters for the media stream content to be played during the future timeframe further comprises: proactively decreasing the resolution of the media stream content based on the predicted bandwidth decrease, wherein the resolution is to be decreased to reduce a required streaming bandwidth for the media stream content, wherein the required streaming bandwidth is to be reduced to minimize playback stalls during the future timeframe based on the predicted bandwidth decrease; or proactively increasing the compression rate for compression of the media stream content based on the predicted bandwidth decrease, wherein the compression rate is to be increased to reduce a required streaming bandwidth for the media stream content, wherein the required streaming bandwidth is to be reduced to minimize playback stalls during the future timeframe based on the predicted bandwidth decrease.

Example A31 includes the method of Example A28, wherein: the link performance prediction comprises a predicted bandwidth increase for the network link during the future timeframe; the performance objective comprises minimizing resource utilization for the media stream content to be played during the future timeframe; and adjusting the one or more media streaming parameters for the media stream content to be played during the future timeframe comprises: proactively decreasing the buffer level of the media stream buffer based on the predicted bandwidth increase, wherein the buffer level is to be decreased to reduce an amount of memory used by the media stream buffer for buffering the media stream content during the future timeframe.

Example A32 includes the method of Example A28, wherein: the link performance prediction comprises a predicted bandwidth increase for the network link during the future timeframe; the performance objective comprises maximizing the quality of the media stream content to be played during the future timeframe; and adjusting the one or more media streaming parameters for the media stream content to be played during the future timeframe comprises: proactively adjusting the one or more media streaming parameters to improve the quality of the media stream content to be played during the future timeframe based on the predicted bandwidth increase.

Example A33 includes the method of Example A32, wherein proactively adjusting the one or more media streaming parameters to improve the quality of the media stream content to be played during the future timeframe based on the predicted bandwidth increase comprises: proactively increasing the resolution of the media stream content based on the predicted bandwidth increase, wherein the resolution is to be increased to improve the quality of the media stream content to be played during the future timeframe based on the predicted bandwidth increase; or proactively reducing the compression rate for compression of the media stream content based on the predicted bandwidth increase, wherein the compression rate is to be reduced to improve the quality of the media stream content to be played during the future timeframe based on the predicted bandwidth increase.

Example A34 includes the method of any of Examples A25-A27, wherein: the media stream comprises a video stream; and the media stream content comprises video content within the video stream.

Example A35 includes the method of Example A34, wherein: the video stream comprises an augmented reality or virtual reality (AR/VR) stream; the video content comprises AR/VR content within the AR/VR stream, wherein the AR/VR content comprises a plurality of AR/VR frame sections, wherein the plurality of AR/VR frame sections comprise a field-of-view (FOV) frame section and one or more non-FOV frame sections, wherein the FOV frame section is within a current field of view of a user and the one or more non-FOV frame sections are outside the current field of view of the user; the link performance prediction comprises a predicted bandwidth for the network link during the future timeframe; the performance objective comprises maximizing a quality of gameplay for the user during the future timeframe; and adjusting the one or more media streaming parameters for the media stream content to be played during the future timeframe comprises: maximizing a quality of the AR/VR content without causing a required streaming bandwidth for the AR/VR content to exceed the predicted bandwidth for the network link during the future timeframe, wherein the required streaming bandwidth is to be maintained within the predicted bandwidth to minimize gameplay lag.

Example A36 includes the method of Example A35, wherein maximizing the quality of the AR/VR content without causing the required streaming bandwidth for the AR/VR content to exceed the predicted bandwidth for the network link during the future timeframe comprises: maximizing a quality of the FOV frame section while maintaining the required streaming bandwidth for the plurality of AR/VR frame sections within the predicted bandwidth; or assigning weighted qualities to the plurality of AR/VR frame sections such that the required streaming bandwidth for the plurality of AR/VR frame sections is within the predicted bandwidth.

Example A37 includes a system for media streaming using link performance predictions, comprising: means for receiving, via network interface circuitry, a link performance prediction for a network link between a computing device and a network, wherein the link performance prediction is to indicate a predicted performance of the network link during a future timeframe; means for identifying a performance objective for a media stream based on the link performance prediction, wherein the performance objective is associated with media stream content to be played during the future timeframe, wherein the media stream content is to be received in the media stream over the network link; means for adjusting one or more media streaming parameters for the media stream content to be played during the future timeframe, wherein the one or more media streaming parameters are to be adjusted based on the link performance prediction and the performance objective; and means for receiving, via the network interface circuitry, the media stream content to be played during the future timeframe, wherein the media stream content is to be received over the network link based on the one or more media streaming parameters.

B. LPP Bandwidth and Latency Measurement Examples

Example B01 includes a method comprising: selecting, by a measurement unit, a destination test unit for performing link performance prediction (LPP) measurements; and performing, by the measurement unit, the LPP measurements for a link between the destination test unit and the measurement unit.

Example B02 includes the method of Example B01 and/or some other example(s) herein, wherein selecting the destination test unit comprises: selecting the destination test unit based on a location of the destination test unit in a network and/or based on a location of the measurement unit.

Example B03 includes the method of Example B02 and/or some other example(s) herein, wherein selecting the destination test unit comprises: selecting the destination test unit based on a distance between the measurement unit and the destination test unit, the distance being based on the location of the destination test unit in the network and the location of the measurement unit.

Example B04 includes the method of Examples B01-B03 and/or some other example(s) herein, wherein selecting the destination test unit comprises: selecting the destination test unit based on a device type of the destination test unit.

Example B05 includes the method of Examples B01-B04 and/or some other example(s) herein, further comprising: sending, by the measurement unit, a lock request to lock the destination test unit for performing the LPP measurements; performing the LPP measurements comprises performing the LPP measurements for the link between the destination test unit and the measurement unit while the destination test unit is locked; and sending, by the measurement unit, an unlock request to unlock the destination test unit after performing the LPP measurements.

Example B06 includes the method of Example B05 and/or some other example(s) herein, wherein the lock request is to cause the destination test unit to perform a test and set operation on a locking mechanism.

Example B07 includes the method of Example B06 and/or some other example(s) herein, wherein the locking mechanism is a semaphore locking mechanism or a database (record) locking mechanism.

Example B08 includes the method of Examples B01-B07 and/or some other example(s) herein, wherein performing the LPP measurements comprises: determining, by the measurement unit, a current radio status of the measurement unit at a start of the LPP measurement process; and determining, by the measurement unit, a current radio status of the measurement unit at an end of the LPP measurement process.

Example B09 includes the method of Example B08 and/or some other example(s) herein, wherein determining the current radio status comprises: determining a current location of the measurement unit; determining a current radio access technology (RAT) being used by the measurement unit; and/or determining current radio/signal conditions of a cell in which the measurement unit is located and/or a call on which the measurement unit is camping, wherein the current radio/signal conditions include signal strength measurements and/or signal quality measurements.

Example B10 includes the method of Examples B01-B09 and/or some other example(s) herein, wherein performing the LPP measurements comprises: requesting, by the measurement unit, data from the destination test unit; receiving, by the measurement unit, the requested data from the destination test unit; measuring, by the measurement unit, a latency of the received data; and sampling, by the measurement unit, the received data and/or timestamps of the received data.

Example B11 includes the method of Example B10 and/or some other example(s) herein, wherein the request for data is a pull request for measurement of LPP in a downlink direction and/or a push request for measurement of LPP in a uplink direction.

Example B12 includes the method of Examples B10-B11 and/or some other example(s) herein, wherein measuring the latency comprises: accounting for a transport layer protocol and application layer protocol used for requesting the data and receiving the data.

Example B13 includes the method of Examples B10-B12 and/or some other example(s) herein, wherein measuring the latency comprises: measuring a round trip time (RTT) between requesting the data and receiving the data.

Example B14 includes the method of Examples B10-B13 and/or some other example(s) herein, wherein the sampling comprises: storing a number of bytes of the received data for one or more intervals.

Example B15 includes the method of Example B14 and/or some other example(s) herein, wherein the one or more intervals are time intervals and/or data size intervals.

Example B16 includes the method of Examples B10-B15 and/or some other example(s) herein, wherein performing the LPP measurements further comprises: monitoring, by the measurement unit, for exception conditions during the measuring and/or during the sampling; and monitoring, by the measurement unit, for end conditions based on a detected exception condition and/or based on completion of the sampling.

Example B17 includes the method of Example B16 and/or some other example(s) herein, wherein the monitoring for the exception conditions comprises: detecting a change in radio signal properties; detecting a signal loss, a decrease in signal strength, loss of network connectivity, and/or radio link failure; detecting a change in connection type or RAT; detecting a timeout due to no initial data being sent or received; detecting a timeout due to no data being sent or received for a predefined or configured time period; and/or meeting or exceeding a data cap and/or data consumption for measurements exceeds an allocated quota for a certain time period.

Example B18 includes the method of Examples B16-B17 and/or some other example(s) herein, wherein the monitoring for the end conditions comprises: aborting or terminating the measurement process; concluding the measurement process early; and/or reporting the measurements with or without any detected exception conditions.

Example B19 includes the method of Examples B01-B18 and/or some other example(s) herein, further comprising: generating measurement results based on performing the LPP measurements; and providing the measurement results to a result collection entity.

Example B20 includes the method of Example B19 and/or some other example(s) herein, wherein the result collection entity is remote from the measurement unit, and providing the measurement results to the result collection entity comprises: sending the measurement results to the result collection entity.

Example B21 includes the method of Example B20 and/or some other example(s) herein, wherein the result collection entity is a network function in a core network of a mobile network, an application server outside of the mobile network and/or in a datacenter or server farm, an edge compute node of in an edge network, a content delivery network (CDN) node in a CDN, or a cloud computing node or cluster of a cloud computing service.

Example B22 includes the method of Example B19 and/or some other example(s) herein, wherein the result collection entity is implemented by the measurement unit, and providing the measurement results to the result collection entity comprises: storing the measurement results in a local storage of the measurement unit; and sending the measurement results to an LPP service provider.

Example B23 includes the method of Examples B01-B22 and/or some other example(s) herein, wherein the destination test unit is a network function in a core network of a mobile network, an application server in a datacenter or server farm, an edge compute node in an edge network, a CDN node in a CDN, a cloud computing node or cluster of a cloud computing service, or a radio access network (RAN) node.

Example B24 includes the method of Examples B01-B23 and/or some other example(s) herein, wherein the measurement unit is a user equipment (UE) or a radio access network (RAN) node.

Example C01 includes a method comprising: receiving, by a selected destination test unit, a request for performing link performance prediction (LPP) measurements from a measurement unit; and sending, by the destination test unit, data to the measurement for performing the LPP measurements for a link between the destination test unit and the measurement unit.

Example C02 includes the method of Example C01 and/or some other example(s) herein, wherein the request is based on a location of the destination test unit in a network and/or based on a location of the measurement unit.

Example C03 includes the method of Example C02 and/or some other example(s) herein, wherein the request is based on a distance between the measurement unit and the destination test unit, the distance being based on the location of the destination test unit in the network and the location of the measurement unit.

Example C04 includes the method of Examples C01-C03 and/or some other example(s) herein, wherein the request is based on a device type of the destination test unit.

Example C05 includes the method of Examples C01-004 and/or some other example(s) herein, wherein the request is a lock request to lock the destination test unit for performing the LPP measurements, and the method further comprises: receiving, by the destination test unit, an unlock request to unlock the destination test unit after performing the LPP measurements.

Example C06 includes the method of Example C05 and/or some other example(s) herein, further comprising: performing, by the destination test unit, a test and set operation on a locking mechanism in response to receipt of the lock request, and performing the test and set operation comprises: determining a value of a variable or database record of the locking mechanism; and locking the destination test unit for performance of the LPP measurements when the determined value indicates that the destination test unit is not locked.

Example C07 includes the method of Example C06 and/or some other example(s) herein, wherein the locking mechanism is a semaphore locking mechanism or a database (record) locking mechanism.

Example C08 includes the method of Examples C01-007 and/or some other example(s) herein, wherein the request is a request for data, and the method comprises: sending, by the measurement unit, the requested data to the measurement unit.

Example C09 includes the method of Example C07 and/or some other example(s) herein, wherein the request for data is a pull request for measurement of LPP in a downlink direction and/or a push request for measurement of LPP in a uplink direction.

Example C10 includes the method of Examples C01-009 and/or some other example(s) herein, further comprising: measuring the latency between receiving the request for the data and receipt of the data at the measurement unit including accounting for a transport layer protocol and application layer protocol used for requesting the data and receiving the data.

Example C11 includes the method of Example C10 and/or some other example(s) herein, wherein measuring the latency comprises: measuring a round trip time (RTT) between receiving the request for the data and receipt of the data at the measurement unit.

Example C12 includes the method of Examples C10-C11 and/or some other example(s) herein, further comprising: generating measurement results message for the latency measurements; and providing the measurement results message to the measurement unit and/or to a result collection entity.

Example C13 includes the method of Example C12 and/or some other example(s) herein, wherein the result collection entity is remote from the measurement unit or the result collection entity is implemented by the measurement unit.

Example C14 includes the method of Example C13 and/or some other example(s) herein, wherein the result collection entity is a network function in a core network of a mobile network, an application server outside of the mobile network and/or in a datacenter or server farm, an edge compute node of in an edge network, a content delivery network (CDN) node in a CDN, or a cloud computing node or cluster of a cloud computing service.

Example C15 includes the method of Examples C01-C14 and/or some other example(s) herein, wherein the destination test unit is a network function in a core network of a mobile network, an application server in a datacenter or server farm, an edge compute node in an edge network, a CDN node in a CDN, a cloud computing node or cluster of a cloud computing service, or a radio access network (RAN) node.

Example C16 includes the method of Examples C01-C15 and/or some other example(s) herein, wherein the measurement unit is a user equipment (UE) or a radio access network (RAN) node.

C. LPP Notification Examples

Example P01 includes an apparatus for providing link performance predictions (LPPs), the apparatus comprising: processor circuitry coupled with network interface circuitry, the network interface circuitry arranged to communicatively couple the apparatus with one or more network access nodes (NANs), wherein individual NANs of the one or more NANs are arranged to provide network connectivity to one or more user equipment (UEs) via respective links between the individual NANs and the one or more UEs, and the processor circuitry is arranged to operate an LPP engine to: obtain predicted performance metrics for LPP from individual prediction layers of a plurality of prediction layers, determine, for each of the respective links, a corresponding LPP based on the obtained predicted performance metrics, and generate, for each of the respective links, a message indicating the corresponding LPP; and wherein the network interface circuitry is further arranged to send the message for each of the respective links to the individual NANs or the one or more UEs via the individual NANs.

Example P02 includes the apparatus of Example P01 and/or some other example(s) herein, wherein the message includes a time field to indicate a timestamp of the corresponding LPP, a type field to indicate an LPP type of the corresponding LPP, a value field to indicate a value of the LPP, and a probability field to indicate a likelihood that the corresponding LPP comes true or an estimated standard deviation of the corresponding LPP.

Example P03 includes the apparatus of Example P02 and/or some other example(s) herein, wherein the LPP type is one of bandwidth, latency, jitter, round trip time (RTT), number of interrupts, out-of-order delivery of data packets, transmission power, bit error rate, bit error ratio (BER), packet loss rate, a packet reception rate (PRR), a signal-to-noise ratio (SNR), a signal-to-noise and interference ratio (SINR), a signal-plus-noise-plus-distortion to noise-plus-distortion (SINAD) ratio, a peak-to-average power ratio (PAPR), a Block Error Rate (BLER), a Reference Signal Received Power (RSRP), a Reference Signal Received Quality (RSRQ), a Received Signal Strength Indicator (RSSI), a channel interference measurement, a thermal noise power measurement, a received interference power measurement, network or cell load, a recommended transmission power.

Example P04 includes the apparatus of Examples P01-P03 and/or some other example(s) herein, wherein, to determine the corresponding LPP for each of the respective links, the processor circuitry is arranged to operate the LPP engine to: combine one or more predicted performance metrics from the individual prediction layers with one or more other predicted performance metrics from at least one other prediction layer of the plurality of prediction layers.

Example P05 includes the apparatus of Examples P01-P04 and/or some other example(s) herein, wherein the individual prediction layers are to be operated by respective edge compute nodes, and the network interface circuitry is further arranged to receive the predicted performance metrics from the respective edge compute nodes.

Example P06 includes the apparatus of Example P05 and/or some other example(s) herein, wherein individual prediction layers are to be operated within respective virtual machines (VMs) or application containers in the respective edge compute nodes.

Example P07 includes the apparatus of Examples P05-P06 and/or some other example(s) herein, wherein the edge compute nodes are Content Delivery Network (CDN) servers, Nebula edge-cloud computing systems, fog computing systems, cloudlet edge-cloud computing systems, Mobile Cloud Computing (MCC) systems, Central Office Re-architected as a Datacenter (CORD) systems, mobile CORD (M-CORD) systems, Converged Multi-Access and Core (COMAC) computing systems, or Multi-access Edge Computing (MEC) servers.

Example P08 includes the apparatus of Examples P01-P07 and/or some other example(s) herein, wherein the apparatus is a System-On-Chip (SoC) or a Multi-Chip Package (MCP) disposed in a server computing system, the server computing system is to operate as an application server, a server of a service provider platform, or a as a cloud computing node provided by a cloud computing service.

Example P09 includes the apparatus of Example P08 and/or some other example(s) herein, wherein the processor circuitry is arranged to operate individual prediction layers of the plurality of prediction layers, and each prediction layer of the plurality of prediction layers is arranged to use a machine learning (ML) algorithm to generate an ML model for corresponding NANs of the one or more NANs, and each prediction layer is arranged to use the ML model for the corresponding NANs to generate respective predicted performance metrics.

Example P10 includes the apparatus of Examples P08-P09 and/or some other example(s) herein, wherein at least one prediction layer of the plurality of prediction layers is arranged to use an ML algorithm that is different than ML algorithms used by other prediction layers of the plurality of prediction layers.

Example P11 includes the apparatus of Examples P08-P10 and/or some other example(s) herein, wherein the processor circuitry is arranged to operate individual prediction layers in respective virtual machines (VMs) or application containers.

Example Q01 includes a Link Performance Prediction (LPP) method comprising: obtaining or causing to obtain predicted performance metrics from individual prediction layers of a plurality of prediction layers; and for each radio link provided by one or more network access nodes (NANs) to a plurality of user equipment (UEs) being served by the one or more NANs: determining or causing to determine an LPP for the radio link based on combinations of the obtained predicted performance metrics, generating or causing to generate an LPP notification including the LPP, and transmitting or causing to transmit the LPP notification to the NAN or the UE.

Example Q02 includes the method of Example Q01 and/or some other example(s) herein, wherein the plurality of layers includes a data collection layer, and the method comprises: collecting and storing or causing to collect and store, by the data collection layer, operational parameters, mobility information, and measurement information from the plurality of UEs or the one or more NANs as spatio-temporal data.

Example Q03 includes the method of Example Q02 and/or some other example(s) herein, wherein: the operational parameters include one or more of hardware configuration information, subscription data, security permissions, processor speed, memory or storage capacity, average computation time per workload, reuse degree of computational resources, processor utilization, memory utilization, available memory, available processor resources, communication capabilities, available battery power, and a battery power budget; the mobility information indicating a speed and direction of travel of the plurality of UEs, and the mobility information includes one or more of global navigation satellite system (GNSS) data, mapping application data, turn-by-turn navigation data, signal measurement based calculations, Long Term Evolution (LTE) location based services; and the measurement information includes one or more of bandwidth, network or cell load, latency, jitter, round trip time (RTT), number of interrupts, out-of-order delivery of data packets, bit error rate, bit error ratio (BER), Block Error Rate (BLER), packet loss rate, packet reception rate (PRR), transmission power measurements, reception power measurements, Received Signal Strength Indicator (RSSI) measurements, Reference Signal Received Power (RSRP) measurements, Reference Signal Received Quality (RSRQ) measurements, peak-to-average power ratio (PAPR), channel interference measurement, thermal noise power measurement, received interference power measurement, signal-to-noise ratio (SNR) measurements, signal-to-noise and interference ratio (SINR) measurements, signal-plus-noise-plus-distortion to noise-plus-distortion (SINAD) ratio, GNSS timing information, GNSS code measurements, and GNSS carrier phase measurements.

Example Q04 includes the method of Examples Q02-Q03 and/or some other example(s) herein, wherein the plurality of layers further includes a cell load layer, and the method comprises: generating or causing to generate, by the cell load layer for respective NANs of the one or more NANs, a cell load machine learning (ML) model using at least a subset of the spatio-temporal data and NAN characteristics of the respective NANs, the cell load ML model representing a predicted bandwidth or predicted resource utilization for the respective NANs at one or more time instances; and determining or causing to determine, by the cell load layer using the cell load ML model for the respective NANs, a predicted bandwidth or predicted resource utilization for the respective NANs at one or more future time instances.

Example Q05 includes the method of Example Q04 and/or some other example(s) herein, wherein generating the cell load ML model comprises: operating or causing to operate, by the cell load layer, one or both of a Long Short Term Memory (LSTM) algorithm and a Recurrent Neural Network (RNN) using the subset of the spatio-temporal data and the NAN characteristics as an input.

Example Q06 includes the method of Examples Q02-Q05 and/or some other example(s) herein, wherein the plurality of layers includes an intra-cell layer, and the method comprises: generating or causing to generate, by the intra-cell layer, an intra-cell ML model for respective NANs of the one or more NANs using at least a subset of the spatio-temporal data, the intra-cell ML model representing a predicted signal quality for a given UE within a coverage area of the respective NANs at one or more time instances; and determining or causing to determine, by the intra-cell layer using the intra-cell ML model for the respective NANs, a predicted signal quality for each UE of the plurality of UEs within the coverage area of the respective NANs at one or more future time instances.

Example Q07 includes the method of Example Q06 and/or some other example(s) herein, wherein generating the intra-cell ML model comprises: operating or causing to operate one or more of a pattern matching algorithm and a graph matching algorithm using the subset of the spatio-temporal data as an input.

Example Q08 includes the method of Examples 006-Q07 and/or some other example(s) herein, wherein the plurality of layers includes a geoposition layer, and the method comprises: generating or causing to generate, by the geoposition layer, a geoposition ML model for the respective NANs using at least a subset of the spatio-temporal data, the geoposition ML model representing a predicted signal quality for a given UE at a given geolocation at one or more time instances; and determining or causing to determine, by the geoposition layer, using the geoposition ML model for the respective NANs, a predicted signal quality for each UE at one or more geolocations at one or more future time instances.

Example Q09 includes the method of Example Q08 and/or some other example(s) herein, wherein generating the geoposition ML model comprises: correlating or causing to correlate, by the geoposition layer, the predicted signal quality for each UE with one or more measurements taken at the given geolocation at the one or more time instances.

Example Q10 includes the method of Examples Q02-Q09 and/or some other example(s) herein, wherein the plurality of layers includes a cell transition layer, and the method comprises: generating or causing to generate, by the cell transition layer, a cell transition ML model for respective NANs of the one or more NANs using at least a subset of the spatio-temporal data, the cell transition ML model representing a probability that a given UE will travel from a coverage area of the respective NANs to another coverage area of another NAN of the one or more NANs; and determining or causing to determine, by the cell transition layer using the cell transition ML model for the respective NANs, a predicted coverage area to be visited by each UE at one or more future time instances.

Example Q11 includes the method of Example Q10 and/or some other example(s) herein, wherein generating the cell transition ML model comprises: operating or causing to operate a graph drawing algorithm to generate a graph data structure including a node to represent a corresponding one of the one or more NANs and an edge between the node and at least one other node, the edge representing a direction, time and probability of a transition between the node and the at least one other node; and operating or causing to operate a sequence prediction algorithm to determine, for each node in the graph data structure, a probability that the given UE will travel from the node to the at least one other node at a given time instance.

Example Q12 includes the method of Example Q11 and/or some other example(s) herein, wherein the graph drawing algorithm includes one or more of a forced-based layout algorithm, a spectral layout algorithm, and a tree layout algorithm; and wherein the sequence prediction algorithm includes one or more of a Compact Prediction Tree (CPT) algorithm, a Random Forest algorithm, and a graph traversal algorithm.

Example Q13 includes the method of Examples Q02-Q12 and/or some other example(s) herein, wherein the plurality of layers includes a network topology layer, and the method comprises: generating or causing to generate, by the network topology layer, a network topology ML model using one or more NAN characteristics of the respective NANs, the network topology ML model representing a predicted link quality for one or more backhaul links connected to the respective NANs at one or more time instances; and determining or causing to determine, by the network topology layer using the network topology ML model for the respective NANs, a predicted link quality for each of the one or more backhaul links at one or more future time instances.

Example R01 includes a computer-implemented link performance predictions (LPP) method, the method comprising: receiving, by an LPP service (LPPS) provider from an LPPS consumer, a first message for requesting LPP services from the LPPS provider; determining, by the LPPS provider, an LPP for a radio link based on combinations of predicted performance metrics obtained from one or more performance prediction layers; and sending, by the LPPS provider to the LPPS consumer, a second message including an LPP notification, the LPP notification indicating the determined LPP.

Example R02 includes the method of Example R01 and/or some other example(s) herein, wherein the first message is a request message, the second message is a reply message, and the method further comprises: determining, by the LPPS provider, the LPP for the radio link based at least in part on information contained in the request message; and generating, by the LPPS provider, the LPP notification in response to receipt of the request message.

Example R03 includes the method of Example R01 and/or some other example(s) herein, wherein the first message is a subscribe message, the second message is a notify message, and the method further comprises: adding, by the LPPS provider, the LPPS consumer and information contained in the request message to a subscriber list; detecting, by the LPPS provider, a trigger to determine the LPP for the radio link; and in response to detecting the trigger, generating, by the LPPS provider, the LPP notification, and sending the notify message to the LPPS consumer.

Example R04 includes the method of Examples R01-R03 and/or some other example(s) herein, wherein the first message is a registration request message, the second message is a registration response message, and the method further comprises: in response to receipt of the registration request message, determining, by the LPPS provider, a unique key based on information included in the registration request message; and generating, by the LPPS provider, the registration response message to include the unique key and a domain name of the LPPS provider.

Example R05 includes the method of Examples R01-R04 and/or some other example(s) herein, wherein the second message is to cause the LPP service consumer to perform one or more operational decisions for link resource utilization based on the LPP notification.

Example Z01 may include an apparatus comprising means to perform one or more elements of a method described in or related to any of Examples A01-A37, B01-B23, C01-C16, P01-P11, Q01-Q13, R01-R05, or any other method or process described herein. Example Z02 may include one or more non-transitory computer-readable media comprising instructions to cause an electronic device, upon execution of the instructions by one or more processors of the electronic device, to perform one or more elements of a method described in or related to any of Examples A01-A37, B01-B23, C01-C16, P01-P11, Q01-Q13, R01-R05, or any other method or process described herein. Example Z03 may include an apparatus comprising logic, modules, or circuitry to perform one or more elements of a method described in or related to any of Examples A01-A37, B01-B23, C01-C16, P01-P11, Q01-Q13, R01-R05, or any other method or process described herein. Example Z04 may include a method, technique, or process as described in or related to any of Examples A01-A37, B01-B23, C01-C16, P01-P11, Q01-Q13, R01-R05, or portions or parts thereof. Example Z05 may include an apparatus comprising: one or more processors and one or more computer-readable media comprising instructions that, when executed by the one or more processors, cause the one or more processors to perform the method, techniques, or process as described in or related to any of Examples A01-A37, B01-B23, C01-C16, P01-P11, Q01-Q13, R01-R05, or portions thereof. Example Z06 may include a signal as described in or related to any of Examples A01-A37, B01-B23, C01-C16, P01-P11, Q01-Q13, R01-R05, or portions or parts thereof. Example Z07 may include a datagram, packet, frame, segment, protocol data unit (PDU), or message as described in or related to any of Examples A01-A37, B01-B23, C01-C16, P01-P11, Q01-Q13, R01-R05, or portions or parts thereof, or otherwise described in the present disclosure. Example Z08 may include a signal encoded with data as described in or related to any of Examples A01-A37, B01-B23, C01-C16, P01-P11, Q01-Q13, R01-R05, or portions or parts thereof, or otherwise described in the present disclosure. Example Z09 may include a signal encoded with a datagram, packet, frame, segment, protocol data unit (PDU), or message as described in or related to any of Examples A01-A37, B01-B23, C01-C16, P01-P11, Q01-Q13, R01-R05, or portions or parts thereof, or otherwise described in the present disclosure. Example Z10 may include an electromagnetic signal carrying computer-readable instructions, wherein execution of the computer-readable instructions by one or more processors is to cause the one or more processors to perform the method, techniques, or process as described in or related to any of Examples A01-A37, B01-B23, C01-C16, P01-P11, Q01-Q13, R01-R05, or portions thereof. Example Z11 may include a computer program comprising instructions, wherein execution of the program by a processing element is to cause the processing element to carry out the method, techniques, or process as described in or related to any of Examples A01-A37, B01-B23, C01-C16, P01-P11, Q01-Q13, R01-R05, or portions thereof. Example Z12 may include a signal in a wireless network as shown and described herein. Example Z13 may include a method of communicating in a wireless network as shown and described herein. Example Z14 may include a system for providing wireless communication as shown and described herein. Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

IV. Terminology

For the purposes of the present document, the following terms and definitions are applicable to the examples and embodiments discussed herein. The terminology used herein is for the purpose of describing particular embodiments only and is not intended to be limiting of the disclosure.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a Field-Programmable Gate Array (FPGA), Programmable Logic Device (PLD), System-on-Chip (SoC), System-in-Package (SiP), Multi-Chip Package (MCP), Digital Signal Processors (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. The term "admission control" refers to a validation process in communication systems where a check is performed before a connection is established to see if current resources are sufficient for the proposed connection.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content.

The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by the processor 102 during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

What is claimed is:

1. A device, comprising:

network interface circuitry to communicate over a network; and processing circuitry to:

receive, via the network interface circuitry, a link performance prediction for a network link between the device and the network, wherein the link performance prediction indicates a predicted bandwidth of the network link during a future timeframe;

adjust, based on the link performance prediction, one or more media streaming parameters associated with a media stream, wherein the media stream is streamed over the network link using a media streaming technology, wherein the one or more media streaming parameters control a behavior of the media streaming technology, wherein the one or more media streaming parameters comprise a buffer level of a media stream buffer, and wherein the buffer level is proactively adjusted based on the predicted bandwidth of the network link, a required bandwidth of the media stream, a duration of the future timeframe, and a probability associated with the predicted bandwidth; and receive, via the network interface circuitry, media content within the media stream, wherein the media content is received over the network link based on the one or more media streaming parameters, and wherein the media content is to be played during the future timeframe.

2. The device of claim 1, wherein:

the device comprises a mobile device;

the network comprises a radio access network;

the network link comprises a radio link between the mobile device and the radio access network; and the link performance prediction comprises the predicted bandwidth for the radio link during the future timeframe.

3. The device of claim 1, wherein the one or more media streaming parameters further comprise at least one of:

a resolution of the media content to be played during the future timeframe; or a compression rate for compression of the media content to be played during the future timeframe.

4. The device of claim 3, wherein the one or more media streaming parameters are adjusted based on the link performance prediction and a performance objective for the media stream, wherein the performance objective comprises at least one of:

minimizing playback stalls for the media content to be played during the future timeframe;

minimizing resource utilization for the media content to be played during the future timeframe; or maximizing a quality of the media content to be played during the future timeframe.

5. The device of claim 4, wherein:

the link performance prediction comprises a predicted bandwidth decrease for the network link during the future timeframe;

the performance objective comprises minimizing playback stalls for the media content to be played during the future timeframe; and the processing circuitry to adjust, based on the link performance prediction, the one or more media streaming parameters associated with the media stream is further to:

proactively increase the buffer level of the media stream buffer based on the predicted bandwidth decrease, wherein the buffer level is to be increased to increase a playback length of the media content from the media stream buffer to minimize playback stalls during the future timeframe.

6. The device of claim 5, wherein the processing circuitry to adjust, based on the link performance prediction, the one or more media streaming parameters associated with the media stream is further to:

proactively decrease the resolution of the media content based on the predicted bandwidth decrease, wherein the resolution is to be decreased to reduce a required streaming bandwidth for the media content, wherein the required streaming bandwidth is to be reduced to minimize playback stalls during the future timeframe based on the predicted bandwidth decrease; or proactively increase the compression rate for compression of the media content based on the predicted bandwidth decrease, wherein the compression rate is to be increased to reduce a required streaming bandwidth for the media content, wherein the required streaming bandwidth is to be reduced to minimize playback stalls during the future timeframe based on the predicted bandwidth decrease.

7. The device of claim 4, wherein:

the link performance prediction comprises a predicted bandwidth increase for the network link during the future timeframe;

the performance objective comprises minimizing resource utilization for the media content to be played during the future timeframe; and the processing circuitry to adjust, based on the link performance prediction, the one or more media streaming parameters associated with the media stream is further to:

proactively decrease the buffer level of the media stream buffer based on the predicted bandwidth increase, wherein the buffer level is to be decreased to reduce an amount of memory used by the media stream buffer for buffering the media content during the future timeframe.

8. The device of claim 4, wherein:

the link performance prediction comprises a predicted bandwidth increase for the network link during the future timeframe;

the performance objective comprises maximizing the quality of the media content to be played during the future timeframe; and the processing circuitry to adjust, based on the link performance prediction, the one or more media streaming parameters associated with the media stream is further to:

proactively adjust the one or more media streaming parameters to improve the quality of the media content to be played during the future timeframe based on the predicted bandwidth increase.

9. The device of claim 8, wherein the processing circuitry to proactively adjust the one or more media streaming parameters to improve the quality of the media content to be played during the future timeframe based on the predicted bandwidth increase is further to:

proactively increase the resolution of the media content based on the predicted bandwidth increase, wherein the resolution is to be increased to improve the quality of the media content to be played during the future timeframe based on the predicted bandwidth increase; or proactively reduce the compression rate for compression of the media content based on the predicted bandwidth increase, wherein the compression rate is to be reduced to improve the quality of the media content to be played during the future timeframe based on the predicted bandwidth increase.

10. The device of claim 1, wherein:

the media stream comprises a video stream; and the media content comprises video content within the video stream.

11. The device of claim 10, wherein:

the video stream comprises an augmented reality or virtual reality (AR/VR) stream;

the video content comprises AR/VR content within the AR/VR stream, wherein the AR/VR content comprises a plurality of AR/VR frame sections, wherein the plurality of AR/VR frame sections comprise a field-of-view (FOV) frame section and one or more non-FOV frame sections, wherein the FOV frame section is within a current field of view of a user and the one or more non-FOV frame sections are outside the current field of view of the user;

the one or more media streaming parameters are adjusted based on the link performance prediction and a performance objective for the media stream, wherein the performance objective comprises maximizing a quality of gameplay for the user during the future timeframe; and the processing circuitry to adjust, based on the link performance prediction, the one or more media streaming parameters associated with the media stream is further to:

maximize a quality of the AR/VR content without causing a required streaming bandwidth for the AR/VR content to exceed the predicted bandwidth for the network link during the future timeframe, wherein the required streaming bandwidth is to be maintained within the predicted bandwidth to minimize gameplay lag.

12. At least one non-transitory computer-readable storage medium having instructions stored thereon, wherein the instructions, when executed on processing circuitry, cause the processing circuitry to:

receive, via network interface circuitry, a link performance prediction for a network link between a device and a network, wherein the link performance prediction indicates a predicted bandwidth of the network link during a future timeframe;

adjust, based on the link performance prediction, one or more media streaming parameters associated with a media stream, wherein the media stream is streamed over the network link using a media streaming technology, wherein the one or more media streaming parameters control a behavior of the media streaming technology, wherein the one or more media streaming parameters comprise a buffer level of a media stream buffer, and wherein the buffer level is proactively adjusted based on the predicted bandwidth of the network link, a required bandwidth of the media stream, a duration of the future timeframe, and a probability associated with the predicted bandwidth; and receive, via the network interface circuitry, media content within the media stream, wherein the media content is received over the network link based on the one or more media streaming parameters, and wherein the media content is to be played during the future timeframe.

13. The storage medium of claim 12, wherein:

the device comprises a mobile device;

the network comprises a radio access network;

the network link comprises a radio link between the mobile device and the radio access network; and the link performance prediction comprises the predicted bandwidth for the radio link during the future timeframe.

14. The storage medium of claim 12, wherein:

the one or more media streaming parameters further comprise at least one of:

a resolution of the media content to be played during the future timeframe; or a compression rate for compression of the media content to be played during the future timeframe; and the one or more media streaming parameters are adjusted based on the link performance prediction and a performance objective for the media stream, wherein the performance objective comprises at least one of:

minimizing playback stalls for the media content to be played during the future timeframe;

minimizing resource utilization for the media content to be played during the future timeframe; or maximizing a quality of the media content to be played during the future timeframe.

15. The storage medium of claim 14, wherein:

the link performance prediction comprises a predicted bandwidth decrease for the network link during the future timeframe;

the performance objective comprises minimizing playback stalls for the media content to be played during the future timeframe; and the instructions that cause the processing circuitry to adjust, based on the link performance prediction, the one or more media streaming parameters associated with the media stream further cause the processing circuitry to:

proactively increase the buffer level of the media stream buffer based on the predicted bandwidth decrease, wherein the buffer level is to be increased to increase a playback length of the media content from the media stream buffer to minimize playback stalls during the future timeframe.

16. The storage medium of claim 15, wherein the instructions that cause the processing circuitry to adjust, based on the link performance prediction, the one or more media streaming parameters associated with the media stream further cause the processing circuitry to:

proactively decrease the resolution of the media content based on the predicted bandwidth decrease, wherein the resolution is to be decreased to reduce a required streaming bandwidth for the media content, wherein the required streaming bandwidth is to be reduced to minimize playback stalls during the future timeframe based on the predicted bandwidth decrease; or proactively increase the compression rate for compression of the media content based on the predicted bandwidth decrease, wherein the compression rate is to be increased to reduce a required streaming bandwidth for the media content, wherein the required streaming bandwidth is to be reduced to minimize playback stalls during the future timeframe based on the predicted bandwidth decrease.

17. The storage medium of claim 14, wherein:

the link performance prediction comprises a predicted bandwidth increase for the network link during the future timeframe;

the performance objective comprises minimizing resource utilization for the media content to be played during the future timeframe; and the instructions that cause the processing circuitry to adjust, based on the link performance prediction, the one or more media streaming parameters associated with the media stream further cause the processing circuitry to:

proactively decrease the buffer level of the media stream buffer based on the predicted bandwidth increase, wherein the buffer level is to be decreased to reduce an amount of memory used by the media stream buffer for buffering the media content during the future timeframe.

18. The storage medium of claim 14, wherein:

the link performance prediction comprises a predicted bandwidth increase for the network link during the future timeframe;

the performance objective comprises maximizing the quality of the media content to be played during the future timeframe; and the instructions that cause the processing circuitry to adjust, based on the link performance prediction, the one or more media streaming parameters associated with the media stream further cause the processing circuitry to:

proactively adjust the one or more media streaming parameters to improve the quality of the media content to be played during the future timeframe based on the predicted bandwidth increase.

19. The storage medium of claim 18, wherein the instructions that cause the processing circuitry to proactively adjust the one or more media streaming parameters to improve the quality of the media content to be played during the future timeframe based on the predicted bandwidth increase further cause the processing circuitry to:

proactively increase the resolution of the media content based on the predicted bandwidth increase, wherein the resolution is to be increased to improve the quality of the media content to be played during the future timeframe based on the predicted bandwidth increase; or proactively reduce the compression rate for compression of the media content based on the predicted bandwidth increase, wherein the compression rate is to be reduced to improve the quality of the media content to be played during the future timeframe based on the predicted bandwidth increase.

20. The storage medium of claim 12, wherein:

the media stream comprises a video stream; and the media content comprises video content within the video stream.

21. The storage medium of claim 20, wherein:

the video stream comprises an augmented reality or virtual reality (AR/VR) stream;

the video content comprises AR/VR content within the AR/VR stream, wherein the AR/VR content comprises a plurality of AR/VR frame sections, wherein the plurality of AR/VR frame sections comprise a field-of-view (FOV) frame section and one or more non-FOV frame sections, wherein the FOV frame section is within a current field of view of a user and the one or more non-FOV frame sections are outside the current field of view of the user;

the one or more media streaming parameters are adjusted based on the link performance prediction and a performance objective for the media stream, wherein the performance objective comprises maximizing a quality of gameplay for the user during the future timeframe; and the instructions that cause the processing circuitry to adjust, based on the link performance prediction, the one or more media streaming parameters associated with the media stream further cause the processing circuitry to:

maximize a quality of the AR/VR content without causing a required streaming bandwidth for the AR/VR content to exceed the predicted bandwidth for the network link during the future timeframe, wherein the required streaming bandwidth is to be maintained within the predicted bandwidth to minimize gameplay lag.

22. The storage medium of claim 21, wherein the instructions that cause the processing circuitry to maximize the quality of the AR/VR content without causing the required streaming bandwidth for the AR/VR content to exceed the predicted bandwidth for the network link during the future timeframe further cause the processing circuitry to:

maximize a quality of the FOV frame section while maintaining the required streaming bandwidth for the plurality of AR/VR frame sections within the predicted bandwidth; or assign weighted qualities to the plurality of AR/VR frame sections such that the required streaming bandwidth for the plurality of AR/VR frame sections is within the predicted bandwidth.

23. A method, comprising:

receiving, via network interface circuitry, a link performance prediction for a network link between a device and a network, wherein the link performance prediction indicates a predicted bandwidth of the network link during a future timeframe;

adjusting, based on the link performance prediction, one or more media streaming parameters associated with a media stream, wherein the media stream is streamed over the network link using a media streaming technology, wherein the one or more media streaming parameters control a behavior of the media streaming technology, wherein the one or more media streaming parameters comprise a buffer level of a media stream buffer, and wherein the buffer level is proactively adjusted based on the predicted bandwidth of the network link, a required bandwidth of the media stream, a duration of the future timeframe, and a probability associated with the predicted bandwidth; and receiving, via the network interface circuitry, media content within the media stream, wherein the media content is received over the network link based on the one or more media streaming parameters, and wherein the media content is to be played during the future timeframe.

24. The method of claim 23, wherein:
the device comprises a mobile device;
the network comprises a radio access network;
the network link comprises a radio link between the mobile device and the radio access network; and
the link performance prediction comprises the predicted bandwidth for the radio link during the future timeframe.

25. The method of claim 23, wherein:
the one or more media streaming parameters further comprise at least one of:
　a resolution of the media content to be played during the future timeframe; or
　a compression rate for compression of the media content to be played during the future timeframe; and
the one or more media streaming parameters are adjusted based on the link performance prediction and a performance objective for the media stream, wherein the performance objective comprises at least one of:
　minimizing playback stalls for the media content to be played during the future timeframe;
　minimizing resource utilization for the media content to be played during the future timeframe; or
　maximizing a quality of the media content to be played during the future timeframe.

\* \* \* \* \*